(12) United States Patent
Kim

(10) Patent No.: US 12,483,957 B2
(45) Date of Patent: Nov. 25, 2025

(54) DEVICE AND METHOD FOR PREVENTING POTENTIAL ERRORS THAT MAY OCCUR WHEN PERFORMING DAPS HANDOVER IN NEXT-GENERATION MOBILE COMMUNICATION SYSTEM

(71) Applicant: Samsung Electronics Co., Ltd., Suwon-si (KR)

(72) Inventor: Donggun Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 322 days.

(21) Appl. No.: 18/260,924

(22) PCT Filed: Jan. 7, 2022

(86) PCT No.: PCT/KR2022/000282
§ 371 (c)(1),
(2) Date: Jul. 10, 2023

(87) PCT Pub. No.: WO2022/149898
PCT Pub. Date: Jul. 14, 2022

(65) Prior Publication Data
US 2024/0056927 A1    Feb. 15, 2024

(30) Foreign Application Priority Data
Jan. 8, 2021 (KR) .................. 10-2021-0002608

(51) Int. Cl.
*H04W 36/00* (2009.01)
*H04W 36/18* (2009.01)
(Continued)

(52) U.S. Cl.
CPC ...... *H04W 36/185* (2023.05); *H04W 74/0833* (2013.01); *H04W 74/0836* (2024.01); *H04W 74/0838* (2024.01)

(58) Field of Classification Search
CPC .......... H04W 36/185; H04W 74/0833; H04W 74/0836; H04W 74/0838; H04W 36/08;
(Continued)

(56) References Cited

U.S. PATENT DOCUMENTS

| 2020/0314716 A1 | 10/2020 | Kim et al. |
| 2020/0329405 A1 | 10/2020 | Awoniyi-Oteri et al. |
| 2021/0051539 A1* | 2/2021 | Zhang ............... H04W 36/38 |

FOREIGN PATENT DOCUMENTS

| KR | 10-2021-0088389 A | 7/2021 |
| WO | 2020088592 A1 | 5/2020 |

OTHER PUBLICATIONS

International Search Report and Written Opinion of the International Searching Authority dated Apr. 13, 2022, in connection with International Application No. PCT/KR2022/000282, 9 pages.
(Continued)

*Primary Examiner* — Marcos Batista

(57) ABSTRACT

The present disclosure relates to: a communication technique for convergence of IoT technology and a 5th generation (5G) or a pre-5G communication system for supporting a higher data transmission rate than a 4th generation (4G) communication system such as Long Term Evolution (LTE); and a system therefor. The present disclosure can be applied to intelligent services (for example, smart homes, smart buildings, smart cities, smart cars or connected cars, healthcare, digital education, retail businesses, security- and safety-related services, and the like) on the basis of 5G communication technology and IoT-related technology. According to various embodiments of the present disclosure, a method and a device for preventing potential errors that may occur when performing a DAPS handover can be provided.

16 Claims, 24 Drawing Sheets

(51) Int. Cl.
*H04W 74/0833* (2024.01)
*H04W 74/0836* (2024.01)
*H04W 74/0838* (2024.01)

(58) Field of Classification Search
CPC ............ H04W 76/34; H04W 36/0027; H04W 36/0079
USPC .......................................... 455/442; 370/338
See application file for complete search history.

(56) References Cited

OTHER PUBLICATIONS

Mediatek Inc, "UE Capabilities for Intra-frequency DAPS Handover," R2-2009783, 3GPP TSG-RAN WG2 Meeting #112-e, Online, Nov. 2-13, 2020, 5 pages.

Sharp, "Potential security issue on DAPS handover with key change failure," R2-2010209 revision of R2-2007790, 3GPP TSG-RAN WG2 Meeting #112 electronic, Online, Nov. 2-13, 2020, 3 pages.

3GPP TS 36.213 V16.3.0 (Sep. 2020), Technical Specification, 3rd Generation Partnership Project; Technical Specification Group Radio Access Network; Evolved Universal Terrestrial Radio Access (E-UTRA); Physical layer procedures (Release 16), Sep. 2020, 579 pages.

3GPP TS 38.213 V16.3.0 (Sep. 2020), Technical Specification, 3rd Generation Partnership Project; Technical Specification Group Radio Access Network; NR; Physical layer procedures for control (Release 16), Sep. 2020, 179 pages.

3GPP TS 38.321 V16.2.0 (Sep. 2020), Technical Specification, 3rd Generation Partnership Project; Technical Specification Group Radio Access Network; NR; Medium Access Control (MAC) protocol specification (Release 16), Sep. 2020, 154 pages.

3GPP TS 38.322 V16.1.0 (Jul. 2020), Technical Specification, 3rd Generation Partnership Project; Technical Specification Group Radio Access Network; NR; Radio Link Control (RLC) protocol specification (Release 16), Jul. 2020, 33 pages.

3GPP TS 38.331 V16.2.0 (Sep. 2020), Technical Specification, 3rd Generation Partnership Project; Technical Specification Group Radio Access Network; NR; Radio Resource Control (RRC) protocol specification (Release 16), Sep. 2020, 921 pages.

Supplementary European Search Report dated Apr. 30, 2024, in connection with European Application No. 22736875.0, 12 pages.

3GPP TS 38.300 V16.4.0 (Dec. 2020), Technical Specification, 3rd Generation Partnership Project; Technical Specification Group Radio Access Network; NR; NR and NG-RAN Overall Description; Stage 2 (Release 16), Dec. 2020, 149 pages.

Ericsson, "MAC PDU discard at split bearer / SCG bearer reconfiguration," R2-1714192, 3GPP TSG-RAN WG2 #100, Reno, US, Nov. 27-Dec. 1, 2017, 4 pages.

Samsung, "Handling of unforeseen protocol data during DAPS handover," R2- 2101498, 3GPP TSG RAN WG2 Meeting #113e, e-Meeting, Jan. 25-Feb. 5, 2021, 3 pages.

* cited by examiner

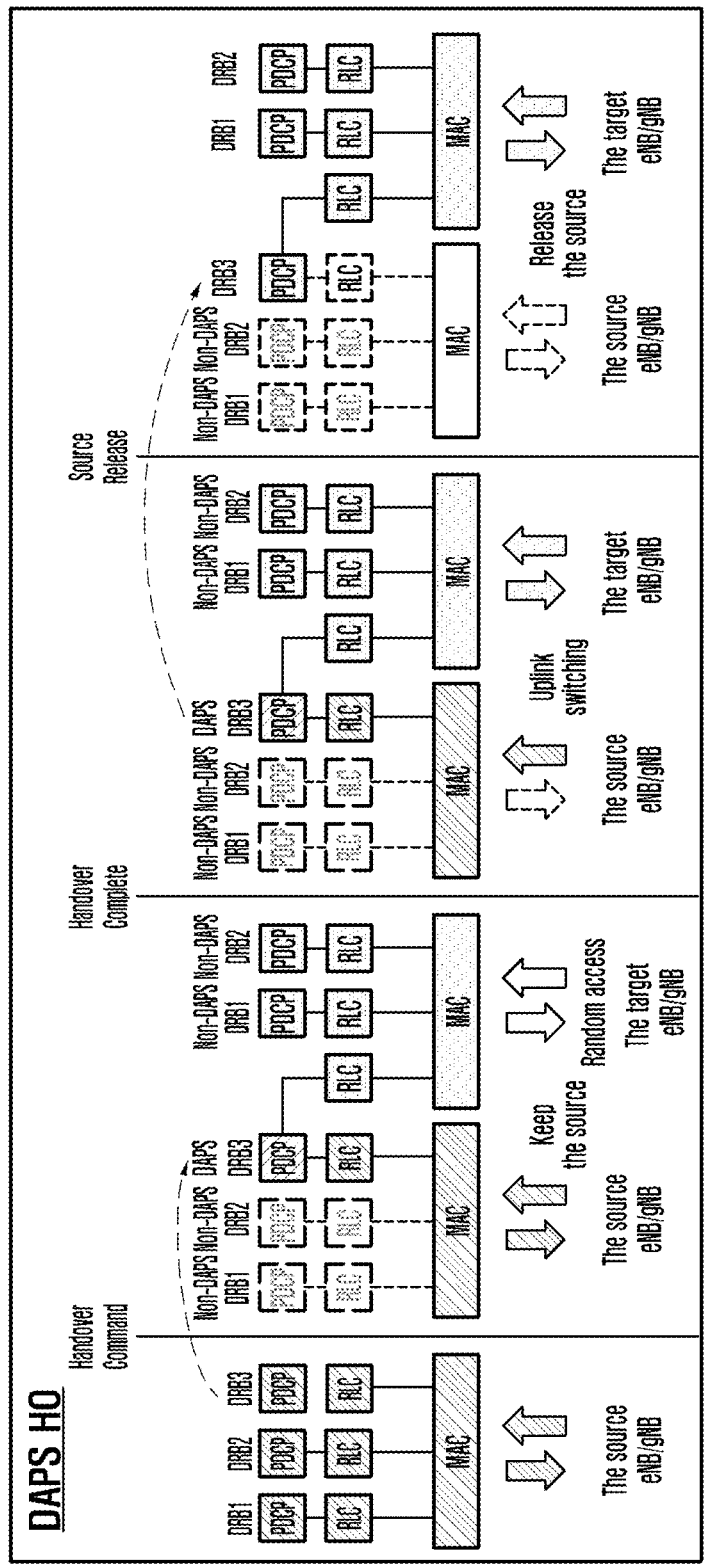
FIG. 1JAA

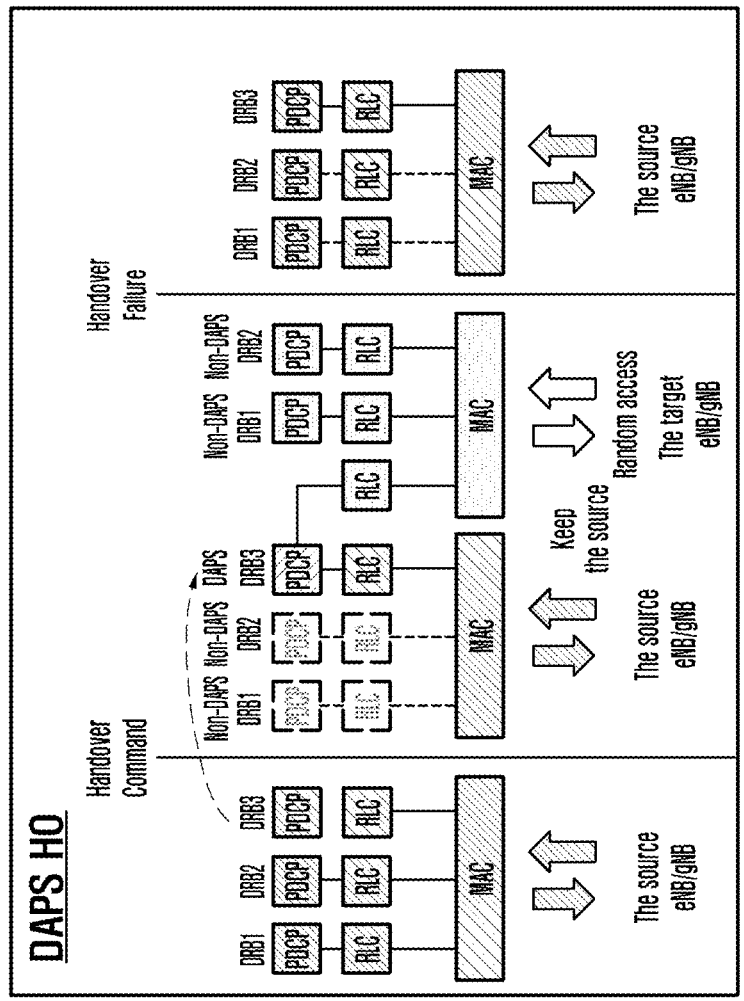
FIG. 1JAB

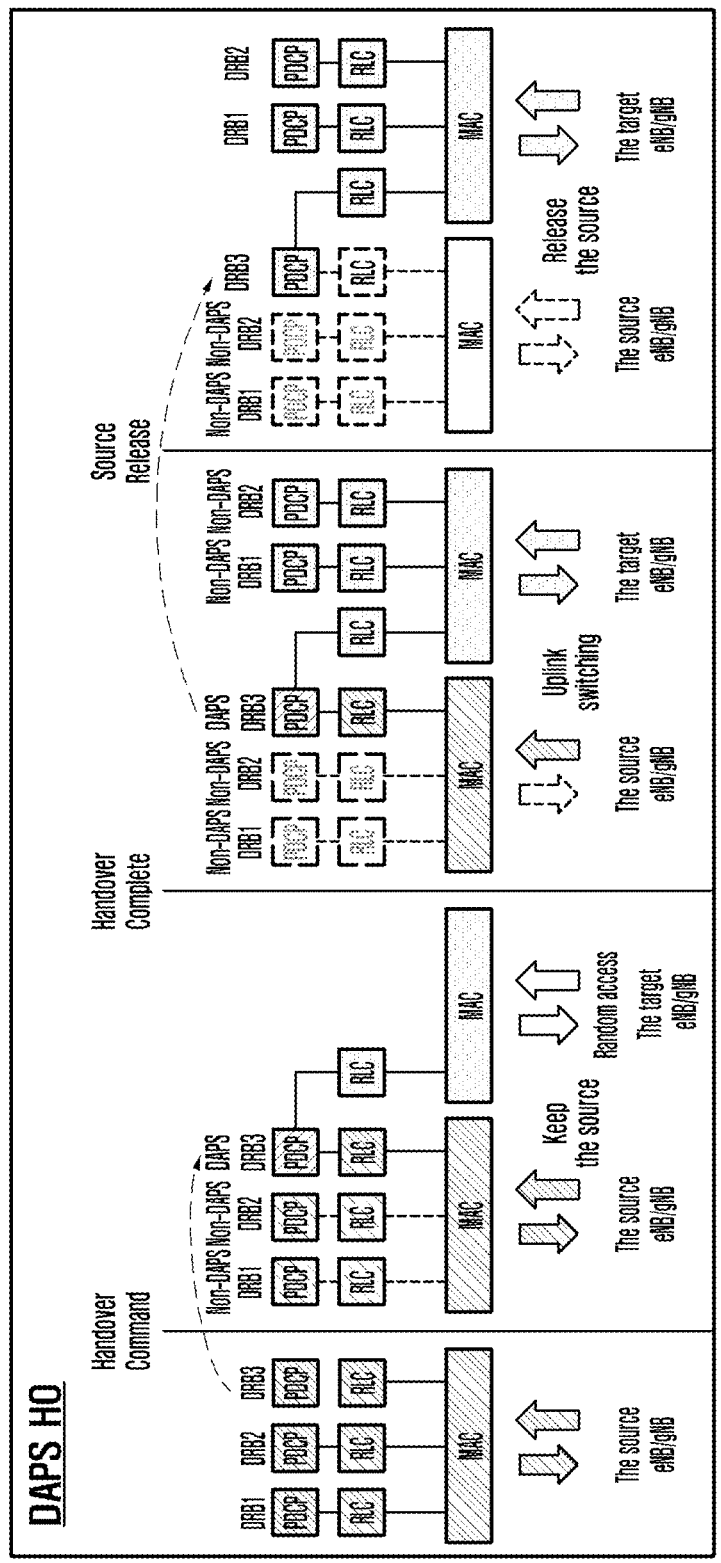
FIG. 1JBA

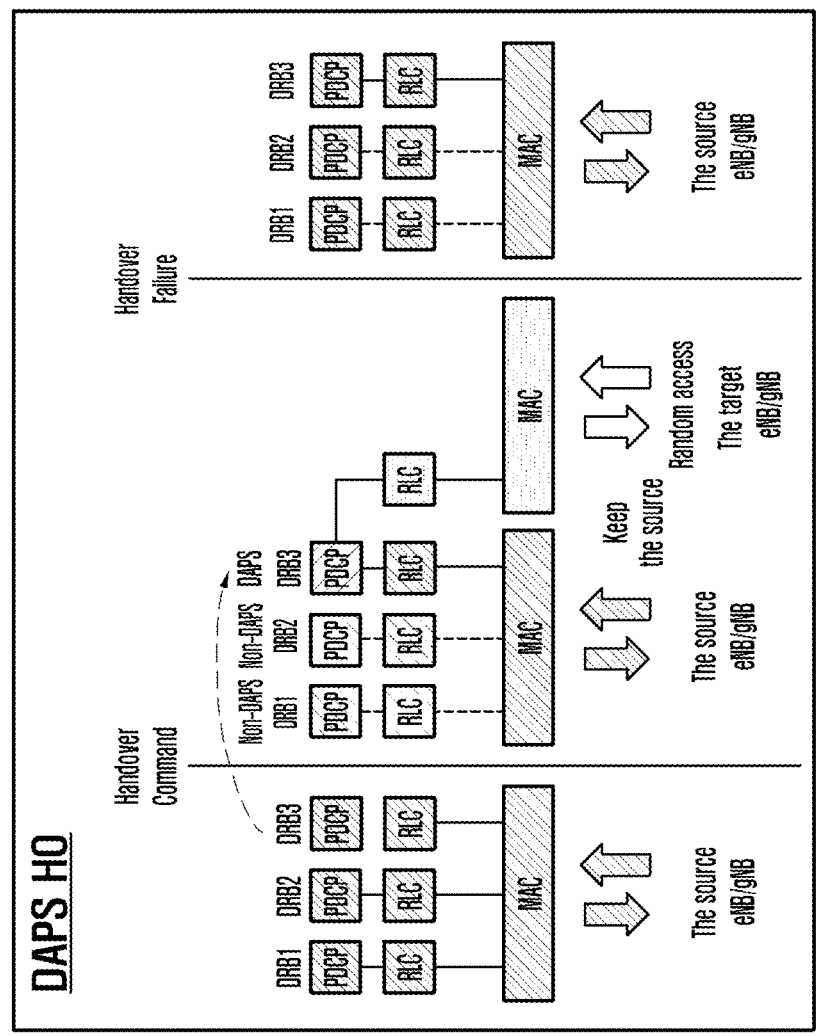
FIG. 1JBB

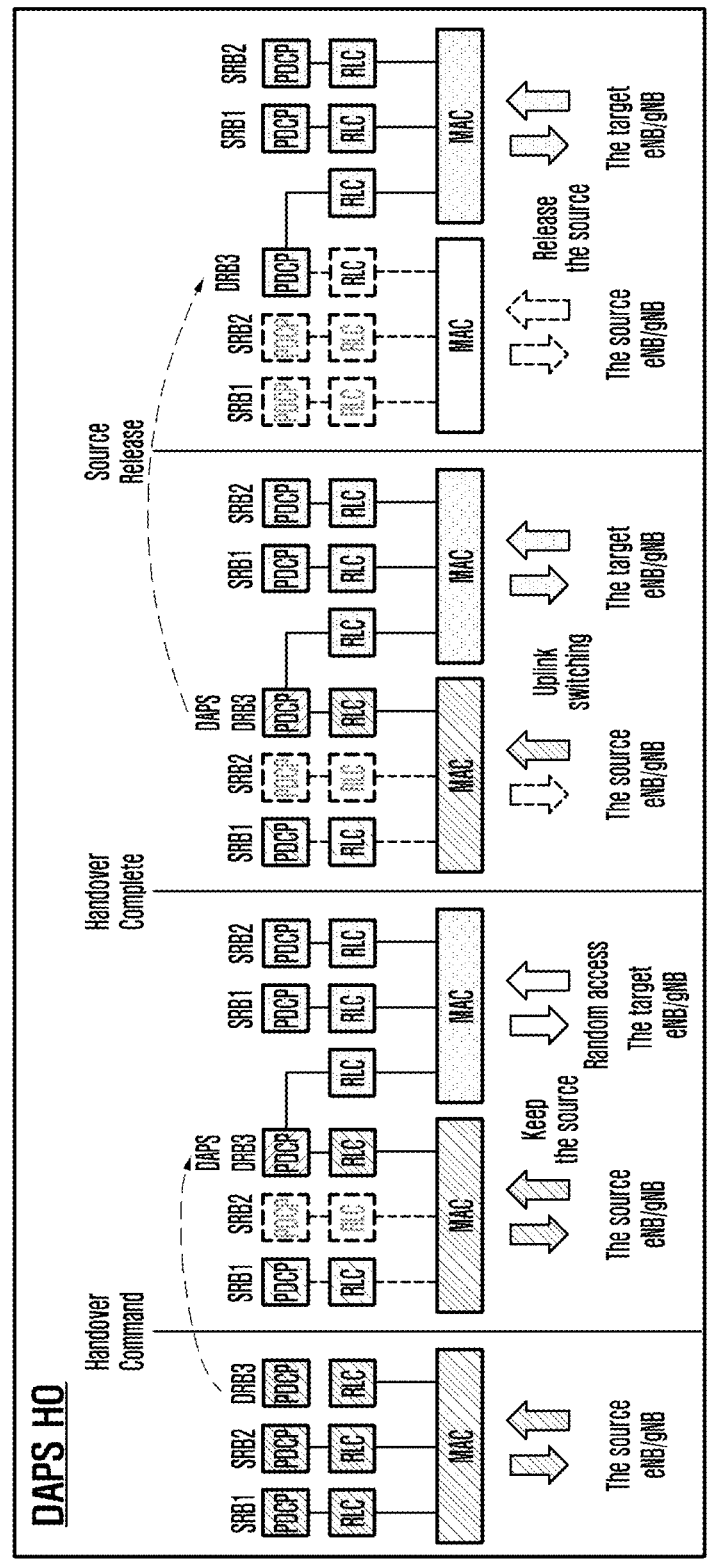
FIG. 1JCA

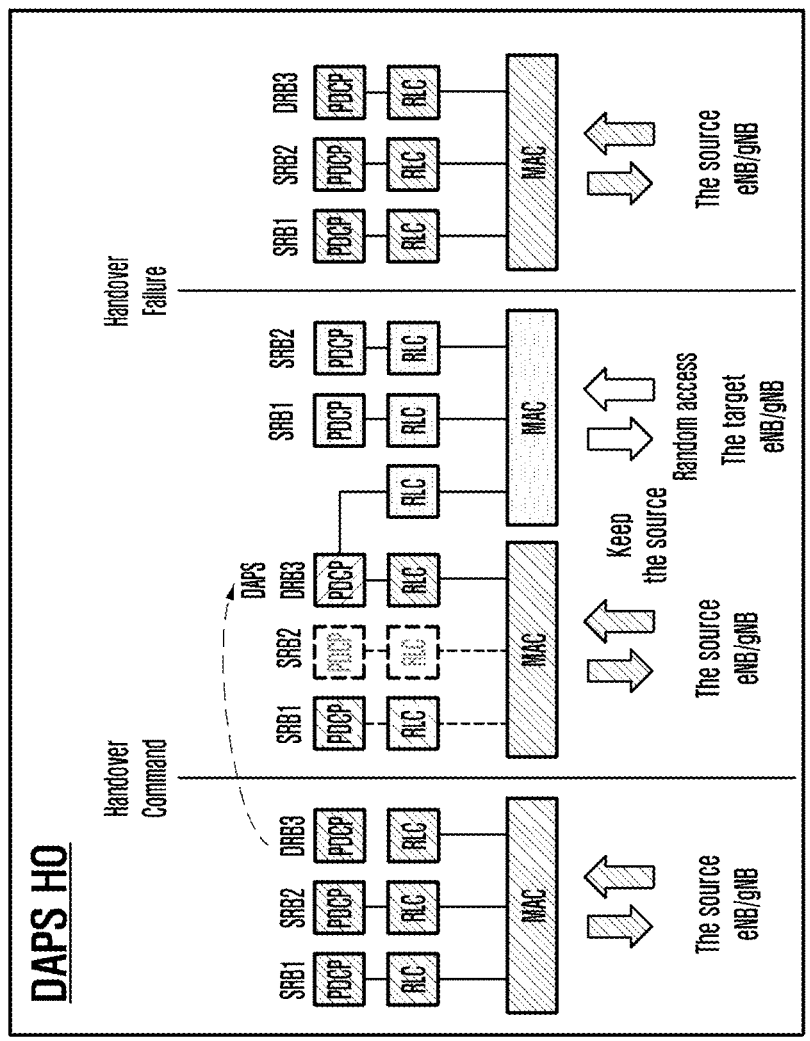
FIG. 1JCB

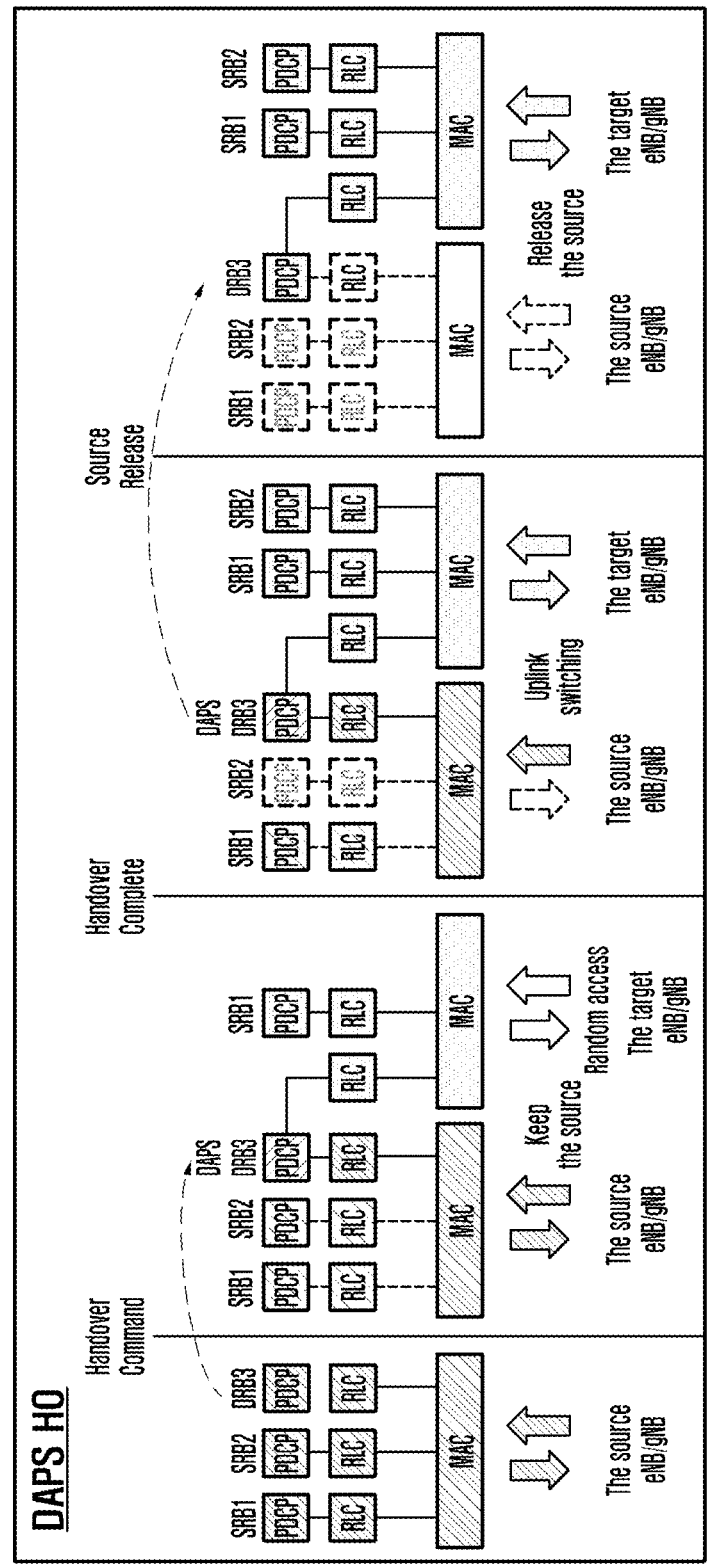
FIG. 1JDA

FIG. 1JDB
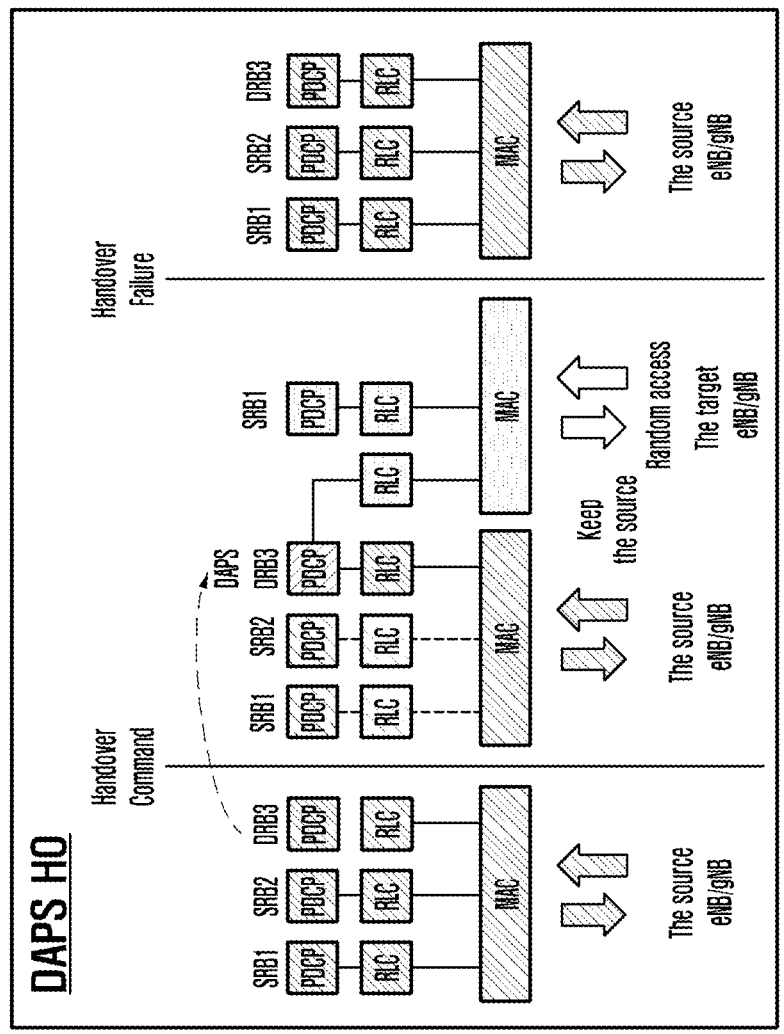

ately understood by those skilled in the art from the following description.

DEVICE AND METHOD FOR PREVENTING POTENTIAL ERRORS THAT MAY OCCUR WHEN PERFORMING DAPS HANDOVER IN NEXT-GENERATION MOBILE COMMUNICATION SYSTEM

CROSS-REFERENCE TO RELATED APPLICATIONS

This application is a 371 National Stage of International Application No. PCT/KR2022/000282, filed Jan. 7, 2022, which claims priority to Korean Patent Application No. 10-2021-0002608, filed Jan. 8, 2021, the disclosures of which are herein incorporated by reference in their entirety.

TECHNICAL FIELD

The disclosure relates to operations of a terminal and a base station in a mobile communication system, and relates to errors that may occur when performing an efficient handover method (for example, a dual active protocol stack (DAPS) handover method) which causes no suspension of data transmission or reception during handover, and a method and a device which can solve the errors in a next-generation mobile communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (post LTE)" system.

The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The 5G system is considering supports for more various services as compared to the conventional 4G system. For example, the most representative service may include a ultrawide band mobile communication service (enhanced mobile broad band (eMBB)), an ultrahigh reliable/low latency communication service (ultra-reliable and low latency communication (URLLC)), a massive device-to-device communication service (massive machine type communication (mMTC)), and a next-generation broadcast service (evolved multimedia broadcast/multicast service (eMBMS)). A system providing the URLLC service may be referred to as a URLLC system, and a system providing the eMBB service may be referred to as an eMBB system. The terms "service" and "system" may be interchangeably used.

Among these services, the URLLC service that is a new service under consideration in the 5G system in contrast to the existing 4G system requires to meet ultrahigh reliability (e.g., packet error rate of about 10-5) and low latency (e.g., about 0.5 msec) conditions as compared to the other services. To meet these strict conditions required therefor, the URLLC service may need to apply a shorter transmission time interval (TTI) than the eMBB service, and various operating scheme employing the same are now under consideration.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

DISCLOSURE

Technical Problem

In the next-generation mobile communication system, to support a service without data interruption along with low transmission latency, a dual active protocol stack (DAPS) handover method can be supported as an efficient handover method. However, a method of analyzing problems which may occur when the DAPS handover method is performed by a base station and a terminal, and solving the problems may be required.

The technical subjects pursued in the disclosure may not be limited to the above mentioned technical subjects, and other technical subjects which are not mentioned may be clearly understood, through the following descriptions, by those skilled in the art to which the disclosure pertains.

Technical Solution

According to an embodiment for solving the problems above, a method performed by a terminal of a wireless communication system may include receiving, from a source base station, a handover command message indicating a dual active protocol stack (DAPS) handover for at least one bearer, before the DAPS handover is completed, receiving, from the source base station, a medium access control protocol data unit (MAC PDU) including a MAC subPDU including a logical channel identifier for a bearer for which the DAPS handover is not configured, and discarding the MAC subPDU including the logical channel identifier for the bearer for which the DAPS handover is not configured.

In addition, the method may further include up to a time point just before the DAPS handover is completed, transmitting or receiving data to or from the source base station through a protocol layer device corresponding to the at least one bearer for which the DAPS handover is configured.

In addition, the method may further include generating a protocol layer device for a target base station corresponding to the at least one bearer for which the DAPS handover is configured, and performing a random access procedure with the target base station by using the protocol layer device for the target base station.

In addition, the method may further include in case that a first condition is satisfied, suspending uplink data transmission to the source base station through the protocol layer device corresponding to the at least one bearer for which the DAPS handover is configured; and transmitting uplink data to the target base station through a protocol layer device for the target base station.

In addition, the first condition may include at least one of a case where a random access procedure with the target base station is successfully completed, a case where an uplink resource is initially allocated from the target base station, a case where an uplink transmission resource is included in the handover command message in case that a handover requiring no random access procedure is indicated, a case where the handover command message indicates a 2-step random access procedure, or a case where the handover command message indicates a 2-step random access procedure and a transmission resource configured for data transmission in the 2-step random access procedure has a value greater than a pre-configured value.

In addition, the method may further include in case that a second condition is satisfied, suspending downlink data reception from the source base station through the protocol layer device corresponding to the at least one bearer for which the DAPS handover is configured, and receiving downlink data from the target base station through a protocol layer device for the target base station.

In addition, the second condition may include at least one of a case where a random access response message is received from the target base station, a case where a handover complete message is transmitted to the target base station, a case where a random access procedure with the target base station is completed and uplink data is initially transmitted to the target base station, a case where an uplink resource is initially allocated from the target base station, or a case where a pre-configured timer expires.

In addition, according to an embodiment for solving the problems above, a terminal of a wireless communication system may include a transceiver, and a controller connected to the transceiver and configured to receive, from a source base station, a handover command message indicating a dual active protocol stack (DAPS) handover for at least one bearer, before the DAPS handover is completed, receive, from the source base station, a medium access control protocol data unit (MAC PDU) including a MAC subPDU including a logical channel identifier for a bearer for which the DAPS handover is not configured, and discard the MAC subPDU including the logical channel identifier for the bearer for which the DAPS handover is not configured.

Advantageous Effects

The disclosure proposes a DAPS handover method as an efficient handover method which prevents a data interruption time due to handover from occurring when the handover is performed in the next-generation mobile communication system, thereby supporting a service without data interruption. In addition, methods of analyzing problems which may occur when the DAPS handover method is performed, and solving the problems are proposed.

Advantageous effects obtainable from the disclosure may not be limited to the above mentioned effects, and other effects which are not mentioned may be clearly understood, through the following descriptions, by those skilled in the art to which the disclosure pertains.

DESCRIPTION OF DRAWINGS

FIG. 1IB illustrates structures of a PDCP layer entity applied to a DAPS handover method according to a second embodiment of the disclosure, and a method of applying the structures.

FIG. 1JAA illustrates a method in which when a DAPS handover method corresponding to a second embodiment of the disclosure is indicated for each bearer by an RRCReconfiguration message or an RRCConnectionReconfiguration message, a terminal having received the message operates a protocol layer entity for different bearers, with respect to an SRB, a bearer for which the DAPS handover method is configured, or bearers for which the DAPS handover method are not configured.

FIG. 1JAB illustrates a method in which when a DAPS handover method corresponding to a second embodiment of the disclosure is indicated for each bearer by an RRCReconfiguration message or an RRCConnectionReconfiguration message, a terminal having received the message operates a protocol layer entity for different bearers, with respect to an SRB, a bearer for which the DAPS handover method is configured, or bearers for which the DAPS handover method are not configured.

FIG. 1JBA illustrates a method in which when a DAPS handover method corresponding to a second embodiment of the disclosure is indicated for each bearer by an RRCReconfiguration message or an RRCConnectionReconfiguration message, a terminal having received the message operates a protocol layer entity for different bearers, with respect to an SRB, a bearer for which the DAPS handover method is configured, or bearers for which the DAPS handover method are not configured.

FIG. 1JBB illustrates a method in which when a DAPS handover method corresponding to a second embodiment of the disclosure is indicated for each bearer by an RRCReconfiguration message or an RRCConnectionReconfiguration message, a terminal having received the message operates a protocol layer entity for different bearers, with respect to an SRB, a bearer for which the DAPS handover method is configured, or bearers for which the DAPS handover method are not configured.

FIG. 1JCA illustrates a method in which when a DAPS handover method corresponding to a second embodiment of the disclosure is indicated for each bearer by an RRCReconfiguration message or an RRCConnectionReconfiguration message, a terminal having received the message operates a protocol layer entity for different bearers, with respect to an SRB, a bearer for which the DAPS handover method is configured, or bearers for which the DAPS handover method are not configured.

FIG. 1JCB illustrates a method in which when a DAPS handover method corresponding to a second embodiment of the disclosure is indicated for each bearer by an RRCReconfiguration message or an RRCConnectionReconfiguration message, a terminal having received the message operates a protocol layer entity for different bearers, with respect to an SRB, a bearer for which the DAPS handover method is configured, or bearers for which the DAPS handover method are not configured.

FIG. 1JDA illustrates a method in which when a DAPS handover method corresponding to a second embodiment of the disclosure is indicated for each bearer by an RRCReconfiguration message or an RRCConnectionReconfiguration message, a terminal having received the message operates a protocol layer entity for different bearers, with respect to an SRB, a bearer for which the DAPS handover method is configured, or bearers for which the DAPS handover method are not configured.

FIG. 1JDB illustrates a method in which when a DAPS handover method corresponding to a second embodiment of the disclosure is indicated for each bearer by an RRCReconfiguration message or an RRCConnectionReconfiguration message, a terminal having received the message operates a protocol layer entity for different bearers, with respect to an SRB, a bearer for which the DAPS handover method is configured, or bearers for which the DAPS handover method are not configured.

FIG. 1O illustrates a block configuration of a TRP in a wireless communication system according to an embodiment of the disclosure.

MODE FOR INVENTION

Figure 1A:
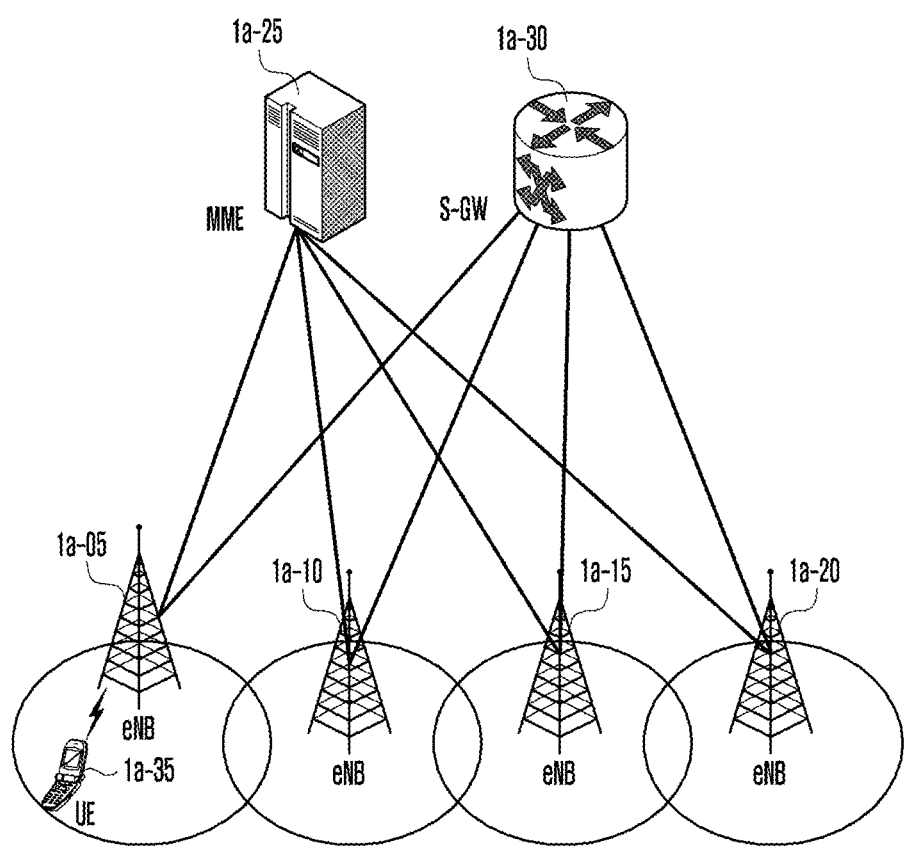
FIG. 1A illustrates a structure of an LTE system according to an embodiment of the disclosure.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description of the disclosure, terms and names defined in the 3rd generation partnership project long term evolution (3GPP LTE) standards will be used for the sake of descriptive convenience. However, the disclosure is not limited by these terms and names, and may be applied in the same way to systems that conform other standards. In the disclosure, the term "eNB" may be interchangeably used with the term "gNB". That is, a base station described as "eNB" may indicate "gNB".

In the disclosure, non-interruption handover methods capable of minimizing a data interruption time due to handover or making the data interrupt time become 0 ms in a next-generation mobile communication system are proposed.

Specifically, efficient handover methods proposed in the disclosure may have one or more or two or more features among multiple features described below. In addition, with respect to efficient handover methods (for example, a dual active protocol stack (DAPS) handover method) proposed in the disclosure, different handover methods may be applied to different bearers.

When a terminal performing data transmission or reception (uplink or downlink data transmission and reception) to or from a source base station through each of protocol layer entities (a physical (PHY) entity, a medium access control (MAC) layer entity, a radio link control (RLC) layer entity, or a packet data convergence protocol (PDCP) layer entity) for multiple first bearers receives a handover command message (for example, a handover command message or a radio resource control (RRC) reconfiguration message) from the source base station, the terminal may configure, for bearers (for example, the first bearers) configured using an indicator indicating to perform a DAPS handover method in the handover command message, protocol layer entities for new second bearers corresponding to the protocol layer entities for the first bearers (e.g., having a same bearer identifier), according to configuration information included in the handover command message. In addition, the terminal performs data transmission or reception (uplink or downlink data transmission and reception) without discontinuing but maintaining data transmission or reception (uplink or downlink data transmission and reception) to or from the source base station through the multiple first bearers. In the description above, the first bearers and the second bearers may receive or transmit data through a single PDCP layer entity, and data of the first bearers may be processed in the PDCP layer entity by using a security key, a security algorithm (encryption, decryption, or integrity protection or verification), or a header compression protocol (or context) for the source base station. Alternatively, data of the second bearers may be processed in the PDCP layer entity by using a security key, a security algorithm (encryption, decryption, or integrity protection or verification), or a header compression protocol (or context) for a target base station. The above-described PDCP layer entity is proposed as a structure of a second PDCP layer entity and described in detail below in the disclosure.

The protocol layer entities (a PHY layer entity, a MAC layer entity, an RLC layer entity, or a PDCP layer entity) for the multiple second bearers which are newly configured after reception of the handover command message are configured for data transmission and reception to and from the target base station, based on bearer configuration information or multiple pieces of protocol layer entity information, included in the handover command message.

In the description above, the terminal may perform a procedure of random access to the target base station by using a protocol layer entity (for example, the MAC layer entity) for the multiple second bearers while performing data transmission or reception (uplink or downlink data transmission and reception) to or from the source base station by using the protocol layer entities for the multiple first bearers. In the description above, the random access procedure may include transmission of a preamble, reception of a random access response, transmission of a message 3, reception of a message 4 (for example, reception of contention resolution MAC CE or an uplink transmission resource), or the like.

In the description above, the terminal may complete the random access procedure with respect to the target base station by using the protocol layer entity (for example, the MAC layer entity) for the multiple second bearers while performing data transmission or reception to or from the source base station by using the protocol layer entities for the multiple first bearers, and may transmit a handover complete message to the target base station by using the protocol layer entities for the multiple second bearers.

In the description above, the terminal may complete the procedure of random access to the target base station by using the protocol layer entity (for example, the MAC layer entity) for the multiple second bearers while performing data transmission or reception to or from the source base station by using the protocol layer entities for the multiple first bearers, and may transmit a handover complete message to the target base station by using the protocol layer entities for the multiple second bearers, and perform data transmission and reception (uplink or downlink).

In the description above, when successfully completing the random access procedure with respect to the target base station, the terminal may suspend uplink data transmission to the source base station by using the protocol layer entities for the multiple first bearers and switch uplink data transmission, so as to transmit uplink data to the target base station through the second bearers.

In the description above, when receiving the handover command message, the terminal may continuously perform data transmission or reception (uplink or downlink data transmission and reception) to or from the source base station by using the protocol layer entities of the multiple first bearers, and perform the procedure of random access to the target base station by using the protocol layer entities of the multiple second bearers, and when successfully completing the random access procedure, the terminal may suspend uplink data transmission to the source base station by using the protocol layer entities for the multiple first bearers, and perform uplink data transmission to the target base station by using only the protocol layer entities for the second multiple bearers. The terminal may continuously receive downlink data from the source base station by using the protocol layer entities for the multiple first bearers, and also continuously receive downlink data from the target base station by using the protocol layer entities of the multiple second bearers. In addition, in the description above, when retransmission, HARQ retransmission, HARQ feedback, RLC control data, or PDCP control data needs to be transmitted to the source base station through the first bearers, the terminal may perform the transmission to the source base station.

In the description above, a first bearer and a second bearer may be configured as a structure of a second PDCP layer entity, in the second PDCP layer entity structure, the first bearer (for example, an RLC layer entity, a MAC layer entity, or a PHY layer entity) for the source base station and the second bearer (e.g., an RLC layer entity, a MAC layer entity, or a PHY layer entity) for the target base station may be all connected to one PDCP layer entity, and uplink data may be transmitted through one bearer among the first bearer and the second bearer by using the PDCP layer entity. That is, until the terminal performs a procedure of random access to the target base station and successfully completes the random access procedure, uplink data may be transmitted through the first bearer. If the terminal has performed the procedure of random access to the target base station and has successfully completed the random access procedure, the terminal may suspend the data transmission through the first bearer, and may perform switching so as to transmit the uplink data to the target base station through the second bearer. However, in the second PDCP layer entity structure, the terminal may receive downlink data from the source base station or the target base station through the first bearer or the second bearer.

In the disclosure, as the above-described efficient handover method, a dual active protocol stack (DAPS) handover method and device is proposed.

In addition, errors which may occur in the above-described DAPS handover method are described, and methods which can solve the errors are proposed.

FIG. 1A illustrates a structure of an LTE system according to an embodiment of the disclosure.

Referring to FIG. 1A, a radio access network of the LTE system may include next-generation base stations (evolved nodes B, hereinafter, referred to as ENBs, nodes B, or base stations) 1a-05, 1a-10, 1a-15, and 1a-20, a mobility management entity (MME) 1a-25, and a serving-gateway (S-GW) 1a-30. A user equipment (hereinafter, referred to as a UE or a terminal) 1a-35 may access an external network via the ENBs 1a-05 to 1a-20 and the S-GW 1a-30.

In FIG. 1A, the ENBs 1a-05 to 1a-20 correspond to existing nodes B of a UMTS. The ENBs 1a-05 to 1a-20 may be connected to the terminal 1a-35 through wireless channels and may perform complex functions compared to the existing nodes B. All user traffic including real-time services, such as voice over IP (VoIP) through Internet protocol, may be serviced through shared channels in the LTE system, and thus an entity for collating state information such as buffer state information, available transmission power state information, and channel state information, of the terminals 1a-35 and performing scheduling may be required and the ENBs 1a-05 to 1a-20 may operate as such an entity. One of ENBs 1a-05 to 1a-20 generally controls multiple cells. For example, the LTE system uses radio access technology, such as orthogonal frequency division multiplexing (hereinafter, referred to as OFDM) at a bandwidth of 20 MHz to achieve a data rate of 100 Mbps. In addition, adaptive modulation & coding (hereinafter, referred to as AMC) for determining a modulation scheme and a channel coding rate in accordance with a channel state of the terminal 1a-35 is applied in the LTE system. The S-GW 1a-30 is an entity for providing a data bearer, and generates or removes the data bearer by the control of the MME 1a-25. The MME 1a-25 is an entity for performing a mobility management function and various control functions on the terminal 1a-35 and is connected to the multiple base stations 1a-05 to 1a-20.

Figure 1B:
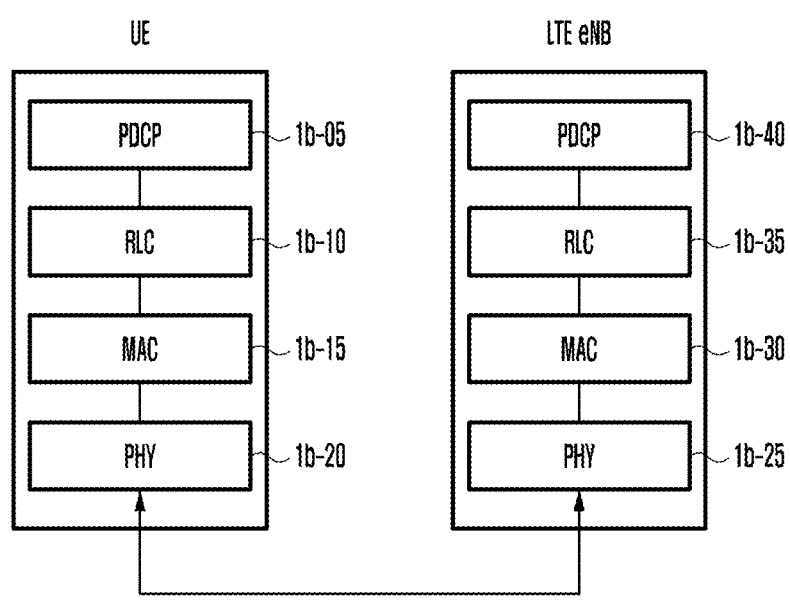
FIG. 1B illustrates a radio protocol structure of an LTE system according to an embodiment of the disclosure.

FIG. 1B illustrates a radio protocol structure of an LTE system according to an embodiment of the disclosure.

Referring to FIG. 1B, the radio protocol structure of the LTE system may include packet data convergence protocol (PDCP) layers 1b-05 and 1b-40, radio link control (RLC) layers 1b-10 and 1b-35, and medium access control (MAC) layers 1b-15 and 1b-30 for a terminal and an ENB, respectively. The PDCP layer 1b-05 or 1b-40 performs an operation such as IP header compression/decompression. Main functions of the PDCP layer 1b-05 or 1b-40 are summarized as shown below.

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink.

The radio link control (hereinafter, referred to as "RLC") layer 1b-10 or 1b-35 may perform an ARQ operation, or the like by reconfiguring a PDCP protocol packet data unit (PDU) to have an appropriate size. Main functions of the RLC layer 1b-10 or 1b-35 are summarized as shown below.

Transfer of upper layer PDUs
Error Correction through ARQ (only for AM data transfer)
Concatenation, segmentation, and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC layer 1b-15 or 1b-30 is connected to multiple RLC layer entities configured for one terminal, and performs an operation of multiplexing RLC PDUs into a MAC PDU and demultiplexing the RLC PDUs from the MAC PDU. Main functions of the MAC layer 1b-15 or 1b-30 are summarized as shown below.

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding A physical layer 1b-20 or 1b-25 performs an operation of performing channel coding and modulation of upper layer data, generating OFDM symbols therefrom, and transmitting the OFDM symbols through a wireless channel, or performing demodulation and channel decoding for OFDM symbols received through a wireless channel and delivering the OFDM symbols to an upper layer.

Figure 1C:
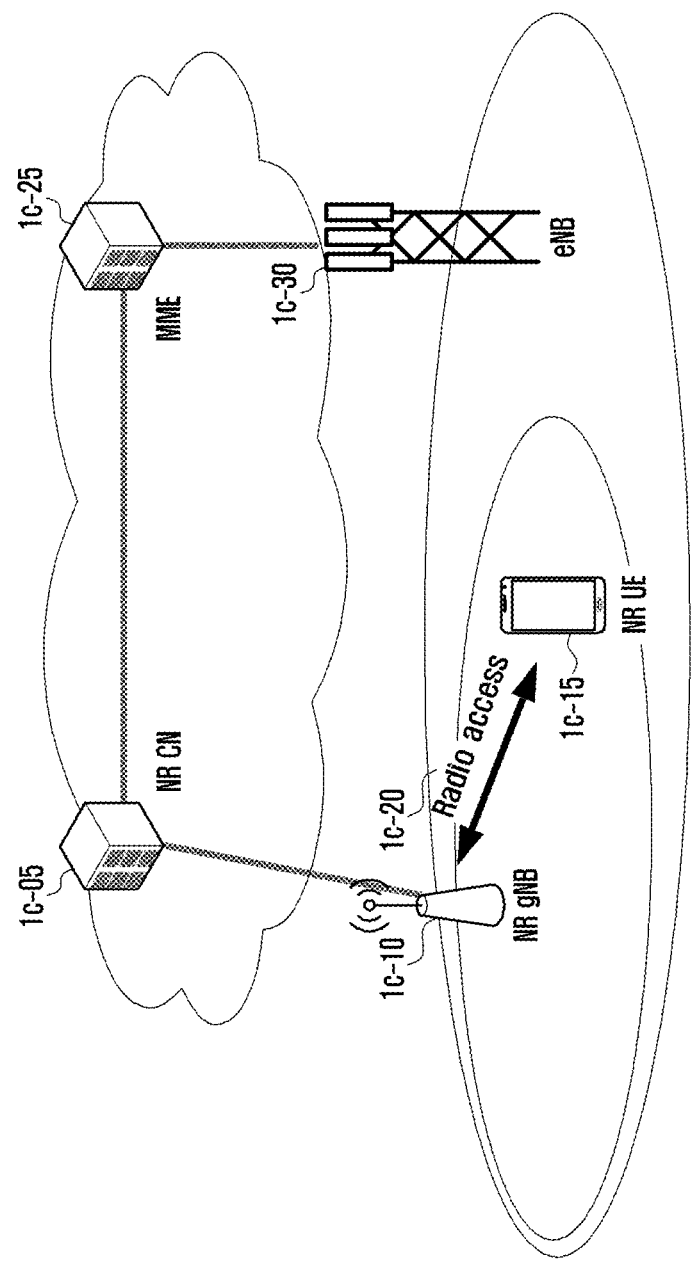
FIG. 1C illustrates a structure of a next-generation mobile communication system according to an embodiment of the disclosure.

FIG. 1C illustrates a structure of a next-generation mobile communication system according to an embodiment of the disclosure.

Referring to FIG. 1C, a radio access network of the next-generation mobile communication system (hereinafter, referred to as the NR or 5G communication system) includes a new radio node B (hereinafter, referred to as NR gNB, NR base station, or gNB) 1c-10 and a new radio core network (NR CN) 1c-05. A user equipment (a new radio user equipment, hereinafter, referred to as NR UE or a terminal) 1c-15 accesses an external network via the NR gNB 1c-10 and the NR CN 1c-05.

In FIG. 1C, the NR gNB 1c-10 corresponds to an evolved Node B (eNB) of a legacy LTE system. The NR gNB 1c-10 may be connected to the NR UE 1c-15 through a wireless channel and may provide superior services compared to an existing node B. All user traffic data may be serviced through a shared channel in the next-generation mobile communication system, and thus an entity for collating buffer status information of UEs 1c-15, available transmission power status information, and channel state information and performing scheduling is required and the NR gNB 1c-10 operates as such an entity. A single NR gNB 1c-10 generally controls multiple cells. The next-generation mobile communication system may have a bandwidth equal to or greater than the maximum bandwidth of the existing LTE system so as to achieve an ultrahigh data rate, compared to the existing LTE system, may use orthogonal frequency division multiplexing (OFDM) as a radio access technology, and may additionally combine a beamforming technology. In addition, the next-generation mobile communication system applies an adaptive modulation & coding (hereinafter, referred to as AMC) for determining a modulation scheme and a channel coding rate in accordance with a channel state of the terminal 1c-15. The NR CN 1c-05 performs functions such as mobility support, bearer configuration, and quality of service (QoS) configuration. The NR CN 1c-05 is an entity for performing not only a mobility management function for the terminal 1c-15 but also various control functions and is connected to multiple base stations 1c-10. In addition, the next-generation mobile communication system may be linked with the existing LTE system, and the NR CN 1c-05 is connected to an MME 1c-25 through a network interface. The MME 1c-25 is connected to an eNB 1c-30 that is a legacy base station.

Figure 1D:
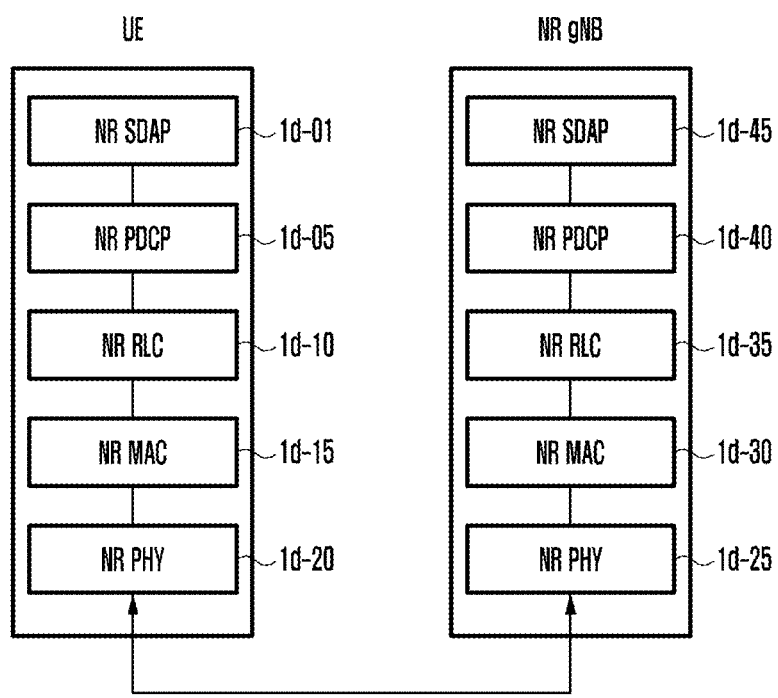
FIG. 1D illustrates a radio protocol structure of a next-generation mobile communication system according to an embodiment of the disclosure.

FIG. 1D illustrates a radio protocol structure of a next-generation mobile communication system according to an embodiment of the disclosure.

Referring to FIG. 1D, the radio protocol of the next-generation mobile communication system may include NR SDAP layers 1d-01 and 1d-45, NR PDCP layers 1d-05 and 1d-40, NR RLC layers 1d-10 and 1d-35, and NR MAC layers 1d-15 and 1d-30 for a terminal and an NR base station, respectively.

Main functions of the NR SDAP layer 1d-01 or 1d-45 may include some of the following functions.
 Transfer of user plane data
 Mapping between a QoS flow and a DRB for both DL and UL
 Marking QoS flow ID in both DL and UL packets
 Reflective QoS flow to DRB mapping for the UL SDAP PDUs.

With regard to an SDAP layer entity, the terminal may be configured, through an RRC message, whether to use a header of the SDAP layer entity or to use functions of the SDAP layer entity for each PDCP layer entity, for each bearer, or for each logical channel. When the SDAP header is configured, a 1-bit NAS reflective QoS indicator and a 1-bit AS reflective QoS indicator of the SDAP header may indicate the terminal to update or reconfigure uplink and downlink QoS flow and data bearer mapping information. The SDAP header may include QoS flow ID information indicating the QoS. The QoS information may be used as a data processing priority, scheduling information, or the like for supporting a seamless service.

Main functions of the NR PDCP layer 1d-05 or 1d-40 may include some of the following functions.
 Header compression and decompression: ROHC only
 Transfer of user data
 In-sequence delivery of upper layer PDUs
 Out-of-sequence delivery of upper layer PDUs
 PDCP PDU reordering for reception
 Duplicate detection of lower layer SDUs
 Retransmission of PDCP SDUs
 Ciphering and deciphering
 Timer-based SDU discard in uplink.

The reordering function of the NR PDCP layer entity may indicate a function of sequentially reordering PDCP PDUs received from a lower layer, based on a PDCP sequence number (SN). The reordering function may include a function of delivering data to an upper layer in the reordered order, or a function of directly delivering data without considering order, a function of recording missing PDCP PDUs by reordering the received PDCP PDUs, a function of reporting status information of the missing PDCP PDUs to a transmitter, and a function of requesting to retransmit the missing PDCP PDUs.

Main functions of the NR RLC layer 1d-10 or 1d-35 may include some of the following functions.
 Transfer of upper layer PDUs
 In-sequence delivery of upper layer PDUs
 Out-of-sequence delivery of upper layer PDUs
 Error Correction through ARQ
 Concatenation, segmentation, and reassembly of RLC SDUs
 Re-segmentation of RLC data PDUs
 Reordering of RLC data PDUs
 Duplicate detection
 Protocol error detection
 RLC SDU discard
 RLC re-establishment The in-sequence delivery function of the NR RLC layer entity may indicate a function of delivering RLC SDUs received from a lower layer, to an upper layer in order. The in-sequence delivery function may include a function of reassembling the RLC SDUs and delivering the reassembled RLC SDU when multiple RLC SDUs segmented from one RLC SDU are received, a function of reordering received RLC PDUs, based on an RLC serial number (SN) or a PDCP serial number (SN), a function of recording missing RLC PDUs by reordering the received RLC PDUs, a function of reporting status information of the missing RLC PDUs to a transmitter, a function of requesting to retransmit the missing RLC PDUs, a function of delivering only RLC SDUs prior to a missing RLC SDU, to an upper layer in order when the missing RLC SDU exists, a function of delivering all RLC SDUs received before a timer starts, to an upper layer in order when a predetermined timer expires even when a missing RLC SDU exists, or a function of delivering all RLC SDUs received up to a current time, to an upper layer in order when a predetermined timer expires even when a missing RLC SDU exists. In addition, the NR RLC layer entity may process the RLC PDUs sequentially in the reception order thereof (according to an arrival order, regardless of a serial number or a sequence number) and may deliver the RLC PDUs to the PDCP entity regardless of the sequence thereof (out-of-sequence delivery). In the case of segments, the NR RLC layer entity may receive segments that are stored in the buffer or will be received in the future, reconfigure the segments to be one complete RLC PDU, process the RLC PDU, and then deliver the same to the PDCP device. The NR RLC layer entity may not include a concatenation function, and the function may be performed in the NR MAC layer, or may be replaced with a multiplexing function of the NR MAC layer.

The non-sequential function (Out-of-sequence delivery) of the NR RLC layer entity is a function of transferring RLC SDUs received from a lower layer directly to an upper layer regardless of the sequence of the RLC SDUs, and may include, when one original RLC SDU is divided into multiple RLC SDUs and then received, a function of reassembling and transferring the RLC PDUs, and a function of storing RLC SNs or PDCP SNs of the received RLC PDUs, reordering the RLC PDUs, and recording lost RLC PDUs.

The NR MAC layer 1*d*-15 or 1*d*-30 may be connected to multiple NR RLC layers configured for one terminal, and main functions of the NR MAC layer may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding An NR PHY layer 1*d*-20 or 1*d*-25 may perform an operation of performing channel coding and modulation of upper layer data, generating OFDM symbols therefrom, and transmitting the OFDM symbols through a wireless channel, or performing demodulation and channel decoding for OFDM symbols received through a wireless channel and delivering the OFDM symbols to an upper layer.

Figure 1E:
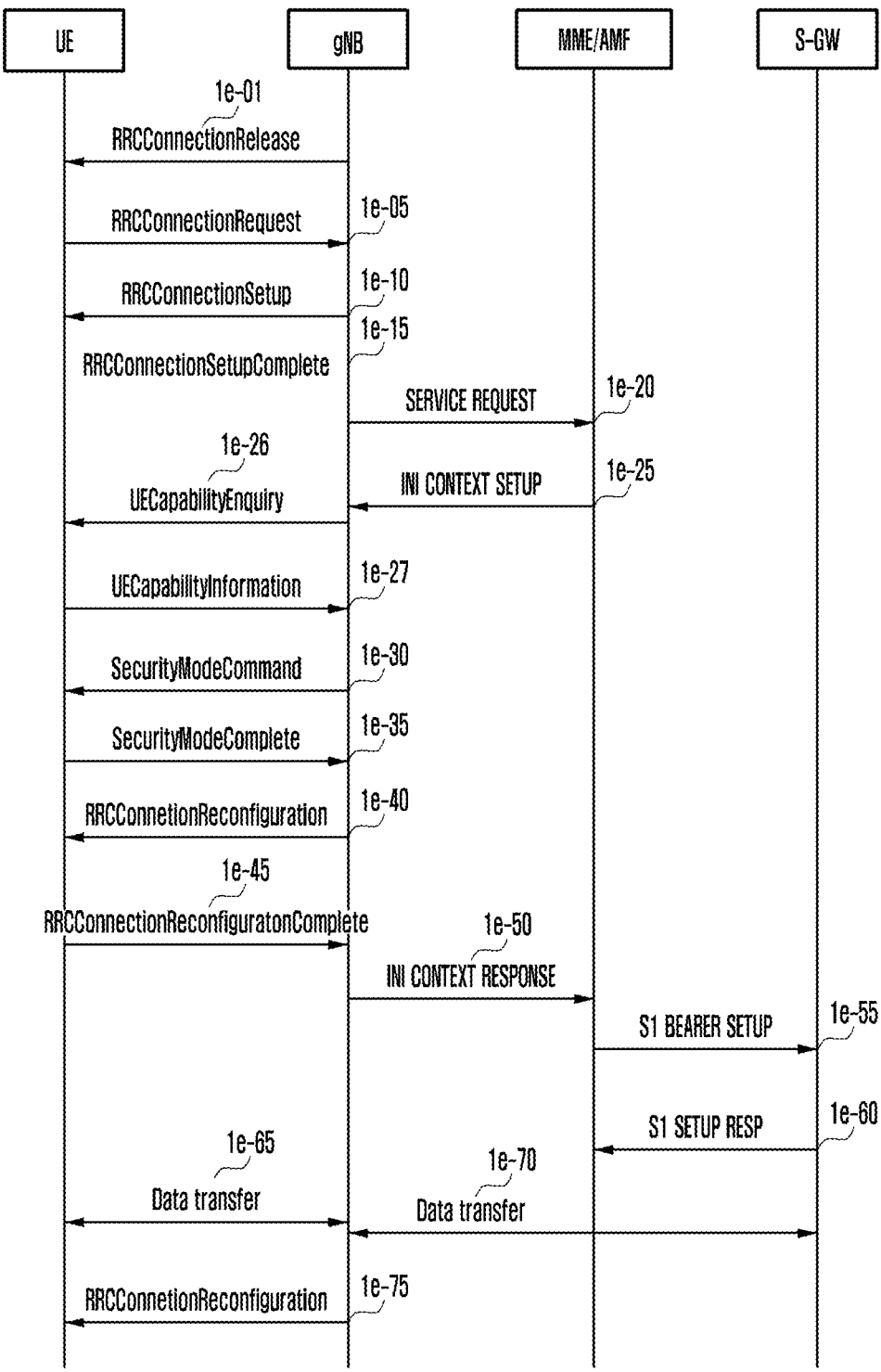
FIG. 1E illustrates a procedure in which a terminal switches from an RRC idle mode to an RRC-connected mode and establishes connection with a network according to an embodiment of the disclosure

FIG. 1E illustrates a procedure in which a terminal switches from an RRC idle mode to an RRC-connected mode and establishes connection with a network according to an embodiment of the disclosure.

In FIG. 1E, when the terminal configured to transmit and receive data in an RRC-connected mode does not transmit or receive data for a predetermined reason or for a predetermined time, a base station may transmit an RRCConnectionRelease message to the terminal to allow the terminal to switch to an RRC idle mode (operation 1*e*-01). Thereafter, when the terminal that is not currently connected (hereinafter, referred to as an idle mode UE) has data to be transmitted, the terminal may perform an RRC connection establishment procedure with the base station. The terminal establishes inverse direction transmission synchronization with the base station through a random access procedure, and transmits an RRCConnectionRequest message to the base station (operation 1*e*-05). The RRCConnectionRequest message includes an identifier of the terminal, an establishment cause, or the like. The base station transmits an RRCConnectionSetup message to allow the terminal to establish RRC connection (operation 1*e*-10).

The message includes configuration information for each service/bearer/RLC layer, each logical channel, or each bearer, and may include information about whether to use ROHC for each bearer/logical channel, ROHC configuration information (for example, a ROHC version, initial information, and the like), statusReportRequired information (information with which a base station indicates a PDCP Status report to a terminal), drb-ContinueROHC information (which corresponds to configuration information indicating to maintain and use ROHC configuration information without change, and can be transmitted to be included in the PDCP layer entity configuration information (pdcp-config)), and the like. In addition, the message includes RRC connection configuration information, and the like. A bearer for RRC connection is called a signaling radio bearer (SRB), and is used in transmission and reception of an RRC message that is a control message between the terminal and the base station.

The terminal having configured the RRC connection transmits an RRCConnectionSetupComplete message to the base station (operation 1*e*-15). The message includes a control message, such as a SERVICE REQUEST message for requesting, by the terminal, an MME/AMF to configure a bearer for a predetermined service. The base station transmits the SERVICE REQUEST message included in the RRCConnectionSetupComplete message to the MME or the AMF (operation 1*e*-20), and the MME or the AMF determines whether to provide the service requested by the terminal. As a result of the determination, when the service requested by the terminal is to be provided, the MME or the AMF transmits an INITIAL CONTEXT SETUP REQUEST message to the base station (operation 1*e*-25). The message includes information such as quality of service (QoS) information to be applied in configuring a data radio bearer (DRB) and security-related information (for example, a security key or a security algorithm) to be applied to the DRB.

In addition, when the base station fails to receive terminal capability information from the MME or the AMF, the base station may transmit a terminal capability information request message to the terminal so as to determine the terminal capability information (operation 1*e*-26). When the terminal receives the terminal capability information request message, the terminal may configure and generate a terminal capability information message, and report the same to the base station (operation 1*e*-27). The terminal capability information message may include information about the types of handover methods supported by the terminal. For example, the terminal may report information about a terminal capability to the base station via an indicator, the information indicating whether or not the terminal supports an efficient handover method (i.e., dual active protocol stack (DAPS)) proposed in the disclosure. In a case where the base station identifies the terminal capability information, when the base station indicates handover to the terminal, the base station may indicate handover to the terminal by defining an indicator indicating a handover type to be indicated in a handover command message, for each of handover methods. For example, the base station may indicate the efficient handover method (the DAPS handover method) proposed in the disclosure to the terminal, or may configure the DAPS handover method to the terminal for each bearer (DRB or SRB). When the base station configures the DAPS handover method to the terminal, the base station also indicates other handover methods (e.g., a conditional handover method (a method of configuring configurations of multiple target cells and multiple conditions for the terminal, and performing a procedure handover to one target cell when the terminal satisfies the conditions in a cell selection or reselection procedure) or a handover method without a random access procedure), thereby preventing data loss or a transmission delay which may occur during handover. The terminal may perform a procedure of handover to a target base station according to the handover method indicated in the handover command message.

To configure security with the terminal, the base station exchanges a SecurityModeCommand message (operation 1*e*-30) and a SecurityModeComplete message (operation 1*e*-35). When security configuration is completed, the base station transmits an RRCConnectionReconfiguration message to the terminal (operation 1*e*-40).

The message includes configuration information for each service/bearer/RLC layer, each logical channel, or each bearer, and may include information about whether to use ROHC for each bearer/logical channel, ROHC configuration information (for example, a ROHC version, initial information, and the like), statusReportRequired information (information with which a base station indicates a PDCP Status report to a terminal), drb-ContinueROHC information (which corresponds to configuration information indicating to maintain and use ROHC configuration information without change, and can be transmitted to be included in the PDCP layer entity configuration information (pdcp-config)), and the like. In addition, the message includes RRC connection configuration information, and the like. A bearer for RRC connection is called a signaling radio bearer (SRB), and is used in transmission and reception of an RRC message that is a control message between the terminal and the base station.

The message includes configuration information of a DRB in which user data is to be processed, and the terminal configures the DRB by using the information and transmits an RRCConnectionReconfigurationComplete message to the base station (operation 1e-45). The base station having completed the DRB configuration with the terminal transmits an INITIAL CONTEXT SETUP COMPLETE message to the MME or the AMF (operation 1e-50), and the MME or the AMF having received the message may exchange an S1 BEARER SETUP message and an S1 BEARER SETUP RESPONSE message with an S-GW to configure an S1 bearer (operations 1e-55 and 1e-60). The S1 bearer refers to a connection for data transmission, which is configured between the S-GW and the base station, and corresponds to the DRB in a one-to-one manner. Once the above procedures are all completed, the terminal transmits or receives data to or from the base station through the S-GW (operations 1e-65 and 1e-70). As such, general data transmission processes largely include three stages including RRC connection configuration, security configuration, and DRB configuration. In addition, the base station may transmit, to the terminal, an RRC connection reconfiguration message to renew, add, or change the configuration for a predetermined reason (operation 1e-75).

In the disclosure, a bearer may include an SRB and a DRB, wherein the SRB stands for a signaling radio bearer and the DRB stands for a data radio bearer. The SRB is mainly used to transmit and receive an RRC message of an RRC layer entity, and the DRB is mainly used to transmit and receive multiple items of user layer data. In addition, a UM DRB indicates a DRB using an RLC layer entity operating in an unacknowledged mode (UM), and a AM DRB indicates a DRB using an RLC layer entity operating in an acknowledged mode (AM).

In the disclosure, a bearer in which the DAPS handover method is configured may refer to or indicate a bearer having an identifier included in a list of bearers in which the DAPS handover method is configured, the identifier being configured in the RRC message, a bearer having an identifier not included in a list of bearers in which the DAPS handover method is not configured, a bearer having bearer configuration information including a DAPS handover method configuration indicator, or a bearer having a DAPS handover method configuration indicator configured in PDCP layer configuration information.

In the disclosure, a bearer in which the DAPS handover method is not configured may refer to or indicate a bearer having an identifier not included in a list of bearers in which the DAPS handover method is configured, the identifier configured in the RRC message, a bearer having an identifier included in a list of bearers in which the DAPS handover method is not configured, a bearer having bearer configuration information not including a DAPS handover method configuration indicator, or a bearer having a DAPS handover method configuration indicator not configured in PDCP layer configuration information.

In the disclosure, the source base station may be interpreted as a source cell (a primary cell (PCell), a special cell (SpCell), or a secondary cell (SCell)) or a source cell group (a cell group or a master cell group), and the target base station may be interpreted as a target cell (a PCell, an SpCell, or an SCell) or a target cell group (a cell group or a master cell group).

Figure 1F:
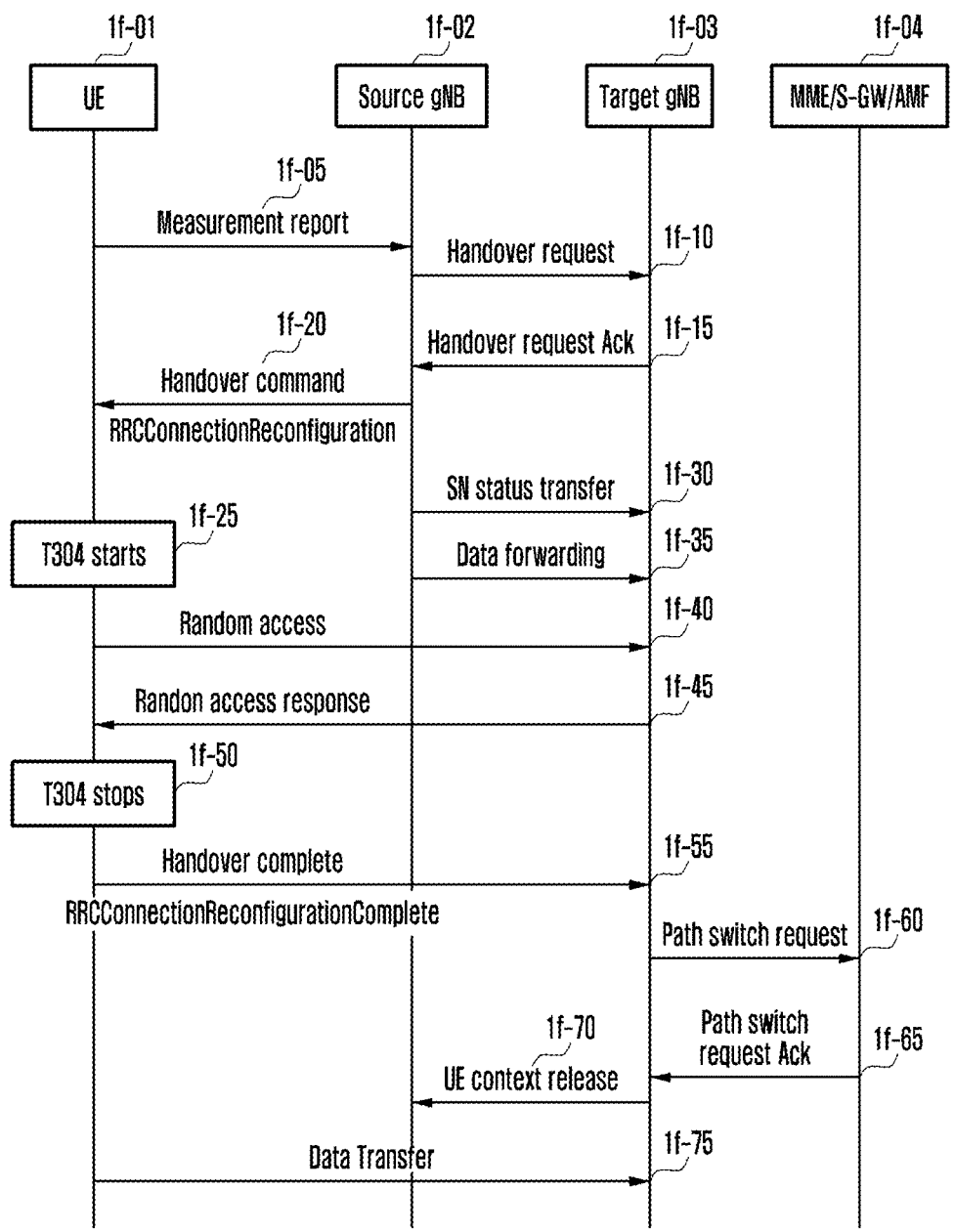
FIG. 1F illustrates signaling procedures in which a handover is performed according to an embodiment of the disclosure.

FIG. 1F illustrates signaling procedures in which a handover is performed according to an embodiment of the disclosure.

A terminal 1f-01 in an RRC-connected mode state reports cell measurement information (cell measurement report) to a current source base station (source eNB) 1f-02 in a periodic manner or when a particular event is satisfied (operation 1f-05). The source base station 1f-02 determines, based on the measurement information, whether the terminal is to perform handover to an adjacent cell. The handover refers to a technology of changing a source base station 1f-20 providing a service to the terminal in a connected mode state to another base station (or another cell in the same base station). When the source base station 1f-02 determines handover, the source base station 1f-02 requests the handover by transmitting a handover (HO) request message (for example, a handover preparation information message) to a new base station which is to provide a service to the terminal 1f-01, that is, a target base station (target eNB) 1f-03 (operation 1f-10). When accepting the handover request, the target base station 1f-03 transmits an HO request Ack message (for example, a handover command message) to the source base station 1f-02 (operation 1f-15). The source base station 1f-02 having received the message may transmit, to the terminal 1f-01, the handover command message (an HO command message, or an RRCReconfiguration message included in a DCCH of the HO request Ack message) (operation 1f-20). The source base station 1f-02 may transmit the handover command (HO command) message to the terminal 1f-01 by using an RRC connection reconfiguration message by extracting the handover command (HO command) message from a message received from the target base station 1f-03 (operation 1f-20).

In the disclosure, proposed is a method of determining, when the source base station 1f-02 transmits the handover preparation information message (operation 1f-10), and in response thereto, the target base station 1f-03 transmits the handover command message to the source base station 1f-02 (operation 1f-15), an efficient DAPS handover method by using the two messages.

First embodiment of determining the efficient DAPS handover method proposed in the disclosure above is as follows.

In the first embodiment, an entity for determining the DAPS handover method may be the source base station 1f-02. In addition, in the first embodiment, in a case where the source base station 1f-02 requests the DAPS handover method, the target base station 1f-03 may always indicate or perform the DAPS handover method.

The source base station 1f-02 may indicate, to the target base station 1f-03, that the source base station 1f-02 is to perform the DAPS handover method proposed in the disclosure, by defining a new indicator in the handover preparation information message, and may request the DAPS handover method. The handover preparation information message may include current bearer configuration information of the terminal 1f-01, security key information, cell group configuration information, terminal capability information, or the like. In the description above, the source base station 1f-02 may be implemented to pre-share a capability of the target base station 1f-03 to identify in advance whether the target base station 1f-03 supports the DAPS handover method, and in the above-description, the source base station 1f-02 may indicate, to the target base station 1f-03, that the source base station 1f-02 is to perform the DAPS handover method so as to notify, to the target base station 1f-03, that the source base station 1f-02 may perform early data forwarding quickly or in advance, and may indicate to the target base station 1f-03 so that the target base station can prepare to receive data forwarding and perform processing. In the description above, the source base station 1f-02 may also request the DAPS handover method for each bearer (DRB or SRB).

In the description above, in a case where the target base station 1f-03 receives the handover preparation information message and identifies that an indicator requesting the DAPS handover method is included therein, when configuring an RRCReconfiguration message for indicating a handover to the terminal 1f-01, the target base station 1f-03 may configure the RRCReconfiguration message by including an indicator indicating the DAPS handover method, and including bearer configuration information required when the terminal 1f-01 performs the DAPS handover method, bearer configuration information, security key information, cell group configuration information, or system information. In addition, the target base station may transfer the RRCReconfiguration message to the source base station 1f-02 by including the same in a DL-DCCH message of a handover command message. In the description above, the target base station 1f-03 may also indicate the DAPS handover method for each bearer (DRB or SRB).

In the description above, when receiving the handover command message, the source base station 1f-02 may extract the RRCReconfiguration message included in the handover command message or transmit the RRCReconfiguration message to the terminal 1f-01, so as to indicate handover. In the description above, the source base station 1f-02 may also perform the DAPS handover method for each bearer (DRB or SRB) by identifying the indicated DAPS handover method for each bearer.

In the description above, a second embodiment of determining an efficient DAPS handover method proposed in the disclosure is as follows.

In the second embodiment, an entity for determining a DAPS handover method may be the target base station 1f-03. In addition, in the second embodiment, in a case where the source base station requests the DAPS handover method from the target base station 1f-03 through an indicator, the target base station 1f-03 may reject or accept the request, or may indicate another handover method to the source base station 1f-02 by indicating the same through a handover command message.

The source base station 1f-02 may indicate, to the target base station 1f-03, that the source base station 1f-02 is to perform the DAPS handover method proposed in the disclosure, by defining a new indicator in the handover preparation information message, and may request the DAPS handover method. The handover preparation information message may include current bearer configuration information of the terminal 1f-01, security key information, cell group configuration information, terminal capability information, or the like. In the description above, the source base station 1f-02 may be implemented to pre-share a capability of the target base station 1f-03 to identify in advance whether the target base station 1f-03 supports the DAPS handover method, and in the description above, the source base station 1f-02 may indicate, to the target base station 1f-03, that the source base station 1f-02 is to perform the DAPS handover method, so as to notify, to the target base station 1f-03, that the source base station 1f-02 may perform early data forwarding quickly, and may indicate the target base station 1f-03 to prepare to receive data forwarding and perform processing. In the description above, the source base station 1f-02 may also request the DAPS handover method for each bearer (DRB or SRB).

In the description above, in a case where the target base station 1f-03 receives the handover preparation information message and identifies that an indicator requesting the DAPS handover method is included therein, the target base station 1f-03 may reject or accept the request for the DAPS handover method, or may indicate another handover method according to whether the target base station 1f-03 can support the DAPS handover method, an amount of a current transmission resource, or scheduling. In the description above, the target base station 1f-03 may transmit a handover command message to the source base station 1f-02 by including an indicator for rejecting the request for the DAPS handover method, an indicator for accepting the request for the DAPS handover method, or an indicator indicating another type of the handover method, and may transmit the handover command message to the source base station 1f-02. In the description above, in a case of configuring an RRCReconfiguration message for indicating handover to the terminal 1f-01, the target base station 1f-03 may configure the RRCReconfiguration message by including the indicator indicating the DAPS handover method when the DAPS handover request is accepted, including the indicator indicating another handover method when the DAPS handover request is rejected, and including bearer configuration information necessary for the terminal to perform the DAPS handover method or another handover method, bearer configuration information, security key information, cell group configuration information, or system information. In addition, the target base station may transfer the configured RRCReconfiguration message to the source base station 1f-02 by including a DL-DCCH message of a handover command message. In the description above, the target base station 1f-03 may also indicate the DAPS handover method for each bearer (DRB or SRB).

In the description above, when receiving the handover command message, the source base station 1f-02 may identify whether the request for the DAPS handover method is accepted or rejected by identifying an indicator included in the handover command message, and when the request is accepted, the source base station 1f-02 may also perform the DAPS handover method, and may indicate handover by extracting the RRCReconfiguration message included in the handover command message or transmitting the RRCReconfiguration message to the terminal 1f-01. However, in a case where the indicator included in the handover command message is identified, when the request for the DAPS handover method is rejected or another handover message is indicated, the source base station 1f-02 may also perform another handover method indicated by the target base station 1f-03. In addition, the source base station indicate handover by extracting the RRCReconfiguration message included in the handover command message or transmitting the RRCReconfiguration message to the terminal 1f-01. As another method, even though a separate indicator is not included in the handover command message, the source base station 1f-02 may identify a type of a handover message indicated by the target base station 1f-03 by reading the RRCReconfiguration message included in the handover command message, and may identify whether the request for the DAPS handover method is accepted or rejected, and the source base station 1f-02 may also perform the handover method (for example, the DAPS handover method or another handover method) indicated in the RRCReconfiguration message. In the description above, the source base station may also perform the DAPS handover method for each bearer (DRB or SRB) by identifying the indicated DAPS handover method for each bearer.

In the description above, a third embodiment of determining an efficient DAPS handover method proposed in the disclosure is as follows.

In the third embodiment, an entity for determining a DAPS handover method may be the target base station 1f-03. In addition, in the third embodiment, the target base station 1f-03 may identify capability of the terminal 1f-01, and may determine a handover method (for example, a DAPS handover method) according to whether the target base station can support the DAPS handover method, an amount of a current transmission resource, or scheduling.

The source base station 1f-02 may transmit a handover preparation information message by including current bearer configuration information of the terminal, security key information, cell group configuration information, terminal capability information, or the like, so as to request handover from the target base station 1f-03. In the description above, the source base station 1f-02 may be implemented to pre-share capability of the target base station 1f-03 to identify in advance whether the target base station 1f-03 supports the DAPS handover method, and when the target base station 1f-03 indicates to perform the DAPS handover method, the source base station 1f-02 may perform early data forwarding quickly or in advance.

In the description above, the target base station 1f-03 may receive the handover preparation information message, and may determine the handover method (e.g., the DAPS handover method) according to capability information of the terminal 1f-01, whether the target base station can support the DAPS handover method, an amount of a current transmission resource, or scheduling. In the description above, when determining the DAPS handover method, the target base station 1f-03 may transmit the handover command message by including an indicator indicating the DAPS handover method of the message. In the description above, in a case of configuring an RRCReconfiguration message for indicating handover to the terminal 1f-01, the target base station 1f-03 may configure the RRCReconfiguration message by including the indicator indicating the DAPS handover method when the DAPS handover is determined, including the indicator indicating another handover method when a handover method other than the DAPS handover method is determined, and including bearer configuration information necessary when the terminal 1f-01 performs the DAPS handover method or another handover method, bearer configuration information, security key information, cell group configuration information, or system information. In addition, the target base station may transfer the RRCReconfiguration message to the source base station 1f-02 by including the same in a DL-DCCH message of a handover command message. In the description above, the target base station 1f-03 may also indicate the DAPS handover method for each bearer (DRB or SRB).

In the description above, when receiving the handover command message, the source base station 1f-02 may identify an indicator included in the handover command message to identify whether the DAPS handover method is determined, and when the DAPS handover method is indicated, the source base station 1f-02 may also perform the DAPS handover method, and may indicate handover by extracting the RRCReconfiguration message included in the handover command message or transmitting the RRCReconfiguration message to the terminal 1f-01. However, in a case where the indicator included in the handover command message is identified, when the DAPS handover method is not determined or another handover method is indicated, the source base station 1f-02 may also perform another handover method indicated by the target base station 1f-03. In addition, the source base station may indicate handover by extracting the RRCReconfiguration message included in the handover command message, or transmitting the RRCReconfiguration message to the terminal 1f-01. As another method, when a separate indicator is not included in the handover command message, the source base station 1f-02 may identify a type of a handover message indicated by the target base station 1f-03 by reading the RRCReconfiguration message included in the handover command message, and may identify whether the DAPS handover method is determined, and when another handover method is indicated, the source base station 1f-02 may also perform the indicated handover method. In the description above, the source base station 1f-02 may also perform the DAPS handover method for each bearer (DRB or SRB) by identifying the indicated DAPS handover method for each bearer.

Extension to a new embodiment may be made by combining the methods of the first embodiment, the second embodiment, or the third embodiment of determining an efficient DAPS handover method proposed in the disclosure.

According to an embodiment of the disclosure, a base station may indicate, in the RRCReconfiguration message, an efficient handover method (the DAPS handover method) proposed in the disclosure to the terminal 1f-01, or as another method, the base station may configure the DAPS handover method for each bearer (DRB or SRB) of the terminal 1f-01. For example, a new indicator indicating the efficient handover method (the DAPS handover method) in bearer configuration information, PDCP configuration information, or RLC configuration information for each bearer identifier or each logical channel identifier may be defined in the RRCReconfiguration message, and the base station may indicate, by using the identifier, an efficient handover message for each bearer or logical channel identifier to the terminal 1f-01. When configuring the DAPS handover method for the terminal 1f-01, the base station also indicates other handover methods (for example, a conditional handover method (a method in which multiple target cell configurations and multiple conditions are configured for the terminal, and the terminal 1*f*-01 performs a procedure of handover to one target cell when the condition is satisfied in a cell selection or reselection procedure), or a handover without a random access procedure), thereby preventing data loss or a transmission delay which may occur in handover. When receiving the RRCReconfiguration message, the terminal 1*f*-01 suspends or continues data transmission or reception to or from the source base station 1*f*-02 according to the configured handover method, and starts timer T304 (operation 1*f*-25). When the terminal 1*f*-01 fails to succeed in handover to the target base station 1*f*-03 for a predetermined time (for example, when timer T304 expires), T304 causes the terminal 1*f*-01 to return to original configuration and transition to an RRC idle state. In addition, the terminal 1*f*-01 may trigger an RRC connection re-establishment procedure, and as another method, when an efficient handover method is configured and a connection to the source base station 1*f*-02 is valid, the terminal may also report handover failure to the source base station 1*f*-02 by performing fallback. The source base station 1*f*-02 transfers a sequence number (SN) status of uplink/downlink data for each bearer (for example, for each RLC UM bearer or each RLC AM bearer), and transfers downlink or uplink data to the target base station 1*f*-03 when the downlink or uplink data is present (operations 1*f*-30 and 1*f*-35). The terminal 1*f*-01 attempts a random access to a target cell indicated by the source base station 1*f*-02 (operation 1*f*-40). Performing the random access is to notify switching of the terminal 1*f*-01 to the target cell 1*f*-03 via the handover and simultaneously to match uplink synchronization. For the random access, the terminal 1*f*-01 transmits, to the target cell 1*f*-03, a preamble corresponding to a preamble ID provided by the source base station 1*f*-02 or a randomly-selected preamble ID. After transmission of the preamble and after an elapse of a time interval corresponding to a particular number of subframes, the terminal 1*f*-01 monitors whether a random access response (RAR) message is transmitted from the target cell 1*f*-03. A time interval for monitoring the RAR message is called a random access response window (RAR window). When the RAR message is received during the RAR window (operation 1*f*-45), the terminal 1*f*-01 transmits a handover complete (HO complete) message to the target base station 1*f*-03 via an RRC reconfiguration complete message (operation 1*f*-55). When successfully receiving the RAR message from the target base station 1*f*-03, the terminal 1*f*-01 stops or ends timer T304 (operation 1*f*-50). In order to switch a path of bearers, configured for the source base station 1*f*-02, the target base station 1*f*-03 requests a path switch of the bearers from an MME, an S-GW, or an AMF 1*f*-04 (operations 1*f*-60 and 1*f*-65), and notifies the source base station 1*f*-02 to discard UE context of the terminal 1*f*-01 (operation 1*f*-70). In addition, the target base station 1*f*-03 may transmit an RRC message (for example, an RRCReconfiguration message (operation 1*f*-71)) to the terminal 1*f*-01 to indicate, by using an indicator, releasing of the connection to the source base station 1*f*-02. As another method, the target base station may also indicate releasing of the connection link to the source base station 1*f*-02 by transmitting MAC control information, RLC control information, or PDCP control information to the terminal 1*f*-01. Accordingly, the terminal 1*f*-01 attempts, from a start point of the RAR window, to receive data from the target base station 1*f*-03, and after reception of the RAR message, starts data transmission or reception to or from the target base station 1*f*-03 by transmitting the RRC reconfiguration complete message and receiving a downlink transmission resource or an uplink transmission resource (operation 1*f*-75).

Methods applicable when the base station 1*f*-02 or 1*f*-03 configures or indicates, for or to the terminal 1*f*-01, the second embodiment (the DAPS handover method) proposed in the disclosure, by using the handover command message or the RRC message (for example, the RRCReconfiguration message) is as follows. In the disclosure, when the base station 1*f*-02 or 1*f*-03 configures the DAPS handover method for the terminal 1*f*-01, or when the terminal 1*f*-01 has received, from the base station 1*f*-02 or 1*f*-03, the handover command message in which the DAPS handover method is configured, a method obtained by applying one method or several methods among methods below may be performed.

Method 1-1: When indicating or configuring, to or for the terminal 1*f*-01, handover, the base station (the source base station 1*f*-02, the target base station 1*f*-03, an LTE base station, or an NR base station) may indicate the DAPS handover method for each bearer by including mobility control info or reconfiguration with sync configuration information in the RRCReconfiguration message and defining an indicator in SRB-ToAddMod or DRB-ToAddMod of SRB-ToAddModList or DRB-ToAddModList in bearer configuration information (radio resource config dedicated or radio bearer config) of the RRCReconfiguration message. As another method, in the description above, the base station may indicate the DAPS handover method for each bearer by defining an indicator in pdcp-config in SRB-ToAddMod or DRB-ToAddMod. As another method, in the description above, in a case where the LTE base station indicates or configures, to or for the terminal 1*f*-01, an LTE RRCReconfiguration message, because pdcp-config is not defined in SRB-ToAddMod but the use of default PDCP layer entity configuration is defined therein in LTE, the LTE base station may configure the DAPS handover method for each bearer by defining an indicator in SRB-ToAddMod with respect to a SRB, and may configure the DAPS handover method for each bearer by defining an indicator in pdcp-config in DRB-ToAddMod with respect to DRBs. When the terminal 1*f*-01 receives the handover command message (the RRCReconfiguration message) configured as above, the terminal 1*f*-01 may perform, according to the configuration and for each bearer, the DAPS handover method for a bearer in which the DAPS handover method is configured, and perform a general handover method for a bearer in which the DAPS handover method is not configured. In addition, in a case where an indicator indicating or configuring a handover method type (e.g., MakeBeforeBreak handover, rach-skip handover, RACH-less handover, or conditional handover (CHO)) with respect to the terminal 1*f*-01 is included in mobility control info or reconfiguration with sync configuration information of the handover command message, and the DAPS handover method is configured for each bearer, when the terminal 1*f*-01 performs a handover procedure for each bearer, the terminal 1*f*-01 may preferentially apply the DAPS handover method over to other handover method types. For example, according to configuration and for each bearer, the terminal 1*f*-01 may perform the DAPS handover method for a bearer in which the DAPS handover method is configured, and may perform a handover method for a bearer in which the DAPS handover method is not configured, the handover method being configured according to the indicator indicating or configuring the handover method type (e.g., MakeBeforeBreak handover, rach-skip handover, RACH-less handover, or conditional handover (CHO)) with respect to the terminal 1*f*-01 in mobility control info or reconfiguration with sync configuration information of the handover command message. As another method, in order to decrease complexity of implementation of the terminal, when the DAPS handover method is configured for at least one bearer or a bearer, mobility control info or reconfiguration with sync configuration information of the handover command message may be configured not to indicate or configure another handover method type (e.g., MakeBeforeBreak handover, rach-skip handover, RACH-less handover, or conditional handover (CHO)) with respect to the terminal 1f-01. In addition, in a case where the terminal 1f-01 receives the handover command message (the RRCReconfiguration message) configured as above, when the DAPS handover method is configured for each bearer with respect to at least one bearer or a bearer, the terminal 1f-01 may apply a processing method of an RRC layer entity, an SDAP layer entity, a MAC layer entity, a PHY layer entity, or a SRB for performing the DAPS handover method proposed in the disclosure, and may apply, for each bearer in which the DAPS handover method is configured, a processing method of a PDCP layer entity or an RLC layer entity for performing the DAPS handover method proposed in the disclosure.

Method 1-2: When indicating or configuring handover, to or for the terminal 1f-01, the base station (the source base station 1f-02, the target base station 1f-03, an LTE base station, or an NR base station) may indicate the DAPS handover method for each bearer (DRB) by including mobility control info or reconfiguration with sync configuration information in the RRCReconfiguration message and defining an indicator in DRB-ToAddMod of DRB-ToAddModList in bearer configuration information (radio resource config dedicated or radio bearer config) of the RRCReconfiguration message, and may not introduce a separate indicator for configuration of the DAPS handover method for SRBs. That is, in a case where the terminal 1f-01 receives the handover command message (the RRCReconfiguration message) configured as above, when the DAPS handover method is configured for each bearer with respect to at least one bearer (DRB) or a bearer (DRB), an SRB processing method for performing the DAPS handover method proposed in the disclosure may be applied. As another method, in the description above, the base station may indicate the DAPS handover method for each bearer by defining an indicator in pdcp-config in DRB-ToAddMod. When the terminal 1f-01 receives the handover command message (the RRCReconfiguration message) configured as above, the terminal 1f-01 may perform, according to the configuration and for each bearer, the DAPS handover method for a bearer in which the DAPS handover method is configured, and may perform a general handover method for a bearer in which the DAPS handover method is not configured. In addition, in a case where the indicator indicating or configuring a handover method type (e.g., MakeBeforeBreak handover, rach-skip handover, RACH-less handover, or conditional handover (CHO)) with respect to the terminal 1f-01 is included in mobility control info or reconfiguration with sync configuration information of the handover command message, and the DAPS handover method is configured for each bearer, when performing a handover procedure for each bearer, the terminal 1f-01 may preferentially apply the DAPS handover method over the other handover method types. For example, according to configuration and for each bearer, the terminal 1f-01 may perform the DAPS handover method for a bearer in which the DAPS handover method is configured, and may perform a handover method for a bearer in which the DAPS handover method is not performed, the handover method being configured according to the indicator indicating or configuring the handover method type (e.g., MakeBeforeBreak handover, rach-skip handover, RACH-less handover, or conditional handover (CHO)) with respect to the terminal 1f-01 in mobility control info or reconfiguration with sync configuration information of the handover command message. As another method, in order to decrease complexity of implementation of the terminal, when the DAPS handover method is configured for at least one bearer or a bearer, mobility control info or reconfiguration with sync configuration information of the handover command message may be configured not to indicate or configure another handover method type (e.g., MakeBeforeBreak handover, rach-skip handover, RACH-less handover, or conditional handover (CHO)) with respect to the terminal. In addition, in a case where the terminal 1f-01 receives the handover command message (the RRCReconfiguration message), when the DAPS handover method is configured for each bearer with respect to at least one bearer or a bearer in the handover command message (the RRCReconfiguration message), a processing method of an RRC layer entity, an SDAP layer entity, a MAC layer entity, a PHY layer entity, or an SRB for performing the DAPS handover method proposed in the disclosure may be applied, and for each bearer in which the DAPS handover method is configured, a processing method of a PDCP layer entity or an RLC layer entity for performing the DAPS handover method proposed in the disclosure may be applied.

Method 2-1: When indicating or configuring handover to or for the terminal 1f-01, the base station (the source base station 1f-02, the target base station 1f-03, an LTE base station, or an NR base station) may indicate that the DAPS handover method has been configured for at least one bearer or a bearer by including mobility control info or reconfiguration with sync configuration information in the RRCReconfiguration message, and defining and including the indicator indicating or configuring the DAPS handover method in mobility control info or reconfiguration with sync, and may indicate the DAPS handover method for each bearer (SRB or DRB) by defining an indicator in SRB-ToAddMod or DRB-ToAddMod of SRB-ToAddModList or DRB-ToAddModList in bearer configuration information (Radio Resource Config Dedicated or Radio Bearer Config) of the RRCReconfiguration message. As another method, in the description above, the base station may indicate the DAPS handover method for each bearer by defining an indicator in pdcp-config in SRB-ToAddMod or DRB-ToAddMod. As another method, in the description above, in a case where the LTE base station indicates or configures handover to or for the terminal 1f-01 by using an LTE RRCRecofiguration message, because pdcp-config is not defined in SRB-ToAddMod but the use of default PDCP layer configuration is defined therein in LTE, the LTE base station may configure the DAPS handover method for each bearer by defining an indicator in SRB-ToAddMod with respect to a SRB, and may configure the DAPS handover method for each bearer by defining an indicator in pdcp-config in DRB-ToAddMod with respect to DRBs. When receiving the handover command message (the RRCReconfiguration message) configured as above, the terminal 1*f*-01 may perform, according to configuration and for each bearer, the DAPS handover method for a bearer in which the DAPS handover method is configured, and may perform a general handover method for a bearer in which the DAPS handover method is not configured. In addition, in a case where the indicator indicating or configuring a handover method type (e.g., MakeBeforeBreak handover, rach-skip handover, RACH-less handover, or conditional handover (CHO)) with respect to the terminal is included in mobility control info or reconfiguration with sync configuration information of the handover command message, and the DAPS handover method is configured for each bearer, when performing a handover procedure for each bearer, the terminal 1*f*-01 may preferentially apply the DAPS handover method over the other handover method types. For example, according to configuration and for each bearer, the UE 1*f*-01 may perform the DAPS handover method for a bearer in which the DAPS handover method is configured, and may perform a handover method for a bearer in which the DAPS handover method is not configured, the handover method being configured according to the indicator indicating or configuring the handover method type (e.g., MakeBeforeBreak handover, rach-skip handover, RACH-less handover, or conditional handover (CHO)) with respect to the terminal 1*f*-01 in mobility control info or reconfiguration with Sync configuration information of the handover command message. As another method, in order to decrease complexity of implementation of the terminal, when the DAPS handover method is configured for at least one bearer or a bearer, mobility control info or reconfiguration with sync configuration information of the handover command message may be configured not to indicate or configure another handover method type (e.g., MakeBeforeBreak handover, rach-skip handover, RACH-less handover, or conditional handover (CHO)) with respect to the terminal 1*f*-01. In addition, in a case where the terminal 1*f*-01 receives the handover command message (the RRCReconfiguration message), when the indicator indicating or configuring the DAPS handover method is included or configured in mobility control info of reconfiguration with sync in the handover command message (the RRCReconfiguration message), a processing method of an RRC layer entity, an SDAP layer entity, a MAC layer entity, a PHY layer entity, or an SRB for performing the DAPS handover method proposed in the disclosure may be applied, and for each bearer in which he DAPS handover method is configured, a processing method of a PDCP layer entity or an RLC layer entity for performing the DAPS handover method proposed in the disclosure may be applied.

Method 2-2: When indicating or configuring handover to or for the terminal 1*f*-01, the base station (the source base station 1*f*-02, the target base station 1*f*-03, an LTE base station, or an NR base station) may indicate that the DAPS handover method has been configured for at least one bearer or a bearer by including mobility control info or reconfiguration with sync configuration information in the RRCReconfiguration message, and defining and including the indicator indicating or configuring the DAPS handover method in mobility control info or reconfiguration with sync, may indicate the DAPS handover method for each bearer (DRB) by defining an indicator in DRB-ToAddMod of DRB-ToAddModList in bearer configuration information (radio resource config dedicated or radio bearer config) of the RRCReconfiguration message, and may not introduce a separate indicator for configuration of the DAPS handover method for SRBs. That is, in a case where the terminal 1*f*-01 has received the handover command message (the RRCReconfiguration message), when the DAPS handover method is configured for each bearer with respect to at least one bearer (DRB) or a bearer (DRB), a processing method of an SRB for performing the DAPS handover method proposed in the disclosure may be applied. As another method, in the description above, the base station may indicate the DAPS handover method for each bearer by defining an indicator in pdcp-config in DRB-ToAddMod. When the terminal 1*f*-01 receives the handover command message (the RRCReconfiguration message) configured as above, the terminal 1*f*-01 may perform, according to the configuration and for each of bearers, the DAPS handover method for a bearer in which the DAPS handover method is configured, and may perform a general handover method for a bearer in which the DAPS handover method is not configured. In addition, in a case where the indicator indicating or configuring a handover method type (e.g., MakeBeforeBreak handover, rach-skip handover, RACH-less handover, or conditional handover (CHO)) with respect to the terminal 1*f*-01 is included in mobility control info or reconfiguration with sync configuration information of the handover command message, and the DAPS handover method is configured for each bearer, when the terminal 1*f*-01 performs a handover procedure for each bearer, the terminal 1*f*-01 may preferentially apply the DAPS handover method over the other handover method types. For example, according to the configuration and for each bearer, the terminal 1*f*-01 may perform the DAPS handover method for a bearer in which the DAPS handover method is configured, and may perform a handover method for a bearer in which the DAPS handover method is not configured, the handover method being configured according to the indicator indicating or configuring the handover method type (e.g., MakeBeforeBreak handover, rach-skip handover, RACH-less handover, or conditional handover (CHO)) with respect to the terminal 1*f*-01 in mobility control info or reconfiguration with sync configuration information of the handover command message. As another method, in order to decrease complexity of implementation of the terminal, when the DAPS handover method is configured for at least one bearer or a bearer, mobility control info or reconfiguration with sync configuration information of the handover command message may be configured not to indicate or configure another handover method type (e.g., MakeBeforeBreak handover, rach-skip handover, RACH-less handover, or conditional handover (CHO)) with respect to the terminal 1*f*-01. In addition, in a case where the terminal 1*f*-01 has received the handover command message (the RRCReconfiguration message) configured as above, when the indicator indicating or configuring the DAPS handover method is included or configured in mobility control info of reconfiguration with sync in the handover command message (the RRCReconfiguration message), a processing method of an RRC layer entity, an SDAP layer entity, a MAC layer entity, a PHY layer entity, or an SRB for performing the DAPS handover method proposed in the disclosure may be applied, and for each bearer in which the DAPS handover method is configured, a processing method of a PDCP layer entity or an RLC layer entity for performing the DAPS handover method proposed in the disclosure may be applied.

Method 3-1: When indicating or configuring handover to or for the terminal 1f-01, the base station (the source base station 1f-02, the target base station 1f-03, an LTE base station, or an NR base station) may indicate that the DAPS handover method has been configured for at least one bearer or a bearer by including mobility control info or reconfiguration with sync configuration information in the RRCReconfiguration message, and defining and including the indicator indicating or configuring the DAPS handover method in mobility control info or reconfiguration with sync, and may also indicate whether the DAPS handover method is configured for each bearer by configuring and including a list of bearers in which the DAPS handover method is configured and including identifiers (SRB or DRB) of the bearers in which the DAPS handover method is configured in the list of bearers. As another method, in the description above, the base station may indicate whether the DAPS handover method is configured for each bearer by configuring and including a list of bearers in which the DAPS handover method is not configured and including identifiers (SRB or DRB) of the bearers in which the DAPS handover method is not configured in the list of bearers. When the terminal 1f-01 receives handover command message (the RRCReconfiguration message) configured as above, the terminal 1f-01 may perform, according to the configuration and for each bearer, the DAPS handover method for a bearer in which the DAPS handover method is configured, a bearer having an identifier included in the list of bearers in which the DAPS handover method is configured, or a bearer having an identifier not included in the list of bearers in which the DAPS handover method is not configured, and may perform a general handover method for a bearer in which the DAPS handover method is not configured, a bearer having an identifier not included in the list of bearers in which the DAPS handover method is configured, or a bearer having identifier included in the list of bearers in which the DAPS handover method is not configured. In addition, in a case where the indicator indicating or configuring a handover method type (e.g., MakeBeforeBreak handover, rach-skip handover, RACH-less handover, or conditional handover (CHO)) with respect to the terminal is included in mobility control info or reconfiguration with sync configuration information of the handover command message, and the DAPS handover method is configured for each bearer, when the terminal 1f-01 performs a handover procedure for each bearer, the terminal 1f-01 may preferentially apply the DAPS handover method over the other handover method types. For example, according to configuration and for each of bearers, the terminal 1f-01 may perform the DAPS handover method for a bearer in which the DAPS handover method is configured, a bearer having an identifier included in the list of bearers in which the DAPS handover method is configured, or a bearer having an identifier not included in the list of bearers in which the DAPS handover method is not configured, and may perform a handover method for a bearer in which the DAPS handover method is not configured, a bearer having an identifier not included in the list of bearers in which the DAPS handover method is configured, or a bearer having an identifier included in the list of bearers in which the DAPS handover method is not configured, the handover method being configured according to the indicator indicating or configuring the handover method type (e.g., MakeBeforeBreak handover, rach-skip handover, RACH-less handover, or conditional handover (CHO)) with respect to the terminal 1f-01 in mobility control info or reconfiguration with sync configuration information of the handover command message. As another method, in order to decrease complexity of implementation of the terminal, when the DAPS handover method is configured for at least one bearer or a bearer, mobility control info or reconfiguration with sync configuration information of the handover command message may be configured not to indicate or configure another handover method type (e.g., MakeBeforeBreak handover, rach-skip handover, RACH-less handover, or conditional handover (CHO)) with respect to the terminal. In addition, in a case where the terminal 1f-01 has received the handover command message (the RRCReconfiguration message) configured as above, when the indicator indicating or configuring the DAPS handover method is included or configured in mobility control info of reconfiguration with sync of the handover command message (the RRCReconfiguration message), a processing method of an RRC layer entity, an SDAP layer entity, a MAC layer entity, a PHY layer entity, or an SRB for performing the DAPS handover method proposed in the disclosure may be applied, and for each bearer, a processing method of a PDCP layer entity or an RLC layer entity for performing the DAPS handover method proposed in the disclosure may be applied to the bearer in which the DAPS handover method is configured, the bearer having an identifier included in the list of bearers in which the DAPS handover method is configured, or the bearer having an identifier not included in the list of bearers in which the DAPS handover method is not configured.

Method 3-2: When indicating or configuring handover to or for the terminal 1f-01, the base station (the source base station 1f-02, the target base station 1f-03, an LTE base station, or an NR base station) may indicate that the DAPS handover method has been configured for at least one bearer or a bearer by including mobility control info or reconfiguration with sync configuration information in the RRCReconfiguration message, and also defining and including the indicator indicating or configuring the DAPS handover method in mobility control info or reconfiguration with sync, and may also indicate whether the DAPS handover method is configured for each bearer by configuring and including a list of bearers in which the DAPS handover method is configured, and including identifiers (SRB or DRB) of the bearers in which the DAPS handover method is configured in the list of bearers. In addition, for SRBs, a separate indicator for configuration of the DAPS handover method may not be introduced. As another method, in the description above, the base station may indicate whether the DAPS handover method is configured for each bearer by configuring and including a list of bearers in which the DAPS handover method is not configured, and including identifiers (SRB or DRB) of the bearers in which the DAPS handover method is not configured in the list of bearers. That is, in a case where the terminal 1*f*-01 has received the handover command message (the RRCReconfiguration message) configured as above, when the DAPS handover method is configured for each bearer with respect to at least one bearer (DRB) or a bearer (DRB), a processing method of an SRB for performing the DAPS handover method proposed in the disclosure may be applied. When receiving the handover command message (the RRCReconfiguration message) configured as above, the terminal 1*f*-01 may perform, according to the configuration and for each bearer, the DAPS handover method for a bearer in which the DAPS handover method is configured, a bearer having an identifier included in the list of bearers in which the DAPS handover method is configured, or a bearer having an identifier not included in the list of bearers in which the DAPS handover method is not configured, and may perform a general handover method for a bearer in which the DAPS handover method is not configured, a bearer having an identifier not included in the list of bearers in which the DAPS handover method is configured, or a bearer having an identifier included in the list of bearers in which the DAPS handover method is not included. In addition, in a case where the indicator indicating or configuring a handover method type (e.g., MakeBeforeBreak handover, Rach-skip handover, RACH-less handover, or Conditional handover CHO) with respect to the terminal 1*f*-01 is included in mobility control info or reconfiguration with sync configuration information of the handover command message, and the DAPS handover method is configured for each bearer, when performing a handover procedure for each bearer, the terminal 1*f*-01 may preferentially apply the DAPS handover method over the other handover method types. For example, according to configuration and for each bearer, the terminal 1*f*-01 may perform the DAPS handover method for a bearer in which the DAPS handover method is configured, a bearer having an identifier included in the list of bearers in which the DAPS handover method is configured, or a bearer having an identifier not included in the list of bearers in which the DAPS handover method is not configured, and may perform a handover method for a bearer in which the DAPS handover method is not configured, a bearer having an identifier not included in the list of bearers in which the DAPS handover method is configured, or a bearer having identifier included in the list of bearers in which the DAPS handover method is not configured, the handover method being configured according to the indicator indicating or configuring the handover method type (e.g., MakeBeforeBreak handover, Rach-skip handover, RACH-less handover, or Conditional handover CHO) with respect to the terminal in mobility control info or reconfiguration with sync configuration information of the handover command message. As another method, in order to decrease complexity of implementation of the terminal, when the DAPS handover method is configured for at least one bearer or a bearer, mobility control info or reconfiguration with Sync configuration information of the handover command message may be configured not to indicate or configure another handover method type (e.g., MakeBeforeBreak handover, rach-skip handover, RACH-less handover, or conditional handover (CHO)) with respect to the terminal 1*f*-01. In addition, in a case where the terminal 1*f*-01 has received the handover command message (the RRCReconfiguration message) configured as above, when the indicator indicating or configuring the DAPS handover method is included or configured in mobility control info of reconfiguration with sync, a processing method of an RRC layer entity, an SDAP layer entity, a MAC layer entity, a PHY layer entity, or an SRB for performing the DAPS handover method proposed in the disclosure may be applied, and for each bearer, a processing method of a PDCP layer entity or an RLC layer entity for performing the DAPS handover method proposed in the disclosure may be applied to the bearer in which the DAPS handover method is configured, the bearer having an identifier included in the list of bearers in which the DAPS handover method is configured, or the bearer having an identifier not included in the list of bearers in which the DAPS handover method is not configured.

The disclosure proposes non-interruptive handover methods capable of reducing a data interruption time due to handover or making the data interruption time become 0 ms in a next-generation mobile communication system.

A terminal may configure multiple first bearers with a source base station and may perform data transmission and reception (uplink or downlink data transmission and reception) by using protocol layer entities (a PHY layer entity, a MAC layer entity, an RLC layer entity, or a PDCP layer entity) for each of the bearers, but in the disclosure, for convenience of description, it is assumed, in drawings and descriptions, that the terminal has one bearer.

Figure 1G:
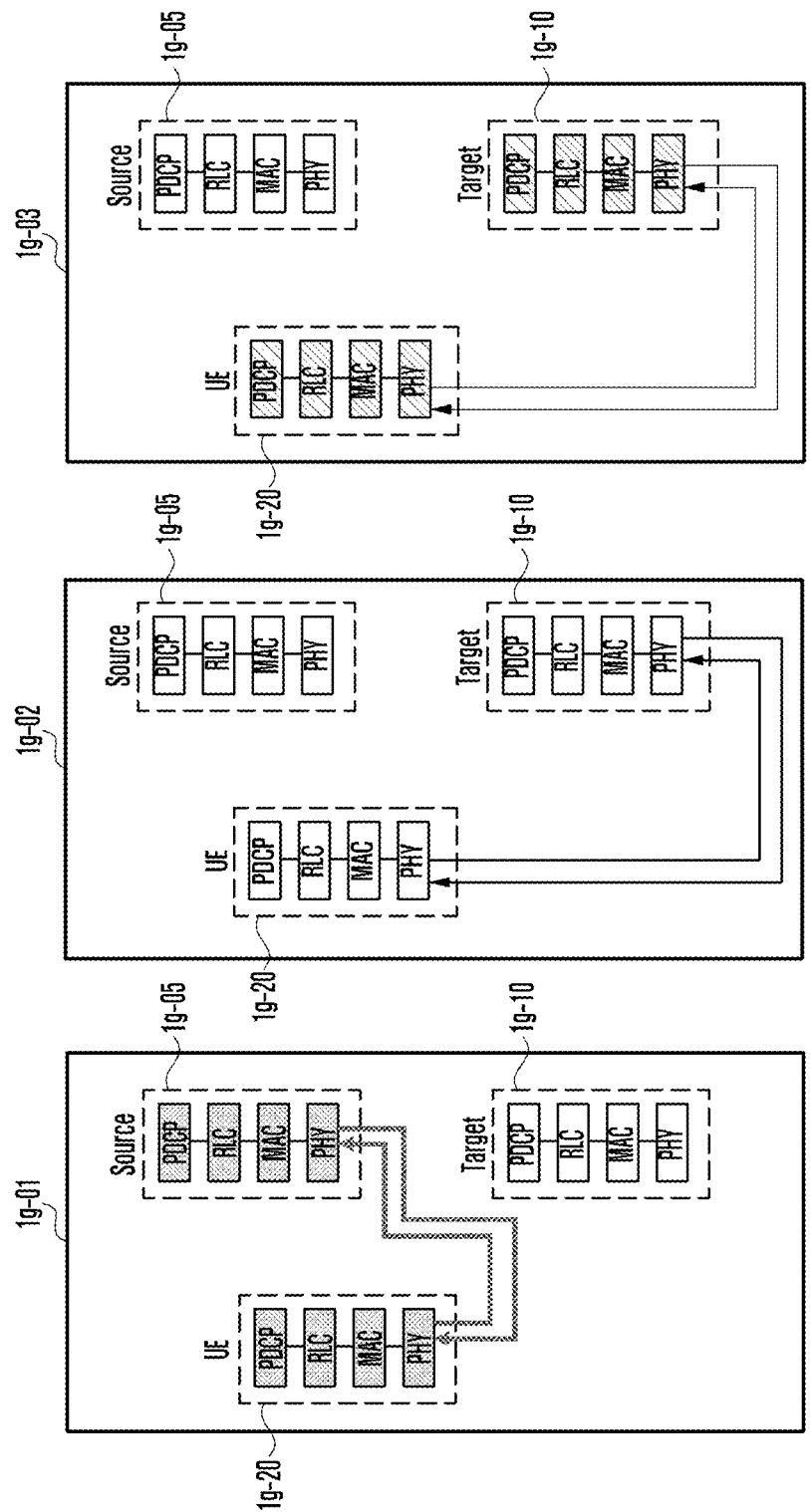
FIG. 1G illustrates specific operations of a handover method for reducing a data interruption time due to handover according to a first embodiment of the disclosure.

FIG. 1G illustrates specific operations of a handover method for minimizing a data interruption time due to handover according to a first embodiment of the disclosure.

Referring to FIG. 1G, in the first embodiment of the general handover method, in a case where in the first operation 1*g*-01, the terminal 1*g*-20 receives a handover command message from a source base station 1*g*-05 while transmitting or receiving data to or from the source base station 1*g*-05, when the handover command message is received according to a handover method indicated by the handover command message (for example, the RRCReconfiguration message), the terminal 1*g*-20 may release a connection to the source base station 1*g*-05, perform a procedure of random access to a target base station 1*g*-10, and perform a handover procedure. As another method, to minimize a data interruption time occurring during the handover according to the indicated handover method, the terminal 1*g*-20 may continuously transmit and receive data to and from the source base station 1*g*-05.

In the first embodiment of the general handover method of FIG. 1G, in the second operation 1*g*-02, when performing the procedure of random access to the target base station 1*g*-10 according to the handover method indicated by the handover command message, transmitting a preamble, or initially transmitting data in an uplink transmission resource by using a physical uplink control channel (PUCCH) or physical uplink shared channel (PUSCH) transport resource, the terminal 1*g*-20 may suspend data transmission and reception (uplink data transmission and downlink data reception) to and from the source base station 1*g*-05.

In the first embodiment of the general handover method of FIG. 1G, in the third operation 1*g*-03, the terminal 1*g*-20 may complete the random access procedure with respect to the target base station 1*g*-10, transmit a handover complete message, and start data transmission and reception (uplink data transmission and downlink data reception) to and from the target base station 1*g*-10.

The first embodiment of the efficient handover method of the disclosure above may describe a handover method performed when the DAPS handover method is not configured.

Figure 1H:
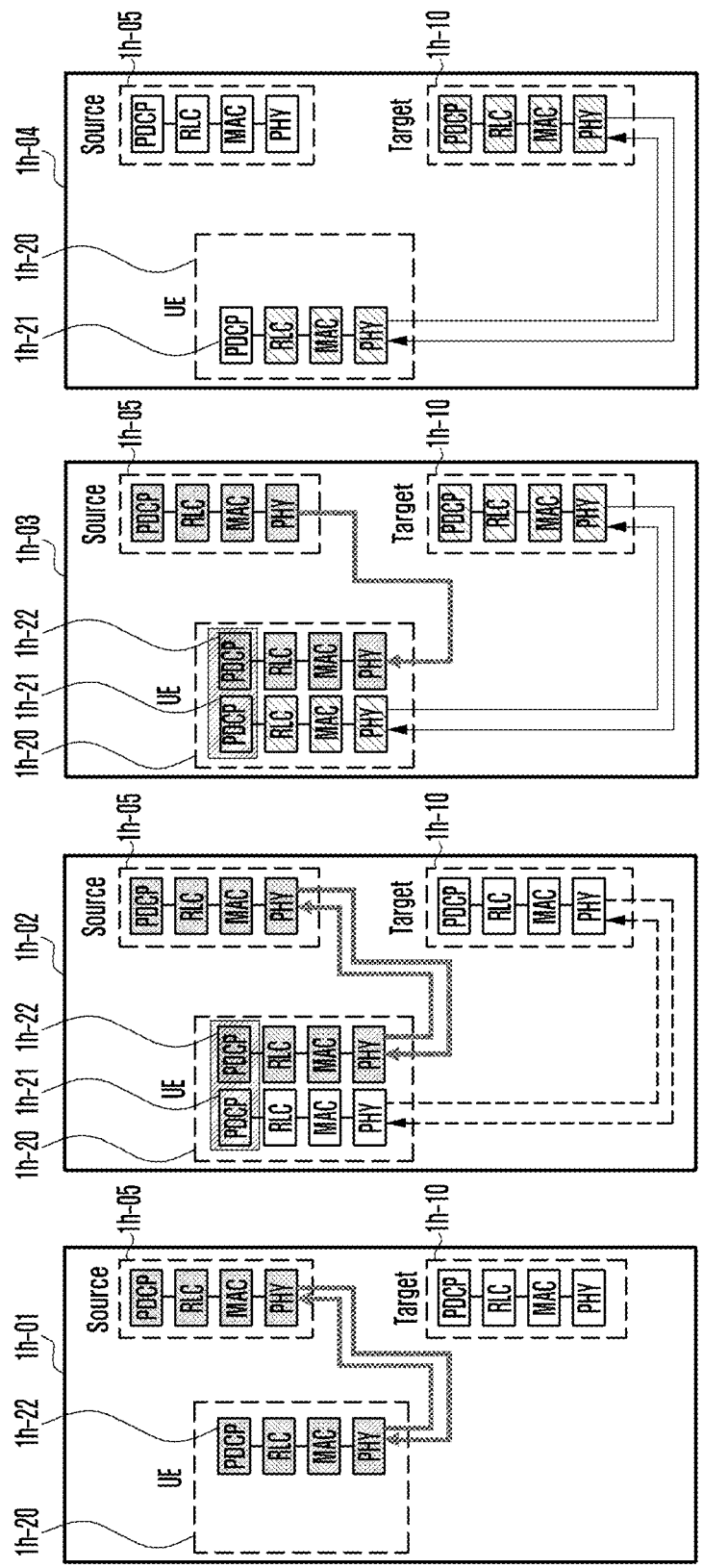
FIG. 1H illustrates specific operations of a handover method for reducing a data interruption time due to handover according to a second embodiment of the disclosure.

FIG. 1H illustrates specific operations of a handover method for reducing a data interruption time due to handover according to a second embodiment of the disclosure.

As a second embodiment of the disclosure, specific operations of an efficient dual active protocol stack (DAPS) handover method for minimizing a data interruption time due to handover are described.

In the DAPS handover method of FIG. 1H, i.e., in the second embodiment, in a case where a terminal 1h-20 receives a handover command message from a source base station 1h-05 while transmitting or receiving data to or from the source base station 1h-05 in the first operation 1h-01, when the handover command message indicates the second embodiment (for example, the DAPS handover method) of the efficient handover method proposed in the disclosure, or indicates handover for each bearer, the terminal may continuously transmit or receive data to or from the source base station 1h-05 through protocol layer entities 1h-22 for a first bearer so as to minimize a data interruption time occurring during handover even when the handover command message is received. In addition, when an RRC layer entity identifies, in the handover command message, an indication for the second embodiment (for example, the DAPS handover method) of the efficient handover method proposed in the disclosure, or identifies an indicator for the DAPS handover method for each bearer, the RRC layer entity may transfer the indicator to a PDCP layer entity corresponding to each bearer or a bearer to which the DAPS handover method is indicated, and when the PDCP layer entity receives the indicator, the PDCP layer entity may switch from a first PDCP layer entity structure 1i-11 or 1i-12 to a second PDCP layer entity structure 1i-20. The first operation 1h-01 above may describe an operation in which a terminal 1h-20 receives a handover command message (an RRCReconfiguration message) from a base station 1h-05. In addition, when switching to the second PDCP layer entity structure according to the configuration included in the received handover command message above, protocol layer entities (a PHY layer entity, a MAC layer entity, an RLC layer entity, or a PDCP layer entity) 1h-21 for a second bearer for a target base station 1h-10 may be configured or established in advance, a security key for the target base station 1h-10 may be derived and updated, and header (or data) compression context for the target base station 1h-10 may be configured. In addition, in a case where the terminal 1h-20 receives a handover command message and the handover command message indicates the DAPS handover method proposed in the disclosure or indicates the DAPS handover method for a particular bearer, or a PDCP realignment timer value is newly configured, when switching from the first PDCP layer entity structure or function (1i-11 or 1i-12) to the second PDCP layer entity structure or function (1i-20) proposed in the disclosure is performed for each bearer or for a bearer indicting the DAPS handover method, the terminal 1h-20 may update a variable for realignment to a PDCP serial number or a COUNT value which is expected to be received next time, stop a realignment timer, and restart the realignment timer. In addition, in the description above, when the handover command message (for example, the RRCReconfiguration message) is received, an RRC layer entity of the terminal 1h-20 may start a first timer (for example, T304). In addition, the first timer may stop when the terminal performs a procedure of random access to the target base station 1h-10 to perform handover and the random access procedure is successfully completed (for example, when a first condition proposed in the disclosure is satisfied), and in a case where the handover fails and the first timer thus expires, when a connection to the source base station 1h-05 is valid, the terminal 1h-20 may report handover failure to the source base station 1h-5 and attempt connection recovery by performing fallback, and when a connection to the source base station 1h-05 is invalid, the terminal may perform an RRC connection re-establishment procedure.

The handover command message may indicate that the second bearer is configured and established to have the same bearer identifier as the first bearer so as to prevent a data interruption time from occurring for each bearer. In addition, in the second embodiment above, a PDCP layer entity for the first bearer and a PDCP layer entity for the second bearer may logically operate as one PDCP layer entity, and a detailed operation method is described with reference to FIG. 1i. In addition, in the second embodiment above, when the terminal 1h-20 is configured to transmit uplink data to both the source base station 1h-05 and the target base station 1h-10, uplink data may be transmitted to only one of the source base station 1h-05 and the target base station 1h-10 in the second embodiment so as to avoid coverage lessening problem due to insufficient transmission power of the terminal 1h-20 or a problem (link selection) that a base station from which a transmission resource is requested and to which the uplink data is to be transmitted needs to be determined when the uplink data is transmitted. More specifically, in the second embodiment above, when the terminal 1h-20 does not have a capability (dual uplink transmission) of simultaneously transmitting uplink data to different base stations at different frequencies or the same frequency, the terminal may transmit the uplink data to only one base station among the source base station 1h-05 and the target base station 1h-10 within one time unit. Accordingly, the terminal 1h-20 may request scheduling from only one base station among the source base station 1h-05 and the target base station 1h-10, may transmit a report (for example, a buffer status report) about sizes of multiple items of data to be transmitted by the PDCP layer entity to only one base station among the source base station 1h-05 and the target base station 1h-10, and may receive an uplink transmission resource, thereby transmitting uplink data to only one base station. In addition, even when receiving a handover command message from the source base station 1h-05, the terminal 1h-20 may not initialize a MAC layer entity for the first bearer so as to prevent data loss by continuing data transmission and reception upon retransmission of HARQ. In addition, an RLC layer entity in an AM mode may continuously perform RLC retransmission. As another method, when the handover command message indicates, for each bearer, the second embodiment (the DAPS handover method) of the efficient handover method proposed in the disclosure, the terminal 1h-20 may continuously transmit or receive data to or from the source base station 1h-05 for only a PDCP layer entity, an RLC layer entity, or a MAC layer entity, which corresponds to a bearer or a logical channel identifier to which the second embodiment (the DAPS handover method) is indicated in the handover command message, or for only data corresponding to the bearer or the logical channel identifier. In addition, when the first condition proposed in the disclosure is satisfied (for example, when uplink data transmission is switched to the target base station 1h-10), the terminal 1h-20 may also continuously transmit or receive RLC control data (a RLC status report), PDCP control data (ROHC feedback or a PDCP status report), or HARQ retransmission to or from the source base station 1h-05 for only the PDCP layer entity, the RLC layer entity, or the MAC layer entity, which corresponds to the bearer or the logical channel identifier to which the second embodiment (the DAPS handover method) is indicated in the handover command message. In addition, when the handover command message indicates, for each bearer, the second embodiment (the DAPS handover method) of the efficient handover method proposed in the disclosure, the terminal 1h-20 may suspend transmission or reception of data to or from the source base station 1h-05 for a PDCP layer entity, an RLC layer entity, or a MAC layer entity, which corresponds to a bearer or a logical channel identifier to which the second embodiment (the DAPS handover method) is not indicated in the handover command message. In addition, in the description above, when the terminal 1h-20 receives a handover command message and the handover command message indicates the DAPS handover method proposed in the disclosure, or indicates the DAPS handover method for specific bearers, the DAPS handover method is configured for at least one bearer, the DAPS handover method is configured for a bearer, or a QoS flow and bearer mapping information are newly configured, the terminal 1h-20 may switch a first SDAP layer entity structure or function 1j-10 to a second SDAP layer entity structure or function 1j-20 proposed in the disclosure for each bearer or a bearer to which the DAPS handover method is indicated. In addition, in the second SDAP layer entity structure 1j-20, an existing first QoS flow and existing bearer mapping information for the source base station 1h-05 are maintained so that uplink data to be transmitted to the source base station 1h-05 and downlink data to be received from the source base station 1h-05 are processed, and a second QoS flow and the bearer mapping information that are newly configured in the handover command message may be configured for the target base station 1h-10, and may be used to process uplink data to be transmitted to the target base station 1h-10 and downlink data to be received from the target base station 1h-10. That is, in the second SDAP layer entity structure 1j-20 proposed in the disclosure, the first QoS flow and the bearer mapping information for the source base station 1h-05 or the second QoS flow and the bearer mapping information for the target base station 1h-10 may be maintained so that data for the source base station 1h-05 and data for the target base station 1h-10 are separately processed. In the second SDAP layer entity structure, an SDAP layer entity may distinguish whether data received from a lower layer is data received from the source base station 1h-05 or data received from the target base station 1h-10, through a 1-bit indicator of an SDAP header, a 1-bit indicator of a PDCP header, or information indicated by the PDCP layer entity. In addition, when the base station indicates the DAPS handover method for each bearer to the terminal 1h-20 by using a handover command message, the base station may always indicate the DAPS handover method for a default bearer (default DRB) so that when data occurs in a new QoS flow that does not correspond to a QoS flow and bearer mapping information during a DAPS handover procedure, uplink data is always transmitted through the default bearer. When the DAPS handover method is not configured for the default bearer, uplink data transmission for the new QoS flow occurring during handover is unavailable such that a data interruption time may occur. As another method, in the description above, in a case where the terminal 1h-20 receives a handover command message (for example, an RRCReconfiguration message), the second embodiment (the DAPS handover method) is indicated, and SDAP layer configuration information or a second QoS flow and bearer mapping information for the target base station are configured in the RRC message, the terminal 1h-20 may apply the SDAP layer configuration information or the second QoS flow and the bearer mapping information when the first condition proposed in the disclosure is satisfied. In addition, in the description above, in a case where the handover command message indicates the second embodiment (the DAPS handover method) for each bearer, the terminal 1h-20 may maintain and apply only a first QoS flow and bearer mapping information which correspond to a bearer to which the second embodiment is indicated when the maintaining the first QoS flow and the bearer mapping information for the source base station 1h-05, and may release or may not apply a first QoS flow and bearer mapping information which correspond to a bearer to which the second embodiment is not indicated, and in a case where the SDAP layer configuration information or the second QoS flow and the bearer mapping information for the target base station 1h-10 are configured in the RRC message, the terminal 1h-20 may apply the SDAP layer configuration information or the second QoS flow and the bearer mapping information to data transmission or reception to or from the target base station 1h-10 when the first condition proposed in the disclosure is satisfied.

In the second embodiment of the efficient handover method of FIG. 1H, in the second operation 1h-02, when performing a random access procedure for the target base station 1h-10 indicated in the handover command message, through the protocol layer entities 1h-21 for the second bearer, the terminal 1h-20 may also continue data transmission or reception (uplink data transmission or downlink data reception) to or from the source base station 1h-05 through the protocol layer entities 1h-22 for the first bearer. In the description above, the second operation may describe an operation in which the terminal 1h-20 performs a cell selection or reselection procedure, and performs a procedure of random access procedure to a target cell 1h-10 indicated by a handover command message (an RRCReconfiguration message) received from the source base station 1h-05.

In the second embodiment of the efficient handover method of FIG. 1H, when a first condition is satisfied in the third operation 1h-03, the terminal 1h-20 may suspend uplink data transmission to the source base station 1h-05 through the protocol layer entities 1h-22 for the first bearer among bearers to which the DAPS handover method is configured, and transmit the uplink data to the target base station 1h-10 through the protocol layer entities 1h-21 for the second bearer, and downlink data may be continuously received from the source base station 1h-05 and the target base station 1h-10 through the protocol layer entities 1h-22 for the first bearer and the protocol layer entities 1h-21 for the second bearer. In the description above, the third operation describes an operation in which the terminal 1h-20 satisfies the first condition and thus switches uplink transmission from the source base station 1h-05 to the target base station 1h-10, and describes, more specifically, an operation in which the terminal 1h-20 transmits uplink data to the source base station 1h-05 via the first bearer until the first condition is satisfied, and when the first condition is satisfied, the terminal 1h-20 suspends transmission of the uplink data to the source base station 1h-05 via the first bearer, and starts transmission of the uplink data to the target base station 1h-10 via the second bearer. Specifically, in the second PDCP layer entity structure proposed in the disclosure for the bearer in which the DAPS handover method is configured, in a case where the PDCP layer entity transmits uplink data via the first bearer, then satisfies the first condition, and thus receives an indicator from a lower layer entity (when the MAC layer entity succeeds in a procedure of random access to the target base station) or an upper layer entity (when a first timer expires in the RRC layer entity), transmission of the uplink data via the first bearer may be suspended and switching may be performed, whereby transmission of the uplink data via the second bearer may start. In addition, as in the PDCP layer entity structure proposed with reference to FIG. 1I, a reception PDCP layer entity 1h-21 for the second bearer and a reception PDCP layer entity 1h-22 for the first bearer may operate as one entity, and the reception PDCP layer entity 1h-21 may continuously receive data from the source base station 1h-05 or the target base station 1h-10 without interruption by using stored transmission/reception data, serial number information, or information such as header compression and decompression context. In the description above, the first condition may be one of conditions below. The first condition to be proposed below proposes an uplink data transmission switching time point at which a transmission resource can be most efficiently used and a data interruption time can be minimized.

The first condition may be determined to be satisfied in a case where the terminal 1h-20 successfully completes a procedure of random access to the target base station 1h-10 through the layer entities 1h-21 (for example, a MAC layer entity) for the second bearer, a case where the terminal 1h-20 successfully completes the procedure of random access to the target base station 1h-10 through the layer entities 1h-21 (for example, the MAC layer entity) for the second bearer and receives allocation of a first uplink transmission resource from the target base station 1h-10, or a case where an uplink transmission resource is initially indicated to the terminal 1h-20.

■ For example, in a case where the terminal 1h-20 receives a handover command message from the source base station 1h-05 and receives an indication of a random access to the target base station 1h-10, when the indicated random access is a contention free random access (CFRA) (for example, when a predesignated preamble or a terminal-cell identifier (for example, a C-RNTI) is allocated),
   ♦ it may be considered that the random access procedure is successfully completed when the terminal 1h-20 transmits the predesignated preamble to a cell of the target base station 1h-10 and receives a random access response (RAR) message, and thus when a first uplink transmission resource allocated, included, or indicated in the RAR message is received, it may be determined that the first condition is satisfied. As another method, when an uplink transmission resource is initially received after the reception of the RAR message, it may be determined that the first condition is satisfied.

■ In a case where the terminal 1h-20 receives a handover command message from the source base station 1h-05 and receives an indication of a random access to the target base station 1h-10, when the indicated random access is a contention-based random access (CBRA) (for example, when a predesignated preamble or a terminal-cell identifier (for example, C-RNTI) is not allocated),
   ♦ the terminal 1h-20 may consider that the procedure of random access to the target base station 1h-10 is successfully completed when the terminal 1h-20 transmits a preamble (for example, a random preamble) to a cell of the target base station 1h-10 and receives a random access response (RAR) message, transmits message 3 (for example, a handover complete message) by using an uplink transmission resource allocated, included, or indicated in the RAR message, and receives, from the target base station 1h-10 via message 4, an MAC CE (contention resolution MAC CE) indicating resolution of contention or receives an uplink transmission resource via a PDCCH corresponding to a C-RNTI of the terminal 1h-20, and thus thereafter, when the terminal 1h-20 monitors the PDCCH and initially receives or is initially indicated with the uplink transmission resource via the PDCCH corresponding to the C-RNTI of the terminal 1h-20, it may be determined that the first condition is satisfied. As another method, when a size of the uplink transmission resource allocated in the RAR message is sufficient and thus the terminal 1h-20 can transmit message 3 and the terminal 1h-20 can additionally transmit uplink data, it may be determined that the uplink transmission resource is initially received and it may be also determined that the first condition is satisfied. That is, when the RAR is received, it may be determined that the uplink transmission resource is initially received and it may be also determined that the first condition is satisfied.

When a handover method (RACH-less handover) requiring no random access procedure is indicated together in the handover command message received by the terminal 1h-20,
■ when the handover command message includes an uplink transmission resource for the target base station 1h-10,
   ♦ it may be determined that a random access procedure is successfully completed and the first condition is satisfied when the terminal 1h-20 transmits message 3 (for example, a handover complete message or a RRCReconfigurationComplete message) by using the uplink transmission resource of the target base station 1h-10, receives, from the target base station 1h-10, a UE identity confirmation MAC CE via message 4, or receives the uplink transmission resource via a PDCCH corresponding to a C-RNTI of the terminal 1h-20. As another method, when a first uplink transmission resource is received via the PDCCH corresponding to the C-RNTI of the terminal 1h-20 through monitoring of the PDCCH after the random access procedure is successfully completed, it may be determined that the first condition is satisfied.
■ When the handover command message does not include the uplink transmission resource for the target base station 1h-10,
   ♦ it may be determined that a random access procedure is successfully completed and the first condition is satisfied when the terminal 1h-20 monitors a PDCCH for the target base station (or cell) 1h-10 and receives an uplink transmission resource via the PDCCH corresponding to the C-RNTI of the terminal 1h-20, or the terminal transmits message 3 (for example, a handover complete message or a RRCReconfigurationComplete message) by using the uplink transmission resource, and receives a UE identity confirmation MAC CE from the base station 1h-10, or receives an uplink transmission resource via the PDCCH corresponding to the C-RNTI of the terminal 1h-20. As another method, when a first uplink transmission resource is received via the PDCCH corresponding to the C-RNTI of the terminal 1h-20 through monitoring of the PDCCH after the random access procedure is successfully completed, it may be determined that the first condition is satisfied.

1> When the DAPS handover method is indicated to the terminal 1h-20 via the handover command message and the handover command message (for example, the RRCReconfiguration message) configures or indicates a 2-step random access procedure, 1> Alternatively, even though the 2-step random access procedure is not configured or indicated in the handover command message (for example, the RRCReconfiguration message), in a case where the terminal 1h-20 supports the 2-step random access procedure through terminal capability, and a case where information (for example, a random access resource or a threshold value for determining to perform or not to perform the 2-step random access procedure) for the 2-step random access procedure is broadcasted in system information of the target cell 1h-10, or a case where the terminal 1h-20 receives the system information and the terminal 1h-20 performs the 2-step random access procedure for the target cell 1h-10 since the strength of a signal is better or has a value greater than the threshold value broadcasted in the system information, ■ 2> the terminal 1h-20 may determine that the first condition is satisfied when the 2-step random access procedure is successfully completed above.

■ 2> Specifically, the 2-step random access procedure may be performed through one of a contention-based random access (CBRA) method or a contention-free random access (CFRA) method.

♦ 3> When the terminal 1h-20 performs the CBRA-based 2-step random access procedure, ● 4> the terminal 1h-20 may transmit a preamble in a transmission resource for the 2-step random access procedure (for example, a PRACH occasion, a transmission resource configured by the base station through an RRC message, or a transmission resource broadcasted in system information), and transmit data (for example, a MsgA MAC PDU) in a transmission resources (for example, a PUSCH occasion) for data transmission. The data may include MAC control information (C-RNTI MAC CE) including a terminal identifier (C-RNTI) or an RRC message (RRCReconfigurationComplete message or a handover complete message).

● 4> The terminal 1h-20 may monitor a PDCCH scrambled by the terminal identifier (C-RNTI) or a first identifier (MsgB-RNTI) induced by a time or a frequency in which the preamble is transmitted.

● 4> When the terminal 1h-20 receives a PDCCH scrambled by the terminal identifier, receives allocation of a downlink transmission resource in the PDCCH, or receives MAC control information (a timing advance command MAC CE) for controlling timing in the downlink transmission resource, ■ 5> the terminal 1h-20 may determine that the 2-step random access procedure is successfully completed and the first condition is satisfied.

● 4> When the terminal 1h-20 receives a PDCCH scrambled by the first identifier (MsgB-RNTI), receives allocation of a downlink transmission resource in the PDCCH, or receives a fallback random access response to a preamble transmitted by the terminal in the downlink transmission resource (that is, fallback RAR indicating transmission of a MsgA through another transmission resource when the base station receives the preamble but fails to receive the MsgA), ■ 5> the terminal 1h-20 may transmit data (MsgA MAC PDU) through a transmission resource indicated by the fallback random access response.

■ 5> the terminal 1h-20 may monitor the PDCCH scrambled by the terminal identifier (C-RNTI).

■ 5> when the terminal 1h-20 receives the PDCCH scrambled by the terminal identifier or an uplink transmission resource is allocated in the PDCCH, the terminal 1h-20 may determine that the 2-step random access procedure is successfully completed and determine that the first condition is satisfied.

♦ 3> When the terminal 1h-20 performs the CFRA-based 2-step random access procedure, ● 4> the terminal 1h-20 may transmit a preamble in a transmission resource for the 2-step random access procedure (for example, a PRACH occasion or a transmission resource designated by the base station through an RRC message), and transmit data (for example, a MsgA MAC PDU) in a transmission resource (for example, a PUSCH occasion) for data transmission. The data may include MAC control information (C-RNTI MAC CE) including a terminal identifier (C-RNTI) or an RRC message (RRCReconfigurationComplete message or a handover complete message).

● 4> The terminal 1h-20 may monitor a PDCCH scrambled by the terminal identifier (C-RNTI) or a first identifier (MsgB-RNTI) induced by a time or a frequency in which the preamble is transmitted.

● 4> When the terminal 1h-20 receives a PDCCH scrambled by the terminal identifier, receives allocation of a downlink transmission resource in the PDCCH, or receives MAC control information (a timing advance command MAC CE) for controlling timing in the downlink transmission resource, ■ 5> the terminal 1h-20 may determine that the 2-step random access procedure is successfully completed and determine that the first condition is satisfied.

● 4> When the terminal 1h-20 receives a PDCCH scrambled by the first identifier (MsgB-RNTI), receives allocation of a downlink transmission resource in the PDCCH, or receives a fallback random access response to a preamble transmitted by the terminal 1h-20 in the downlink transmission resource (that is, fallback RAR indicating transmission of a MsgA through another transmission resource when the base station receives the preamble but fails to receive the MsgA), ■ 5> the terminal 1h-20 may determine that the 2-step random access procedure is successfully completed and determine that the first condition is satisfied.

■ 5> The terminal 1h-20 may transmit data (MsgA MAC PDU) through a transmission resource indicated by the fallback random access response.

1> As another method, when the DAPS handover method is indicated to the terminal 1h-20 via the handover command message and the handover command message (for example, the RRCReconfiguration message) configures or indicates the 2-step random access procedure, the terminal 1h-20 may determine that the first condition is satisfied. For example, in the case above, the terminal 1h-20 may determine that the first condition is satisfied before the 2-step random access procedure starts.

1> As another method, the terminal 1h-20 may determine that the first condition is satisfied when the DAPS handover method is indicated to the terminal 1h-20 via the handover command message, the handover command message (for example, the RRCReconfiguration message) configures or indicates the 2-step random access procedure, and a transmission resource (a PUSCH) configured for data transmission in the 2-step random access procedure has a value greater than a first threshold value, or a configuration value (a timing advance value) for controlling timing is included in the RRC message. In the description above, the first threshold value may be configured by the base station through the RRC message (for example, RRCReconfiguration), may be broadcasted in system information, or may be configured by the size of data that the terminal 1h-20 has for transmission. For example, in the case above, the terminal 1h-20 may determine that the first condition is satisfied before the 2-step random access procedure starts. As another method, when a configuration value (a timing advance value) for controlling timing is included in the RRC message or the 2-step random access procedure is configured, the terminal 1h-20 may directly transmit data in a configured transmission resource (for example, a transmission resource configured in the RRC message or a transmission resource indicated by a PDCCH of the target base station 1h-20 and monitored by the terminal 1h-20) without transmitting a preamble. Accordingly, in the case above, the terminal 1h-20 may determine that the first condition is satisfied before the 2-step random access procedure starts, when the data is transmitted, or before the data is transmitted. As another method, when a configuration value (a timing advance value) for controlling timing is included in the RRC message or the 2-step random access procedure is configured, the terminal 1h-20 may directly transmit data in a configured transmission resource (a PUSCH) (for example, a transmission resource configured in the RRC message or a transmission resource indicated by a PDCCH of the target base station 1h-10 and monitored by the terminal 1h-20) without transmitting a preamble. In the case above, when the configured transmission resource (PUSCH) (for example, the transmission resource configured in the RRC message or the transmission resource indicated by the PDCCH of the target base station 1h-10 and monitored by the terminal 1h-20) has a value greater than a first threshold value or when the RRC message includes the configuration value (the timing advance value) for controlling timing, the terminal 1h-20 may determine that the first condition is satisfied before the 2-step random access procedure starts, when the data is transmitted, or before the data is transmitted.

Hereinafter, a method of efficiently switching uplink data from the source base station 1h-05 to the target base station 1h-10 in the DAPS handover method proposed in the disclosure is proposed. In the description above, a MAC layer entity or an RRC layer entity for a second bearer corresponding to the target base station 1h-10 may determine or identify whether the first condition is satisfied according to one of the following methods, and the following methods may be combined and extended to a new method.

First method: For example, when an RRCReconfiguration message received by the terminal 1h-20 indicates DAPS handover, the terminal 1h-20 may configure the MAC layer entity for the target base station 1h-10 corresponding to the second bearer, and the MAC layer entity may perform a random access procedure, and may identify whether the first condition is satisfied. In addition, when the first condition is satisfied, the MAC layer entity may indicate, by using an indicator, an upper layer entity (e.g., a PDCP layer entity) for a bearer in which the DAPS handover method is configured to switch uplink data transmission from the source base station 1h-05 via a first bearer to the target base station 1h-10 via the second bearer in the DAPS handover method proposed in the disclosure.

Second method: As another method, for example, when an RRCReconfiguration message received by the terminal 1h-20 indicates DAPS handover, the terminal 1h-20 may configure the MAC layer entity for the target base station 1h-10 corresponding to the second bearer, and the MAC layer entity may perform a random access procedure, and may identify whether the first condition is satisfied. In addition, when the first condition is satisfied, the MAC layer entity may also indicate, to an upper layer entity (e.g., an RRC layer entity), that the first condition is satisfied. In addition, the upper layer entity (e.g., the RRC layer entity) may indicate, by using an indicator, a lower layer entity (e.g., the PDCP layer entity) for a bearer in which the DAPS handover method is configured to switch uplink data transmission from the source base station 1h-05 via the first bearer to the target base station 1h-10 via the second bearer in the DAPS handover method proposed in the disclosure. In the description above, when the first condition proposed in the disclosure is satisfied or a procedure of random access to the target base station 1h-10 is successfully performed, the upper layer entity (e.g., the RRC layer entity) may stop a first timer, and thus when the first timer stops, the RRC layer entity may indicate, by using an indicator, the PDCP layer entity for the bearer in which the DAPS handover method is configured to switch the uplink data transmission.

Third method: When an RRCReconfiguration message received by the terminal 1h-20 indicates DAPS handover, the terminal 1h-20 may configure the MAC layer entity for the target base station 1h-10 corresponding to the second bearer, and when the RRC layer entity of the terminal 1h-20 indicates, by using an indicator, a lower layer entity (e.g., the MAC layer entity) to perform the DAPS handover, the MAC layer entity may perform a random access procedure, and may identify whether the first condition is satisfied. When the first condition is satisfied, the MAC layer entity may indicate, by using an indicator, an upper layer entity (e.g., the PDCP layer entity) for a bearer in which the DAPS handover method is configured to switch uplink data transmission from the source base station 1h-05 via the first bearer to the target base station 1h-10 via the second bearer in the DAPS handover method proposed in the disclosure.

Forth method: As another method, when an RRCReconfiguration message received by the terminal 1h-20 indicates DAPS handover, the terminal 1h-20 may configure the MAC layer entity for the target base station 1h-10 corresponding to the second bearer, and when the RRC layer entity of the terminal 1h-20 indicates, by using an indicator, a lower layer entity (e.g., the MAC layer entity) to perform the DAPS handover, the MAC layer entity may perform a random access procedure, and may identify whether the first condition is satisfied. In addition, when the first condition is satisfied, the MAC layer entity may also indicate, to an upper layer entity (e.g., the RRC layer entity), that the first condition is satisfied. In a case where the indicator is identified, the upper layer entity (e.g., the RRC layer) may stop the first timer when the first condition proposed in the disclosure is satisfied or the procedure of random access to the target base station 1h-10 is successfully performed, and thus the first timer may stop. In addition, the upper layer entity (e.g., the RRC layer entity) may indicate, by using an indicator, a lower layer entity (e.g., the PDCP layer entity) for a bearer fin which the DAPS handover method is configured to switch uplink data transmission from the source base station 1h-05 via the first bearer to the target base station 1h-10 via the second bearer in the DAPS handover method proposed in the disclosure.

According to the above-described first method, second method, third method, or fourth method, when the PDCP layer entity receives an indicator indicating that the first condition is satisfied or an indicator indicating switching uplink data transmission from the source base station 1h-05 to the target base station 1h-10, from the upper layer entity (e.g., the RRC layer entity) or the lower layer entity (e.g., the MAC layer entity) (for example, when the DAPS handover method is indicated), the PDCP layer entity may perform a protocol layer operation proposed below so as to efficiently perform switching of uplink data transmission, and may perform one or more operations among operations below so as to prevent data loss due to the uplink data transmission. The operations below may be applied to the PDCP layer entity connected to an AM DRB or a UM DRB (an RLC layer entity operating in an AM mode or an RLC layer entity operating in a UM mode). In the description above, before the first condition is satisfied or before the indicator indicating that the first condition is satisfied is received, the PDCP layer entity may indicate, to the MAC layer entity for the first bearer for the source base station 1h-05, that there is data to be transmitted by indicating the size or amount (e.g., a PDCP data volume) of the data to be transmitted when a buffer stores the data to be transmitted, and may perform uplink data transmission to the source base station 1h-05. Thereafter, the MAC layer entity for the first bearer for the source base station 1h-05 may perform a scheduling request or a buffer status report procedure to receive allocation of an uplink transmission resource from the source base station 1h-05. However, when the first condition is satisfied or the indicator indicating that the first condition is satisfied is received, switching of uplink data transmission to the target base station 1h-10 may be performed for a bearer in which the DAPS handover method is configured.

Uplink or downlink ROHC context for the source base station 1h-05 may not be initialized and may be used without change, uplink or downlink ROHC context for the target base station 1h-10 may be initialized, and the terminal may start in an initial state (e.g., an IR state in a U mode).

In the description above, in order to switch uplink data transmission from the first bearer for the source base station 1h-05 to the second bearer for the target base station 1h-10, the PDCP layer entity may indicate, to the MAC layer entity for the first bearer for the source base station 1h-05, that the size or amount of data to be transmitted is 0 (or none). That is, the PDCP layer entity may indicate, to the MAC layer entity for the first bearer, that a data volume (a PDCP data volume) of the PDCP layer entity is 0, thereby indicating that there is no more data to be transmitted (even when the buffer actually stores multiple items of data to be transmitted, in order to switch uplink data transmission, the PDCP layer entity may indicate, to the MAC layer entity for the first bearer for the source base station 1h-05, that there is no more data to be transmitted).

However, as proposed in the disclosure, in a case where the handover method (the DAPS handover method) of the second embodiment of the disclosure is indicated, a case of a bearer to which the handover method (the DAPS handover method) of the second embodiment of the disclosure is indicated, or a case where the first condition is satisfied, when RLC control data (RLC status report) or PDCP control data (PDCP status report or ROHC feedback) for the source base station 1h-05 is generated, a PDCP layer entity for the bearer may indicate a data volume corresponding to the RLC control data or the PDCP control data to the MAC layer entity for the source base station 1h-05, and may perform data transmission to the source base station 1h-05 or an RLC layer entity for the source base station 1h-05. However, as proposed in the disclosure, in a case where the handover method (the DAPS handover method) of the second embodiment of the disclosure is indicated, a case of a bearer to which the handover method (the DAPS handover method) of the second embodiment of the disclosure is indicated, or a case where the first condition is satisfied, when RLC control data (RLC status report) or PDCP control data (PDCP status report or ROHC feedback) for the target base station 1h-10 is generated, a PDCP layer entity for the bearer may indicate a data volume corresponding to the RLC control data or the PDCP control data to a MAC layer entity for the target base station 1h-10, and may perform data transmission to the target base station 1h-10 or an RLC layer for the target base station 1h-10. When the first condition is not satisfied, the PDCP layer entity may indicate the data volume corresponding to the generated data (PDCP data PDU or PDCP control PDU) to the MAC layer entity for the source base station 1h-05, and may perform data transmission to the source base station 1h-05 or the RLC layer entity for the source base station 1h-05. Accordingly, in the second PDCP layer entity structure proposed for the bearer in which the DAPS handover method is configured, when an indicator indicating that the first condition is satisfied is received and thus the second PDCP layer entity indicates a data volume to the MAC layer entity for the target base station 1h-10, the second PDCP layer entity may indicate the data volume to the MAC layer entity for the target base station 1h-10, the data volume excluding PDCP control data or RLC control data to be transmitted to the bearer for the source base station 1h-05 or the MAC layer entity for the source base station 1h-05, or a data size.

In the description above, the PDCP layer entity connected to an AM DRB (that is an RLC layer operating in an AM mode) (wherein all pre-stored PDCP PDUs are discarded (for example, PDCP SDUs are not discarded to prevent loss of original data)) may perform, based on header context for the target base station 1h-10, a new header compression procedure for multiple items of data (the PDCP SDUs of the buffer) in ascending order of COUNT values (or PDCP serial numbers) allocated before the first condition is satisfied or the indicator indicating that the first condition is satisfied is received, wherein the ascending order starts from first data (for example, a PDCP SDU) for which successful transfer is not acknowledged by lower layer entities (e.g., the RLC layer entity corresponding to the first bearer for the source base station 1h-05), may re-perform an integrity procedure or a ciphering procedure by applying security keys for the target base station 1h-10, may configure a PDCP header, and may transfer the same to the lower layer entity (the RLC layer entity for the second bearer for the target base station 1h-10), thereby performing retransmission or transmission. That is, the PDCP layer entity performs accumulated retransmission on data starting from first data for which successful transfer is not acknowledged. As another method, when the PDCP layer entity performs retransmission, the PDCP layer entity may perform retransmission only on multiple items of data for which successful transfer is not acknowledged by lower layer entities (for example, the RLC layer entities for the first bearer for the source base station 1h-05). More specifically, the PDCP layer entity connected to the AM DRB (or the RLC layer entity operating in the AM mode) (wherein all stored PDCP PDUs may be discarded to be transmitted to the source base station 1h-05 by using a first protocol layer entity previously connected to the PDCP layer entity (for example, PDCP SDUs may not be discarded to prevent loss of original data)) may perform, by applying header compression (or data compression) protocol context or security key corresponding to the target base station 1h-10, a new header or data compression procedure for multiple items of data (for example, the PDCP SDUs) for which successful transfer is not acknowledged by lower layer entities (e.g., the RLC layer entities) that are the first protocol layer entity for the source base station 1h-05, based on COUNT values (or PDCP seral numbers) allocated before the first condition is satisfied or the indicator indicating that the first condition is satisfied is received, may re-perform an integrity procedure or a ciphering procedure, may configure a PDCP header, and may transfer the same to the lower layer entity that is a second protocol layer entity for transmission to the target base station 1h-10, thereby performing retransmission or transmission. That is, to prevent waste of transmission resources, the PDCP layer entity may also perform selective retransmission only on the multiple items of data for which successful transfer is not acknowledged. As another method, the transmission or the retransmission may be also performed after lower layer entities (e.g., transmission or reception RLC layer entity or MAC layer entity) that are the first protocol layer entity for transmitting data to the source base station 1h-05 are released. When the transmission or retransmission procedure is extended to a UM DRB, the PDCP layer entity connected to a RLC layer operating in a UM mode may regard data that is not transmitted to a lower layer entity yet, data for which PDCP discard timer is not expired, or multiple items of data to which PDCP serial numbers (or COUNT values) are already allocated, as multiple items of data received or newly received from an upper layer entity, may not restart a PDCP discard timer with respect to each data, and may perform header (or data) compression on the multiple items of data by using header (or data) compression context or a security key for the target base station 1h-10, or the PDCP layer entity may perform ciphering or an integrity protection procedure, may generate and concatenate a PDCP header with the multiple items of data, and then perform transmission or retransmission, and may process data in ascending order of COUNT values allocated before the procedure is triggered, and then perform transmission or retransmission. A window state variable of the PDCP layer entity connected to the UM DRB or the AM DRB may not be initialized and may be maintained without change and used.

In the description above, when the buffer stores data to be transmitted, the PDCP layer entity may indicate, to the MAC layer entity for the second bearer for the target base station 1h-10, that there is data to be transmitted by indicating the size or volume (e.g., a PDCP data volume) of the data to be transmitted, and may perform switching of uplink data transmission to the target base station 1h-10. Thereafter, the MAC layer entity for the second bearer for the target base station 1h-10 may perform a scheduling request or a buffer status report procedure to receive allocation of an uplink transmission resource from the target base station 1h-10.

In the description above, for or the bearer to which (or for which) the second embodiment (or the DAPS handover method) is indicated (or configured), when the first condition is satisfied, configuration information or context for the data compression protocol (for the source base station 1h-05) (for example, uplink data compression protocol) may be released. Alternatively, when the first condition is satisfied, the upper layer entity (for example, the RRC layer entity) of the terminal 1h-20 may indicate or reconfigure the PDCP layer entity to release configuration information or context for the data compression protocol (for example, uplink data compression protocol). However, for the bearer to which (for which) the second embodiment (or the DAPS handover method) is not indicated (or not configured), when the handover command message is received, the terminal 1h-20 may release configuration information or context for the data compression protocol (for example, uplink data compression protocol). Alternatively, when the handover command message is received, the upper layer entity (for example, the RRC layer entity) of the terminal 1h-20 may indicate or reconfigure the PDCP layer entity to release configuration information or context for the data compression protocol (for the source base station 1h-05) (for example, uplink data compression protocol). This is because, for the bearer for which the DAPS handover method is configured, it is necessary to compress data and transmit the compressed data to the source base station 1h-05 by using the configuration information or context for the data compression protocol for the source base station 1h-05 until the first condition is satisfied.

In the description above, in a case where the DAPS handover method is configured for at least one bearer among the bearers configured for the terminal 1h-20, a case where the DAPS handover method is configured for a bearer, a case where the first condition is satisfied, or a case where the indicator indicating that the first condition is satisfied is received, the terminal 1h-20 may perform one of the following methods for the bearer for which the DAPS handover method is not configured.

- First method: When the first condition is satisfied as described above, the upper layer entity (for example, the RRC layer entity) of the terminal 1h-20 may trigger or request the PDCP re-establishment procedure for the bearer or bearers for which the DAPS handover method is not configured (even when the target base station 1h-10 configures the PDCP re-establishment procedure for the bearer in the handover command message, the PDCP re-establishment procedure may be performed when the first condition is satisfied). The PDCP layer entity having received the request for the PDCP re-establishment procedure may perform different PDCP re-establishment procedures for each bearer. For example, for the UM DRB, the PDCP layer entity may initialize window state variables, may perform transmission or retransmission by performing compressing or ciphering or performing integrity protection for multiple items of data that has not yet been transmitted to the lower layer entity or multiple items of data in which the PDCP discard timer has not expired, in ascending order of COUNT values, based on the header (or data) compression context or security key of the target base station 1h-10, may stop and initialize the reordering timer when the reordering timer is running, and may sequentially process the received data (PDCP SDU or PDCP PDU) to transmit the processed data to the upper layer entity, and for the AM DRB, the PDCP layer may not initialize window state variables, and may perform transmission or retransmission by performing compression or ciphering, or performing the integrity protection, based on header (or data) compression context or security keys of the target base station 1h-10 in ascending order of COUNT values or PDCP sequence numbers from the first data (PDCP SDU or PDCP PDU) for which successful transfer from the lower layer entity is not confirmed. In the description above, the reason why the PDCP re-establishment procedure is not performed when the handover command message is received for the bearer(s) for which the DAPS handover method is not configured and the PDCP re-establishment procedure is performed when the first condition is satisfied is that, when the handover procedure to the target base station 1h-10 fails to be performed, the fallback to the source base station 1h-05 may be performed, but multiple items of data, which are processed by the bearers through compression of data into the header (or data) compression context of the target base station 1h-10 in the PDCP re-establishment procedure, and the ciphering or integrity protection using the security key of the target base station 1h-10, become useless when the fallback needs to be performed, and are thus to be discarded. In addition, this is because, when the fallback needs to be performed, the PDCP re-establishment procedure needs to be performed again for the bearers, so that data is compressed with the header (or data) compression context of the source base station 1h-05 for data to be transmitted, and the ciphering or integrity protection needs to be performed again by using the security key of the source base station 1h-05, which causes unnecessary processing to occur. Accordingly, in a case where the terminal 1h-20 performs the DAPS handover method, the PDCP re-establishment procedure may not be triggered or performed for the bearer for which the DAPS handover method is not configured when the handover command message is received, or the target base station 1h-10 may not configure the PDCP re-establishment procedure for the bearers in the handover command message, and may trigger or perform the PDCP re-establishment procedure when the first condition is satisfied. In addition, the PDCP re-establishment procedure is not performed for the bearer for which the DAPS handover method is configured.

- Second method: When the handover command message is received for the bearer(s) for which the DAPS handover method is not configured, the upper layer entity (for example, the RRC layer entity) of the terminal 1h-20 may trigger or request the PDCP re-establishment procedure. The PDCP layer entity having received the request for the PDCP re-establishment procedure may perform different PDCP re-establishment procedures for each bearer. For example, for the UM DRB, the PDCP layer entity may initialize window state variables, may perform transmission or retransmission by performing compressing or ciphering, or performing the integrity protection for multiple items of data that have not yet been transmitted to the lower layer entity or multiple items of data in which the PDCP discard timer has not expired, in ascending order of COUNT values, based on the header (or data) compression context or security key of the target base station 1h-10, may stop and initialize the reordering timer when the reordering timer is running, and may sequentially process the received data (PDCP SDU or PDCP PDU) to transmit the processed data to the upper layer entity, or for the AM DRB, the PDCP layer entity may not initialize window state variables, and may perform transmission or retransmission by performing compression or ciphering, or performing the integrity protection, based on header (or data) compression context or security keys of the target base station 1h-10 in ascending order of COUNT values or PDCP sequence numbers from the first data (PDCP SDU or PDCP PDU) for which successful transfer from the lower layer entity is not confirmed. In the description above, in a case where the handover command message is received for the bearer(s) for which the DAPS handover method is not configured, since the data is compressed with the header (or data) compression context of the target base station 1h-10 and the data is processed by performing ciphering or integrity protection with the security key of the target base station 1h-10, through the PDCP re-establishment procedure, when the terminal 1h-20 fails to perform the handover procedure to the target base station 1*h*-10 (for example, when the first timer has expired or when the wireless connection to the target base station 1*h*-10 fails) and when the fallback to the source base station 1*h*-05 is possible and is thus performed, the upper layer entity (for example, the RRC layer) of the terminal 1*h*-20 may indicate the bearers, to which the DAPS handover method is not indicated, to discard the data (PDCP PDUs) processed based on the configuration information (security key or header (or data) compression context) for the target base station 1*h*-10, or reconfigure the PDCP re-establishment procedure or the configuration information (security key or header (or data) compression context) for the source bases station 1*h*-05, and request or indicate re-generation and re-processing of the data based on the source base station configuration information, so that the bearers can discard multiple items of data (for example, PDCP PDUs) generated or processed for transmission to the target base station 1*h*-10 and re-process multiple items of data (for example, PDCP SDUs), based on the header (or data) compression context or security key for the source base station 1*h*-05.

In the second embodiment (for example, the DAPS handover method) of the efficient handover method proposed in the disclosure, even after receiving the handover command message (for example, the RRCReconfiguration message), the terminal 1*h*-20 may continue to receive downlink data from the source base station 1*h*-05 or the target base station 1*h*-10 through the protocol layer entities for the first bearer for the source base station 1*h*-05 or the second bearer for the target base station 1*h*-10, and for the AM bearers, may allow the RLC status report rather than data to be continuously transmitted to the source base station 1*h*-05 (or the target base station 1*h*-10) via uplink through the protocol layer entities 1*h*-22 and 1*h*-21 for the first bearer (or the second bearer) so that downlink data can be seamlessly received from the source base station 1*h*-05 (or the target base station 1*h*-10), or the source base station 1*h*-05 (or the target base station 1*h*-10) can seamlessly transmit downlink data. That is, even when the first condition is satisfied and the terminal 1*h*-20 switches the uplink data transmission to the target base station 1*h*-10, in a case where the terminal 1*h*-20 needs to transmit RLC status report, HARQ ACK or NACK, or PDCP control data (PDCP ROHC feedback or PDCP status report) to the source base station 1*h*-05, the terminal may allow data transmission to be transmitted through the first bearer for the source base station 1*h*-05. This is because, in the case of the AM bearers, when successful transfer is not indicated by the RLC status report (that is, when the RLC status report is not received) after data is transmitted to a transmitting end, data cannot be continuously transmitted thereafter. Specifically, in the second embodiment of the efficient handover method of FIG. 1H, in the third operation 1*h*-03, even when the first condition is satisfied and the terminal 1*h*-20 stops transmitting uplink data to the source base station 1*h*-05 through the protocol layer entities 1*h*-22 for the first bearer and performs switching to start transmitting uplink data to the target base station 1*h*-10 through the protocol layer entities 1*h*-21 for the second bearer, the terminal 1*h*-20 may continue to transmit HARQ ACK or HARQ NACK information, RLC status report (ACK or NACK information), or PDCP control data (for example, PDCP status report or ROHC feedback information) through the protocol layer entities for the first bearer (or the second bearer), so that downlink data can be seamlessly received from the source base station 1*h*-05 (or the target base station 1*h*-10), or the source base station 1*h*-05 (or the target base station 1*h*-10) can seamlessly transmit downlink data. In addition, in the second embodiment of the efficient handover method of FIG. 1H, in the third operation 1*h*-03, even when the first condition is satisfied and the terminal 1*h*-20 stops transmitting uplink data to the source base station 1*h*-05 through the protocol layer entities 1*h*-22 for the first bearer and performs switching to start transmitting uplink data to the target base station 1*h*-10 through the protocol layer entities 1*h*-21 for the second bearer, the terminal 1*h*-20 may continue to perform data transmission due to HARQ retransmission of the MAC layer entity or data transmission due to retransmission of the AM mode RLC layer entity so as to prevent data loss to the source base station 1*h*-05. In the description above, in the second embodiment of the efficient handover method of FIG. 1H, in the third operation 1*h*-03, when the first condition is satisfied and the terminal 1*h*-20 stops transmitting uplink data to the source base station 1*h*-05 through the protocol layer entities 1*h*-22 for the first bearer and performs switching to start transmitting uplink data to the target base station 1*h*-10 through the protocol layer entities 1*h*-21 for the second bearer, the source base station 1*h*-05 or the target base station 1*h*-10 may allocate the transmission resources to the terminal 1*h*-20 by splitting the time, so as to prevent collision between the uplink transmission resource to the target base station 1*h*-10 and the uplink transmission resource to the source base station 1*h*-05. When the uplink transmission resource to the target base station 1*h*-10 and the uplink transmission resource to the source base station 1*h*-05 collide and overlap each other, the terminal 1*h*-20 may prioritize uplink transmission resource to the source base station 1*h*-05 and perform data transmission to the source base station 1*h*-05 so as to maintain downlink data transmission or continuously receive downlink data from the source base station 1*h*-05 without problems. As another method, when the uplink transmission resource to the target base station 1*h*-10 and the uplink transmission resource to the source base station 1*h*-05 collide and overlap each other, the terminal 1*h*-20 may prioritize uplink transmission resource to the target base station 1*h*-10 and perform data transmission to the target base station 1*h*-10 so as to maintain downlink data transmission from the target base station 1*h*-10.

Specifically, in a case where the terminal 1*h*-20 receives the handover command message, when the handover (for example, DAPS handover) corresponding to the second embodiment of the disclosure is indicated, or is indicated for each bearer, the UE 1*h*-20 or the bearer to which the DAPS handover is indicated may perform the scheduling request through the first protocol layer entity 1*h*-22 until the first condition is satisfied, may transmit the buffer status report to the source base station 1*h*-05, so as to receive the uplink transmission resource and transmit the uplink data to the source base station 1*h*-05, and may receive downlink data from the source base station 1*h*-05. However, when the first condition is satisfied, the terminal 1*h*-20 may no longer transmit data to the source base station 1*h*-05, may switch the uplink to perform the scheduling request through the second protocol layer entity 1*h*-21, and may transmit the buffer status report to the target base station 1*h*-10 to receive the uplink transmission resource and transmit uplink data to the target base station 1*h*-10. However, the terminal 1*h*-20 may continuously receive downlink data from the source base station 1*h*-05, and even after uplink transmission switching, may continuously transmit, to the source base station 1*h*-05, HARQ ACK or HARQ NACK, RLC status report, or PDCP control data (for example, PDCP status report or ROHC feedback information) corresponding to the downlink data. In addition, even when the first condition is satisfied, the terminal 1h-20 may continuously receive downlink data from the source base station 1h-05 or the target base station 1h-10.

In the second embodiment of the efficient handover method of FIG. 1H, in the fourth operation 1h-04, when the second condition is satisfied, the terminal 1h-20 may stop receiving downlink data from the source base station 1h-05 through the protocol layer entities 1h-22 for the first bearer, and may release the connection with the source base station 1h-05. In the description above, the second condition may be one of the following conditions. In addition, the PDCP layer entity 1h-21 for the second bearer may continuously perform seamless data transmission or reception with the target base station 1h-10 by using information such as transmission or reception data, sequence number information, or header compression and decompression context, stored in the PDCP layer entity 1h-22 for the first bearer.

- When performing the procedure of random access to the target base station 1h-10 through the layer entities 1h-21 for the second bearer and receiving the random access response, the terminal 1h-20 may determine that the second condition is satisfied.
- When performing the procedure of random access to the target base station 1h-10 through the layer entities for the second bearer, receiving the random access response, and configuring and transmitting the handover complete message to the target base station 1h-10, the terminal 1h-20 may determine that the second condition is satisfied.
- When completing the procedure of random access to the target base station 1h-10 through the layer entities for the second bearer and transmitting data using the PUCCH or PUSCH uplink transmission resource for the first time, or when receiving the PUCCH or PUSCH uplink transmission resource for the first time, the terminal 1h-20 may determine that the second condition is satisfied.
- When the base station configures a separate timer for the terminal 1h-20 via the RRC message and the timer has expired, the terminal may determine that the second condition is satisfied.
  - ■ The timer may start when the terminal 1h-20 receives the handover command message from the source base station 1h-05, when random access to the target base station 1h-10 is started (when the preamble is transmitted), when the random access response is received from the target base station 1h-10, when the handover complete message is transmitted to the target base station 1h-10, or when data is transmitted for the first time using the PUCCH or PUSCH uplink transmission resource.
- When successful transfer of the handover complete message is confirmed by the MAC layer entity (HARQ ACK) or the RLC layer entity (RLC ACK) after the terminal 1h-20 performs the procedure of random access to the target base station 1h-10 through the layer entities 1h-21 for the second bearer, receives the random access response, and configures and transmits the handover complete message to the target base station 1h-10, the terminal may determine that the second condition is satisfied.
- When the uplink transmission resource is allocated from the target base station 1h-10 for the first time or the uplink transmission resource is indicated for the first time after the terminal 1h-20 performs the procedure of random access to the target base station 1h-10 through the layer entities for the second bearer, receives the random access response, or configures and transmits the handover complete message to the target base station 1h-10, the terminal may determine that the second condition is satisfied.

When the source base station 1h-05 performs the efficient handover proposed in the disclosure, the source base station 1h-05 may determine when to stop the transmission of downlink data to the terminal 1h-20 or when to release the connection with the terminal 1h-20. For example, the determination above may be made by a predetermined method (for example, when a predetermined timer has expired (a timer may start after handover indication) or when the source base station 1h-05 receives an indication from the target base station 1h-10 that the terminal 1h-20 has successfully performed handover to the target base station 1h-10). In addition, when downlink data is not received from the source base station 1h-05 for a predetermined time, the terminal 1h-20 may determine that the second condition is satisfied, may determine that the connection with the source base station 1h-05 has been released, and may release the connection.

When receiving, from the target base station 1h-10, the indication indicating releasing of the connection with the source base station 1h-05 (for example, RRC message (e.g., RRCReconfiguration message), MAC CE, RLC control PDU, or PDCP control PDU), the terminal 1h-20 may determine that the second condition is satisfied.

When the terminal 1h-20 has failed to receive downlink data from the source base station 1h-05 for a predetermined time, the terminal may determine that the second condition is satisfied.

The terminal 1h-20 may determine that the second condition is satisfied when the terminal successfully completes the procedure of random access to the target base station 1h-10 through the layer entities 1h-21 (for example, MAC layer entity) for the second bearer, when the terminal 1h-20 successfully completes the procedure of random access to the target base station 1h-10 through the layer entities for the second bearer and receives allocation of the first uplink transmission resource from the target base station 1h-10, or when the uplink transmission resource is indicated to the terminal 1h-20 for the first time.

- ■ For example, more specifically, in a case where the terminal 1h-20 receives the handover command message from the source base station 1h-05 and, random access to the target base station 1h-10 is indicated, when the indicated random access is a contention-free random access (CFRA) procedure (for example, when a pre-designated preamble or a terminal cell identifier (for example, C-RNTI) is allocated),
  - ◆ When the terminal 1h-20 transmits a pre-designated preamble to the cell of the target base station 1h-10 and receives a random access response (RAR) message, it may be considered that the random access procedure has been successfully completed, and thus when the first uplink transmission resource allocated, included, or indicated in the RAR message is received, the terminal 1h-20 may determine that the second condition is satisfied. As another method, when receiving the uplink transmission resource for the first time after the reception of the RAR, the terminal 1*h*-20 may also determine that the second condition is satisfied.

- In a case where the terminal 1*h*-20 receives the handover command message from the source base station 1*h*-05 and, when random access to the target base station 1*h*-10 is indicated, when the indicated random access is a contention-based random access (CBRA) procedure (for example, when a pre-designated preamble or a terminal cell identifier (for example, C-RNTI) is not allocated),
  - ♦ The terminal 1*h*-20 may determine that the procedure of random access to the target base station 1*h*-10 has been successfully completed when the terminal 1*h*-20 transmits a preamble (for example, a random preamble) to the cell of the target base station 1*h*-10, receives a random access response (RAR) message, transmits message 3 (for example, the handover complete message) by using an uplink transmission resource allocated, included, or indicated in the random access response message, and receives a MAC CE (contention resolution MAC CE) indicating that contention has been resolved from the target base station 1*h*-10 via message 4, or when the terminal receives an uplink transmission resource through PDCCH corresponding to the C-RNTI of the terminal 1*h*-20, and thus the terminal may determine that the second condition is satisfied when the terminal 1*h*-20 monitors the PDCCH and receives the uplink transmission resource for the first time through the PDCCH corresponding to the C-RNTI of the terminal 1*h*-20 or when the terminal 1*h*-20 receives an indication of the uplink transmission resource for the first time. As another method, in a case where the size of the uplink transmission resource allocated in the random access message is sufficient to transmit message 3 and the terminal 1*h*-20 can additionally transmit uplink data, the terminal may determine that the uplink transmission resource is received for the first time and may determine that the second condition is satisfied. That is, when receiving the RAR, the terminal 1*h*-20 may determine that the uplink transmission resource is received for the first time and the second condition is satisfied.

In a case where the handover method (RACH-less handover) requiring no random access procedure is indicated together in the handover command message received by the terminal 1*h*-20,

- when the uplink transmission resource for the target base station 1*h*-10 is included in the handover command message,
  - ♦ the terminal 1*h*-20 may determine that the random access procedure has been successfully completed and determine that the second condition is satisfied when the terminal transmitting message 3 (for example, a handover complete message or an RRCReconfigurationComplete message) through the uplink transmission resource of the target base station 1*h*-10 and receives the UE identity confirmation MAC CE from the base station 1*h*-10 via message 4, or when the terminal 1*h*-20 receives the uplink transmission resource through the PDCCH corresponding to the C-RNTI of the terminal 1*h*-20. As another method, when the terminal 1*h*-20 performs PDCCH monitoring and receives the first uplink transmission resource through the PDCCH corresponding to the C-RNTI of the terminal 1*h*-20 after the random access procedure is successfully completed, the terminal may determine that the second condition is satisfied.
- when the uplink transmission resource for the target base station 1*h*-10 is not included in the handover command message,
  - ♦ the terminal 1*h*-20 may determine that the random access procedure has been successfully completed and determine that the second condition is satisfied when the terminal 1*h*-20 performs PDCCH monitoring for the target base station (or cell) 1*h*-10 and receives the uplink transmission resource through the PDCCH corresponding to the C-RNTI of the terminal 1*h*-20, when the terminal transmits message 3 (for example, a handover complete message or an RRCReconfigurationComplete message) through the uplink transmission resource and receives the UE identity confirmation MAC CE from the base station 1*h*-10, or when the terminal receives the uplink transmission resource through the PDCCH corresponding to the C-RNTI of the terminal 1*h*-20. As another method, the terminal 1*h*-20 may determine that the second condition is satisfied when the terminal performs PDCCH monitoring and receives the first uplink transmission resource through the PDCCH corresponding to the C-RNTI of the terminal 1*h*-20 after the random access procedure is successfully completed.

In the description above, in a case where the terminal 1*h*-20 performs the second embodiment (for example, the DAPS handover method) of the efficient handover method proposed in the disclosure, when it is identified that the RRC layer entity, MAC layer entity, or RLC layer entity for the first bearer for the source base station 1*h*-05 of the terminal 1*h*-20 or the RRC layer entity, MAC layer entity, or RLC layer entity for the second bearer for the target base station 1*h*-10 satisfies the second condition proposed in the disclosure, the indicator indicating that the second condition is satisfied may be indicated to the PDCP layer entity of the bearer or the terminal 1*h*-20 performing the DAPS handover method. When the PDCP layer entity of the terminal 1*h*-20 receives, from the lower layer entity or the upper layer entity, the indicator indicating that the second condition is satisfied, or when the second condition is satisfied, the second embodiment of the efficient handover method proposed in the disclosure may be successfully completed by performing one or more of the following procedures for the terminal 1*h*-20 the bearer for which the DAPS handover method is configured.

The terminal 1*h*-20 may release the first bearer for the source base station 1*h*-05 and release the connection with the source base station 1*h*-05. Before the first bearer for the source base station 1*h*-05 is released, the RLC re-establishment procedure may be performed for the RLC layer entity corresponding to the first bearer for the source base station 1*h*-05 (for example, when the reordering timer is running, the timer may be stopped or initialized, and when the received data is stored in the buffer, the stored multiple items of data may be processed and transmitted to the upper layer, or when there is data to be transmitted in the buffer, the data may be discarded), or the MAC layer may be initialized.

When the connection with the source base station 1*h*-05 is released, the terminal 1*h*-20 may trigger the PDCP status report procedure so as to report the reception status of multiple items of downlink data received from the source base station 1*h*-05 to the target base station 1*h*-10, may configure the PDCP status report, and may transmit the PDCP status report to the target base station 1*h*-10.

When the second condition is satisfied, the terminal 1*h*-20 may switch from the second PDCP layer entity structure or function 1*i*-20 to the first PDCP layer entity structure or function 1*i*-11 or 1*i*-12 proposed in the disclosure, for each bearer or for the bearer to which the DAPS handover method is indicated, may initialize the reordering variable, may stop and initialize the reordering timer, and may perform the deciphering procedure or header (or data) decompression by applying the security key or header compression decompression context for the source base station 1*h*-05 to the multiple items of data stored in the buffer for reordering (for example, multiple items of data received from the source base station 1*h*-05), and then discard the security key or header decompression context for the source base station 1*h*-05. In addition, the terminal may also transfer the processed multiple items of data to the upper layer in ascending order. That is, when second condition is satisfied, the terminal 1*h*-20 may perform the deciphering procedure or header (or data) decompression by applying the security key or header decompression context for the source base station 1*h*-05 to the multiple items of data stored in the buffer for reordering (for example, the multiple items of data received from the source base station 1*h*-05), and then discard the security key or header decompression context for the source base station 1*h*-05. As another method, in the description above, when the second condition is satisfied, the terminal 1*h*-20 may switch from the second PDCP layer entity structure or function 1*i*-20 to the third PDCP layer entity structure or function 1*i*-30 proposed in the disclosure, for each bearer or the bearer to which the DAPS handover method is indicated, and may continue to use the reordering variables and the reordering timer without stopping or initializing the reordering variables and the reordering timer. However, the terminal may perform the deciphering procedure or header (or data) decompression by applying the security key or header decompression context for the source base station 1*h*-05 to the multiple items of data stored in the buffer for reordering (for example, the multiple items of data received from the source base station 1*h*-05), and then discard the security key or header decompression context for the source base station 1*h*-05. In addition, the terminal may transfer the processed multiple items of data to the upper layer in ascending order. That is, in the description above, when the second condition is satisfied, the terminal 1*h*-20 may perform the deciphering procedure or header (or data) decompression by applying the security key or header decompression context for the source base station 1*h*-05 to the multiple items of data stored in the buffer for reordering (for example, the multiple items of data received from the source base station 1*h*-05), and then discard the security key or header decompression context for the source base station 1*h*-05. In the description above, the terminal 1*h*-20 may release QoS mapping information of the SDAP layer entity for the source base station 1*h*-05, security key information for the source base station 1*h*-05 of the PDCP layer entity, header (or data) compression context information for the source base station 1*h*-05, or the RLC layer entity or the MAC layer entity for the source base station 1*h*-05. In the description above, switching from the second PDCP layer entity structure or function 1*i*-20 to the first PDCP layer entity structure or function proposed in the disclosure for each bearer or for the bearer to which the DAPS handover method is indicated may mean reconfiguration of the PDCP layer, and the reconfiguration may be performed when a reconfiguration indicator of the PDCP layer entity is received from the upper layer entity (for example, the RRC layer entity). For example, the terminal 1*h*-20 receives the handover command message, the upper layer entity (for example, the RRC layer entity) transmits a PDCP layer entity reconfiguration indicator to the PDCP layer entity of the bearer, for the bearer for which the DAPS handover method is configured, so that the first PDCP layer entity structure or function can be reconfigured to the second PDCP layer entity structure or function, and when the second condition is satisfied, the upper layer entity (for example, the RRC layer entity) transmits the PDCP layer entity reconfiguration indicator to the PDCP layer entity of the bearer, so that the second PDCP layer entity structure or function can be reconfigured to the first PDCP layer entity structure or function. For example, whenever the PDCP layer entity reconfiguration indicator is received from the upper layer entity (for example, the RRC layer entity) in a toggle manner, the PDCP layer entity of the bearer may reconfigure the first PDCP layer entity structure or function to the second PDCP layer entity structure or function, or may reconfigure the second PDCP layer entity structure or function to the first PDCP layer entity structure or function.

When the second condition proposed in the disclosure is satisfied while the DAPS handover method proposed in the disclosure is performed, the terminal 1*h*-20 may release the first bearers for the source base station 1*h*-05, and may switch again from the second SDAP layer entity structure and function 1*j*-20 applied to each bearer or the bearer to which the DAPS handover method is indicated to the first SDAP layer entity structure and function 1*j*-10 and apply the same. In addition, when the second condition is satisfied, the terminal 1*h*-20 may switch from the second SDAP layer entity structure or function 1*j*-20 to the first SDAP layer entity structure or function 1*j*-10 proposed in the disclosure, for each bearer or for the bearer to which the DAPS handover method is indicated, may maintain the second mapping information between the QoS flow and the bearer and the second bearer for the target base station 1*h*-10, may complete, before releasing the first bearer for the source base station 1*h*-05 or the first mapping information between the QoS flow and the bearer, the data processing by applying the first mapping information between the QoS flow and the bearer to multiple items of data received from the source base station (for example, all data received from the source base station 1*h*-05), and then may release the first mapping information between the QoS flow and the bearer or the first bearer. In addition, the terminal may transfer the processed multiple items of data to the upper layer in ascending order. That is, when the second condition is satisfied, the terminal 1*h*-20 may perform data processing (for example, the procedure of reading SDAP header information and updating the mapping information, configuring the SDAP header, or routing or transferring the same to an appropriate upper layer entity or lower layer entity, based on the first mapping information between the QoS flow and the bearer) by applying the first mapping information between the QoS flow and the bearer for the source base station 1h-05 to the multiple items of data stored in the buffer (for example, the multiple items of data received from the source base station 1h-05), and then may discard the first mapping information between the QoS flow and the bearer for the source base station 1h-05. In the description above, the SDAP layer entity may define and apply a 1-bit indicator of a new SDAP header, a 1-bit indicator of the PDCP header, SDAP control data (for example, downlink end marker), or information indicated by the PDCP layer entity, and may identify the type of the last data received from the source base station 1h-05, based on the 1-bit indicator of a new SDAP header, the 1-bit indicator of the PDCP header, the SDAP control data, or the information indicated by the PDCP layer entity. Accordingly, after the data processing is performed by applying the first mapping information between the QoS flow and the bearer for the source base station 1h-05 to the last data received from the source base station 1h-05, the first mapping information between the QoS flow and the bearer for the source base station 1h-05 may be discarded. In addition, the SDAP layer entity may continue to maintain the second mapping information between the QoS flow and the bearer, and process uplink data or downlink data to the target base station 1h-10, based on the mapping information.

When the MAC layer entity for the source base station 1h-05 is initialized and the second PDCP layer entity structure for the bearer for which the DAPS handover method is configured is switched to the first PDCP layer entity structure, the RLC layer re-establishment or the release procedure may be performed for the RLC layer entity for the source base station 1h-05 in the second PDCP layer entity structure.

■ In the disclosure, when the second condition is satisfied, or when the indicator indicating that the second condition is satisfied is received from the upper layer entity (for example, the RRC layer entity) or the lower layer entity (for example, the MAC layer entity), the RLC layer re-establishment or release procedure of the first bearer for the source base station 1h-05 may follow one of the following methods.
 ◆ First method: For a bearer for which the DAPS handover method is configured, when the RLC layer entity for the first bearer for the source base station 1h-05 is an LTE RLC layer entity, the upper layer entity (for example, the RRC layer entity) may indicate the LTE RLC layer entity to perform the re-establishment procedure. Specifically, when the reordering timer is running in the LTE RLC layer entity, the reordering timer may be stopped or initialized, and when there are stored multiple items of data, the stored multiple items of data are processed and transmitted to the upper layer entity, whereby the transmission delay due to the reordering timer can be reduced. In addition, variables may be initialized and multiple items of data for transmission may be discarded. Thereafter, the upper layer entity (for example, the RRC layer entity) may indicate to release the LTE RLC layer entity. However, in the description above, when the RLC layer entity for the first bearer for the source base station 1h-05 is an NR RLC layer entity, the upper layer entity (for example, the RRC layer entity) may indicate the NR RLC layer entity to be immediately released without re-establishment. This is because there is no stored data since the NR RLC layer entity always performs out-of-sequence delivery, and even when there is the stored data, the data may be segmented data, and thus there is no problem in discarding the stored data. As described above, different procedures may be applied according to the RLC layer entity configured for each bearer.
 ◆ Second method: For a bearer for which the DAPS handover method is configured, when the RLC layer entity for the first bearer for the source base station 1h-05 is an LTE RLC layer entity, the upper layer entity (for example, the RRC layer entity) may indicate the LTE RLC layer entity to perform the re-establishment procedure. Specifically, when the reordering timer is running in the LTE RLC layer entity, the reordering timer may be stopped or initialized, and when there are stored multiple items of data, the stored multiple items of data are processed and transferred to the upper layer entity, whereby the transmission delay due to the reordering timer can be reduced. In addition, variables may be initialized and multiple items of data for transmission may be discarded. Alternatively, the upper layer entity (for example, the RRC layer entity) may release the LTE RLC layer entity. However, when the RLC layer entity for the first bearer for the source base station 1h-05 is an NR RLC layer entity, the upper layer entity (for example, the RRC layer entity) may indicate the NR RLC layer entity to be immediately released without re-establishment. This is because there may be no stored data since the NR RLC layer always performs out-of-sequence delivery, and even when there is the stored data, the data may be segmented data, and thus there is no problem in discarding the data. As described above, different procedures may be applied according to the RLC layer entity configured for each bearer.
 ◆ Third method: In the description above, for a bearer for which the DAPS handover method is configured, in a case where the RLC layer entity for the first bearer for the source base station 1h-05 is an LTE RLC layer entity, when the target base station 1h-10 transmits, to the terminal 1h-20, an RRC message (for example, RRCReconfiguration) including an indicator indicating releasing of the connection with the source base station 1h-05 or releasing of the first bearer for the source base station 1h-05, an indicator (for example, reestablishRLC) for re-establishing the LTE RLC layer entity may be transmitted by being included in configuration information (for example, rlc-config) of the LTE RLC layer entity for the bearer in the RRC message (or also including an indicator indicating releasing of the LTE RLC layer entity). Accordingly, when an indication indicating releasing of the connection with the source base station 1h-05 is received, or when the second condition is satisfied, the upper layer entity (for example, the RRC layer entity) may read the RRC message and may indicate the LTE RLC layer entity to perform the re-establishment procedure according to the indication for the LTE RLC re-establishment (or release) procedure. Specifically, when the reordering timer is running in the LTE RLC layer entity, the reordering timer may be stopped or initialized, and when there are stored multiple items of data, the stored multiple items of data are processed and transmitted to the upper layer entity, whereby the transmission delay due to the reordering timer can be reduced. In addition, variables may be initialized and multiple items of data for transmission may be discarded. Thereafter, the upper layer entity (for example, the RRC layer entity) may release the LTE RLC layer entity. For a bearer for which the DAPS handover method is configured, in a case where the RLC layer entity for the first bearer for the source base station 1h-05 is an NR RLC layer entity, when the target base station 1h-10 transmits, to the terminal 1h-10, an RRC message (for example, RRCReconfiguration) including an indicator indicating releasing of the connection with the source base station 1h-05 or releasing of the first bearer for the source base station 1h-05, an indicator indicating releasing of the NR RLC layer entity may be transmitted by being included in configuration information (for example, rlc-config) of the NR RLC layer entity for the bearer in the RRC message. As described above, the target base station 1h-10 may indicate different procedures via the RRC message according to the RLC layer entity configured for each bearer, and accordingly, the terminal 1h-20 may apply the procedures for each bearer.

♦ Fourth method: For a bearer for which the DAPS handover method is configured, in a case where the RLC layer entity for the first bearer for the source base station 1h-05 is an LTE RLC layer entity, when the target base station 1h-10 transmits, to the terminal 1h-05, an RRC message (for example, RRCReconfiguration) including an indicator indicating releasing of the connection with the source base station 1h-05 or releasing of the first bearer for the source base station 1h-05, an indicator (for example, reestablishRLC) for re-establishing the LTE RLC layer entity may be transmitted by being included in configuration information (for example, rlc-config) of the LTE RLC layer entity for the bearer in the RRC message (or also including an indicator indicating releasing of the LTE RLC layer entity). Accordingly, when an indication indicating releasing of the connection with the source base station 1h-05 is received, or when the second condition is satisfied, the upper layer entity (for example, the RRC layer entity) may read the RRC message and may indicate the LTE RLC layer entity to perform the re-establishment procedure according to the indication for the LTE RLC re-establishment (or release) procedure. Specifically, when the reordering timer is running in the LTE RLC layer entity, the reordering timer may be stopped or initialized, and when there are stored multiple items of data, the stored multiple items of data are processed and transferred to the upper layer entity, whereby the transmission delay due to the reordering timer can be reduced. In addition, variables may be initialized and multiple items of data for transmission may be discarded. Alternatively, the upper layer entity (for example, the RRC layer entity) may release the LTE RLC layer entity. For a bearer for which the DAPS handover method is configured, in a case where the RLC layer entity for the first bearer for the source base station 1h-05 is an NR RLC layer entity, when the target base station 1h-10 transmits, to the terminal 1h-20, an RRC message (for example, RRCReconfiguration) including an indicator indicating releasing of the connection with the source base station 1h-05 or releasing of the first bearer for the source base station 1h-05, an indicator indicating releasing of the NR RLC layer entity for the bearer or an indicator indicating re-establishment of the NR RLC layer entity may be transmitted by being included in the RRC message. As described above, the target base station 1h-10 may indicate different procedures via the RRC message according to the RLC layer entity configured for each bearer, and accordingly, the terminal 1h-20 may apply the procedures for each bearer.

The reception PDCP layer entity may process or store the data received due to the re-establishment procedure of the lower layer entity (for example, the RLC layer entity), and may perform, for UM DRBs, the header decompression procedure based on the header compression context (robust header compression (ROHC) or Ethernet header compression (EHC)) for the stored multiple items of data (received from the source base station 1h-05) or all the stored data (for the source base station 1h-05).

The reception PDCP layer entity may process or store the data received due to the re-establishment procedure of the lower layer entity (for example, the RLC layer entity), and may perform, for AM DRBs, the header decompression procedure based on the header compression context (robust heard compression (ROHC) or Ethernet header compression (EHC)) for the stored multiple items of data (received from the source base station 1h-05) or all the stored data (for the source base station 1h-05).

As another method, the reception PDCP layer entity may process or store the data received due to the re-establishment procedure of the lower layer entity (for example, the RLC layer entity), and for UM DRB or AM DRBs, when the indicator (drb-Continue ROHC or drb-Continue Ethernet header compression (EHC)) indicating the continuous use of the header compression context is not configured, the reception PDCP layer entity may perform the header decompression procedure based on the header compression context (robust heard compression (ROHC) or Ethernet header compression (EHC)) for the stored multiple items of data (received from the source base station 1h-05) or all the stored data.

After the above procedure is performed, the transmission or reception PDCP layer entity may discard or release the security key or header compression contexts for the source base station 1h-05.

In FIG. 1F of the disclosure, when the handover command message 1f-20 is transmitted to the terminal 1f-01, the base station 1f-02 may define indicators for the embodiments proposed in the disclosure in the handover command message (for example, the RRCReconfiguration message), may indicate, to the terminal 1f-01 or 1h-20 an embodiment of the handover procedure to be triggered, and the terminal 1f-01 or 1h-20 may perform the handover procedure according to the handover method indicated in the handover command message, and for example, may perform the second embodiment (DAPS handover method) of the efficient handover method proposed in the disclosure, so as to perform handover to the target base station 1f-03 or 1h-10 while minimizing a data interruption time. As another method, in the handover command message, the indicators for the embodiments proposed in the disclosure may be defined for each bearer, and an embodiment to be applied to the bearer during handover and a bearer to which the embodiment is applied during handover may be more specifically indicated. For example, it may be indicated so that the second embodiment of the disclosure is applied only to the AM bearer in which the RLC layer entity is running in the AM mode is running, or it may be also extended and applied to the UM bearer in which the RLC layer entity is running in the UM mode is running. In addition, it may be assumed that the embodiments proposed in the disclosure are applied to the DRB. However, if necessary (for example, if the terminal 1f-01 or 1h-1 maintains the SRB for the source base station 1f-02 or 1h-05 and fails to perform handover to the target base station 1f-03 or 1h-10, and may report the handover failure message to the SRB for the source base station 1f-02 or 1h-05 or restore the same), it may be also extended and applied to the SRB.

In the embodiments of the disclosure, when the terminal 1h-20 performs data transmission and reception to or from the source base station 1h-05 through the protocol layer entities for the first bearer and performs data transmission and reception to or from the target base station 1h-10 through the protocol layer entities for the second bearer, each of the MAC layer entity for the first bearer and the MAC layer entity for the second bearer may operate a separate discontinuous reception (DRX) cycle to reduce battery consumption of the terminal 1h-20. That is, the terminal 1h-20 may continue to apply the DRX cycle of the MAC layer entity when transmitting and receiving data through the protocol layer entities for the first bearer even after receiving the handover command message, and may stop discontinuous reception (DRX) according to the first condition or the second condition of the disclosure. In addition, the terminal 1h-20 may separately operate the application of the DRX cycle to the MAC layer entity for the second bearer according to the indication of the target base station 1h-10.

In addition, in the disclosure, when the terminal 1h-20 stops uplink transmission to the source base station 1h-05 through the protocol layer entities for the first bearer and stops downlink data reception from the source base station 1h-05, it means that the terminal 1h-20 re-establishes, initializes, or releases the protocol layer entities (the PHY layer entity, the MAC layer entity, the RLC layer entity, or the PDCP layer entity) for the first bearer.

In the embodiments of the disclosure, for convenience of description, it has been described that the terminal 1h-20 configures the first bearer for the source base station 1h-05 or the second bearer for the target base station 1h-10, and it may be easily extended to the case in which the terminal 1h-20 configures multiple first bearers for the source base station 1h-05 or multiple second bearers for the target base station 1h-10, so that the same may be applied. According to another method, it may be easily extended to the case in which a plurality of bearers for a plurality of target gNBs 1h-10 are configured, and the same may be applied. For example, the terminal 1h-20 may perform the procedure of handover to the first target base station to configure second bearers, may perform, when the handover fails, the procedure of handover to the second target base station to configure second bearers, so as to search for and determine a cell satisfying a predetermined condition (for example, a predetermined signal strength or greater) by the terminal itself from among multiple target base stations, and may perform the handover procedure on the determined cell.

FIGS. 11A and 11B illustrate structures of a PDCP layer entity applied to a DAPS handover method according to a second embodiment of the disclosure, and a method of applying the structures.

FIGS. 11A and 11B propose a specific structure and functions of an efficient PDCP layer entity applied to the DAPS handover method corresponding to the second embodiment of the efficient handover method proposed in the disclosure, and with respect to PDCP layer entity structures proposed below, different PDCP layer entity structures may be applied at different time points for each bearer while performing a DAPS handover procedure.

For example, before receiving a handover command message from a base station, a terminal processes, transmits, or receives data by applying a first PDCP layer entity structure and function 1i-11 or 1i-12 proposed in the disclosure for each bearer (operation 1i-01).

However, when the terminal receives the handover command message from the base station and indicates the DAPS handover method proposed in the disclosure in the handover command message, or indicates the DAPS handover method for specific bearers, the terminal processes and transmits or receives data by applying a second PDCP layer entity structure and function 1i-20 proposed in the disclosure to each bearer or the bearers to which the DAPS handover method is indicated (operation 1i-02). That is, when the terminal receives the handover command message and indicates the DAPS handover method proposed in the disclosure in the handover command message, or indicates the DAPS handover method for specific bearers, the terminal may switch from the first PDCP layer entity structure or function 1i-11 or 1i-12, which has been used, for each bearer, to the second PDCP layer entity structure or function 1i-20 (for example, dual active protocol stack (DAPS) PDCP) proposed in the disclosure for each bearer or for to the bearer to which the DAPS handover method is indicated. As another method, when the first condition above proposed in the disclosure is satisfied, the terminal may switch from the first PDCP layer entity structure or function 1i-11 or 1i-12, which has been used for each bearer, to the second PDCP layer entity structure or function 1i-20 proposed in the disclosure, for each bearer or for the bearer to which the DAPS handover method is indicated (operation 1i-02). In addition, in the description above, in a case where the terminal receives the handover command message and indicates the DAPS handover method proposed in the disclosure in the handover command message, or indicates the DAPS handover method for specific bearers, or a case where a PDCP reordering timer value is newly configured, when the terminal switches from the first PDCP layer entity structure or function 1i-11 or 1i-12 to the second PDCP layer entity structure or function 1i-20 proposed in the disclosure, for each bearer or for the bearer to which the DAPS handover method is indicated, the terminal may update a reordering variable with a PDCP sequence number or a COUNT value expected to be received next, and may stop and restart the reordering timer. The second PDCP layer entity structure proposed in the disclosure may be called a DAPS PDCP layer entity.

In addition, when the second condition proposed in the disclosure is satisfied while the DAPS handover method proposed above in the disclosure is performed, the terminal may release the first bearers for the source base station, and may switch again from the second PDCP layer entity structure and function 1$i$-20 having been applied for each bearer or for the bearer to which the DAPS handover method is indicated to the first PDCP layer entity structure and function 1$i$-11 or 1$i$-12, and apply the same. In addition, in the description above, in a case where the second condition is satisfied when the terminal switches from the second PDCP layer entity structure or function 1$i$-20 to the first PDCP layer entity structure or function 1$i$-11 or 1$i$-12 proposed in the disclosure, for each bearer or for the bearer to which the DAPS handover method is indicated, the terminal may initialize the reordering variable, and stop and initialize the reordering timer, may perform a deciphering procedure or header (or data) decompression by applying a security key or header decompression context for the source base station to multiple items of data stored in a buffer for reordering (for example, multiple items of data received from the source base station), and then may discard the security key or header decompression context for the source base station. In addition, the terminal may also transfer the processed multiple items of data to an upper layer entity in ascending order. That is, when the second condition is satisfied, the terminal may perform the deciphering procedure or header (or data) decompression by applying the security key or header decompression context for the source base station to the multiple items of data stored in the buffer for reordering (for example, the multiple items of data received from the source base station), and then may discard the security key or header decompression context for the source base station.

As another method, when the second condition proposed in the disclosure is satisfied while the DAPS handover method proposed in the disclosure is performed, the terminal may release the bearers for the source base station, and may switch from the second PDCP layer entity structure and function or the DAPS PDCP layer entity structure 1$i$-20 having been applied for each bearer or for the bearer to which the DAPS handover method is indicated to a third PDCP layer entity structure and function 1$i$-30, and apply the same. In the description above, in a case where the second condition is satisfied, when the terminal switches from the second PDCP layer entity structure or function or the DAPS PDCP layer entity 1$i$-20 to the third PDCP layer entity structure or function 1$i$-30 proposed in the disclosure, for each bearer or for the bearer to which the DAPS handover method is indicated, the terminal may continuously use the reordering variable and the reordering timer without stopping or initializing the same. However, the terminal may perform the deciphering procedure or header (or data) decompression by applying the security key or header decompression context for the source base station to the multiple items of data stored in the buffer for reordering (for example, the multiple items of data received from the source base station), and then may discard the security key or header decompression context for the source base station. In addition, the terminal may also transfer the processed multiple items of data to the upper layer in ascending order. That is, in the description above, when the second condition is satisfied, the terminal may perform the deciphering procedure or header (or data) decompression by applying the security key or header decompression context for the source base station to the multiple items of data stored in the buffer for reordering (for example, the multiple items of data received from the source base station), and then may discard the security key or header decompression context for the source base station.

Figure 1I:
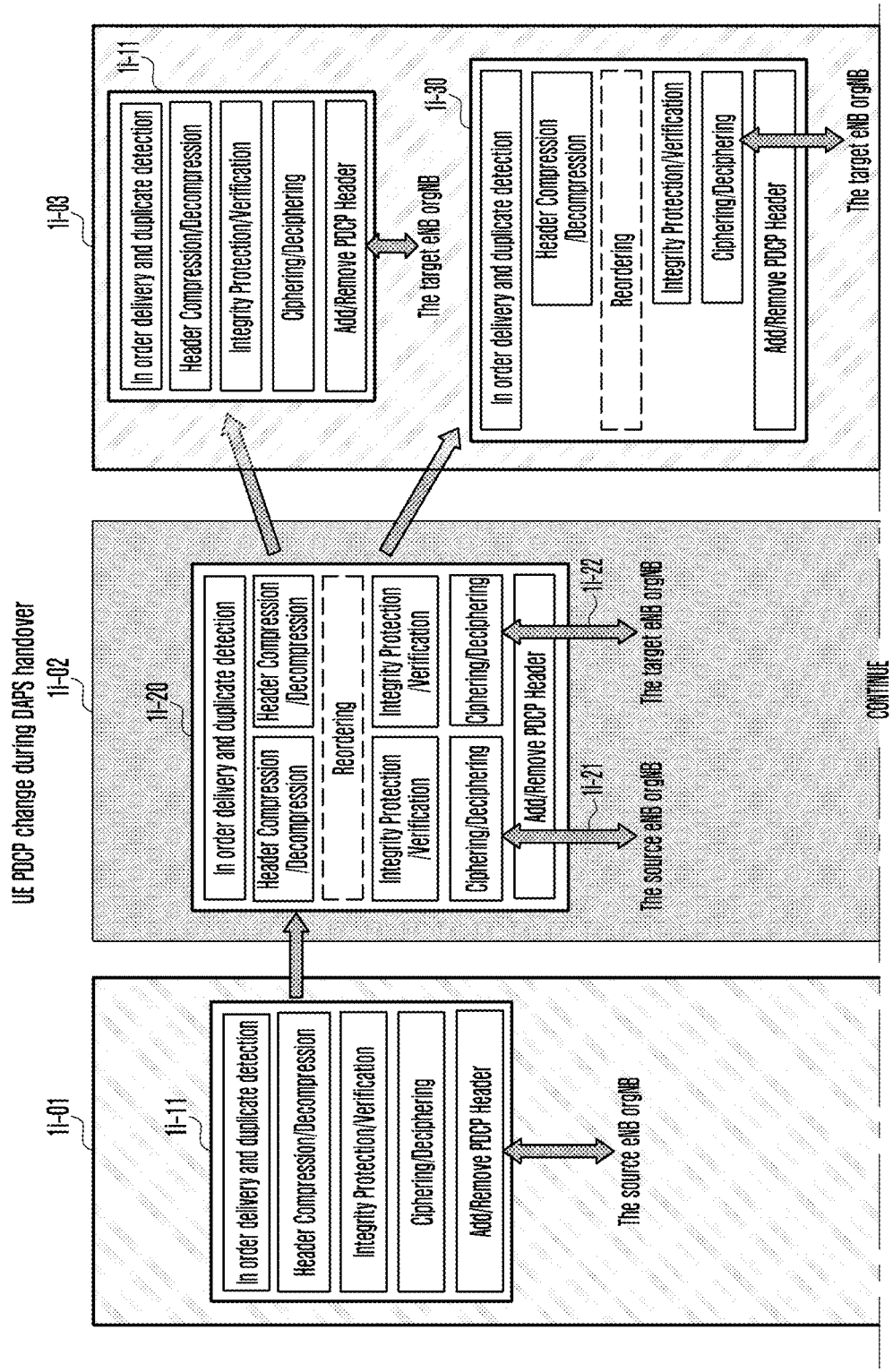
FIG. 1IA illustrates structures of a PDCP layer entity applied to a DAPS handover method according to a second embodiment of the disclosure, and a method of applying the structures.
Figure 1I:
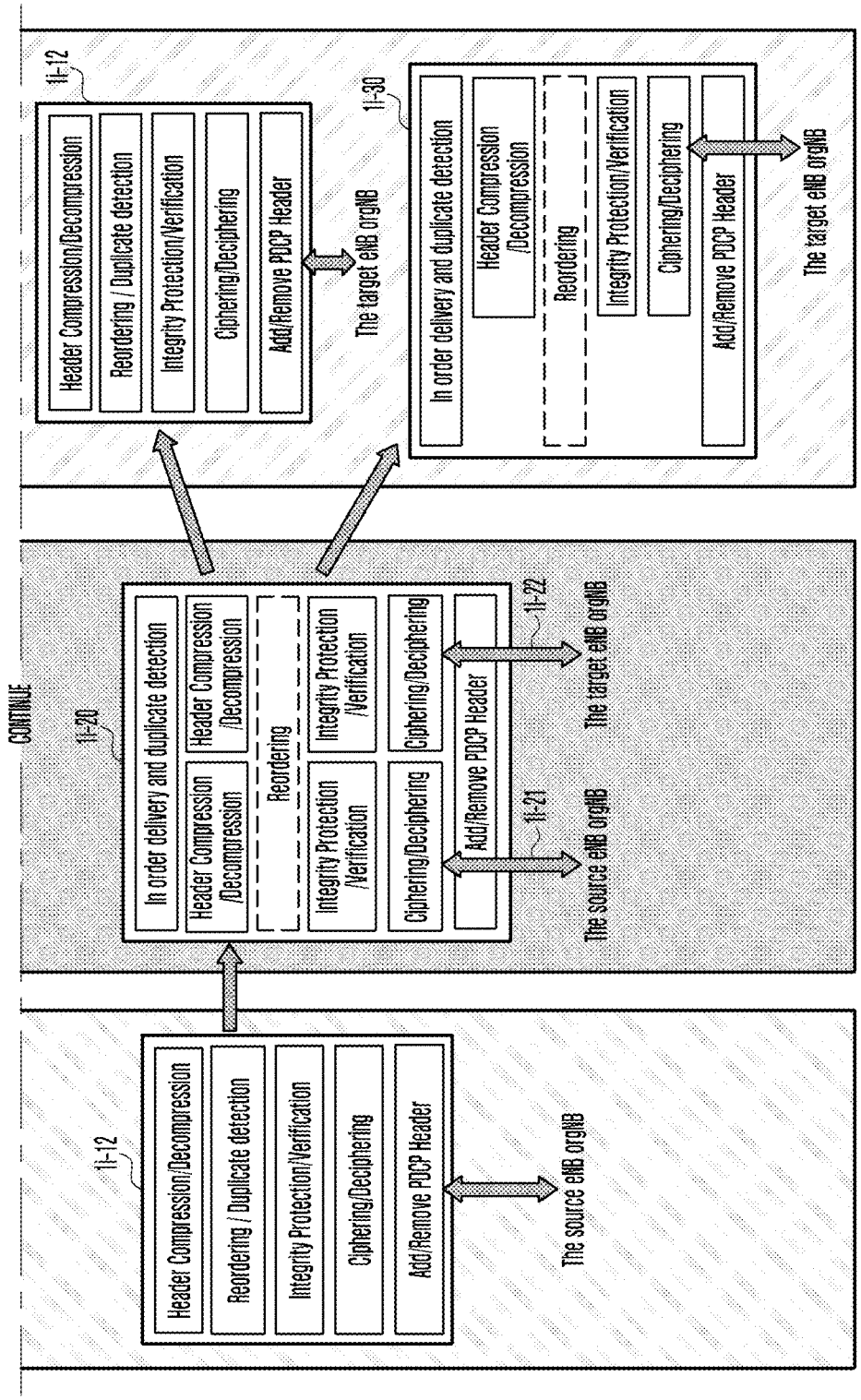

As proposed in FIG. 1I of the disclosure above, when the terminal performs handover by applying the first PDCP layer structure and function 1$i$-11 or 1$i$-12, the second PDCP layer structure and function 1$i$-20, and the third PDCP layer structure and function 1$i$-30 of the first PDCP layer, which are different from each other, for each bearer at different time points, a data interruption time can be minimized without data loss.

The first PDCP layer entity structure 1$i$-11 or 1$i$-12 proposed in FIG. 1I may have a $(1-1)^{th}$ PDCP layer entity structure, a $(1-2)^{th}$ PDCP layer entity structure, a $(1-3)^{th}$ PDCP layer entity structure, or a $(1-4)^{th}$ PDCP layer entity structure, proposed below in the disclosure, and may have the following features.

1> (In a case of the $(1-1)^{th}$ PDCP layer entity structure,) For example, in a case where the terminal applies the first PDCP layer entity structure and function 1$i$-11 to the PDCP layer entity (for example, E-UTRA PDCP layer entity or LTE PDCP layer entity) connected to the AM RLC layer entity (for example, E-UTRA AM RLC layer entity), there may be following features.
- ■ 2> The reception PDCP layer entity may first perform out-of-window data detection or duplicate data detection for the received multiple items of data. (The RLC AM has retransmission, and the size of the LTE RLC SN and the PDCP SN may be different from each other, and thus duplicate data or out-of-window data may be received. The window indicates the area of the COUNT value or the PDCP sequence number, in which valid data is received.)
  - ♦ 3> Before discarding the out-of-window data or duplicate data, the terminal performs the deciphering procedure and the header decompression procedure and then discard the same. (Useful information for the header decompression procedure (for example, IR packet or header compression information) may be included, and thus the out-of-window data or duplicate data may be identified and then discarded.)
- ■ 2> Without performing ordering, the terminal may directly perform deciphering and header decompression procedure for the multiple items of data received without being discarded above. This is because the E-UTRA AM RLC layer entity performs ordering of data and transfers the multiple items of data to the PDCP layer entity.
- ■ 2> In addition, when the multiple items of data are transferred to the upper layer, the multiple items of data are transmitted in ascending order of COUNT values.

1> (In a case of the $(1-2)^{th}$ PDCP layer entity structure,) For example, when the terminal applies the first PDCP layer entity structure and function 1$i$-11 to the PDCP layer entity (for example, E-UTRA PDCP layer entity or LTE PDCP layer entity) connected to the UM RLC layer entity (for example, E-UTRA UM RLC layer entity), there may be following features.
- ■ 2> The out-of-window data detection or duplicate data detection procedure is not performed. This is because the UM E-UTRA RLC layer entity does not have a retransmission procedure.

- 2> For the received multiple items of data above, the deciphering procedure is directly performed and the header decompression procedure is performed.
- 2> The reordering procedure may be performed to transmit data to the upper layer (for example, in ascending order).

1> (In a case of the $(1\text{-}3)^{th}$ PDCP layer entity structure,) For example, when the terminal applies the first PDCP layer entity structure and function 1$i$-11 to the PDCP layer entity (for example, E-UTRA PDCP layer entity or LTE PDCP layer entity) configured as a split bearer, a packet duplication bearer, or an LWA bearer, the reordering procedure and the reordering timer are always applied, and there may be the following features.

- 2> The out-of-window data detection of duplicate data detection may be first performed for the received data. (This is because the RLC AM has retransmission, or data may be received from different RLC layer entities at different time points, the sizes of LTE RLC SN and PDCP SN may be different, and thus the out-of-window data or duplicate data may be received.)
  - 3> The deciphering procedure is performed. However, the header decompression procedure is not performed. (This is because the E-UTRA PDCP is unable to configure the header compression protocol for the split bearer or the LWQ bearer.)
  - 3> Data is discarded after the integrity protection or verification procedure is performed. When the integrity verification procedure fails, the data may be discarded and a report may be made to the upper layer entity.
  - 3> The out-of-window or duplicate data is discarded.
- 2> When the data is not discarded above, the deciphering procedure is directly performed without ordering the received multiple items of data. In addition, when the integrity protection or verification is configured, the integrity verification is performed. Data is discarded after the integrity protection or verification procedure is performed. When the integrity verification procedure fails, the data may be discarded and a report may be made to the upper layer.
- 2> When the ordering is performed for the received multiple items of data and the PDCP sequence numbers or the COUNT values are consecutively ordered in ascending order without a gap, the header compression procedure is performed and (when the header compression procedure or decompression procedure is configured) data is transmitted to the upper layer entity in ascending order.
- 2> When the reordering timer is running,
  - 3> when data corresponding to the COUNT value having the same value as a value obtained by subtracting 1 from a value maintained by the reordering variable is transmitted to the upper layer entity, or when data is all transmitted to the upper layer without a gap in the PDCP sequence number (or COUNT value),
    - 4> the reordering timer is stopped and initialized.
- 2> When the reordering timer is not running,
  - 3> when there is data stored in the buffer without being transmitted to the upper layer entity, or when there is a gap in the PDCP sequence number (or COUNT value),
    - 4> the reordering timer is started.
    - 4> The reordering variable is updated with the PDCP sequence number or COUNT value expected to be received next.
- 2> When the reordering timer has expired,
  - 3> when the header decompression procedure is configured in ascending order of the PDCP sequence numbers or the COUNT values for a value smaller than the reordering variable value, the header decompression procedure is performed and the stored data is transmitted to the upper layer entity.
  - 3> When the header decompression procedure is configured in ascending order of the PDCP sequence numbers or the COUNT values consecutively for a value equal to or greater than the reordering variable value for the stored multiple items of data, the header decompression procedure is performed and the stored multiple items of data are transmitted to the upper layer entity.
  - 3> In addition, the variable value for the last data transferred to the upper layer entity is updated with the PDCP sequence number or the COUNT value of the last transferred data.
  - 3> When there is data stored in the buffer without being transmitted to the upper layer entity, or when there is a gap in the PDCP sequence number (or COUNT value),
    - 4> the reordering timer is started.
    - 4> In addition, the reordering variable is updated with the PDCP sequence number or the COUNT value expected to received next.

1> (In a case of the $(1\text{-}4)^{th}$ PDCP layer entity structure,) For example, when the terminal applies the first PDCP layer entity structure and function 1$i$-12 to the NR PDCP layer entity, the reordering procedure and the reordering timer are always applied, and there may be the following features.

- 2> The deciphering procedure is first performed for the received multiple items of data.
- 2> When the integrity protection or verification procedure is configured, the integrity protection or verification procedure may be performed for the received data, and when the integrity verification procedure fails, the data may be discarded and a report may be made to the upper layer.
- 2> The out-of-window data detection or duplicate data detection is performed for the received data. (After the deciphering procedure is performed above, the out-of-window data detection or duplicate detection may be performed. As another method, only when the integrity protection or verification procedure is configured, the deciphering procedure may be performed, and the out-of-window data detection or duplicate detection may be then performed. When the integrity protection or verification procedure is not configured, the out-of-window data detection or duplicate detection may be performed, and the deciphering procedure may then be performed for multiple items of data that are not discarded.)

- ◆ 3> The out-of-window or duplicate data is discarded.
- ■ 2> When the data is not discarded, the ordering is performed for the received multiple items of data, and when the PDCP sequence numbers or the COUNT values are ordered in ascending order without a gap, the header compression procedure may be performed and (when the header compression procedure or decompression procedure is configured) data may be transferred to the upper layer entity in ascending order.
- ■ 2> In addition, when the multiple items of data are transferred to the upper layer entity, the multiple items of data are transferred in ascending order of COUNT values.
- ■ 2> When the reordering timer is running,
  - ◆ 3> when data corresponding to the COUNT value having the same value as a value obtained by subtracting 1 from a value maintained by the reordering variable is transferred to the upper layer entity, when data is all transmitted to the upper layer entity without a gap in the PDCP sequence number (or COUNT value), or when the value of the variable storing the PDCP sequence number or the COUNT value of the data to be transferred to the upper layer entity is greater than or equal to the value of the reordering variable,
    - ● 4> the reordering timer is stopped and initialized.
- ■ 2> When the reordering timer is not running,
  - ◆ 3> when there is data stored in the buffer without being transferred to the upper layer entity, when there is a gap in the PDCP sequence number (or COUNT value), or when the variable value storing the COUNT value of the first data that is not transferred to the upper layer entity is smaller than the reordering variable value,
    - ● 4> in addition, the reordering variable is updated with the PDCP sequence number or the COUNT value expected to be received next.
    - ● 4> The reordering timer is started.
- ■ 2> When the reordering timer has expired,
  - ◆ 3> when the header decompression procedure is configured in ascending order of the PDCP sequence numbers or the COUNT values for a value smaller than the reordering variable value, the header decompression procedure is performed and the stored data is transferred to the upper layer entity.
  - ◆ 3> When the header decompression procedure is configured in ascending order of the PDCP sequence numbers or the COUNT values consecutively for a value equal to or greater than the reordering variable value for the stored data, the header decompression procedure is performed and the stored data is transferred to the upper layer end.
  - ◆ 3> In addition, the variable value for the first data that is not transferred to the upper layer end is updated with the PDCP sequence number or the COUNT value of the first data that is not transferred to the upper layer entity.
  - ◆ 3> When there is data stored in the buffer without being transferred to the upper layer entity, when there is a gap in the PDCP sequence number (or COUNT value), or when the variable value storing the count value of the first data that is not transferred to the upper layer entity is smaller than the reordering variable value,
    - ● 4> in addition, the reordering variable is updated with the PDCP sequence number or the COUNT value expected to be received next.
    - ● 4> The reordering timer is started.

The second PDCP layer entity structure $1i$-20 proposed in FIG. 1I may have a $(2-1)^{th}$ PDCP layer entity structure or a $(2-2)^{th}$ PDCP layer entity structure proposed below in the disclosure, and may have the following features.

The disclosure proposes the second PDCP layer entity structure that is efficient in handover as shown in $1i$-20. The second PDCP layer entity structure may be applied to the second embodiment of the efficient handover method of minimizing the data interruption time, proposed in the disclosure.

In the second PDCP layer entity structure, the terminal may perform data transmission or reception to for from the source base station $1i$-21 through protocol layer entities for the first bearer (for example, an SDAP layer entity, a PDCP layer entity, an RLC layer entity, or a MAC layer entity), and may perform data transmission or reception to or from the target base station $1i$-22 through protocol layer entities for the second bearer (for example, an SDAP layer entity, a PDCP layer entity, an RLC layer entity, or a MAC layer entity).

In the description above, each of the PDCP layer entity for the first bearer and the PDCP layer entity for the second bearer may be configured in the terminal, but logically, may operate as a single PDCP layer entity, as shown in $1i$-20. Specifically, the single PDCP layer entity may divide the functions of the PDCP layer entity implement the functions (for example, a sequence number allocation function, a reordering function, an in-sequence delivery function, or a duplicate detection function) of an upper PDCP layer entity and the functions (for example, a deciphering or ciphering function, a header (or data) compression or header (or data) decompression function, an integrity protection or verification function, or a duplicate detection function) of two lower PDCP layer entities for each source base station and each target base station. In addition, as proposed above, in the DAPS handover method, when the first condition is satisfied while the terminal transmits uplink data to the source base station, the terminal may perform switching to the target base station, and downlink data may be continuously received from the source base station and the target base station. Accordingly, the header (or data) compression protocol context may maintain and apply only one context for the source base station or the target base station, for the uplink, and may maintain and apply two contexts for the source base station or the target base station, for the downlink.

Based on the second PDCP layer entity structure proposed above, the $(2-1)^{th}$ PDCP layer entity structure (for example, the E-UTRA PDCP layer entity for the DAPS handover method) proposed in the disclosure may have the following features.

In the description above, the upper transmission PDCP layer entity may perform a role of allocating the PDCP sequence number to multiple items of data received from the upper layer entity. In addition, the two lower transmission PDCP layer entity functions $1i$-21 and $1i$-22 for each source base station and each target base station may apply, by using a separate security key configured with each source base station and each target base station, the header (or data) compression context or security key configured with the source base station to data to be transmitted to the source base station, and apply the header (or data) compression context or security key configured with the target base station to data to be transmitted to the target base station, so as to apply the header (or data) compression procedure when the header (or data) compression procedure is configured, apply the ciphering procedure and the integrity protection procedure to the PDCP headers and data (PDCP SDU) when the integrity protection is configured, transfer data to be transmitted to the source base station to the transmission RLC layer entity for the first bearer, and transfer data to be transmitted to the target base station to the transmission RLC layer entity for the second bearer. In the description above, the two lower transmission PDCP layer entity functions 1$i$-21 and 1$i$-22 may perform parallel data processing in which the header compression, the integrity protection, or the ciphering procedure may be performed in parallel so as to accelerate a data processing speed, and in the two lower transmission PDCP layer entity functions 1$i$-21 and 1$i$-22, the integrity protection or the ciphering procedure may be performed by using different security keys. In addition, logically, compression, integrity protection, or a ciphering procedure for different items of data may be performed by applying different security keys or security algorithms within the single transmission PDCP layer entity.

In the description above, in the reception PDCP layer entity functions, for multiple items of data received from each of the lower layer entities, specifically, for multiple items of data received from two RLC layer entities for each source base station and each target base station, the out-of-window data detection or duplicate detection procedure may be independently performed for the multiple items of data received from each of the RLC layer entities, based on the PDCP sequence number or the COUNT value in the lower reception PDCP layer entity functions 1$i$-21 and 1$i$-22 for the source base station or the target base station. As another method, for convenience of implementation, the out-of-window data detection or duplicate detection procedure may be performed, based on the PDCP sequence number or the COUNT value, for all received data without distinguishing the respective RLC layer entities. As another method, for more accurate duplicate detection, the out-of-window data detection may be performed, based on the PDCP sequence number or the COUNT value, for all received data without distinguishing the respective RLC layer entities, and the duplicate detection procedure may be independently performed for data received from the respective RLC layer entities. As another method, when multiple items of data received from different base stations are duplicated, the out-of-window data detection may be performed for all received data, based on the PDCP sequence number or the COUNT value without distinguishing the respective RLC layer entities, and the duplicate detection procedure may be performed on the entire data after the deciphering procedure or integrity protection procedure or the header (or data) decompression procedure is performed for multiple items of data received from the respective RLC layer entities, in order to prevent data loss for the header compression protocol.

The lower functions of the reception PDCP layer entity may directly apply the deciphering procedure to the received multiple items of data by using a separate header (or data) compression context or security key configured with each source base station and each target base station, and apply the integrity verification procedure to the PDCP header and data (PDCP SDU) when the integrity protection is configured.

In the (2-1)$^{th}$ PDCP layer entity structure, the header (or data) decompression procedure may be performed directly for the multiple items of data received from the RLC layer entities for the first bearer for each source base station, without performing ordering, and in addition the header (or data) decompression procedure may be performed directly for the multiple items of data received from the RLC layer entities for the second bearer for each target base station, without performing ordering. In addition, in order to distinguish between the multiple items of data received from the RLC layer entities for the first bearer for each source base station and the multiple items of data received from the RLC layer entities for the second bearer for each target base station, an indicator may be defined for the respective items of data to distinguish whether data is received from the source base station or data received from the target base station. As another method, a 1-bit indicator of a PDCP header, an SDAP header, or an RLC header may be defined to distinguish whether data is received from the source base station or is received from the target base station. In addition, for all of the multiple items of data received from the RLC layer entities for the first bearer for the source base station that has completed the header (or data) compression procedure and the multiple items of data received from the RLC layer entities for the second bearer for the target base station, the duplicate detection procedure (the procedure of discarding all but one item of data (applicable including data previously received or transferred to the upper layer) for each PDCP sequence number or COUNT value) may be performed based on the PDCP sequence number or the COUNT value. In addition, for all of the multiple items of data received from the RLC layer entities for the first bearer for the source base station and the multiple items of data received from the RLC layer entities for the second bearer for the target base station, the reordering procedure may be performed in ascending order, based on the PDCP sequence number or the COUNT value, and data may be sequentially transmitted to the upper layer entity. In the description above, the single PDCP layer entity may receive data from different base stations, that is, the first bearer or the second bearer in any order, and thus it may be necessary to always perform the reordering procedure.

The two lower reception PDCP layer entity functions may perform parallel data processing of performing the header compression, the integrity protection, or the ciphering procedure in parallel so as to accelerate the data processing speed, based on the PDCP sequence number or the COUNT value, and may perform the integrity protection or ciphering procedure or the decompression procedure by using different header (or data) compression contexts or security keys. In addition, logically, different data integrity protection or ciphering procedures or decompression procedures may be performed by applying different header (or data) compression contexts or security keys or security algorithms within a single transmission PDCP layer. In addition, in the lower reception PDCP layer entity functions, the out-of-sequence deciphering or integrity verification procedure may be performed for each of the received multiple items of data regardless of the order of the PDCP sequence number or the COUNT value.

When distinguishing between the layer entities for the first bearer and the layer entities for the second bearer, the single PDCP layer may distinguish between the layer entities for the first bearer (or the first RLC layer entity) and the layer entities for the second bearer (or the second RLC layer entity) by considering that the layer entities are connected to different MAC layer entities, considering that the layer entities have different logical channel identifiers or that the layer entities are different RLC layer entities connected to different MAC layer entities, or considering that different encryption keys are used, so as to perform the ciphering or deciphering procedure by using different security keys for uplink data and downlink data, and perform compression or decompression by using different compression protocol contexts.

Based on the second PDCP layer entity structure proposed above, the $(2\text{-}2)^{th}$ PDCP layer entity structure (for example, the NR PDCP layer for the DAPS handover method) proposed in the disclosure may have the following features.

In the description above, the upper transmission PDCP layer entity may perform a role of allocating the PDCP sequence number to multiple items of data received from the upper layer entity. In addition, the two lower transmission PDCP layer entity functions $1i\text{-}21$ and $1i\text{-}22$ for each source base station and each target base station may apply, by using a separate security key configured with each source base station and each target base station, the header (or data) compression context or security key configured with the source base station to data to be transmitted to the source base station, and apply the header (or data) compression context or security key configured with the target base station to data to be transmitted to the target base station, so as to apply the header (or data) compression procedure when the header (or data) compression procedure is configured, apply the ciphering procedure and the integrity protection procedure to the PDCP headers and data (PDCP SDU) when the integrity protection is configured, transfer data to be transmitted to the source base station to the transmission RLC layer entity for the first bearer, and transfer data to be transmitted to the target base station to the transmission RLC layer entity for the second bearer. In the description above, the two lower transmission PDCP layer entity functions $1i\text{-}21$ and $1i\text{-}22$ may perform parallel data processing in which the header compression, the integrity protection, or the ciphering procedure may be performed in parallel so as to accelerate a data processing speed, and in the two lower transmission PDCP layer entity functions $1i\text{-}21$ and $1i\text{-}22$, the integrity protection or the ciphering procedure may be performed by using different security keys. In addition, logically, compression, integrity protection, or a ciphering procedure for different items of data may be performed by applying different security keys or security algorithms within the single transmission PDCP layer entity.

In the description above, in the reception PDCP layer entity functions, for multiple items of data received from each of the lower layer entities, specifically, for multiple items of data received from two RLC layer entities for each source base station and each target base station, the out-of-window data detection or duplicate detection procedure may be independently performed for the multiple items of data received from each of the RLC layer entities, based on the PDCP sequence number or the COUNT value in the lower reception PDCP layer entity functions $1i\text{-}21$ and $1i\text{-}22$ for the source base station or the target base station. As another method, for convenience of implementation, the out-of-window data detection or duplicate detection procedure may be performed, based on the PDCP sequence number or the COUNT value, for all received data without distinguishing the respective RLC layer entities. As another method, for more accurate duplicate detection, the out-of-window data detection may be performed, based on the PDCP sequence number or the COUNT value, for all received data without distinguishing the respective RLC layer entities, and the duplicate detection procedure may be independently performed for data received from the respective RLC layer entities. As another method, when multiple items of data received from different base stations are duplicated, the out-of-window data detection may be performed for all received data, based on the PDCP sequence number or the COUNT value without distinguishing the respective RLC layer entities, and the duplicate detection procedure may be performed on the entire data after the deciphering procedure or integrity protection procedure or the header (or data) decompression procedure is performed for multiple items of data received from the respective RLC layer entities, in order to prevent data loss for the header compression protocol.

The lower functions $1i\text{-}21$ and $1i\text{-}22$ of the reception PDCP layer entity may directly apply the deciphering procedure to the received multiple items of data by using a separate header (or data) compression context or security key configured with each source base station and each target base station, and apply the integrity verification procedure to the PDCP header and data (PDCP SDU) when the integrity protection is configured.

In the $(2\text{-}2)^{th}$ PDCP layer structure, after the reordering procedure is applied to the multiple items of data received from the RLC layer entities for the first bearer for each source base station and the multiple items of data received from RLC layer entities for the second bearer for each target base station, the header (or data) decompression procedure may be performed by applying the header (or data) compression context of each base station (the source base station or the target base station) for each data received from each base station (the source base station or the target base station) in ascending order of the PDCP sequence number or the COUNT value. In addition, in order to distinguish between the multiple items of data received from the RLC layer entities for the first bearer for each source base station and the multiple items of data received from the RLC layer entities for the second bearer for each target base station, an indicator may be defined for the respective items of data to distinguish whether data is received from the source base station or data received from the target base station. As another method, a 1-bit indicator of a PDCP header, an SDAP header, or an RLC header may be defined to distinguish whether data is received from the source base station or is received from the target base station. In addition, for all of the multiple items of data received from the RLC layer entities for the first bearer for the source base station that has completed the header (or data) compression procedure and the multiple items of data received from the RLC layer entities for the second bearer for the target base station, the duplicate detection procedure (the procedure of discarding all but one item of data (applicable including data previously received or transferred to the upper layer) for each PDCP sequence number or COUNT value) may be performed based on the PDCP sequence number or the COUNT value. In addition, for all of the multiple items of data received from the RLC layer entities for the first bearer for the source base station and the multiple items of data received from the RLC layer entities for the second bearer for the target base station, data may be sequentially transmitted to the upper layer entity, based on the PDCP sequence number or the COUNT value. In the description above, the single PDCP layer entity may receive data from different base stations, that is, the first bearer or the second bearer in any order, and thus it may be necessary to always perform the reordering procedure.

The two lower reception PDCP layer entity functions $1i\text{-}21$ and $1i\text{-}22$ may perform parallel data processing of performing the header compression, the integrity protection, or the ciphering procedure in parallel so as to accelerate the data processing speed, based on the PDCP sequence number or the COUNT value, and may perform the integrity protection or ciphering procedure or the decompression procedure by using different header (or data) compression contexts or security keys. In addition, logically, different data integrity protection or ciphering procedures or decompression procedures may be performed by applying different header (or data) compression contexts or security keys or security algorithms within a single transmission PDCP layer. In addition, in the lower reception PDCP layer entity functions 1$i$-21 and 1$i$-22, the out-of-sequence deciphering or integrity verification procedure may be performed for each of the received multiple items of data regardless of the order of the PDCP sequence number or the COUNT value.

When distinguishing between the layer entities for the first bearer and the layer entities for the second bearer, the single PDCP layer may distinguish between the layer entities for the first bearer (or the first RLC layer entity) and the layer entities for the second bearer (or the second RLC layer entity) by considering that the layer entities are connected to different MAC layer entities, considering that the layer entities have different logical channel identifiers or that the layer entities are different RLC layer entities connected to different MAC layer entities, or considering that different encryption keys are used, so as to perform the ciphering or deciphering procedure by using different security keys for uplink data and downlink data, and perform compression or decompression by using different compression protocol contexts.

The disclosure proposes the third PDCP layer entity structure that is efficient in handover as shown in 1$i$-30. The third PDCP layer entity structure may be applied to the second embodiment of the efficient handover method of minimizing the data interruption time, proposed in the disclosure. In addition, the PDCP layer entity function in the third PDCP layer entity structure proposed in the disclosure may be the same as the second PDCP layer structure proposed in the disclosure. However, the third PDCP layer entity structure corresponds to a structure obtained by releasing the first bearer for the source base station from the second PDCP layer entity structure. Specifically, the third PDCP layer entity structure proposed in the disclosure has the same function as the second PDCP layer entity structure proposed above, but may have a structure in which the first bearer for the source base station (for example, the SDAP layer entity, the PDCP layer entity, the RLC layer entity, or the MAC layer entity) is released. Accordingly, in the third PDCP layer entity structure, QoS mapping information of the SDAP layer entity for the source base station, security key information for the source base station of the PDCP layer entity, header (or data) compression context information for the source base station, or the RLC layer entity or MAC layer entity for the source base station may be released.

Hereinafter, proposed is applying bearer configuration information in different methods according to a handover type indicated in a handover command message when the terminal receives the handover command message and applies the bearer configuration information included in the handover command message in FIG. 1F above.

In a case where the terminal receives the handover command message, when the first handover method (for example, the first embodiment of the disclosure or the general handover method) is indicated in the handover command message, ReconfigWithSync information, or MobilityControlInfo information, when the second embodiment (DAPS handover method) proposed in the disclosure is not configured, or when no bearer is configured in the bearer configuration information in the second embodiment (DAPS handover method) proposed in the disclosure,

- ■ when a default bearer is configured in the SDAP layer entity configuration information configured in the handover command message, the default bearer for the source base station may be configured as a default bearer for the target base station, indicated in the configuration information.
- ■ When second mapping information between the QoS flow and the bearer is configured in the SDAP layer entity configuration information configured in the handover command message, first mapping information between the QoS flow and the bearer, having been applied for the source base station, may be released, and the second mapping information between the QoS flow and the bearer may be applied. As another method, the first mapping information between the QoS flow and the bearer, having been applied for the source base station, may be replaced with the second mapping information between the QoS flow and the bearer.
- ■ When a data discard timer value is configured in the PDCP layer entity configuration information configured in the handover command message, the discard timer value may be directly applied to the PDCP layer entity corresponding to the bearer identifier of the configuration information.
- ■ When a drb-ContinueROHC indicator is configured as "False" in the PDCP layer entity configuration information configured in the handover command message, the header compression or decompression protocol context may be initialized in the PDCP layer entity corresponding to the bearer identifier of the configuration information. When the drb-ContinueROHC indicator is configured as "True", the header compression or decompression protocol context is not initialized in the PDCP layer entity corresponding to the bearer identifier of the configuration information.
- ■ When a reordering timer value is configured in the PDCP layer entity configuration information configured in the handover command message, the reordering timer value may be directly applied to the PDCP layer entity corresponding to the bearer identifier of the configuration information.
- ■ When the handover command message is received, the PDCP layer entity may be re-established. For example, for the SRB, window state variables may be initialized, wherein the stored multiple items of data (PDCP SDU or PDCP PDU) may be discarded, for UM DRB, window state variables may be initialized, wherein the transmission or retransmission may be performed by performing, in ascending order of COUNT values, compression, ciphering, or integrity protection for multiple items of data that have not yet been transmitted to the lower layer entity or multiple items of data for which the PDCP discard timer has not expired, based on the header (or data) compression context or security key of the target base station, the reordering timer may be stopped and initialized when the reordering timer is running, and the received multiple items of data (PDCP SDU or PDCP PDU) may be sequentially processed and transferred to the upper layer entity, and for AM DRB, window state variables may not be initialized, wherein the transmission or retransmission may be performed by performing compression, ciphering, or integrity protection based on the header (or data) compression context or security key in ascending order of the PDCP sequence number or the COUNT value, starting from the first data (PDCP SDU or PDCP PDU) for which successful transfer is not identified from the lower layer entity.
- When the security key-related configuration information or the security algorithm is configured in the security configuration information configured in the handover command message, a new security key or security configuration information may be derived by using the configuration information, the existing security key or security configuration information may be released, or the existing security key or security configuration information may be replaced with the new security key or security configuration information.
- When a new logical channel identifier is configured in the RLC layer configuration information configured in the handover command message, the new logical channel identifier may be configured by releasing the existing logical channel identifier corresponding to the bearer identifier indicated in the RLC layer entity configuration information, or replace the existing logical channel identifier with the new logical channel identifier.
- When the RLC re-establishment procedure is configured in the RLC layer entity configuration information configured in the handover command message, the RLC re-establishment procedure for the RLC layer entity corresponding to the bearer identifier indicated in the RLC layer configuration information may be performed. That is, specifically, the RLC re-establishment procedure may be performed so that the transmission RLC layer entity can perform a procedure of discarding all the stored multiple items of data. In addition, when the reordering timer is running, the reception RLC layer entity may stop and initialize the reordering timer, and may process all the stored multiple items of data to transmit the same to the upper layer entity. In addition, the MAC layer entity may be initialized. In addition, the MAC layer entity for the source base station may be initialized and may be also used for the MAC layer entity for the target base station.
- In the description above, the MAC layer entity may be initialized, and data transmission or reception may be suspended for the source base station and each bearer. In addition, the MAC layer entity may stop PDCCH monitoring on the first terminal identifier (C-RNTI) allocated from the source base station. In addition, the MAC layer entity may also stop a procedure of requesting scheduling to the source base station, or may release the transmission resource for scheduling. In addition, the PHY or MAC layer entity may perform the procedure of random access to the target base station. When the procedure of handover to the target base station is successfully completed, the PHY or MAC layer entity may resume data transmission or reception to the target base station, and may start PDCCH monitoring on the second terminal identifier (C-RNTI) allocated from the target base station. In addition, the PHY or MAC layer entity may receive a system frame number from the target base station and perform synchronization. In addition, the PHY or MAC layer entity may start or perform a procedure of requesting scheduling to the target base station.
- In the description above, the PHY layer entity may stop the procedure of performing channel measurement, channel measurement report, or transmitting HARQ ACK or NACK to the source base station. In addition, the PHY layer performs a downlink synchronization procedure with respect to the target base station. In addition, configuration information about the target base station (or Spcell or Pcell) received in the handover command message may be configured for the lower layer entity or the PHY layer entity. When the procedure of handover to the target base station is successfully completed, the PHY layer entity may start transmitting or transmit HARQ ACK or NACK information to the target base station. In addition, the PHY or MAC layer entity may receive a system frame number from the target base station and perform synchronization. In addition, the PHY or MAC layer entity may start or perform a procedure of requesting scheduling to the target base station.
- When the RLC layer entity configuration information configured in the handover command message is newly configured, the RLC re-establishment procedure may be performed for the RLC layer entity corresponding to the bearer identifier indicated in the RLC layer configuration information.
- When the second priority for the logical channel is newly configured in the MAC layer configuration information configured in the handover command message, the configuration may made by releasing the first priority corresponding to the logical channel identifier indicated in the configuration information, or replacing the first priority corresponding to the logical channel identifier with the second priority newly configured above.
- > When the second priority bit rate (prioritizedBitRate, PBR) for the logical channel is newly configured in the MAC layer entity configuration information configured in the handover command message, the configuration may made by releasing the first priority bit rate (prioritizedBitRate, PBR) corresponding to the logical channel identifier indicated in the configuration information, or replacing the first priority bit rate (prioritizedBitRate, PBR) corresponding to the logical channel identifier with the second priority bit rate (prioritizedBitRate, PBR) newly configured above. In the description above, the priority bit rate is a value that increases for each logical channel every predetermined time (for example, TTI), when the uplink transmission resource is received, a logical channel prioritization (LCP) procedure may be performed, data for the logical channel may be transmitted in consideration of the priority and the priority bit rate, and more data may be transmitted as the priority is higher or the value of the priority bit rate is greater.
- > When the second bucket size (bucketSizeDuration) for the logical channel is newly configured in the MAC layer entity configuration information configured in the handover command message, the configuration may be made by releasing the first bucket size (bucketSizeDuration) corresponding to the logical channel identifier indicated in the configuration information, or replacing the first bucket size (bucketSizeDuration) corresponding to the logical channel identifier with the second bucket size (bucketSizeDuration) newly configured above. In the description above, the bucket size indicates the maximum value that the priority bit rate may have when the priority bit rate is accumulated.

■> When second allowable SCell information, allowable sub-carrier spacing information, maximum PUSCH period, or logical channel group configuration information is configured in the MAC layer configuration information configured in the handover command message, the configuration may be made by releasing the previously configured first allowable SCell information, allowable sub-carrier spacing information, maximum PUSCH period, or logical channel group configuration information, or replacing the previously configured first allowable SCell information, allowable subcarrier spacing information, maximum PUSCH period, or logical channel group configuration information with the second allowable SCell information, allowable sub-carrier spacing information, maximum PUSCH period, or logical channel group configuration information newly configured above.

In a case where the terminal receives a handover command message, when the second handover method (for example, the second embodiment of the disclosure or the DAPS handover method) is indicated or configured in the handover command message, ReconfigWithSync information, or mobilityControlInfo information, when the DAPS handover method is indicated or configured for each bearer identifier, when the second embodiment (DAPS handover method) proposed in the disclosure is configured for a bearer in the bearer configuration information, or when the second embodiment (DAPS handover method) proposed in the disclosure is configured for at least one bearer in the bearer configuration information, ■ When a default bearer is configured in the SDAP layer entity configuration information configured in the handover command message, the DAPS handover method proposed above in the disclosure may be performed, the second SDAP layer entity structure may be applied to maintain the default bearer for the existing source base station, and the default bearer information indicated in the configuration information may be configured as a default bearer for the target base station. As another method, when the first condition proposed in the disclosure is satisfied, switching from the default bearer for the existing source base station to the default bearer for the target base station indicated in the configuration information may be performed.

■ When second mapping information between the QoS flow and the bearer is configured in the SDAP layer entity configuration information configured in the handover command message, the DAPS handover method proposed above in the disclosure may be performed, and the second SDAP layer entity structure may be applied to maintain the first mapping information between the QoS flow and the bearer, having been applied to data for the source base station, and the second mapping information between the QoS flow and the bearer may be applied to data for the target base station. As another method, when the first condition proposed in the disclosure is satisfied, the second mapping information between the QoS flow and the bearer for the target base station may be applied.

■ When the data discard timer value is configured in the PDCP layer entity configuration information configured in the handover command message, the DAPS handover method proposed above in the disclosure may be performed, and the second PDCP layer entity structure may be applied to directly apply the discard timer value to the PDCP layer entity corresponding to the bearer identifier of the configuration information.

■ The PDCP layer entity in which the DAPS handover method is indicated or configured in the handover command message may not be re-established, and the following procedures may be performed. For example, for SRB, window state variables may be initialized (initialization of variables may be omitted in order to perform fallback when DAPS handover fails). Specifically, when the COUNT value or the window state variable value is initialized, in order to solve the security issue (the risk of exposure of security keys caused by transmitting different items of data by using the same security key and same COUNT value when the DAPS handover fallback procedure is performed), which occurs from using the same security key and reusing the same COUNT value from the beginning when the DAPS handover fallback procedure is performed, the COUNT value, a transmission window state variable (TX NEXT), or a reception window state variable (RX NEXT and RX DELIV) may not be initialized and the values of the existing variables may be continuously used or maintained. Alternatively, the stored multiple items of data (PDCP SDU or PDCP PDU) may be discarded. Alternatively, for UM DRB for which the DAPS handover method is configured, window state variables may not be initialized and multiple items of data that have not yet been transmitted to the lower layer entity or data for which the PDCP discard timer has not expired may be continuously transmitted or received to or from the source base station. Alternatively, for AM DRB for which the DAPS handover method is configured, window state variables may not be initialized and data may be continuously transmitted or received data to or from the source base station. In addition, more specifically, with regard to the procedure for the SRBs, the SRBs for the source base station may be suspended, or for the SRBs for the target base station, in order to solve the security issue that occurs from reusing the same COUNT value from the beginning when the DAPS handover fallback procedure is performed, as described above, the existing COUNT values of the SRBs for the source base station or the values of transmission or reception window variables may be applied to the SRBs established for the target base station or maintained to be used (or by configuring the COUNT values of the SRBs of the source base station or the values of transmission or reception window variables as the COUNT values of SRBs of the target base station or values of transmission or reception window variables). When the security key for the target base station is configured, for the SRBs for the target base station, the security key for the target base station may be derived or the derived security key may be applied, and the PDCP layer entity of the SRBs may perform a ciphering, deciphering, integrity protection, or verification procedure by applying the security key for the target base station. In addition, when the PDCP re-establishment procedure is configured in the handover command message, the PDCP re-establishment procedure may be performed for the SRB. In addition, for SRBs for the source base station, old data (for example, RRC message for the source base station) may be discarded. The procedure for the SRB for the target base station may be defined as a new procedure (e.g., a DAPS SRB establishment or PDCP layer entity re-establishment procedure) and indicated, triggered, or performed, and the procedure for the SRB may be extended and applied to UM DRB or AM DRB for which the DAPS handover method is not configured. As another method, with regard to the procedure for the SRBs, the SRBs for the source base station may be suspended, or when the security key for the target base station is not configured, for the SRBs for the target base station, in order to solve the security issue that occurs from reusing the same COUNT value from the beginning when the DAPS handover fallback procedure is performed, as described above, the existing COUNT values of the SRBs for the source base station or the values of transmission or reception window variables may be applied to the SRBs established for the target base station or maintained to be used (or by configuring the COUNT values of the SRBs of the source base station or the values of transmission or reception window variables as the COUNT values of SRBs of the target base station or values of transmission or reception window variables). However, when the security key for the target base station is configured, the SRBs for the target base station may be established by initializing the COUNT value or the value of transmission or reception window variable. In addition, when the PDCP re-establishment procedure is configured, the PDCP re-establishment procedure may be performed for the SRBs.

■ The PDCP layer entity in which the DAPS handover method is not indicated or configured in the handover command message may re-establish the PDCP layer entity. For example, for the SRB, window state variables may be initialized, wherein the stored multiple items of data (PDCP SDU or PDCP PDU) may be discarded, for UM DRB, window state variables may be initialized, wherein the transmission or retransmission may be performed by performing, in ascending order of COUNT values, compression, ciphering, or integrity protection for multiple items of data that have not yet been transmitted to the lower layer entity or multiple items of data for which the PDCP discard timer has not expired, based on the header (or data) compression context or security key of the target base station, the reordering timer may be stopped and initialized when the reordering timer is running, and the received multiple items of data (PDCP SDU or PDCP PDU) may be sequentially processed and transferred to the upper layer entity, and for AM DRB, window state variables may not be initialized, wherein the transmission or retransmission may be performed by performing compression, ciphering, or integrity protection based on the header (or data) compression context or security key in ascending order of the PDCP sequence number or the COUNT value, starting from the first data (PDCP SDU or PDCP PDU) for which successful transfer is not identified from the lower layer entity. In addition, the RLC layer entity may also perform the re-establishment procedure.

■ When the drb-ContinueROHC indicator is configured as "False" in the PDCP layer configuration information in which the DAPS handover method is indicated or configured in the handover command message, the DAPS handover method proposed above in the disclosure may be performed, and the second PDCP layer entity structure may be applied to use the header compression or decompression protocol context for the source base station, without change, in the PDCP layer entity corresponding to the bearer identifier of the configuration information, to initialize the header compression or decompression protocol context for the target base station, and to start from an initial state (for example, IR state). When the drb-ContinueROHC indicator is configured as "True", the DAPS handover method proposed above in the disclosure may be performed, and the second PDCP layer entity structure may be applied to use the header compression or decompression protocol context for the source base station, without change, in the PDCP layer corresponding to the bearer identifier of the configuration information, to equally apply the header compression or decompression protocol context for the target base station to the header compression or decompression protocol context for the source base station. For example, the header compression or decompression protocol context for the source base station may be applied without change by being copied to the header compression or decompression protocol context for the target base station. As another method, the same header compression or decompression protocol context may be applied to the target base station or the source base station.

■ When the reordering timer value is configured in the PDCP layer entity configuration information in which the DAPS handover method is indicated or configured in the handover command message, the DAPS handover method proposed above in the disclosure may be performed, and the second PDCP layer entity structure may be applied to directly apply the reordering timer value to the PDCP layer entity corresponding to the bearer identifier of the configuration information.

■ When the security key-related configuration information or security algorithm is configured in the security configuration information in which the DAPS handover method is indicated or configured in the handover command message, or when there is an indicator indicating a new procedure in the PDCP layer entity configuration information, a new security key or security configuration information may be derived by using the configuration information, the DAPS handover method proposed above in the disclosure may be performed, the second PDCP layer entity structure may be applied to maintain the existing security key or security configuration information for the source base station, and the security key or security configuration information for the target base station may be configured as the new security key or security configuration information.

- When a new logical channel identifier is configured in the RLC layer configuration information of the bearer in which the DAPS handover method is indicated or configured in the handover command message, the DAPS handover method proposed above in the disclosure may be performed, the second PDCP layer entity structure may be applied to maintain the existing logical channel identifier for the RLC layer entity or the MAC layer entity for the first bearer for the source base station corresponding to the bearer identifier indicated in the RLC layer entity configuration information, and the new logical channel identifier indicated in the configuration information may be configured with respect to the RLC layer entity or the MAC layer entity for the second bearer for the target base station.
- The RLC re-establishment procedure may not be performed for the RLC layer entity for the source base station in the RLC layer entity configuration information of the bearer in which the DAPS handover method configured in the handover command message is indicated or configured. Specifically, the transmission RLC layer entity may continue to transmit the stored multiple items of data without performing the RLC re-establishment procedure, and in addition, the reception RLC layer entity may continuously process the stored multiple items of data together with the receiving data so that the data interruption time does not occur. However, when the first condition proposed in the disclosure is satisfied, the PDCP layer entity for which the DAPS handover method is configured may transfer a data discard indicator for PDCP user data (PDCP data PDU) so as to indicate discarding of data (PDCP data PDU) to the RLC layer entity for the source base station with respect to the AM bearer or the UM bearer according to the method proposed in the disclosure. Accordingly, the RLC layer entity for the source base station discards the PDCP data PDU, but may transmit the PDCP control PDU without discarding the PDCP control PDU.
- The RLC re-establishment procedure may be performed for the RLC layer entity of the bearer in which the DAPS handover method configured in the handover command message is not indicated or configured, or, when the RLC re-establishment procedure is configured, the RLC re-establishment procedure may be performed. That is, specifically, the RLC re-establishment procedure may be performed so that the transmission RLC layer entity performs the procedure of discarding all the stored multiple items of data (PDCP Data PDU or PDCP control PDU). In addition, when the reordering timer is running, the reception RLC layer entity may stop and initialize the reordering timer, and may process all the stored multiple items of data and transmit the same to the upper layer entity.
- When the RLC layer entity configuration information of the bearer in which the DAPS handover method is indicated or configured in the handover command message is newly configured, the DAPS handover method proposed above in the disclosure may be performed, and the second PDCP layer structure is applied so that for the RLC layer entity for the first bearer for the source base station corresponding to the bearer identifier indicated in the RLC layer configuration information, the existing RLC configuration information may be maintained, and for the RLC layer entity for the second bearer for the target base station, the new RLC layer configuration information indicated in the configuration information may be configured.
- Method 1, Method 2, or Method 3 of configuring a MAC layer entity, which is to be proposed in FIG. 1J of the disclosure, may be performed.
- Method 1, Method 2, or Method 3 of configuring the MAC layer entity, which is to be proposed in FIG. 1K, may be performed, the data transmission or reception may be continuously performed for the bearers in which the DAPS handover method is indicated or configured in the MAC layer entity, the MAC layer entity may not be initialized, and the data transmission or reception may be suspended for the bearers in which the DAPS handover method is not indicated or configured.
- The PDCCH monitoring for the first terminal identifier (C-RNTI) allocated from the source base station may be continuously performed without initializing of the MAC layer entity for the source base station. In addition, the MAC layer entity for the source base station may also continue to perform a procedure of requesting scheduling from the source base station. In addition, the PHY or MAC layer entity for the target base station may apply the configuration by using the configuration information to be received in the handover command message and perform the procedure of random access to the target base station. When the procedure of handover to the target base station is successfully completed, the PHY or MAC layer entity for the target base station may start data transmission or reception to the target base station, and may start PDCCH monitoring on the second terminal identifier (C-RNTI) allocated from the target base station. In addition, the PHY or MAC layer entity may receive a system frame number from the target base station and perform synchronization. In addition, the PHY or MAC layer for the target base station may start or perform a procedure of requesting scheduling from the target base station. In the description above, until the connection with the source base station is released or until the second condition proposed in the disclosure is satisfied, the terminal may perform PDCCH monitoring for the first terminal identifier allocated from the source base station in the PI-TY or MAC layer entity for the source base station, and may perform PDCCH monitoring for the second terminal identifier allocated from the target base station in the PHY or MAC layer entity for the target base station. In the description above, when the connection with the source base station is released, or when the second condition proposed in the disclosure is satisfied, the terminal may stop the PDCCH monitoring for the first terminal identifier allocated from the source base station in the PI-TY or MAC layer entity for the source base station, or may release the transmission resource for the scheduling request.
- In the description above, the PHY layer entity for the source base station may maintain configuration information, or may continue to perform the procedure of performing channel measurement for the source base station, performing a channel measurement report, or transmitting HARQ ACK or NACK. In addition, the PHY or MAC layer entity for the target base station performs a downlink synchronization procedure with respect to the target base station. In addition, configuration information of the target base station (or Spcell or Pcell) received in the handover command message may be configured for the lower layer entity or the PHY layer entity for the target base station. When the procedure of handover to the target base station is successfully completed, the PHY or MAC layer entity for the target base station may start transmitting or transmit HARQ ACK or NACK information to the target base station. In addition, the PHY or MAC layer entity for the target base station may receive a system frame number from the target base station and perform synchronization. In addition, the PHY or MAC layer entity for the target base station may start or perform a procedure of requesting scheduling from the target base station, a procedure of performing channel measurement, or a procedure of reporting a channel measurement result. In the description above, until the connection with the source base station is released or until the second condition proposed in the disclosure is satisfied, the terminal may perform PDCCH monitoring on the first terminal identifier allocated from the source base station in the PHY or MAC layer entity for the source base station, and may perform PDCCH monitoring on the second terminal identifier allocated from the target base station in the PHY or MAC layer entity for the target base station. In the description above, when the connection with the source base station is released, or when the second condition proposed in the disclosure is satisfied, the terminal may stop the PDCCH monitoring on the first terminal identifier allocated from the source base station in the PHY or MAC layer entity for the source base station, or may release the transmission resource for the scheduling request.

Figure 1J:
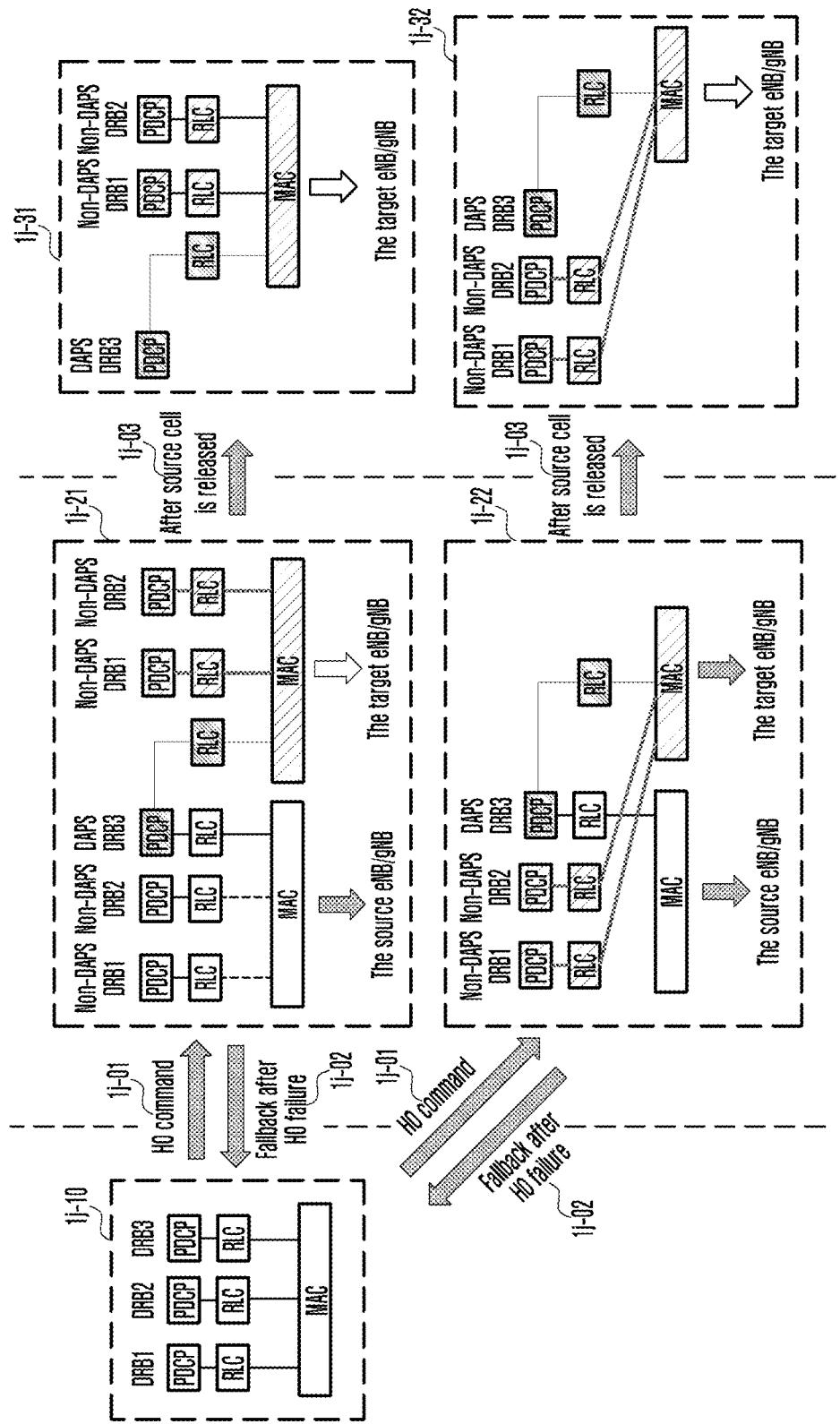
FIG. 1J illustrates a method of applying bearer-specific configuration information when a DAPS handover method is configured, according to an embodiment of the disclosure.

■ Method 1, Method 2, or Method 3 of configuring or processing an SRB, which is to be proposed in FIG. 1J of the disclosure, may be performed.

■ When the second priority for the logical channel is newly configured in the MAC layer entity configuration information configured in the handover command message, the DAPS handover method proposed above in the disclosure may be performed, and the second PDCP layer entity structure may be applied, wherein for the MAC layer entity for the first bearer for the source base station corresponding to the bearer identifier indicated above, the existing configuration information may be maintained, and for the MAC layer entity for the second bearer for the target base station, a new logical channel identifier indicated in the configuration information may be configured, and the newly configured second priority corresponding to the logical channel identifier indicated in the configuration information may be configured. As another method, when the first condition proposed in the disclosure is satisfied, the priority may be applied to the MAC layer entity of the second bearer for the target base station for each logical channel identifier.

■ When the second priority bit rate (prioritizedBitRate, PBR) for the logical channel is newly configured in the MAC layer entity configuration information configured in the handover command message, the DAPS handover method proposed above in the disclosure may be performed, and the second PDCP layer structure may be applied, wherein for the MAC layer entity for the first bearer for the source base station corresponding to the indicated bearer identifier, the existing configuration information may be maintained, and for the MAC layer entity for the second bearer for the target base station, a new logical channel identifier indicated in the configuration information may be configured, and the newly configured second priority bit rate corresponding to the logical channel identifier indicated in the configuration information may be configured. As another method, when the first condition proposed in the disclosure is satisfied, the second priority bit rate may start to be applied to the logical channel identifier in the MAC layer entity for the second bearer for the target base station (in this way, when different handover methods are indicated for each bearer, uplink transmission resources may be fairly distributed). In the description above, the priority bit rate is a value that increases for each logical channel every predetermined time (for example, TTI) when each logical channel identifier starts to be applied, when the uplink transmission resource is received, a logical channel prioritization (LCP) procedure may be performed, data for the logical channel may be transmitted in consideration of the priority and the priority bit rate, and more data may be transmitted as the priority is higher or the value of the priority bit rate is greater.

■ In addition, in a case where the DAPS handover method is applied, when the first condition proposed in the disclosure is not yet satisfied, and thus the terminal needs to transmit uplink data through the first bearer for the source base station, the MAC layer entity for the first bearer may, when performing the LCP procedure, select only the bearers or logical channel identifiers, in which the DAPS handover method (or the handover method which allows data to be continuously transmitted to the source base station even after reception of the handover command message) is indicated, as the target of the LCP procedure, and perform the LCP procedure. This is because for the bearers or logical channel identifiers to which the DAPS handover method is not applied, the uplink data cannot be transmitted to the source base station when the handover command message is received, and thus the bearers or logical channel identifiers should not be selected as the target of the LCP procedure.

■ When the second bucket size (bucketSizeDuration) for the logical channel is newly configured in the MAC layer entity configuration information configured in the handover command message, the DAPS handover method proposed above in the disclosure may be performed, and the second PDCP layer structure may be applied, wherein for the MAC layer entity for the first bearer for the source base station corresponding to the bearer identifier indicated above, the existing configuration information may be maintained, and for the MAC layer entity for the second bearer for the target base station, a new logical channel identifier indicated in the configuration information may be configured, and the newly configured second bucket size corresponding to the logical channel identifier indicated in the configuration information may be configured. As another method, when the first condition proposed in the disclosure is satisfied, the second bucket size may start to be applied to the logical channel identifier in the MAC layer entity for the second bearer for the target base station (in this way, when different handover methods are indicated for each bearer, uplink transmission resources may be fairly distributed). The bucket size indicates the maximum value that the priority bit rate may have when the priority bit rate is accumulated.

■ When second allowable SCell information, allowable sub-carrier spacing information, maximum PUSCH period, or logical channel group configuration information is configured in the MAC layer entity configuration information configured in the handover command message, the DAPS handover method proposed above of the disclosure may be performed, and the second PDCP layer structure may be applied to maintain the existing configuration information for the MAC layer entity for the first bearer for the source base station corresponding to the bearer identifier indicated above, and configure the second allowable SCell information, allowable sub-carrier spacing information, maximum PUSCH period, or logical channel group configuration information indicated in the configuration information for the MAC layer entity of the second bearer for the target base station.

FIG. 1J illustrates a method of applying bearer-specific configuration information when a DAPS handover method is configured, according to an embodiment of the disclosure.

As proposed in FIG. 1J in the disclosure, when the terminal receives the handover command message (operation 1j-01), when the second handover method (for example, the second embodiment of the disclosure or the DAPS handover method) is indicated in the ReconfigWithSync information, when the DAPS handover method is indicated for each bearer identifier or logical channel identifier, when the DAPS handover method is configured for at least one bearer, or when the DAPS handover method is configured for a bearer, the terminal may generate or establish the MAC layer entity for the target base station (or target cell) at a time point of receiving the handover command message, may continue to transmit or receive data to or from the source base station only for bearers (AM bearers or UM bearers) to which the DAPS handover method is indicated through the MAC layer entity for the source base station (or source cell) until the first condition proposed in the disclosure is satisfied from the time point of receiving the handover command message, and when the first condition is satisfied, may switch the uplink data to the target base station and receive downlink data from the source base station until the connection with the source base station is released. However, for the bearers to which the DAPS handover method is not indicated, the terminal cannot perform data transmission or reception to or from the source base station continuously or before until the first condition proposed in the disclosure is satisfied from the time point of receiving the handover command message. Accordingly, in order to cause the terminal to perform the operation proposed in the disclosure, one or more of the following methods may be applied, and modeling as shown in operation 1j-21 or 1j-22 may be performed. When the second condition proposed in the disclosure is satisfied and the source base station is thus released, modeling as shown in operation 1j-31 or 1j-32 may be performed.

As proposed above in the disclosure, in a case where the terminal receives the handover command message, when the second handover method (for example, the second embodiment of the disclosure or the DAPS handover method) is indicated in the ReconfigWithSync information, when the DAPS handover method is indicated for each bearer identifier or logical channel identifier, when the DAPS handover method is configured for at least one bearer, or when the DAPS handover method is configured for a bearer, the SRBs configured in the MAC layer entity for the source base station may be suspended, and the upper layer entity (for example, the RRC layer entity) for the terminal may indicate the MAC layer entity for the source base station to perform the reconfiguration (MAC reconfiguration) with configuration information remaining after excluding the configuration information related to the bearer to which the DAPS handover method is not indicated in the handover command message from the configuration information of the current MAC layer entity. As another method, the upper layer entity (for example, the RRC layer entity) of the terminal may indicate the MAC layer entity for the source base station to perform the reconfiguration (MAC reconfiguration) with configuration information including only the configuration information related to the bearer to which the DAPS handover method is indicated in the handover command message from the configuration information of the current MAC layer entity. When the terminal reconfigures the MAC layer entity for the source base station, the MAC layer entity for the source base station of the terminal maintains only the logical channel identifiers to which the DAPS handover method is indicated, or the priority bit rate or bucket size corresponding to the logical channel identifiers, and releases, no longer uses, or no longer applies the logical channel identifiers corresponding to the bearer to which the DAPS handover method is not indicated, or the priority bit rate or bucket size corresponding to the logical channel identifiers. In addition, in the description above, the upper layer entity (for example, the RRC layer entity) of the terminal may perform the PDCP re-establishment procedure or RLC re-establishment procedure on the bearer to which the DAPS handover method is not indicated, may apply the PDCP configuration information or RLC configuration information configured in the handover message, stop the bearer, stop the bearer in the MAC layer entity for the source base station, or configure the bearer for the MAC layer for the target base station (may configure the bearer for the MAC layer entity for the target base station when the first condition is satisfied), may indicate the MAC layer entity for the target base station so that bearer configuration information such as the logical channel identifier, priority bit rate, or bucket size configured for the target base station for the bearer to which the DAPS handover method is not indicated in the handover command message is configured or applied to the MAC layer entity for the target base station, and may establish a connection by switching the connection of the PDCP layer entity or the RLC layer entity corresponding to the bearer to which the DAPS handover method is not indicated from the MAC layer entity for the source base station to the MAC layer entity for the target base station. Thereafter, for example, when the MAC layer entity for the source base station of the terminal performs the logical channel prioritization (LCP) procedure for data transmission from that time point, only logical channel identifiers corresponding to the bearer to which the DAPS handover method is indicated may be selected as a candidate group, and the LCP procedure may be performed. The procedure, performed by the upper layer entity (for example, the RRC layer), of reconfiguring the MAC layer entity for the source base station may partially reset (may perform partial MAC reset for) the MAC layer entity for the source base station to perform the same procedure. For example, configuration information of the MAC layer entity for the bearer to which the DAPS handover method is not indicated may be initialized or released, or the application thereof may be suspended. In addition, the data transmission or reception to or from the source base station may be performed until the first condition proposed in the disclosure is satisfied. In the description above, for the logical channel identifier corresponding to the bearer to which the DAPS handover method is not indicated, the MAC layer entity for the source base station may first initialize the bit rate, may no longer apply a priority bit rate cumulative calculation procedure, and may release or stop the bearer, and for the logical channel identifier corresponding to the bearer to which the DAPS handover method is indicated, the MAC layer entity for the source base station may continue to maintain the priority bit rate, and may perform the cumulative calculation procedure. When the first condition is satisfied, the data transmission may be switched to the target base station, the MAC layer entity for the target base station may first initialize the priority bit rate for the newly configured logical channel identifiers (logical channel identifiers corresponding to the bearer to which the DAPS handover method is indicated or the bearer to which the DAPS handover method is not indicated), or may start the cumulative calculation (as another method, when the handover command message for the MAC layer entity for the target base station is received, the priority bit rate may be first initialized and the cumulative calculation may be started), and when the bearers to which the DAPS handover method is not indicated have been configured or have been suspended, the MAC layer entity for the target base station may be configured or resumed to perform data transmission or reception to or from the target base station, and may initialize the priority bit rate or start cumulative calculation. In addition, the data reception may be performed from the source base station or the target base station until the second condition proposed in the disclosure is satisfied, and when the second condition is satisfied (operation 1*j*-03), the MAC layer entity for the source base station may be initialized, wherein the RLC layer entity, the PDCP layer entity, or the bearer configuration information corresponding to the bearer to which the DAPS handover method connected to the MAC layer entity for the source base station is not indicated may be released from the MAC layer entity for the source base station, and the RLC layer entity or bearer configuration information corresponding to the bearer to which the DAPS handover method is indicated may be released from the second PDCP layer entity structure or the MAC layer entity for the source base station (operation 1*j*-31 or 1*j*-32). When the handover procedure fails and the connection with the source base station is valid as proposed below in the disclosure, the terminal may perform a fallback procedure to the source base station (operation 1*j*-02), may resume SRB configured in the MAC layer entity of the source base station, may report handover failure, may apply the existing bearer configuration information of the source base station before receiving the handover command message again, may apply the configuration information of the original MAC layer entity (for example, the RRC layer entity may reconfigure the MAC layer entity configuration information used before receiving the handover command message for the MAC layer entity configuration), and may resume data transmission or reception with the source base station for each bearer (operation 1*j*-10). As another method, the upper layer entity (for example, the RRC layer entity) of the terminal may indicate the RLC re-establishment procedure for the bearer to which the DAPS handover method is indicated or the bearer to which the DAPS handover method is not indicated. As another method, configuration information of the MAC layer entity for the source base station, which is to be applied when the source base station performs the DAPS handover method, may be also configured via an RRC message.

In the methods proposed in the disclosure, in a case where the terminal receives the handover command message, when the second handover method (for example, the second embodiment of the disclosure or the DAPS handover method) is indicated in the ReconfigWithSync information, when the DAPS handover method is indicated for each bearer identifier or each logical channel identifier, when the DAPS handover method is configured for at least one bearer, or when the DAPS handover method is configured for a bearer, SRBs configured for the MAC layer entity for the source base station may be applied by applying one or more of the following methods.

In a case where the terminal receives the handover command message, when the second handover method (for example, the second embodiment of the disclosure or the DAPS handover method) is indicated in the ReconfigWithSync information, when the DAPS handover method is indicated for each bearer identifier or each logical channel identifier, when the DAPS handover method is configured for at least one bearer, or when the DAPS handover method is configured for a bearer,

- ■ Method 1: SRB may be suspended in the MAC layer entity for the source base station. Alternatively, window state variables may be initialized by performing the RLC layer entity re-establishment procedure or the PDCP layer entity re-establishment procedure of the SRBs, and the stored multiple items of data (PDCP SDU, PDCP PDU, RLC SDU, or RLC PDU) may be discarded. Alternatively, SRBs may be configured for the MAC layer entity for the target base station according to the configuration received in the handover message. As another method, SRBs of the MAC layer entity for the source base station may be configured according to the configuration received in the handover message, and may be switched and connected to the MAC layer entity for the target base station. When the terminal fails to perform the handover procedure and performs a fallback procedure, the terminal may resume the SRBs suspended in the MAC layer entity for the source base station or reconfigure the SRBs configured for the target base station to the existing configuration for the source base station, and resume the SRBs by switching and connecting to the MAC layer entity for the source base station.

■ Method 2: SRB may be suspended in the MAC layer entity for the source base station. Alternatively, the RLC layer entity re-establishment procedure or the PDCP layer entity re-establishment procedure of the SRBs may be suspended without being performed. Alternatively, SRBs may be configured for the MAC layer entity for the target base station according to the configuration received in the handover message. As another method, SRBs of the MAC layer entity for the source base station may be configured according to the configuration received in the handover message, and may be switched and connected to the MAC layer entity for the target base station. When the terminal fails perform the handover procedure and performs a fallback procedure, the terminal may resume the SRBs suspended in the MAC layer entity for the source base station or reconfigure the SRBs configured in the target base station to the existing configuration for the source base station, and resume the SRBs by performing switching and connection to the MAC layer entity for the source base station.

■ Method 3: SRB may be suspended in the MAC layer entity for the source base station. Alternatively, the RLC layer entity re-establishment procedure of the PDCP layer entity re-establishment procedure of the SRBs is not performed, and window state variables are not initialized, but the stored multiple items of data (PDCP SDU, PDCP PDU, RLC SDU, or RLC PDU) may be discarded (in order to prevent non-transmitted RRC messages from being transmitted unnecessarily later). Alternatively, SRBs may be configured for the MAC layer entity for the target base station according to the configuration received in the handover message. As another method, SRBs of the MAC layer entity for the source base station may be configured according to the configuration received in the handover message, and may be switched and connected to the MAC layer entity for the target base station. When the terminal fails to perform the handover procedure and performs a fallback procedure, the terminal may resume the SRBs suspended in the MAC layer entity for the source base station or reconfigure the SRBs configured for the target base station to the existing configuration for the source base station, and resume the SRBs by performing switching and connecting to the MAC layer entity for the source base station. In addition, more specifically, with regard to the procedure for the SRBs, the SRBs for the source base station may be suspended, or for the SRBs for the target base station, in order to solve the security issue that occurs from reusing the same COUNT value from the beginning when the DAPS handover fallback procedure is performed, as described above, the existing COUNT values of the SRBs for the source base station or the values of transmission or reception window variables may be applied to the SRBs established for the target base station or maintained to be used (or by configuring the COUNT values of the SRBs of the source base station or the values of transmission or reception window variables as the COUNT values of SRBs of the target base station or values of transmission or reception window variables). In addition, for the SRBs for the target base station, the security key for the target base station may be derived or the derived security key may be applied, and the PDCP layer entity of the SRBs may perform a ciphering, deciphering, integrity protection, or verification procedure by applying the security key for the target base station. In addition, for SRBs for the source base station, old data (for example, RRC message for the source base station) may be discarded. The procedure for the SRB for the target base station may be defined as a new procedure (e.g., a DAPS SRB establishment or PDCP layer entity re-establishment procedure) and indicated, triggered, or performed, and the procedure for the SRB may be extended and applied to UM DRB or AM DRB for which the DAPS handover method is not configured. When the terminal fails to perform the handover procedure and performs a fallback procedure, more specifically, the terminal may resume the SRBs for the source base station or may release the SRBs for the target base station. As another method, in order to solve the security issue that occurs from reusing the same COUNT value from the beginning, the existing COUNT values of the SRBs for the target base station or the values of transmission or reception window variables may be applied to the SRBs for the source base station or maintained to be used (or by configuring the COUNT values of the SRBs of the target base station or the values of transmission or reception window variables as the COUNT values of SRBs of the source base station or values of transmission or reception window variables), and the SRBs for the target base station may be released. In addition, for the SRBs for the source base station, the security key for the source base station may be applied, and the PDCP layer entity of the SRBs may perform a ciphering, deciphering, integrity protection, or verification procedure by applying the security key for the source base station. In addition, for SRBs for the source base station, old data (for example, RRC message for the source base station) may be discarded. The procedure for the SRB may be extended and applied to UM DRB or AM DRB for which the DAPS handover method is not configured. As another method, the SRBs for the source base station may be suspended, or when the security key for the target base station is not configured, for the SRBs for the target base station, in order to solve the security issue that occurs from reusing the same COUNT value from the beginning when the DAPS handover fallback procedure is performed, as described above, the existing COUNT values of the SRBs for the source base station or the values of transmission or reception window variables may be applied to the SRBs established for the target base station or maintained to be used (or by configuring the COUNT values of the SRBs of the source base station or the values of transmission or reception window variables as the COUNT values of SRBs of the target base station or values of transmission or reception window variables). However, in a case where the security key for the target base station is configured, when the SRBs for the target base station are established, the SRBs may be may be established through initialization of the COUNT value or the value of transmission or reception window variable. In addition, when the PDCP re-establishment procedure is configured, the PDCP re-establishment procedure may be performed for the SRBs.

In addition, in a case where the terminal performs the second embodiment (the DAPS handover method) of the efficient handover method proposed in the disclosure, when the terminal fails to perform handover, a method of promptly performing fallback to the source base station and reconfiguring the connection by using the features of the DAPS handover method proposed above is proposed. Specifically, the feature of the DAPS handover method proposed in the disclosure may mean that data transmission or reception is performed while maintaining the connection with the source base station even when the handover procedure is performed, and the fallback using a wireless connection made with an existing source base station even when the handover fails is specifically proposed in the disclosure below.

As described with reference to FIG. 1H of the disclosure, in the second embodiment of the efficient handover method (DAPS handover method), even when the terminal receives the handover command message from the source base station, the terminal may perform the procedure of handover to the target base station while maintaining data transmission or reception with the source base station, as proposed in operation 1h-02. In addition, the disclosure proposes a procedure of performing fallback to the source base station when the procedure of handover to the target base station fails.

As proposed above, when the terminal fails to perform the procedure of handover to the target base station and performs fallback to the source base station, a method of determining whether the wireless connection between the terminal and the source base station is valid is required. This is because in a case where the wireless connection between the terminal and the source base station is not valid, when the terminal fails to perform the handover and performs the fallback to the source base station, the procedure of fallback to the source base station also fails, and thus the data interruption time excessively increases, resulting in significant data loss. In addition, when the wireless connection between the terminal and the source base station is valid, the SRB configured in the terminal and the source base station needs to be maintained.

First, the disclosure proposes new timers applicable to the handover method, and proposes specific operations of each of the timers. In addition, the specific operations of the timer may be different from each other according to the type of the handover method indicated by the handover command message in the base station. In addition, a method of releasing or maintaining the connection with the source base station or the SRB configuration according to the handover method is proposed.

In order to efficiently perform the handover procedure, the disclosure proposes introduction of a first timer (for example, T304), a second timer (for example, T310), a third timer (for example, T312), or a fourth timer (for example, a timer for fallback), and driving and applying the timer in the handover procedure. The first timer (for example, T304), the second timer (for example, T310), the third timer (for example, T312), or the fourth timer (for example, the timer for fallback) proposed in the disclosure is proposed to perform different operations as follows according to the type of the handover method indicated by the handover command message. In the description above, the first timer (for example, T304) is a timer for determining whether handover has been successfully performed, the second timer (for example, T310) is a timer for determining whether the wireless connection is valid, and the third timer (for example, T312) is an auxiliary timer for determining whether the wireless connection is valid, and a timer for triggering a frequency measurement procedure and reporting a frequency measurement result. In addition, the fourth timer (for example, the timer for fallback) is a timer for, when handover fails while performing the second embodiment (DAPS handover method) of the efficient handover method proposed in the disclosure, performing the procedure of fallback to the source base station, transmitting a message indicating that handover failure has been performed to the source base station, and determining whether the fallback procedure has been successfully performed or has failed.

The specific operations of the first timer (for example, T304), the second timer (for example, T310), the third timer (for example, T312), or the fourth timer (for example, the timer for fallback) proposed to support the efficient handover method in the disclosure are proposed as follows according to the indicated handover method.

1> In a case where the terminal receives, from the lower layer entity (for example, the MAC layer entity or the PHY layer entity), an out-of-sync indication indicating that the synchronization of the radio connection signal does not match a predetermined number of times (for example, the number may be configured by the base station), and detects a problem in the physical layer entity, when the first timer (for example, T304) is not running, the terminal may start the second timer (for example, T310). In addition, when the terminal receives, from the lower layer entity, an in-sync indication indicating that the synchronization of the radio connection signal well matches a predetermined number of times (for example, the number may be configured by the base station), when the handover procedure is triggered (started), or when the RRC connection re-establishment procedure is started, the terminal stops the second timer. When the second timer has expired, the terminal triggers or starts the RRC connection re-establishment procedure. Alternatively, the terminal transitions to the RRC idle mode and triggers or starts the RRC connection re-establishment procedure.

1> The terminal starts the third timer when the frequency measurement procedure is triggered for the frequency measurement identifier for which the third timer (for example, T312) is configured while the second timer (for example, T310) is running. In addition, the terminal stops the third timer when the terminal receives, from the lower layer entity, an in-sync indication indicating that the synchronization of the radio connection signal well matches a predetermined number of times (for example, the number may be configured by the base station), when the handover procedure is triggered (started), or when the RRC connection re-establishment procedure is started. When the third timer has expired, the terminal triggers or starts the RRC connection re-establishment procedure. Alternatively, the terminal transitions to the RRC idle mode and triggers or starts the RRC connection re-establishment procedure 1> In a case where the first handover method (for example, the first embodiment or the general handover method) is indicated in the handover command message (a message including a mobility indication (MobilityControl info or ReconfigurationWithSync) or a handover indication in the RRCReconfiguration message) received from the base station by the terminal, in a case where the terminal receives the handover command message and the first handover method (for example, the first embodiment of the disclosure or the general handover method) is indicated in the handover command message, ReconfigWithSync information, or MobilityControlInfo information, in a case where the second embodiment (DAPS handover method) proposed in the disclosure is not configured, or in a case where the second embodiment (DAPS handover method) proposed in the disclosure is not configured for a bearer in the bearer configuration information,

- ■ 2> in the disclosure, the terminal triggers the handover procedure and starts the first timer (for example, T304) when receiving the handover command message (the message including the mobility indication (MobilityControl info or ReconfigurationWithSync) or the handover indication in the RRCReconfiguration message).
- ■ 2> When the handover procedure is triggered, the terminal releases the SRB (for example, SRB1) configured for the source base station and configures the SRB (for example, SRB1) for the target base station, based on the configuration information configured in the handover command message.
- ■ 2> In a case where the handover procedure is triggered, when the second timer (for example, T310) is running, the terminal may stop the second timer. Even though the condition (when the asynchronous indicator of the radio connection signal is received from the lower layer entity a predetermined number of times) that the second timer is started when the first timer (for example, T304) is running is satisfied, the terminal may not start the second timer. That is, when the first timer is running, the second timer may not be used.
- ■ 2> When the handover procedure is triggered and the third timer (for example, T312) is running, the terminal may stop the third timer. In addition, the condition (when the frequency measurement procedure is triggered for the frequency measurement identifier for which the third timer is configured) that the third timer is started only when the second timer (for example, T310) is running is satisfied, the terminal may start the third timer. That is, because the second timer is not used when the first timer (for example, T304) is running, the third timer may also not be used.
- ■ 2> When the terminal successfully completes the procedure of handover to the target base station, or when the terminal successfully completes the random access procedure, the terminal stops the first timer (for example, T304).
- ■ 2> When the first timer (for example, T304) has expired (for example, when the procedure of handover to the target base station fails), the terminal performs the RRC connection re-establishment procedure (the terminal releases the connection with the base station, performs the RRC connection procedure again from the beginning, that is, performs the cell selection or reselection procedure, performs the random access procedure, and transmits the RRC connection reestablishment request message).

1> In a case where the second handover method (for example, the second embodiment or the DAPS handover method) is indicated in the handover command message (the message including the mobility indication (MobilityControl info or ReconfigurationWithSync) or the handover indication in the RRCReconfiguration message) received from the base station by the terminal (or the case to be extended and applied even when the conditional handover method is indicated together), a case where the second embodiment (DAPS handover method) proposed in the disclosure is configured in the handover command message, ReconfigWithSync information, and MobilityControlInfo information when the terminal receives the handover command message, a case where the second embodiment (DAPS handover method) proposed in the disclosure is configured for a bearer in the bearer configuration information, or a case where the second embodiment (DAPS handover method) proposed in the disclosure is configured for at least one bearer in the bearer configuration information,

- ■ 2> in the disclosure, when the terminal receives the handover command message (the message including the mobility indication (MobilityControl info or ReconfigurationWithSync) or the handover indication in the RRCReconfiguration message), the terminal triggers the handover procedure and starts the first timer (for example, T304). When the conditional handover method is indicated together, the terminal may select one cell from among multiple target cells and start the first timer when the handover procedure is started or the random access procedure is performed.
- ■ 2> In a case where the handover procedure is triggered, the terminal maintains or stops the SRB (for example, SRB1) configured for the source base station when the DAPS handover method is started, and configures the SRB (for example, SRB1) for the target base station, based on the configuration information configured in the handover command message. As another method, in a case where the handover procedure is triggered, the terminal may maintain or stop the SRB (for example, SRB1) configured for the source base station when the DAPS handover method is started, initializes a window state variable by re-establishing the PDCP layer entity or re-establishing the RLC layer entity with respect to the SRB for the source base station, stop the timer, indicate to discard the stored multiple items of data (PDCP SDU or PDCP PDU) (which may be performed when the fallback procedure proposed in the disclosure is triggered), and configure the SRB (for example, SRB1) for the target base station, based on the configuration information configured in the handover command message. As another method, the terminal may configure the first bearer for the source base station and the second bearer for the target base station by applying the second PDCP layer entity structure proposed in the disclosure to the SRB. As another method, when the second PDCP layer structure is applied to the SRB, the terminal may initialize the window state variable by re-establishing the PDCP layer entity for the first bearer or re-establishing the RLC device entity, stop the timer, and indicate to discard the stored multiple items of data (PDCP SDU or PDCP PDU) (which may be performed when the fallback procedure proposed in the disclosure is triggered). That is, as another method, when the fallback procedure proposed in the disclosure is triggered, the terminal may perform a procedure of discarding multiple items of data (for example, old RRC messages) remaining in the SRB for the source base station or stored in the buffer, indicate or trigger a procedure, performed by the upper layer entity (for example, the RRC layer entity) of the terminal, of discarding multiple items of data (for example, old RRC messages) remaining in the PDCP layer entity for the SRB or stored in the buffer. This is because it is necessary to prevent old RRC messages from being transmitted to the source base station.

■ 2> In a case where the terminal triggers the DAPS handover method upon triggering the handover procedure, even when the second timer (for example, T310) for the source base station is running, the second timer may not be stopped. In addition, when the condition (when the asynchronous indicator of the radio connection signal is received from the lower layer entity a predetermined number of times) for starting the second timer even when the first timer is running (or not running) is satisfied, the second timer may be started. The second timer may operate for the wireless connection between the terminal and the source base station. As another method, two second timers operate, wherein one second timer operates for the wireless connection between the terminal and the source base station, and the other second timer operates for the wireless connection between the terminal and the target base station. That is, even when the first timer is running, the second timer may be used for the wireless connection with the source base station or the target base station. However, even in a case where the second timer has expired, when the first timer does not expires and is running, the terminal may not trigger the RRC connection re-establishment procedure. That is, specifically, when the first timer has not expired and is running even in a case where the second timer for the source base station has expired or the wireless connection failure (RLF) occurs, when the procedure of random access to the target base station is being performed, or when the procedure of handover to the target base station is performed, the terminal may release the radio connection with the source base station without triggering the RRC connection re-establishment procedure, may not release the RRC configuration information (for example, bearer configuration information, etc.) having been configured from the source base station, and may reuse the same when the RRC connection re-establishment procedure is triggered later. In addition, even in a case where the second timer has expired, when the first timer does not expires and is running, the terminal may report to the source base station or the target base station that the source connection has failed, without triggering the RRC connection re-establishment procedure, may release the connection with the source base station (for example, may release the first bearers for the source base station), or may stop the first bearers for the source base station. However, when the second timer has expired and the first timer has expired, has been stopped, or has not started and is thus not running, the terminal may trigger the RRC connection re-establishment procedure. The reason why the second timer is operated even when the handover procedure is performed is to allow the fallback procedure to be performed in a case where the wireless connection between the terminal and the source base station or the target base station is valid when the wireless connection between the terminal and the source base station or the target base station is monitored and the handover failure occurs. In addition, in a case where the second timer for the target base station has expired or the wireless connection with the target base station has failed, when the first timer has expired, has been stopped, or has not started and is thus not running, or when the procedure of random access to the target base station has been successfully performed, the RRC connection re-establishment procedure may be triggered.

■ 2> In a case where the terminal triggers the DAPS handover method upon triggering the handover procedure, even when the third timer (for example, T312) for the source base station is running, the third timer may not be stopped. When the condition (when the frequency measurement procedure is triggered for the frequency measurement identifier for which the third timer is configured) that the third timer is started only when the second timer is running is satisfied, the terminal may start the third timer. That is, the terminal uses the second timer even when the first timer is running, and thus the third timer may also be used. The third timer may operate for the wireless connection between the terminal and the source base station. As another method, two third timers may operate, wherein one third timer operates for the wireless connection between the terminal and the source base station, and the other third timer operates for the wireless connection between the terminal and the target base station. That is, even when the first timer is running, the third timer may be used for the wireless connection with the source base station or the target base station. However, even when the third timer has expired, when the first timer has not expired and is running, the terminal may not trigger the RRC connection re-establishment procedure. In addition, when the first timer does not expire and is running even when the third timer expires, the terminal may report to the source base station or the target base station that the source connection has failed, without triggering the RRC connection re-establishment procedure, may release the connection with the source base station (for example, may release the first bearers for the source base station), or may stop the first bearers for the source base station. However, in a case where the third timer has expired, when the first timer has expired, has been stopped, or has not started and is thus not running, the terminal may trigger the RRC connection re-establishment procedure. The reason why the third timer is operated even when the handover procedure is performed is to allow the fallback procedure to be performed in a case where the wireless connection between the terminal and the source base station or the target base station is valid when the wireless connection between the terminal and the source base station or the target base station is monitored and the handover failure occurs, and to allow the frequency measurement result to be reported in the fallback procedure.

■ 2> When the terminal successfully completes the procedure of handover to the target base station, the terminal stops the first timer.

■ 2> When the first timer has expired (for example, when the handover procedure to the target base station fails), when the maximum number of retransmissions to the target base station has been exceeded in the RLC layer entity, when the handover command message is received, but the terminal fails to perform handover because the configuration information of the handover command message exceeds the capability of the terminal or an error occurs in the application of the configuration information, when a problem occurs in the random access to the target base station and the random access procedure is continuously attempted, but the first timer has expired and the handover procedure fails, or in a case of operating the second timer or the third timer for the target base station, when the second timer or the third timer expires before the completion of the handover procedure, timer T304 is stopped or expired, and the handover procedure is determined to have failed, ♦ 3> when the second timer or the third timer for the wireless connection between the terminal and the source base station has not expired (or when the second timer or the third timer for the wireless connection between the terminal and the source base station has not started or is running) or when the wireless connection between the terminal and the source base station is valid, ● 4> the terminal may determine that the wireless connection between the terminal and the source base station is valid, and may perform the fallback procedure proposed in the disclosure.

● 4> In a case where the SRB (for example, SRB1, or MAC, RLC, or PDCP layer of SRB1) configured for the source base station is suspended when the terminal starts the fallback procedure, the terminal may resume or newly configure the SRB, and may perform the fallback procedure on the SRB (for example, SRB1). As another method, when the second PDCP layer structure proposed in the disclosure is applied to the SRB, the fallback procedure may be performed through the first bearer for the source base station, and the second bearer for the target base station may be released. For example, the terminal may switch the uplink data transmission to the first bearer for the source base station, may indicate that there is data to be transmitted to the RLC layer entity or the MAC layer entity of the first bearer, and may transmit the handover failure report message for the fallback procedure through the first bearer. In addition, when the fallback procedure is triggered, the terminal may perform a procedure of discarding multiple items of data (for example, old RRC messages) remaining in the SRB for the source base station or stored in the buffer, or trigger or indicate a procedure of discarding, by the upper layer entity (for example, the RRC layer) of the terminal, multiple items of data (for example, old RRC messages) remaining in the PDCP layer entity for SRB or stored in the buffer. This is because it is necessary to prevent old RRC messages from being transmitted to the source base station.

● 4> In the fallback procedure, the terminal configures a report message indicating that the handover has failed through the SRB (for example, SRB1) configured with the source base station, and reports the handover failure to the source base station. When the terminal transmits, to the source base station, the report message indicating that handover has failed, the frequency measurement result measured by the terminal is reported together so as to help promptly restoring the connection with the source base station. As another method, the terminal may define and transmit MAC control information (for example, handover failure may be indicated by indicating that there is data to be transmitted in new MAC control information or buffer status report, or by defining a special value), RLC control information, or PDCP control information, so as to indicate to the source base station that the handover has failed. As another method, the terminal may transmit the RRC connection re-establishment request message to the SRB (for example, SRB0 or SRB1) for the source base station. As another embodiment, the fallback procedure may be a procedure of, when the handover fails, releasing the second bearer for the target base station for each bearer or in the second PDCP layer entity structure of the bearer for which the DAPS handover method is configured, or switching to the first PDCP layer entity structure, and allowing the terminal to resume data transmission or reception through the first bearer for the source base station, and the presence of data to be transmitted to the MAC layer entity of the first bearer may be indicated, and the terminal may report to the source base station that there is a scheduling request or data to be transmitted (for example, a buffer status report), or transmit new MAC CE, RLC control data, or PDCP control data to perform fallback to the source base station, and indicate the source base station to resume data transmission. The SRB for the source base station may be newly configured or resumed. In addition, when the handover fails, the fallback procedure is previously configured for each bearer, or the bearers for which the DAPS handover method is not configured do not have the second PDCP layer entity structure, and the terminal may release, from the MAC layer entity for the target base station, the PDCP layer entity, the RLC layer entity, the bearer configuration information, or the logical channel identifier information reconfigured in the configuration information of the handover command message, or may switch, connect, and configure to the MAC layer entity for the source base station, and then, may resume data transmission or reception to the source base station for each bearer. This is because, when the terminal receives the handover command message, the terminal may apply the bearer configuration information configured in the handover command message to the MAC layer entity for the target base station with respect to the bearer to which the DAPS handover method is not indicated, and may switch the connection of the PDCP layer entity or the RLC layer entity corresponding to the bearer to which the DAPS handover method is not indicated, from the MAC layer entity for the source base station to the MAC layer entity for the target base station, and connect thereto. For example, when the handover command message is received, the upper layer entity (for example, the RRC layer entity) of the terminal may indicate the MAC layer entity for the source base station to perform the reconfiguration (MAC reconfiguration) by using configuration information remaining after excluding the configuration information related to the bearer to which the DAPS handover method is not indicated in the handover command message from the configuration information of the current MAC layer entity for the source base station, or, the upper layer entity (for example, the RRC layer entity) of the terminal may indicate the MAC layer entity for the source base station to perform the reconfiguration (MAC reconfiguration) by using configuration information including only the configuration information related to the bearer to which the DAPS handover method is indicated in the handover command message from the configuration information of the current MAC layer. That is, when the handover command message is received, the configuration information of the PDCP layer entity, RLC layer entity, or MAC layer entity of the bearer to which the DAPS handover method is not indicated is released in the MAC layer entity for the source base station, it is possible to apply or connect to the MAC layer entity for the target base station according to the bearer configuration for the target base station, and thus when the terminal performs the fallback procedure, the bearer for which the DAPS handover method is not configured has to be reconfigured in the MAC layer entity for the source base station. For example, when the terminal performs the fallback procedure, the upper layer entity (for example, the RRC layer entity) of the terminal may indicate the MAC layer entity for the source base station to perform the reconfiguration (MAC reconfiguration) by using the configuration information together with the bearer configuration information to which the DAPS handover method is indicated, including the configuration information related to the bearer to which the DAPS handover method is not indicated in the handover command message in the configuration information of the current MAC layer entity, or when the fallback procedure is performed, the terminal may reconfigure or restore the bearer configuration before the reception of the handover command message (for example, PDCP layer entity configuration information, RLC layer entity configuration information, MAC layer entity configuration information, or PHY layer entity configuration information), and may be applied to the bearers for the source base station (PDCP layer entity configuration information, RLC layer entity configuration information, MAC layer entity configuration information, or PHY layer entity of SRB or AM DRB or UM DRB).

● 4> In the fallback procedure, when the terminal transmits, to the source base station, the report message indicating that the handover has failed (for example, RRC message, MAC CE or RLC control data, or PDCP control data proposed above), the fourth timer (for example, the timer for fallback) may be started. When the terminal receives an indication or a message from the source base station in response to the report message indicating that the handover has failed, which is transmitted by the terminal, the terminal may stop the fourth timer. However, when the fourth timer has expired, or when the response message has not been received until the fourth timer has expired, the terminal performs the RRC connection re-establishment procedure (may release the connection with the base station and perform the RRC connection procedure again from the beginning, that is, may perform the cell selection or reselection procedure, perform the random access procedure, and may transmit the RRC connection re-establishment request message). In addition, in a case where the RRC connection re-establishment procedure is triggered due to the expiration of the fourth timer, when the second timer or the third timer is running, the terminal may stop the second timer or the third timer.

♦ 3> When the second timer or the third timer for the wireless connection between the terminal and the source base station or the target base station has expired, or when the wireless connection between the terminal and the source base station or the target base station is not valid, ● 4> the terminal performs the RRC connection re-establishment procedure (releases the connection with the base station, and performs the RRC connection procedure again from the beginning, that is, performs the cell selection or reselection procedure, performs the random access procedure, and transmits the RRC connection re-establishment request message).

■ 2> When the terminal performs the DAPS handover procedure and the second condition proposed in the disclosure is satisfied, the connection with the source base station may be released, or the SRB for the source base station may be released, and the second timer (for example, T310) or the third timer (for example, T312) for the source base station may be stopped and initialized when the second timer or the third timer is running. Only when the second timer or the third timer is stopped, an unnecessary RRC connection re-establishment procedure due to expiration of the second timer or the third timer may be prevented. This is because, when the second condition is satisfied, it may mean that the handover procedure has been successfully performed, thus the first timer is stopped, and the expiration of the second timer or the third timer may trigger an unnecessary RRC connection re-establishment procedure. As another method, in a case where the first condition proposed in the disclosure is satisfied, or in a case where the handover procedure is successfully completed, the terminal may release the SRB for the source base station, or stop and initialize the second timer or the third timer for the source base station when the second timer or the third timer is running. Only when the second timer or the third timer is stopped, an unnecessary RRC connection re-establishment procedure due to expiration of the second timer or the third timer may be prevented. This is because, when the first condition is satisfied, it may mean that the handover procedure has been successfully performed, thus the first timer is stopped, and the expiration of the second timer or the third timer may trigger an unnecessary RRC connection re-establishment procedure.

According to the method proposed in the disclosure, when the terminal determines that the handover failure has occurred, and when the proposed condition is satisfied and the fallback procedure is performed, the terminal may allow the source base station to confirm the handover failure of the terminal by transmitting, to SRB1 or SRB1 to which the second PDCP layer structure is applied, the RRC message (for example, ULInformationTransferMRDC message or FailureInformation message) by including information indicating that the handover failure has occurred therein. When the source base station detects the handover failure of the terminal, the source base station may configure an RRC message (for example, an RRCReconfiguration message or an RRCRelease message) in response thereto and transmit the RRC message to the terminal, when the terminal receives an RRCReconfiguration message (RRC message received through SRB1 or SRB1 to which the second PDCP layer entity structure is applied) as a response RRC message to the handover failure report, the terminal may complete the application of the configuration information and may transmit, in response thereto, the RRCReconfigurationComplete message again to the source base station through SRB1 or SRB1 to which the second PDCP layer entity structure is applied, and when handover is indicated in RRCReconfiguration or the access to another cell is indicated, the procedure of random access to the cell may be completed, and an RRCReconfigurationComplete message may be transmitted through SRB1. However, when the terminal receives the RRCRelease message as the response RRC message to the handover failure report, the terminal may transition to the RRC idle mode or the RRC inactive mode according to the configuration information indicated in the RRCRelease message, and an additional response RRC message to the RRC message may no longer be transmitted to the base station.

Figure 1K:
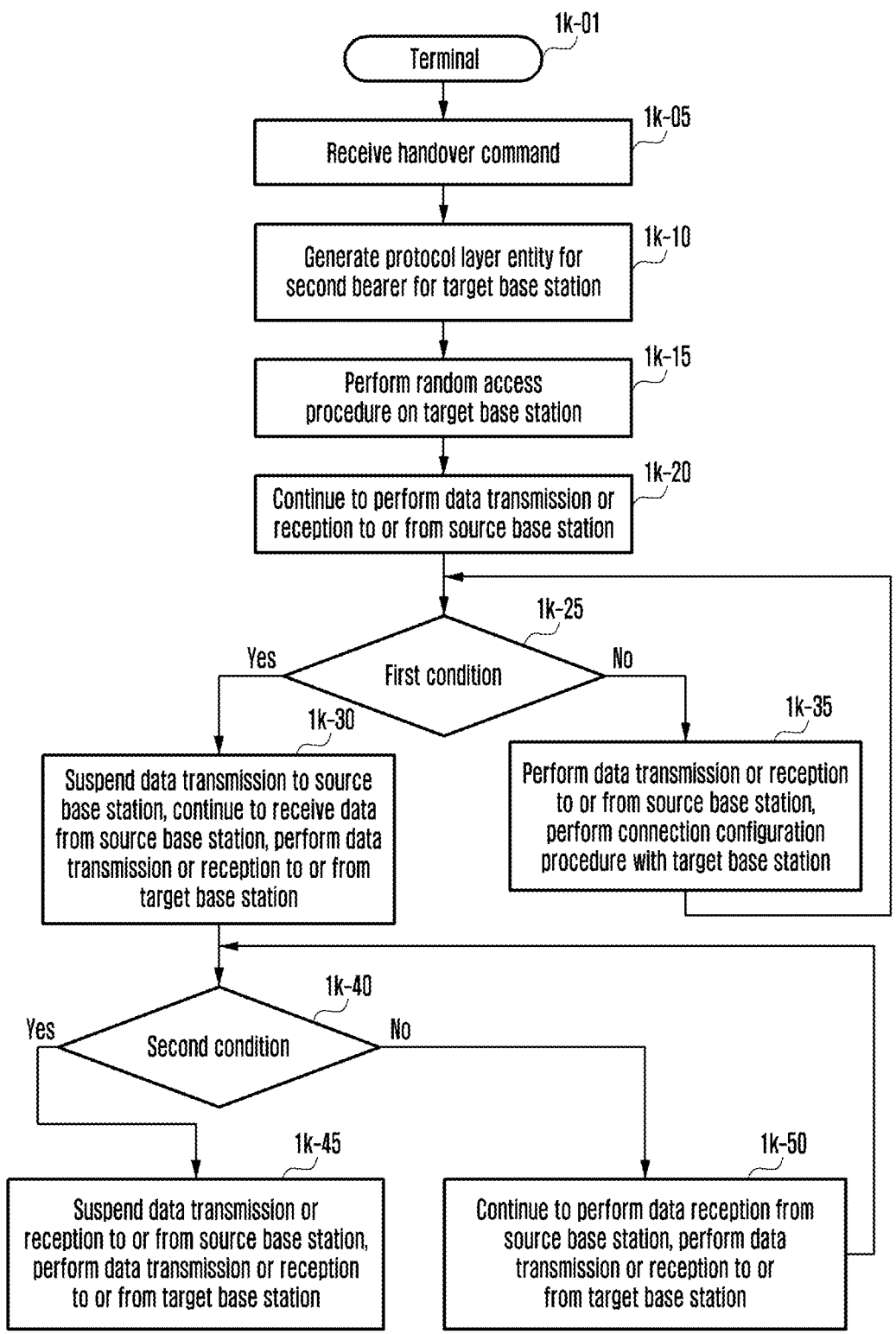
FIG. 1K illustrates a terminal operation according to an embodiment of the disclosure.

FIG. 1K illustrates a terminal operation according to an embodiment of the disclosure.

In FIG. 1K, the terminal 1k-01 may transmit or receive data to or from the source base station through the first PDCP layer entity structure for each bearer. However, in a case where the terminal receives the handover command message (operation 1k-05) and indicates the DAPS handover method of the second embodiment proposed in the disclosure in the handover command message, or indicates the DAPS handover method for each bearer, when the terminal performs switching, for the target base station indicated in the message, to the second PDCP layer entity for each bearer or the bearers to which the DAPS handover method is indicated, configures and establishes the protocol layer entities for the second bearer (operation 1k-10), and performs the procedure of random access to the target base station through the established protocol layers (operation 1k-15), the terminal may continue to transmit or receive data (perform uplink data transmission and downlink data reception) with the source base station through the protocol layer entities for the first bearer (operation 1k-20).

When the first condition is satisfied (operation 1k-25), the terminal may stop transmitting uplink data to the source base station through the protocol layer entities for the first bearer, and may switch uplink data transmission to transmit uplink data to the target base station through protocol layer entities for the second bearer, and the downlink data may be continuously received from the source base station and the target base station through the protocol layer entities for the first bearer and the second bearer (operation 1k-30). In addition, the PDCP layer entity for the second bearer may continue to perform seamless data transmission or reception to or from the target base station by using information such as transmission or reception data, sequence number information, or header compression and decompression context, which is stored in the PDCP layer entity for the first bearer. When the first condition is not satisfied, the terminal may keep identifying the first condition while continuously performing the procedure that has been previously being performed (operation 1k-35).

In addition, when the second condition is satisfied, the terminal may stop receiving downlink data from the source base station through the protocol layer entities for the first bearer (operations 1k-40 and 1k-45). In addition, the PDCP layer entity for the second bearer may continue to perform seamless data transmission or reception to or from the target base station by using information such as transmission or reception data, sequence number information, or header compression and decompression context, which is stored in the PDCP layer entity for the first bearer.

When the second condition is not satisfied, the terminal may keep identifying the second condition while continuously performing the procedure that has been previously being performed (operation 1k-50).

In a specific embodiment of the PDCP layer entity proposed in the disclosure, different procedures may be performed as follows according to the type of the handover indicated in the handover command message received by the terminal.

When the type of the handover indicated in the handover command message received from the source base station by the terminal indicates the handover of the first embodiment (for example, the general handover procedure), when the terminal receives the handover command message and the first handover method (for example, the first embodiment of the disclosure or the general handover method) is indicated in the handover command message, ReconfigWithSync information, or MobilityControlInfo information, when the second embodiment (DAPS handover method) proposed in the disclosure is not configured, when the second embodiment (DAPS handover method) proposed in the disclosure is not configured for a bearer in the bearer configuration information, or for the bearer for which the second embodiment (DAPS handover method) proposed in the disclosure is not configured in the bearer configuration information,

- ■ the terminal may perform a PDCP re-establishment procedure for the PDCP layer entity for each bearer. For example, for the SRB, the terminal may initialize window state variables and discard the stored multiple items of data (PDCP SDU or PDCP PDU), for UM DRB, the terminal may initialize window state variables and perform the transmission or retransmission by performing, in ascending order of COUNT values, compression, ciphering, or integrity protection for multiple items of data that have not yet been transmitted to the lower layer entity or multiple items of data for which the PDCP discard timer has not expired, based on the header (or data) compression context or security key of the target base station, stop and initialize the reordering timer when the reordering timer is running, and sequentially process the received multiple items of data (PDCP SDU or PDCP PDU) to transfer the same to the upper layer entity, and for AM DRB, the terminal may not initialize window state variables, and perform the transmission or retransmission by performing compression or performing ciphering or integrity protection, based on the header (or data) compression context or security key in ascending order of the PDCP sequence number or the COUNT value, starting from the first data (PDCP SDU or PDCP PDU) for which successful transfer is not identified from the lower layer entity. In addition, the reception PDCP layer entity may process or store the data received due to the re-establishment procedure of the lower layer entity (for example, the RLC layer entity), and for AM DRBs, when the indicator (drb-Continue ROHC) indicating the continuous use of the header compression context is not configured, the reception PDCP layer entity may perform the header decompression procedure based on the header compression context (ROHC) for the stored multiple items of data. In addition, the reception PDCP layer entity may process or store the data received due to the re-establishment procedure of the lower layer entity (for example, the RLC layer entity), and for AM DRBs, may perform the header decompression procedure based on the header compression context (Ethernet header compression (EHC)) for the stored multiple items of data. As another method, the reception PDCP layer entity may process or store the data received due to the re-establishment procedure of the lower layer entity (for example, the RLC layer entity), and for AM DRBs, when the indicator (drb-Continue Ethernet header compression (EHC))) indicating the continuous use of the header compression context is not configured, the reception PDCP layer entity may perform the header decompression procedure based on the header compression context (Ethernet header compression (EHC)) for the stored multiple items of data.

When the type of the handover indicated in the handover command message received from the source base station by the terminal indicates the handover of the second embodiment (or indicates the same for each bearer), when the terminal receives the handover command message and the second handover method (for example, the second embodiment of the disclosure or the general handover method) is configured in the handover command message, ReconfigWithSync information, or MobilityControlInfo information, when the second embodiment (DAPS handover method) proposed in the disclosure is not configured, when the second embodiment (DAPS handover method) proposed in the disclosure is configured for a bearer in the bearer configuration information, when the second embodiment (DAPS handover method) proposed in the disclosure is configured for at least one bearer in the bearer configuration information, or for the bearer for which the second embodiment (DAPS handover method) proposed in the disclosure is configured in the bearer configuration information,

- ■ the terminal may receive the handover command message, and the PDCP layer entity in which the DAPS handover method is indicated or configured in the handover command message may not perform the PDCP re-establishment procedure, and perform the following procedures. For example, for SRB, the terminal may initialize window state variables (initialization of variables may be omitted in order to perform fallback when DAPS handover fails), or discard the stored multiple items of data (PDCP SDU or PDCP PDCU), for UM DRB, the terminal may not initialize window state variables and continue to perform data transmission or reception to or from the source base station for the multiple items of data that have not yet been transmitted to the lower layer entity or multiple items of data for which the PDCP discard timer has not expired, and for AM DRB, the terminal may not initialize window state variables, and continue to perform data transmission or reception to or from the source base station. In addition, the terminal may not initialize and use uplink or downlink ROHC context for the source base station without change, initialize uplink or downlink ROHC context for the target base station, and the start in an initial state (for example, an IR state in a U mode). As another method, the terminal may initialize uplink or downlink ROHC context for the source base station, and start in an initial state (for example, an IR state in a U mode), and may initialize uplink or downlink ROHC context for the target base station, and start in an initial state (for example, an IR state in a U mode).
- ■ The terminal may perform the procedures proposed when the first condition is satisfied, for each bearer (or for the bearer to which the second embodiment is indicated).
- ■ The terminal may perform the procedures proposed when the second condition is satisfied, for each bearer (or for the bearer to which the second embodiment is indicated).
- ■ The terminal may release configuration information or context for the data compression protocol (for example, uplink data compression protocol) for or the bearer to which (or for which) the second embodiment (or the DAPS handover method) is not indicated (or not configured) when the handover command message is received. Alternatively, when the handover command message is received, the upper layer entity (for example, the RRC layer entity) of the terminal may indicate or reconfigure the PDCP layer entity to release configuration information or context for the data compression protocol (for example, uplink data compression protocol). However, for the bearer to which (for which) the second embodiment (or the DAPS handover method) is indicated (or configured), when the first condition proposed in the disclosure is satisfied, the terminal may release configuration information or context for the data compression protocol (for the source base station) (for example, uplink data compression protocol). Alternatively, when the first condition is satisfied, the upper layer entity (for example, the RRC layer entity) of the terminal may indicate or reconfigure the PDCP layer entity to release configuration information or context for the data compression protocol (for the source base station) (for example, uplink data compression protocol). This is because, for the bearer for which the DAPS handover method is configured, it is necessary to compress data and transmit the compressed data to the source base station by using the configuration information or context for the data compression protocol for the source base station until the first condition is satisfied.

■ In a case where the terminal receives the handover command message, for the PDCP layer entity or the bearer to which the DAPS handover method is not indicated, one of the following methods may be applied.
◆ Method 1: For the bearer or the PDCP layer for which the DAPS handover method is not configured, the PDCP re-establishment procedure may not be triggered or performed when the handover command message is received, or the target base station may not configure the PDCP re-establishment procedure for the bearer in the handover command message, and when the first condition proposed in the disclosure is satisfied, the terminal may trigger or perform the PDCP re-establishment procedure (even when the target base station configures the PDCP re-establishment procedure for the bearer in the handover command message, the PDCP re-establishment procedure may be performed when the first condition is satisfied). Specifically, when the first condition is satisfied, the upper layer entity (for example, the RRC layer entity) of the terminal may trigger or request the PDCP re-establishment procedure for the bearer or the bearers for which the DAPS handover method is not configured. The PDCP layer entity having received the request for the PDCP re-establishment procedure may perform different PDCP re-establishment procedures for each bearer. For example, for the UM DRB, the PDCP layer entity may initialize window state variables, may perform transmission or retransmission by performing compressing or ciphering, or performing the integrity protection for multiple items of data that has not yet been transmitted to the lower layer entity or multiple items of data in which the PDCP discard timer has not expired, in ascending order of COUNT values, based on the header (or data) compression context or security key of the target base station, and may stop and initialize the reordering timer when the reordering timer is running, and may sequentially process the received data (PDCP SDU or PDCP PDU) to transmit the processed data to the upper layer entity, and for the AM DRB, the PDCP layer may not initialize window state variables, and may perform transmission or retransmission by performing compression or ciphering or performing the integrity protection, based on header (or data) compression context or security keys of the target base station in ascending order of COUNT values or PDCP sequence numbers from the first data (PDCP SDU or PDCP PDU) for which successful transfer from the lower layer entity is not confirmed. In the description above, the reason why the PDCP re-establishment procedure is not performed when the handover command message is received for the bearer(s) for which the DAPS handover method is not configured and the PDCP re-establishment procedure is performed when the first condition is satisfied is that, when the handover procedure to the target base station fails to be performed, the fallback to the source base station may be performed, but multiple items of data, which are processed by the bearers through compression of data into the header (or data) compression context of the target base station in the PDCP re-establishment procedure, and the ciphering or integrity protection using the security key of the target base station, become useless when the fallback needs to be performed, and are thus to be discarded. In addition, this is because, when the fallback needs to be performed, the PDCP re-establishment procedure needs to be performed again for the bearers, so that data is compressed with the header (or data) compression context of the source base station for data to be transmitted, and the ciphering or integrity protection needs to be performed again by using the security key of the source base station, which causes unnecessary processing to occur. Accordingly, in a case where the terminal performs the DAPS handover method, the PDCP re-establishment procedure may not be triggered or performed for the bearer for which the DAPS handover method is not configured when the handover command message is received, and the PDCP re-establishment procedure may be triggered or performed when the first condition is satisfied. In addition, the PDCP re-establishment procedure is not performed for the bearer for which the DAPS handover method is configured.
◆ Second method: When the handover command message is received for the bearer(s) for which the DAPS handover method is not configured, the upper layer entity (for example, the RRC layer entity) of the terminal may trigger or request the PDCP re-establishment procedure. The PDCP layer entity having received the request for the PDCP re-establishment procedure may perform different PDCP re-establishment procedures for each bearer. For example, for the UM DRB, the PDCP layer entity may initialize window state variables, may perform transmission or retransmission by performing compressing or ciphering, or performing the integrity protection for multiple items of data that have not yet been transmitted to the lower layer entity or multiple items of data in which the PDCP discard timer has not expired, in ascending order of COUNT values, based on the header (or data) compression context or security key of the target base station, may stop and initialize the reordering timer when the reordering timer is running, and may sequentially process the received data (PDCP SDU or PDCP PDU) to transmit the processed data to the upper layer entity, and for the AM DRB, the PDCP layer entity may not initialize window state variables, and may perform transmission or retransmission by performing compression or ciphering, or performing the integrity protection, based on header (or data) compression context or security keys of the target base station in ascending order of COUNT values or PDCP sequence numbers from the first data (PDCP SDU or PDCP PDU) for which successful transfer from the lower layer entity is not confirmed. In the description above, in a case where the handover command message is received for the bearer(s) for which the DAPS handover method is not configured, since the data is compressed with the header (or data) compression context of the target base station and the data is processed by performing ciphering or integrity protection with the security key of the target base station, through the PDCP re-establishment procedure, when the terminal fails to perform the handover procedure to the target base station (for example, when the first timer has expired or when the wireless connection to the target base station fails) and when the fallback to the source base station is possible and is thus performed, the upper layer entity (for example, the RRC layer) of the terminal may indicate the bearers, to which the DAPS handover method is not indicated, to discard the data (PDCP PDUs) processed based on the configuration information (security key or header (or data) compression context) for the target base station, or reconfigure the PDCP re-establishment procedure or the configuration information (security key or header (or data) compression context) for the source bases station, and request or indicate re-generation and re-processing of the data based on the source base station configuration information, so that the bearers can discard multiple items of data (for example, PDCP PDUs) generated or processed for transmission to the target base station and re-process multiple items of data (for example, PDCP SDUs), based on the header (or data) compression context or security key for the source base station.

In addition, when the source base station indicates, to the terminal, the handover to which the embodiments proposed in the disclosure are applied, the source base station may start data forwarding to the target base station when the following third condition is satisfied. The third condition may mean satisfying one or more of the following conditions.

A case where an indication indicating that the terminal has successfully completed handover is received from the target base station A case where the handover command message is transmitted to the terminal A case where the handover command message is transmitted to the terminal and the successful transfer of the handover command message (HARQ ACK or NACK or RLC ACK or NACK) is confirmed A case where the source base station receives, from the terminal, an indication indicating the release of the connection with the source base station (for example, an RRC message (e.g., RRCReconfiguration message), MAC CE, RLC control PDU, or PDCP control PDU)

A case where the timer has expired by transmitting the handover command message to the terminal and operating a predetermined timer A case where the confirmation (HARQ ACK, NACK, RLC ACK, or NACK) information for successful transfer of downlink data is not received from the terminal for a predetermined time interval FIGS. 1JAA, 1JAB, 1JBA, 1JBB, 1JCA, 1JCB, 1JDA, and 1JDB illustrate a method in which when the DAPS handover method corresponding to the second embodiment of the efficient handover method proposed in the disclosure is indicated for each bearer via the RRCReconfiguration message or the RRCConnectionReconfiguration message, the terminal having received the message operates a protocol layer entity for different bearers, with respect to the SRB, the bearer for which the DAPS handover method is configured, or the bearers for which the DAPS handover method are not configured.

Hereinafter, an operation of a terminal that specifically performs the techniques proposed above is proposed. Specifically, proposed is a method in which when the DAPS handover method corresponding to the second embodiment of the efficient handover method proposed in the disclosure is indicated for each bearer via the RRCReconfiguration message or the RRCConnectionReconfiguration message, the terminal having received the message operates a protocol layer entity for different bearers, with respect to the SRB, the bearer for which the DAPS handover method is configured, or the bearers for which the DAPS handover method are not configured.

FIGS. 1JAA, 1JAB, 1JCA, and 1JCB illustrate a specific first embodiment of a method in which the terminal operates a protocol layer entity for different bearers, with respect to the SRB, the bearer for which the DAPS handover method is configured, or the bearers for which the DAPS handover method are not configured when the DAPS handover method is configured for each bearer in the RRC message (for example, RRCReconfiguration method or RRCConnectionReconfiguration message) received by the terminal, and the embodiment is described as follows.

1> When the terminal receives the handover command message (for example, RRCReconfiguration message), when ReconfigWithSync information (in case of the NR base station) or MobilityControlInfo information (in case of the LTE base station) is received in the RRCReconfiguration message, or when the terminal may follow the configuration information of the RRC message, the terminal may perform one or more of the following operations.

■ 2> The first timer (for example, T304) proposed in the disclosure is started.

■ 2> When the second handover method (for example, the second embodiment of the disclosure or the DAPS handover method) is not indicated, when the DAPS handover method is not indicated for each bearer identifier or each logical channel identifier, when the DAPS handover method is not configured for at least one bearer, or when the DAPS handover method is not configured for a bearer, ♦ 3> when the second timer (for example, T310) for the source base station proposed in the disclosure is running, the second timer may be stopped.

♦ 3> When the third timer (for example, T312) for the source base station proposed in the disclosure is running, the third timer may be stopped.

■ 2> When the second handover method (for example, the second embodiment of the disclosure or the DAPS handover method) is indicated (or configured), when the DAPS handover method is indicated for each bearer identifier or each logical channel identifier, when the DAPS handover method is configured for at least one bearer, or when the DAPS handover method is configured for a bearer, or for the bearer for which the DAPS handover method is configured, one or more of the following operations may be performed.

♦ 3> Even when the second timer for the source base station proposed in the disclosure is running, the second timer is not stopped.

♦ 3> The MAC layer entity for the target base station may be generated or established. For example, the same configuration as that for the source PCell may be applied as configuration for the target PCell.

- ◆ 3> A new terminal identifier (for example, C-RNTI) may be applied to the target base station or the MAC or PHY layer entity for the target base station.
- ◆ 3> The MAC layer entity for the source PCell may be reconfigured. Specifically, the MAC layer entity for the source PCell may be reconfigured by the MAC layer entity configuration information except for information for the logical channel for the bearer for which the DAPS handover method is not configured. Alternatively, the MAC layer entity for the source PCell may be reconfigured by the MAC layer entity configuration information including the configuration information for the logical channel or the bearer for which the DAPS handover method is configured. In addition, the configuration information may include mapping information between the logical channel and the SCell, etc.
- ◆ 3> All SCells configured for the MAC layer entity for the source base station may be deactivated. However, the source PCell may be maintained and data transmission or reception may be continuously performed.
- ◆ 3> For each DRB for which the DAPS handover method is configured, for a DRB having an identifier included in a DRB list for which the DAPS handover method is configured in a case where there is a DRB list for the DAPS handover, or all DRBs in a case where there is no DRB list for the DAPS handover,
  - ● 4> the dedicated control channel (DCCH) logical channel and the RLC layer entity for the target PCell may be generated or established. For example, the same configuration as that for the source PCell may be applied as configuration for the target PCell.
  - ● 4> The first PDCP layer entity structure (or the general PDCP layer entity) may be reconfigured or switched to the second PDCP layer entity structure (or the DAPS PDCP layer entity). Alternatively, the received PDCP layer entity configuration information may be applied to the second PDCP layer entity structure.
- ◆ 3> For each DRB for which the DAPS handover method is not configured, or for a DRB having an identifier not included in a DRB list for which the DAPS handover method is configured in a case where there is a DRB list for the DAPS handover,
  - ● 4> the PDCP layer entity may be re-established. As proposed in the disclosure, the security key or the ROHC context for the target PCell may be applied, or data (for example, PDCP PDU) generated based on the applied security key or ROCH context for the target PCell may be transmitted or retransmitted. In addition, when the PDCP layer entity is re-established, the PDCP status report may be triggered for the AM DRB or the UM DRB, so that the PDCP status report can be transmitted to the target base station, and the target base station may perform the PDCP status report from the terminal so that data transmission or reception can be seamlessly performed based thereon.
  - ● 4> The RLC layer entity may be re-established, and the RLC layer entity or the connected DTCH channel may be connected to the target PCell (or the MAC layer entity for the target PCell).
- ◆ 3> For each SRB,
  - ● 4> the SRBs for the target PCell are configured or established. Specifically, the PDCP layer entity for the target PCell may be configured or established. In addition, the dedicated control channel (DCCH) or the RLC layer entity for the target PCell may be configured or established. For example, the same configuration as that for the source PCell may be applied as configuration for the target PCell.
  - ● 4> The SRBs for the source PCell are stopped. Alternatively, when there are RRC messages or data stored in the SRBs (for example, SRB1, SRB2, SRB3, or SRB4) for the source PCell, the data or the RRC messages may be discarded. Alternatively, when there are RRC messages or data stored in the PDCP layer entity for the SRBs (for example, SRB1, SRB2, SRB3, or SRB4) for the source PCell, the data or the RRC messages may be discarded. Alternatively, the RLC layer entity for the SRBs may be re-established. This is because transmission of old data or RRC message may generate an error.
- ■ 2> Otherwise (when the second handover method (for example, the second embodiment of the disclosure or the DAPS handover method) is not indicated (or not configured), when the DAPS handover method is not indicated (or not configured) for each bearer identifier or each logical channel identifier, when the DAPS handover method is not configured for at least one bearer, or when the DAPS handover method is not configured for a bearer), one or more of the following operations may be performed.
  - ◆ 3> If configured, the MCG MAC layer entity or the SCG MAC layer entity is initialized.
  - ◆ 3> If configured, the configuration or context for the uplink compression data method is released.
  - ◆ 3> For all the established bearers or all bearers (for example, DRB or SRBs) for which the PDCP layer entity is configured, the PDCP layer entity may be re-established.
  - ◆ 3> For all the established bearers or all bearers (for example, DRB or SRBs) for which the RLC layer entity is configured, the MAC RLC or SCG RLC layer entity may be re-established.
- 1> When the MAC layer entity successfully completes the random access procedure (or when the first condition proposed in the disclosure is satisfied),
- 1> Alternatively, when an indicator (for example, rach-Skip) indicating to omit the random access procedure is configured and the MAC layer entity indicates successful reception of the PDCCH transmission corresponding to the terminal identifier (C-RNTI),
  - ■ 2> the first timer (for example, T304) is stopped.
  - ■ 2> When the second handover method (for example, the second embodiment of the disclosure or the DAPS handover method) is configured, when the DAPS handover method is indicated for each bearer identifier or each logical channel identifier, when the DAPS handover method is configured for at least one bearer, or when the DAPS handover method is configured for a bearer,

- ◆ 3> when the second timer (for example, T310) is running, the second timer is stopped.
- ◆ 3> When the third timer (for example, T312) is running, the third timer is stopped.
- ◆ 3> The uplink data switching may be triggered or indicated for each bearer for which the second handover method or the DAPS handover method is configured or each bearer (or lower layer entity or PDCP layer entity) for which the DAPS PDCP layer entity is configured. In addition, when the uplink data switching is indicated, the PDCP status report may be triggered for the AM DRB or the UM DRB, so that the PDCP status report can be transmitted to the target base station, and the target base station may perform the PDCP status report from the terminal so that data transmission or reception can be seamlessly performed based thereon.
- ◆ 3> The MCG configuration information may be released. The MCG configuration information may include configuration information of each bearer, the SDAP, PDCP, RLC, MAC, or PHY layer entity information, terminal identifier information, security information, etc.
- ◆ 3> When there is SCG configuration information, the SCG configuration information may be released. The SCG configuration information may include configuration of each bearer, the SDAP, PDCP, RLC, MAC, or PHY layer entity information, terminal identifier information, security information, etc.
- ■ 2> System information may be read from the target PCell.

1> When the first timer proposed in the disclosure has expired (for example, when the handover procedure has failed),
- ■ 2> when the first timer (for example, T304) for handover has expired or when the handover has failed,
  - ◆ 3> designated preamble information is released when the random access-related configuration information is configured.
  - ◆ 3> When the second handover method (for example, the second embodiment of the disclosure or the DAPS handover method) is not indicated (or not configured), when the DAPS handover method is not configured for (not indicated to) each bearer identifier or each logical channel identifier, when the DAPS handover method is not configured for at least one bearer, or when the DAPS handover method is not configured for a bearer,
  - ◆ 3> alternatively, when the second handover method (for example, the second embodiment of the disclosure or the DAPS handover method) is configured (or indicated), when the DAPS handover method is indicated for each bearer identifier or each logical channel identifier, when the DAPS handover method is configured for at least one bearer, when the DAPS handover method is configured for a bearer, and when wireless connection between the source base station and the terminal has failed (or radio link failure (RLF) has been detected), or when wireless connection between the source PCell and the terminal has failed (or when the second timer or the third timer has expired, when there is a problem in random access, when the retransmission count has reached the maximum retransmission count, or when an indication indicating out-of-synchronization is received a predetermined number or more of times),
    - ● 4> fallback, return, or restoration may be performed using configuration information having been used in the source PCell, except for the physical layer entity configuration information, the MAC layer entity configuration information, or the transmission resource information.
    - ● 4> The measured frequency or cell information may be configured to be ready for reporting, and may be reported to the connected cell or base station.
    - ● 4> The RRC connection re-establishment procedure may be performed.
  - ◆ 3> When the second handover method (for example, when the second embodiment of the disclosure or the DAPS handover method is configured (or indicated)), when the DAPS handover method is configured (or indicated) for each bearer identifier or each logical channel identifier, when the DAPS handover method is configured for at least one bearer, or when the DAPS handover method is configured for a bearer, and when the wireless connection between the source base station and the terminal has not failed (or when radio link failure (RLF) has not been detected (for example, when the second timer or the third timer has not expired, when there is no problem in random access, when the retransmission count has not reached the maximum retransmission count, or when an indication indicating out-of-synchronization is not received a predetermined number or more of times)), or when the wireless connection between the source PCell and the terminal has not failed (or when the second timer or the third timer has not expired),
    - ● 4> the MAC layer entity for the target PCell may be initialized or released.
    - ● 4> For each DRB for which the DAPS handover method is configured, for DRBs included in a list in a case where there is a list in which the DAPS handover method is configured, or all DRBs in a case where there is no list in which the DAPS handover method is configured,
      - ■ 5> the RLC layer entity for the target PCell may be re-established or released, or the related DTCH logical channel may be released.
      - ■ 5> The PDCP layer entity (for example, the DAPS PDCP layer entity or the second PDCP layer entity structure) may be reconfigured to be the general PDCP layer entity (for example, the normal PDCP layer entity or the first PDCP layer entity structure). In addition, when the DPCP layer entity is reconfigured, the PDCP status report may be triggered for the AM DRB or the UM DRB, so that the PDCP status report can be transmitted to the source base station, and the source base station may perform the PDCP status report from the terminal so that data transmission or reception can be seamlessly performed based thereon.
    - ● 4> For each DRB for which the DAPS handover method is not configured, or for DRBs not included in a list when there is a list in which the DAPS handover method is configured,
- ■ 5> The PDCP layer entity may be re-established. Alternatively, the upper layer entity (for example, the RRC layer entity) may indicate the PDCP layer entity re-establishment procedure for the bearer. Alternatively, the terminal may receive, after transmitting a message indicating that the DAPS handover has failed through the SRB for the source base station, the RRC message (for example, the RRCReconfiguration message) from the base station as a response message thereto, and may perform the PDCP re-establishment procedure for each bearer having an indicator indicating re-establishment of the PDCP layer entity according to the indication of the RRC message. Alternatively, the upper layer entity (for example, the RRC layer entity) may receive the RRC message, identify the indicator, and indicate the PDCP layer entity re-establishment procedure for the bearer. As proposed in the disclosure, the security key or the ROCH context for the source PCell may be applied, or data (for example, PDCP PDU) generated based on the applied security key or ROCH context (or data compression context) for the applied source PCell may be transmitted or retransmitted. In the disclosure, when the terminal receives the handover command message or the RRC message indicating the DAPS handover method, the terminal performs the PDCP layer entity re-establishment procedure for the bearer for which the DAPS handover method is not configured, based on the security key or the ROCH context for the target PCell, thus data for the target base station may be generated for the AM DRB or the UM DRB, and accordingly, the data generated for the target base station needs to be discarded. This is because when the fallback to the source base station is performed and the data for the target base station is transmission, the transmission of the data may occur an error. Accordingly, to update the security configuration information for the target PCell, the ROCH context or data compression configuration information, and the like with the security configuration information for the source PCell or the ROCH context or data compression configuration information when the fallback to the source base station is performed, the re-establishment procedure may be performed for the PDCP layer entity as described above. In addition, when the PDCP layer entity is re-established, the PDCP status report may be triggered for the AM DRB or the UM DRB, so that the PDCP status report can be transmitted to the source base station, and the source base station may perform the PDCP status report from the terminal so that data transmission or reception can be seamlessly performed based thereon.
- ■ 5> The RLC layer entity may be re-established, and the RLC layer entity or the connected DTCH channel may be connected to the source PCell (or the MAC layer entity for the source PCell).
  - ● 4> The suspended SRBs for the source base station or configured for the MAC layer entity for the source base station (or source PCell) are resumed.
  - ● 4> The MAC layer entity for the source PCell may be reconfigured. Specifically, the MAC layer entity for the source PCell may be reconfigured by the original MAC layer entity configuration information (for example, the configuration information before receiving the handover command message) including again the information for the logical channel or the bearer for which the DAPS handover method is not configured. In addition, the configuration information may include mapping information between the logical channel and the SCell, etc.
  - ● 4> The PDCP layer entity for the target PCell may be re-established or released.
  - ● 4> The RLC layer entity for the target PCell may be re-established or released, or the related DTCH logical channel may be released.
  - ● 4> When there are RRC messages or data stored in the SRBs (for example, SRB1, SRB2, SRB3, or SRB4) for the source PCell in a case of resuming the SRBs for the source PCell, the data or the RRC messages may be discarded. Alternatively, when there are RRC messages or data stored in the PDCP layer entity for the SRBs (for example, SRB1, SRB2, SRB3, or SRB4) for the source PCell, the data or the RRC messages may be discarded. Alternatively, the RLC layer entity for the SRBs may be re-established. This is because transmission of old data or RRC message may generate an error.
  - ● 4> To perform the fallback to the source base station, a procedure of re-obtaining required system information from the source PCell may be performed.
  - ● 4> A handover failure message may be configured through the resumed SRBs and may be transmitted to the source base station. Alternatively, the DRBs may be resumed and data transmission or reception may be resumed. Alternatively, the handover procedure has failed, and thus SRB1 having been configured or established for the target PCell may be released.
1> When the terminal has detected a wireless connection problem in the physical layer entity,
- ■ 2> when the second handover method (for example, the second embodiment of the disclosure or the DAPS handover method) is configured, when the DAPS handover method is configured for each bearer identifier or each logical channel identifier, or when the DAPS handover method is configured for at least one bearer, when the DAPS handover method is configured for a bearer, and when an out-of-sync indication indicating that the synchronization of the radio connection signal is out of synchronization is received from the lower layer entity (for example, MAC layer entity or PHY layer entity) a predetermined number (for example, the number may be configured by the base station) of times and the problem in the physical layer entity is detected in a case where predetermined timers (for example, T300 (timer for RRC connection configuration procedure), T301 (timer for RRC connection re-establishment procedure), or T311 (timer for RRC connection re-establishment procedure)) are not running,
- ◆ 3> the second timer (for example, T310) may be started.
- ■ 2> When an out-of-sync indication indicating that the synchronization of the radio connection signal is out of synchronization is received from the lower layer entity (for example, MAC layer entity or PHY layer entity) a predetermined number (for example, the number may be configured by the base station) of times and the problem in the physical layer entity is detected, and when the first timer, timer T300, timer T304, timer T311, or timer T319 is not running,
  - ◆ 3> the second timer (for example, T310) may be started. However, when the DAPS handover method is not configured and the first timer is running, the second timer does not start even when the physical layer problem is detected.
- 1> When the second handover method (for example, the second embodiment of the disclosure or the DAPS handover method) is configured (or indicated), when the DAPS handover method is configured (or indicated) for each bearer identifier or each logical channel identifier, when the DAPS handover method is configured for at least one bearer, or when the DAPS handover method is configured for a bearer, and when the first timer is running (or when the handover procedure is being performed),
  - ■ 2> when the wireless connection between the source base station and the terminal has failed (or when the radio link failure (RLF) has been detected (for example, when the second timer or the third timer has expired, when there is a random access problem, when the retransmission count has reached the maximum retransmission count, or when the out-of-sync indication is received a predetermined number or more times)), or when the wireless connection between the source PCell and the terminal has failed (or when the second timer or the third timer has expired),
    - ◆ 3> the MAC layer entity for the source PCell may be initialized, or the MAC layer entity configuration information may be released.
    - ◆ 3> For each DRB for which the DAPS handover method is configured, for DRBs included in a list in a case where there is a list in which the DAPS handover method is configured, or all DRBs in a case where there is no list in which the DAPS handover method is configured,
      - ● 4> the RLC layer entity for the source PCell may be re-established or released, or the related DTCH logical channel may be released.
      - ● 4> The PDCP layer entity (for example, the DAPS PDCP layer entity or the second PDCP layer entity structure) may be reconfigured to be the general PDCP layer entity (for example, the normal PDCP layer entity or the first PDCP layer entity structure).
    - ◆ 3> For each SRB,
      - ● 4> the PDCP layer entity for the source PCell may be re-established or released.
      - ● 4> The RLC layer entity for the source PCell may be re-established or released, or the related DTCH logical channel may be released.
    - ◆ 3> The physical layer entity configuration information for the source PCell may be released.
    - ◆ 3> Alternatively, when the security configuration information is activated and the SRBS or the DRBs are configured, or as another method, all DRBs configured for the source PCell may be suspended.
- 1> When the terminal receives the handover command message (for example, RRCReconfiguration message), when ReconfigWithSync information (in case of the NR base station) or MobilityControlInfo information (in case of the LTE base station) is received in the RRCReconfiguration message, or when the random access procedure triggered in the MAC layer entity of a cell group or the target base station is successfully completed,
  - ■ 2> the first timer for the source base station, the target base station, or the cell group is stopped.
  - ■ 2> The second timer is stopped when the second timer for the source base station is running (during the handover). This is because an unnecessary RRC connection re-establishment procedure may be triggered when the second timer expires.
  - ■ 2> As another method, when the second handover method (for example, the second embodiment of the disclosure or the DAPS handover method) is configured, or when the DAPS handover method is configured for each bearer identifier or each logical channel identifier,
    - ◆ 3> the second timer is stopped when the second timer for the source base station is running. This is because an unnecessary RRC connection re-establishment procedure may be triggered when the second timer expires.
  - ■ 2> The third timer for the source base station, the target base station, or the cell group is stopped.
- 1> When the terminal receives the RRCReconfiguration message or the RRCConnectionReconfiguration message and the RRC message does not include ReconfigWithSync information (in case of the NR base station) or MobilityControlInfo information (in case of the LTE base station), when the terminal may follow the RRC message configuration information, or when the second condition proposed in the disclosure is satisfied, the terminal performs the following operations.
  - ■ 2> When the received RRCReconfiguration message or RRCConnectionReconfiguration message includes an indicator indicating releasing of the connection with the source base station (or cell) in the DAPS handover procedure,
    - ◆ 3> the MAC layer entity for the source base station (or cell or PCell), the MAC layer entity configuration for the source PCell is released.
    - ◆ 3> For the bearer for which the DAPS handover method is configured, or for each DRB having the second PDCP layer entity structure (DAPS PDCP layer entity structure),
      - ● 4> the RLC layer entity for the source PCell is re-established.
      - ● 4> The dedicated traffic channel (DTCH) logical channel and the RLC layer entity for the source PCell are released.
      - ● 4> The second PDCP layer entity structure (or the current PDCP layer entity) is reconfigured or switched to the first PDCP layer entity structure (or general PDCP layer entity structure) or the third PDCP layer entity structure. In addition, when the PDCP layer entity is reconfigured, the PDCP status report may be triggered for the AM DRB or the UM DRB, so that the PDCP status report can be transmitted to the target base station, and the target base station may perform the PDCP status report from the terminal so that data transmission or reception can be seamlessly performed based thereon.
- ◆ 3> For each of the SRBs,
  - ● 4> The PDCP layer entity configured for the source PCell is released.
  - ● 4> The dedicated traffic channel (DTCH) logical channel and the RLC layer entity for the source PCell are released.
- ◆ 3> Configuration information for the physical channel (or physical layer entity) configured for the source PCell is released.

FIGS. 1JAA, 1JAB, 1JCA, and 1JCB illustrate a specific second embodiment of a method in which the terminal operates a protocol layer entity for different bearers, with respect to the SRB, the bearer for which the DAPS handover method is configured, or the bearers for which the DAPS handover method are not configured when the DAPS handover method is configured for each bearer in the RRC message (for example, RRCReconfiguration method or RRCConnectionReconfiguration message) received by the terminal, and the embodiment is described as follows.

1> When the terminal receives the handover command message (for example, RRCReconfiguration message), when ReconfigWithSync information (in case of the NR base station) or MobilityControlInfo information (in case of the LTE base station) is received in the RRCReconfiguration message, or when the terminal may follow the RRC message configuration information, the terminal may perform one or more of the following operations.
- ■ 2> The first timer proposed in the disclosure is started.
- ■ 2> When the second handover method (for example, the second embodiment of the disclosure or the DAPS handover method) is not indicated, when the DAPS handover method is not indicated for each bearer identifier or each logical channel identifier, when the DAPS handover method is not configured for at least one bearer, or when the DAPS handover method is not configured for a bearer, 3> when the second timer for the source base station proposed in the disclosure is running, the second timer may be stopped.
  - ◆ 3> When the third timer for the source base station proposed in the disclosure is running, the third timer may be stopped.
- ■ 2> When the second handover method (for example, the second embodiment of the disclosure or the DAPS handover method) is indicated (or configured), when the DAPS handover method is indicated for each bearer identifier or each logical channel identifier, when the DAPS handover method is configured for at least one bearer, or when the DAPS handover method is configured for a bearer, or for the bearer for which the DAPS handover method is configured, one or more of the following operations may be performed.
  - ◆ 3> Even when the second timer for the source base station proposed in the disclosure is running, the second timer is not stopped.
  - ◆ 3> The MAC layer entity for the target base station may be generated or established. For example, the same configuration as that for the source PCell may be applied as configuration for the target PCell.
  - ◆ 3> A new terminal identifier (for example, C-RNTI) may be applied to the target base station or the MAC or PHY layer entity for the target base station.
  - ◆ 3> The MAC layer entity for the source PCell may be reconfigured. Specifically, the MAC layer entity for the source PCell may be reconfigured by the MAC layer entity configuration information except for information for the logical channel for the bearer for which the DAPS handover method is not configured. Alternatively, the MAC layer entity for the source PCell may be reconfigured by the MAC layer entity configuration information including the configuration information for the logical channel or the bearer for which the DAPS handover method is configured. In addition, the configuration information may include mapping information between the logical channel and the SCell, etc.
  - ◆ 3> All SCells configured for the MAC layer entity for the source base station may be deactivated. However, the source PCell may be maintained and data transmission or reception may be continuously performed.
  - ◆ 3> For each DRB for which the DAPS handover method is configured, for a DRB having an identifier included in a DRB list for which the DAPS handover method is configured in a case where there is a DRB list for the DAPS handover, or all DRBs in a case where there is no DRB list for the DAPS handover,
    - ● 4> the dedicated control channel (DCCH) logical channel and the RLC layer entity for the target PCell may be generated or established. For example, the same configuration as that for the source PCell may be applied as configuration for the target PCell.
    - ● 4> The first PDCP layer entity structure (or the general PDCP layer entity) may be reconfigured or switched to the second PDCP layer entity structure (or the DAPS PDCP layer entity). Alternatively, the received PDCP layer entity configuration information may be applied to the second PDCP layer entity structure.
  - ◆ 3> For each DRB for which the DAPS handover method is not configured, or for a DRB having an identifier not included in a DRB list for which the DAPS handover method is configured in a case where there is a DRB list for the DAPS handover,
    - ● 4> the PDCP layer entity may be re-established. As proposed in the disclosure, the security key or the ROHC context for the target PCell may be applied, or data (for example, PDCP PDU) generated based on the applied security key or ROCH context for the target PCell may be transmitted or retransmitted. In addition, when the PDCP layer entity is re-established, the PDCP status report may be triggered for the AM DRB or the UM DRB, so that the PDCP status report can be transmitted to the target base station, and the target base station may perform the PDCP status report from the terminal so that data transmission or reception can be seamlessly performed based thereon.

- 4> The RLC layer entity may be re-established, and the RLC layer entity or the connected DTCH channel may be connected to the target PCell (or the MAC layer entity for the target PCell).
  - 3> For each SRB,
    - 4> the SRBs for the target PCell are configured or established. Specifically, the PDCP layer entity for the target PCell may be configured or established. In addition, the dedicated control channel (DCCH) or the RLC layer entity for the target PCell may be configured or established. For example, the same configuration as that for the source PCell may be applied as configuration for the target PCell. As another method, new SRB1 for the target PCell may be configured or established, and the other SRBs (for example, SRB2, SRB3, or SRB4) may re-establish the PDCP layer entity or the RLC layer entity (which has been used for the source PCell), and may be configured or established for the target PCell.
    - 4> The SRBs for the source PCell are stopped. Alternatively, when there are RRC messages or data stored in the SRBs (for example, SRB1, SRB2, SRB3, or SRB4) for the source PCell, the data or the RRC messages may be discarded. Alternatively, when there are RRC messages or data stored in the PDCP layer entity for the SRBs (for example, SRB1, SRB2, SRB3, or SRB4) for the source PCell, the data or the RRC messages may be discarded. Alternatively, the RLC layer entity for the SRBs may be re-established. This is because transmission of old data or RRC message may generate an error. As another method, SRB1 for the source PCell may be stopped, and the other SRBs (for example, SRB2, SRB3, or SRB4) may be released.
- 2> Otherwise (when the second handover method (for example, the second embodiment of the disclosure or the DAPS handover method) is not indicated (or not configured), when the DAPS handover method is not indicated (or not configured) for each bearer identifier or each logical channel identifier, when the DAPS handover method is not configured for at least one bearer, or when the DAPS handover method is not configured for a bearer), one or more of the following operations may be performed.
  - 3> If configured, the MCG MAC layer entity or the SCG MAC layer entity is initialized.
  - 3> If configured, the configuration or context for the uplink compression data method is released.
  - 3> For all the established bearers or all bearers (for example, DRB or SRBs) for which the PDCP layer entity is configured, the PDCP layer entity may be re-established.
  - 3> For all the established bearers or all bearers (for example, DRB or SRBs) for which the RLC layer entity is configured, the MAC RLC or SCG RLC layer entity may be re-established.

1> When the MAC layer entity successfully completes the random access procedure (or when the first condition proposed in the disclosure is satisfied),
1> Alternatively, when an indicator (for example, rach-Skip) indicating to omit the random access procedure is configured and the MAC layer entity indicates successful reception of the PDCCH transmission corresponding to the terminal identifier (C-RNTI),
- 2> the first timer (for example, T304) is stopped.
- 2> When the second handover method (for example, the second embodiment of the disclosure or the DAPS handover method) is configured, when the DAPS handover method is indicated for each bearer identifier or each logical channel identifier, when the DAPS handover method is configured for at least one bearer, or when the DAPS handover method is configured for a bearer,
  - 3> when the second timer (for example, T310) is running, the second timer is stopped.
  - 3> When the third timer (for example, T312) is running, the third timer is stopped.
  - 3> The uplink data switching may be triggered or indicated for each bearer for which the second handover method or the DAPS handover method is configured or each bearer (or lower layer entity or PDCP layer entity) for which the DAPS PDCP layer entity is configured. In addition, when the uplink data switching is indicated, the PDCP status report may be triggered for the AM DRB or the UM DRB, so that the PDCP status report can be transmitted to the target base station, and the target base station may perform the PDCP status report from the terminal so that data transmission or reception can be seamlessly performed based thereon.
  - 3> The MCG configuration information may be released. The MCG configuration information may include configuration information of each bearer, the SDAP, PDCP, RLC, MAC, or PHY layer entity information, terminal identifier information, security information, etc.
  - 3> When there is SCG configuration information, the SCG configuration information may be released. The SCG configuration information may include configuration of each bearer, the SDAP, PDCP, RLC, MAC, or PHY layer entity information, terminal identifier information, security information, etc.
- 2> System information may be read from the target PCell.
1> When the first timer proposed in the disclosure has expired (for example, when the handover procedure has failed),
- 2> when the first timer (for example, T304) for handover has expired or when the handover has failed,
  - 3> designated preamble information is released when the random access-related configuration information is configured.
  - 3> When the second handover method (for example, the second embodiment of the disclosure or the DAPS handover method) is not indicated (or not configured), when the DAPS handover method is not configured for (not indicated to) each bearer identifier or each logical channel identifier, when the DAPS handover method is not configured for at least one bearer, or when the DAPS handover method is not configured for a bearer,
  - 3> Alternatively, when the second handover method (for example, the second embodiment of the disclosure or the DAPS handover method) is configured (or indicated), when the DAPS handover method is indicated for each bearer identifier or each logical channel identifier, when the DAPS handover method is configured for at least one bearer, when the DAPS handover method is configured for a bearer, and when wireless connection between the source base station and the terminal has failed (or radio link failure (RLF) has been detected), or when wireless connection between the source PCell and the terminal has failed (or when the second timer or the third timer has expired, when there is a problem in random access, when the retransmission count has reached the maximum retransmission count, or when an indication indicating out-of-synchronization is received a predetermined number or more of times), ● 4> fallback, return, or restoration may be performed using configuration information having been used in the source PCell, except for the physical layer entity configuration information, the MAC layer entity configuration information, or the transmission resource information.

● 4> The measured frequency or cell information may be configured to be ready for reporting, and may be reported to the connected cell or base station.

● 4> The RRC connection re-establishment procedure may be performed.

♦ 3> When the second handover method (for example, when the second embodiment of the disclosure or the DAPS handover method is configured (or indicated)), when the DAPS handover method is configured (or indicated) for each bearer identifier or each logical channel identifier, when the DAPS handover method is configured for at least one bearer, or when the DAPS handover method is configured for a bearer, and when the wireless connection between the source base station and the terminal has not failed (or when radio link failure (RLF) has not been detected (for example, when the second timer or the third timer has not expired, when there is no problem in random access, when the retransmission count has not reached the maximum retransmission count, or when an indication indicating out-of-synchronization is not received a predetermined number or more of times)), or when the wireless connection between the source PCell and the terminal has not failed (or when the second timer or the third timer has not expired), ● 4> the MAC layer entity for the target PCell may be initialized or released.

● 4> For each DRB for which the DAPS handover method is configured, for DRBs included in a list in a case where there is a list in which the DAPS handover method is configured, or all DRBs in a case where there is no list in which the DAPS handover method is configured, ■ 5> the RLC layer entity for the target PCell may be re-established or released, or the related DTCH logical channel may be released.

■ 5> the PDCP layer entity (for example, the DAPS PDCP layer entity or the second PDCP layer entity structure) may be reconfigured to be the general PDCP layer entity (for example, the normal PDCP layer entity or the first PDCP layer entity structure). In addition, when the DPCP layer entity is reconfigured, the PDCP status report may be triggered for the AM DRB or the UM DRB, so that the PDCP status report can be transmitted to the source base station, and the source base station may perform the PDCP status report from the terminal so that data transmission or reception can be seamlessly performed based thereon.

● 4> For each DRB for which the DAPS handover method is not configured, or for DRBs not included in a list when there is a list in which the DAPS handover method is configured, ■ 5> the PDCP layer entity may be re-established. Alternatively, the upper layer entity (for example, the RRC layer entity) may indicate the PDCP layer entity re-establishment procedure for the bearer. Alternatively, the terminal may receive, after transmitting a message indicating that the DAPS handover has failed through the SRB for the source base station, the RRC message (for example, the RRCReconfiguration message) from the base station as a response message thereto, and may perform the PDCP re-establishment procedure for each bearer having an indicator indicating re-establishment of the PDCP layer entity according to the indication of the RRC message. Alternatively, the upper layer entity (for example, the RRC layer entity) may receive the RRC message, identify the indicator, and indicate the PDCP layer entity re-establishment procedure for the bearer. As proposed in the disclosure, the security key or the ROCH context for the source PCell may be applied, or data (for example, PDCP PDU) generated based on the applied security key or ROCH context (or data compression context) for the applied source PCell may be transmitted or retransmitted. In the disclosure, when the terminal receives the handover command message or the RRC message indicating the DAPS handover method, the terminal performs the PDCP layer entity re-establishment procedure for the bearer for which the DAPS handover method is not configured, based on the security key or the ROCH context for the target PCell, thus data for the target base station may be generated for the AM DRB or the UM DRB, and accordingly, the data generated for the target base station needs to be discarded. This is because when the fallback to the source base station is performed and the data for the target base station is transmission, the transmission of the data may occur an error. Accordingly, to update the security configuration information for the target PCell, the ROCH context or data compression configuration information, and the like with the security configuration information for the source PCell or the ROCH context or data compression configuration information when the fallback to the source base station is performed, the re-establishment procedure may be performed for the PDCP layer entity as described above. In addition, when the PDCP layer entity is re-established, the PDCP status report may be triggered for the AM DRB or the UM DRB, so that the PDCP status report can be transmitted to the source base station, and the source base station may perform the PDCP status report from the terminal so that data transmission or reception can be seamlessly performed based thereon.

■ 5> The RLC layer entity may be re-established, and the RLC layer entity or the connected DTCH channel may be connected to the source PCell (or the MAC layer entity for the source PCell).

■ 5> In the description above, as another method, the PDCP layer entity or the RLC layer entities may be released for each DRB for which the DAPS handover method is not configured, or for DRBs not included in a list when there is a list in which the DAPS handover method is configured. This is because the base station may re-configure the bearers via the RRC message (for example, RRCReconfiguration message) by simply releasing the PDCP re-establishment procedure, without re-performing the PDCP re-establishment procedure.

● 4> The suspended SRBs for the source base station or configured for the MAC layer entity for the source base station (or source PCell) are resumed.

● 4> The MAC layer entity for the source PCell may be reconfigured. Specifically, the MAC layer entity for the source PCell may be reconfigured by the original MAC layer entity configuration information (for example, the configuration information before receiving the handover command message) including again the information for the logical channel or the bearer for which the DAPS handover method is not configured. In addition, the configuration information may include mapping information between the logical channel and the SCell, etc.

● 4> The PDCP layer entity for the target PCell may be re-established or released.

● 4> The RLC layer entity for the target PCell may be re-established or released, or the related DTCH logical channel may be released.

● 4> When there are RRC messages or data stored in the SRBs (for example, SRB1, SRB2, SRB3, or SRB4) for the source PCell in a case of resuming the SRBs for the source PCell, the data or the RRC messages may be discarded. Alternatively, when there are RRC messages or data stored in the PDCP layer entity for the SRBs (for example, SRB1, SRB2, SRB3, or SRB4) for the source PCell, the data or the RRC messages may be discarded. Alternatively, the RLC layer entity for the SRBs may be re-established. This is because transmission of old data or RRC message may generate an error. As another method, SRB1 stopped for the source PCell may be resumed, the other SRBs (for example, SRB2, SRB3, or SRB4) may re-establish the PDCP layer entity or the RLC layer entity (having been re-established or configured for the target PCell), and may be configured or established for the source PCell. Alternatively, the handover procedure has failed, and thus SRB1 having been configured or established for the target PCell may be released.

● 4> To perform the fallback to the source base station, a procedure of re-obtaining required system information from the source PCell may be performed.

● 4> A handover failure message may be configured through the resumed SRBs and may be transmitted to the source base station. Alternatively, the DRBs may be resumed and data transmission or reception may be resumed.

1> When the terminal has detected a wireless connection problem in the physical layer entity, ■ 2> when the second handover method (for example, the second embodiment of the disclosure or the DAPS handover method) is configured, when the DAPS handover method is configured for each bearer identifier or each logical channel identifier, or when the DAPS handover method is configured for at least one bearer, when the DAPS handover method is configured for a bearer, and when an out-of-sync indication indicating that the synchronization of the radio connection signal is out of synchronization is received from the lower layer entity (for example, MAC layer entity or PHY layer entity) a predetermined number (for example, the number may be configured by the base station) of times and the problem in the physical layer entity is detected in a case where predetermined timers (for example, T300 (timer for RRC connection configuration procedure), T301 (timer for RRC connection re-establishment procedure), or T311 (timer for RRC connection re-establishment procedure)) are not running, ♦ 3> the second timer (for example, T310) may be started.

■ 2> When an out-of-sync indication indicating that the synchronization of the radio connection signal is out of synchronization is received from the lower layer entity (for example, MAC layer entity or PHY layer entity) a predetermined number (for example, the number may be configured by the base station) of times and the problem in the physical layer entity is detected, and when the first timer, timer T300, timer T304, timer T311, or timer T319 is not running, ♦ 3> the second timer (for example, T310) may be started. However, when the DAPS handover method is not configured and the first timer is running, the second timer does not start even when the physical layer problem is detected.

1> When the second handover method (for example, the second embodiment of the disclosure or the DAPS handover method) is configured (or indicated), when the DAPS handover method is configured (or indicated) for each bearer identifier or each logical channel identifier, when the DAPS handover method is configured for at least one bearer, or when the DAPS handover method is configured for a bearer, and when the first timer is running (or when the handover procedure is being performed), ■ 2> when the wireless connection between the source base station and the terminal has failed (or when the radio link failure (RLF) has been detected (for example, when the second timer or the third timer has expired, when there is a random access problem, when the retransmission count has reached the maximum retransmission count, or when the out-of-sync indication is received a predetermined number or more times)), or when the wireless connection between the source PCell and the terminal has failed (or when the second timer or the third timer has expired),
- ◆ 3> the MAC layer entity for the source PCell may be initialized, or the MAC layer entity configuration information may be released.
- ◆ 3> For each DRB for which the DAPS handover method is configured, for DRBs included in a list in a case where there is a list in which the DAPS handover method is configured, or all DRBs in a case where there is no list in which the DAPS handover method is configured,
  - ● 4> the RLC layer entity for the source PCell may be re-established or released, or the related DTCH logical channel may be released.
  - ● 4> The PDCP layer entity (for example, the DAPS PDCP layer entity or the second PDCP layer entity structure) may be reconfigured to be the general PDCP layer entity (for example, the normal PDCP layer entity or the first PDCP layer entity structure).
- ◆ 3> For each SRB,
  - ● 4> the PDCP layer entity for the source PCell may be re-established or released.
  - ● 4> The RLC layer entity for the source PCell may be re-established or released, or the related DTCH logical channel may be released.
- ◆ 3> The physical layer entity configuration information for the source PCell may be released.
- ◆ 3> Alternatively, when the security configuration information is activated and the SRBS or the DRBs are configured, or as another method, all DRBs configured for the source PCell may be suspended.

1> When the terminal receives the handover command message (for example, RRCReconfiguration message), when ReconfigWithSync information (in case of the NR base station) or MobilityControlInfo information (in case of the LTE base station) is received in the RRCReconfiguration message, or when the random access procedure triggered in the MAC layer entity of a cell group or the target base station is successfully completed,
- ■ 2> the first timer for the source base station, the target base station, or the cell group is stopped.
- ■ 2> The second timer is stopped when the second timer for the source base station is running (during the handover). This is because an unnecessary RRC connection re-establishment procedure may be triggered when the second timer expires.
- ■ 2> As another method, when the second handover method (for example, the second embodiment of the disclosure or the DAPS handover method) is configured, or when the DAPS handover method is configured for each bearer identifier or each logical channel identifier,
  - ◆ 3> the second timer is stopped when the second timer for the source base station is running. This is because an unnecessary RRC connection re-establishment procedure may be triggered when the second timer expires.
- ■ 2> The third timer for the source base station, the target base station, or the cell group is stopped.

1> When the terminal receives the RRCReconfiguration message or the RRCConnectionReconfiguration message and the RRC message does not include ReconfigWithSync information (in case of the NR base station) or MobilityControlInfo information (in case of the LTE base station), when the terminal may follow the RRC message configuration information, or when the second condition proposed in the disclosure is satisfied, the terminal performs the following operations.
- ■ 2> When the received RRCReconfiguration message or RRCConnectionReconfiguration message includes an indicator indicating releasing of the connection with the source base station (or cell) in the DAPS handover procedure,
  - ◆ 3> the MAC layer entity for the source base station (or cell or PCell), the MAC layer entity configuration for the source PCell is released.
  - ◆ 3> For the bearer for which the DAPS handover method is configured, or for each DRB having the second PDCP layer entity structure (DAPS PDCP layer entity structure),
    - ● 4> The RLC layer entity for the source PCell is re-established.
    - ● 4> The dedicated traffic channel (DTCH) logical channel and the RLC layer entity for the source PCell are released.
    - ● 4> The second PDCP layer entity structure (or the current PDCP layer entity) is reconfigured or switched to the first PDCP layer entity structure (or general PDCP layer entity structure) or the third PDCP layer entity structure. In addition, when the PDCP layer entity is reconfigured, the PDCP status report may be triggered for the AM DRB or the UM DRB, so that the PDCP status report can be transmitted to the target base station, and the target base station may perform the PDCP status report from the terminal so that data transmission or reception can be seamlessly performed based thereon.
  - ◆ 3> For each of the SRBs,
    - ● 4> the PDCP layer entity configured for the source PCell is released.
    - ● 4> The dedicated traffic channel (DTCH) logical channel and the RLC layer entity for the source PCell are released.
  - ◆ 3> Configuration information for the physical channel (or physical layer entity) configured for the source PCell is released.

FIGS. 1JBA, 1JBB, 1JDA, and 1JDB illustrate a specific third embodiment of a method in which the terminal operates, a protocol layer entity for different bearers, with respect to the SRB, the bearer for which the DAPS handover method is configured, or the bearers for which the DAPS handover method are not configured when the DAPS handover method is configured for each bearer in the RRC message (for example, RRCReconfiguration method or RRCConnectionReconfiguration message) received by the terminal, and the embodiment is described as follows.

1> When the terminal receives the handover command message (for example, RRCReconfiguration message), when ReconfigWithSync information (in case of the NR base station) or MobilityControlInfo information (in case of the LTE base station) is received in the RRCReconfiguration message, or when the terminal may follow the RRC message configuration information, the terminal may perform one or more of the following operations.
- ■ 2> The first timer proposed in the disclosure is started.
- ■ 2> When the second handover method (for example, the second embodiment of the disclosure or the DAPS handover method) is not indicated, when the DAPS handover method is not indicated for each bearer identifier or each logical channel identifier, when the DAPS handover method is not configured for at least one bearer, or when the DAPS handover method is not configured for a bearer,
- ◆ 3> when the second timer for the source base station proposed in the disclosure is running, the second timer may be stopped.
- ◆ 3> When the third timer for the source base station proposed in the disclosure is running, the third timer may be stopped.

■ 2> When the second handover method (for example, the second embodiment of the disclosure or the DAPS handover method) is indicated (or configured), when the DAPS handover method is indicated for each bearer identifier or each logical channel identifier, when the DAPS handover method is configured for at least one bearer, or when the DAPS handover method is configured for a bearer, or for the bearer for which the DAPS handover method is configured, one or more of the following operations may be performed.
- ◆ 3> Even when the second timer for the source base station proposed in the disclosure is running, the second timer is not stopped.
- ◆ 3> The MAC layer entity for the target base station may be generated or established. For example, the same configuration as that for the source PCell may be applied as configuration for the target PCell.
- ◆ 3> A new terminal identifier (for example, C-RNTI) may be applied to the target base station or the MAC or PHY layer entity for the target base station.
- ◆ 3> The MAC layer entity for the source PCell may be reconfigured. Specifically, the MAC layer entity for the source PCell may be reconfigured by the MAC layer entity configuration information except for information for the logical channel for the bearer for which the DAPS handover method is not configured. Alternatively, the MAC layer entity for the source PCell may be reconfigured by the MAC layer entity configuration information including the configuration information for the logical channel or the bearer for which the DAPS handover method is configured. In addition, the configuration information may include mapping information between the logical channel and the SCell, etc.
- ◆ 3> All SCells configured for the MAC layer entity for the source base station may be deactivated. However, the source PCell may be maintained and data transmission or reception may be continuously performed.
- ◆ 3> For each DRB for which the DAPS handover method is configured, for a DRB having an identifier included in a DRB list for which the DAPS handover method is configured in a case where there is a DRB list for the DAPS handover, or all DRBs in a case where there is no DRB list for the DAPS handover,
  - ● 4> the dedicated control channel (DCCH) logical channel and the RLC layer entity for the target PCell may be generated or established. For example, the same configuration as that for the source PCell may be applied as configuration for the target PCell.
  - ● 4> The first PDCP layer entity structure (or the general PDCP layer entity) may be reconfigured or switched to the second PDCP layer entity structure (or the DAPS PDCP layer entity). Alternatively, the received PDCP layer entity configuration information may be applied to the second PDCP layer entity structure.
- ◆ 3> For each DRB for which the DAPS handover method is not configured, or for a DRB having an identifier not included in a DRB list for which the DAPS handover method is configured in a case where there is a DRB list for the DAPS handover,
  - ● 4> the DRBs may be suspended. That is, the UM DRB or the AM DRBs for which the DAPS handover method is not indicated may be suspended.
  - ● 4> Alternatively, for the UM DRBs or the AM DRBs, the PDCP entity suspend procedure may be triggered or indicated to the lower layer entity or the PDCP layer entity. As another method, only some of the following procedures may be triggered or indicated. As another method, the following procedures or some procedures below may be performed for the bearers (UM DRB or AM DRB) for which the DAPS handover method is not configured when the DAPS handover procedure has failed and the fallback procedure is performed.
    - ■ 5> In the description above, the procedures performed in the PDCP layer entity of the UM DRB or the AM DRB may be specified as below, and some or all of the following procedures may be performed.
    6> When the COUNT value or the window state variable value is initialized, in order to solve the security issue (the risk of exposure of security keys caused by transmitting different items of data by using the same security key and same COUNT value when the DAPS handover fallback procedure is performed), which occurs from using the same security key and reusing the same COUNT value from the beginning when the DAPS handover fallback procedure is performed, the COUNT value, a transmission window state variable (TX NEXT), or a reception window state variable (RX NEXT and RX DELIV) may not be initialized and the values of the existing variables may be continuously used or maintained.
    6> To discard old data for efficient buffer operation, multiple items of data (for example, PDCP PDU or PDCP SDU) stored in the transmission PDCP layer entity may be discarded. As another method, when the stored multiple items of data are discarded, only the PDCP PDUs may be discarded and the PDCP SDUs corresponding to the original data may be stored or maintained without change, so as to prevent data loss, or may be re-processed to be transmitted through the PDCP re-establishment procedure or the bearer resumption procedure later.
    6> To promptly transfer the stored multiple items of data (PDCP SDU or PDCP PDU) to the upper layer entity while the PDCP reordering timer is running, when the PDCP reordering timer is running, the timer may be stopped and initialized, and when the stored multiple items of data are compressed through the header compression, the header decompression may be performed and the data may be transferred to the upper layer in ascending order of the COUNT values.

6> When the reception PDCP layer entity receives the multiple items of data from the lower layer entity (RLC layer entity) by the RLC re-establishment procedure, the transferred data may be deciphered, the integrity verification may be performed if necessary, the header decompression may be performed if necessary, the PDCP reordering timer may be stopped and initialized so as to be ordered and transmitted together, in ascending order of the COUNT values, when the multiple items of data to be transferred to the upper layer entity are transferred (this operation is useful in a case of EN-DC (a case of being connected to the LTE base station or the NR base station) or in a case of using the NR PDCP layer entity in the LTE base station, that is, in a case where the NR PDCP layer entity and the LTE RLC layer entity are connected and the LTE RLC layer entity is reestablished).

♦ As another method, the COUNT value used for the security key may be initialized, and the transmission window status variable (TX NETX) may be initialized to the initial value so that the variable synchronization with the base station can be performed during re-connection with the network later. In addition, the COUNT value used for the security key may be initialized, and the reception window status variable (RX NEXT and RX DELIV) may be initialized to the initial value so that the variable synchronization with the base station can be performed during re-connection with the network later.

● 4> When the RLC re-establishment procedure is indicated for the UM DRBS or the AM DRBs, the RLC layer entity re-establishment procedure may be performed. In the description above, as the RLC layer entity re-establishment procedure, when there is received multiple items of data, the data may be processed and transferred to the upper layer entity, the transmission or reception window status variables may be initialized, or the stored multiple items of data (RLC SDU or RLC PDU) may be discarded when the transmission data is not yet transmitted.

♦ 3> For each SRB,
  ● 4> the SRBs for the target PCell are configured or established. Specifically, the PDCP layer entity for the target PCell may be configured or established. In addition, the dedicated control channel (DCCH) logical channel or the RLC layer entity for the target PCell may be configured or established. For example, the same configuration as that for the source PCell may be applied as configuration for the target PCell. As another method, new SRB1 for the target PCell may be configured or established, and the other SRBs (for example, SRB2, SRB3, or SRB4) may be stopped. As another method, new SRB1 for the target PCell may be configured or established when the first condition proposed in the disclosure is satisfied.
  ● 4> The SRBs for the source PCell are stopped. Alternatively, when there are RRC messages or data stored in the SRBs (for example, SRB1, SRB2, SRB3, or SRB4) for the source PCell, the data or the RRC messages may be discarded. Alternatively, when there are RRC messages or data stored in the PDCP layer entity for the SRBs (for example, SRB1, SRB2, SRB3, or SRB4) for the source PCell, the data or the RRC messages may be discarded. Alternatively, the RLC layer entity for the SRBs may be re-established. This is because transmission of old data or RRC message may generate an error.

■ 2> Otherwise (when the second handover method (for example, the second embodiment of the disclosure or the DAPS handover method) is not indicated (or not configured), when the DAPS handover method is not indicated (or not configured) for each bearer identifier or each logical channel identifier, when the DAPS handover method is not configured for at least one bearer, or when the DAPS handover method is not configured for a bearer), one or more of the following operations may be performed.
  ♦ 3> If configured, the MCG MAC layer entity or the SCG MAC layer entity is initialized.
  ♦ 3> If configured, the configuration or context for the uplink compression data method is released.
  ♦ 3> For all the established bearers or all bearers (for example, DRB or SRBs) for which the PDCP layer entity is configured, the PDCP layer entity may be re-established.
  ♦ 3> For all the established bearers or all bearers (for example, DRB or SRBs) for which the RLC layer entity is configured, the MAC RLC or SCG RLC layer entity may be re-established.

1> When the MAC layer entity successfully completes the random access procedure (or when the first condition proposed in the disclosure is satisfied),
1> Alternatively, when an indicator (for example, rach-Skip) indicating to omit the random access procedure is configured and the MAC layer entity indicates successful reception of the PDCCH transmission corresponding to the terminal identifier (C-RNTI),
  ■ 2> the first timer (for example, T304) is stopped.
  ■ 2> When the second handover method (for example, the second embodiment of the disclosure or the DAPS handover method) is configured, when the DAPS handover method is indicated for each bearer identifier or each logical channel identifier, when the DAPS handover method is configured for at least one bearer, or when the DAPS handover method is configured for a bearer,
    ♦ 3> when the second timer (for example, T310) is running, the second timer is stopped.
    ♦ 3> When the third timer (for example, T312) is running, the third timer is stopped.
    ♦ 3> The uplink data switching may be triggered or indicated for each bearer for which the second handover method or the DAPS handover method is configured or each bearer (or lower layer entity or PDCP layer entity) for which the DAPS PDCP layer entity is configured. In addition, when the uplink data switching is indicated, the PDCP status report may be triggered for the AM DRB or the UM DRB, so that the PDCP status report can be transmitted to the target base station, and the target base station may perform the PDCP status report from the terminal so that data transmission or reception can be seamlessly performed based thereon.
- ◆ 3> For each DRB for which the DAPS handover method is not configured, or for a DRB having an identifier not included in a DRB list for which the DAPS handover method is configured in a case where there is a DRB list for the DAPS handover,
  - ● 4> the PDCP layer entity may be re-established. As proposed in the disclosure, the security key or the ROHC context for the target PCell may be applied, or data (for example, PDCP PDU) generated based on the applied security key or ROCH context for the target PCell may be transmitted or retransmitted. In addition, when the PDCP layer entity is re-established, the PDCP status report may be triggered for the AM DRB or the UM DRB, so that the PDCP status report can be transmitted to the target base station, and the target base station may perform the PDCP status report from the terminal so that data transmission or reception can be seamlessly performed based thereon.
  - ● 4> The RLC layer entity may be re-established, and the RLC layer entity or the connected DTCH channel may be connected to the target PCell (or the MAC layer entity for the target PCell).
- ◆ 3> The MCG configuration information may be released. The MCG configuration information may include configuration information of each bearer, the SDAP, PDCP, RLC, MAC, or PHY layer entity information, terminal identifier information, security information, etc.
- ◆ 3> When there is SCG configuration information, the SCG configuration information may be released. The SCG configuration information may include configuration of each bearer, the SDAP, PDCP, RLC, MAC, or PHY layer entity information, terminal identifier information, security information, etc.
- ◆ 3> The other SRBs (for example, SRB2, SRB3, or SRB4) may re-establish the PDCP layer entity or the RLC layer entity (which has been used for the source PCell), and may be configured or established for the target PCell. As another method, new SRB1 for the target PCell may be configured or established when the first condition proposed in the disclosure is satisfied.
- ■ 2> System information may be read from the target PCell.

1> When the first timer proposed in the disclosure has expired (for example, when the handover procedure has failed),
- ■ 2> when the first timer (for example, T304) for handover has expired or when the handover has failed,
  - ◆ 3> designated preamble information is released when the random access-related configuration information is configured.
  - ◆ 3> When the second handover method (for example, the second embodiment of the disclosure or the DAPS handover method) is not indicated (or not configured), when the DAPS handover method is not configured for (not indicated to) each bearer identifier or each logical channel identifier, when the DAPS handover method is not configured for at least one bearer, or when the DAPS handover method is not configured for a bearer,
  - ◆ 3> Alternatively, when the second handover method (for example, the second embodiment of the disclosure or the DAPS handover method) is configured (or indicated), when the DAPS handover method is indicated for each bearer identifier or each logical channel identifier, when the DAPS handover method is configured for at least one bearer, when the DAPS handover method is configured for a bearer, and when wireless connection between the source base station and the terminal has failed (or radio link failure (RLF) has been detected), or when wireless connection between the source PCell and the terminal has failed (or when the second timer or the third timer has expired, when there is a problem in random access, when the retransmission count has reached the maximum retransmission count, or when an indication indicating out-of-synchronization is received a predetermined number or more of times),
    - ● 4> fallback, return, or restoration may be performed using configuration information having been used in the source PCell, except for the physical layer entity configuration information, the MAC layer entity configuration information, or the transmission resource information.
    - ● 4> The measured frequency or cell information may be configured to be ready for reporting, and may be reported to the connected cell or base station.
    - ● 4> The RRC connection re-establishment procedure may be performed.
  - ◆ 3> When the second handover method (for example, when the second embodiment of the disclosure or the DAPS handover method is configured (or indicated)), when the DAPS handover method is configured (or indicated) for each bearer identifier or each logical channel identifier, when the DAPS handover method is configured for at least one bearer, or when the DAPS handover method is configured for a bearer, and when the wireless connection between the source base station and the terminal has not failed (or when radio link failure (RLF) has not been detected (for example, when the second timer or the third timer has not expired, when there is no problem in random access, when the retransmission count has not reached the maximum retransmission count, or when an indication indicating out-of-synchronization is not received a predetermined number or more of times)), or when the wireless connection between the source PCell and the terminal has not failed (or when the second timer or the third timer has not expired),
    - ● 4> the MAC layer entity for the target PCell may be initialized or released.
    - ● 4> For each DRB for which the DAPS handover method is configured, for DRBs included in a list in a case where there is a list in which the DAPS handover method is configured, or all DRBs in a case where there is no list in which the DAPS handover method is configured,
- 5> the RLC layer entity for the target PCell may be re-established or released, or the related DTCH logical channel may be released.
- 5> The PDCP layer entity (for example, the DAPS PDCP layer entity or the second PDCP layer entity structure) may be reconfigured to be the general PDCP layer entity (for example, the normal PDCP layer entity or the first PDCP layer entity structure). In addition, when the DPCP layer entity is reconfigured, the PDCP status report may be triggered for the AM DRB or the UM DRB, so that the PDCP status report can be transmitted to the source base station, and the source base station may perform the PDCP status report from the terminal so that data transmission or reception can be seamlessly performed based thereon.
- 4> For each DRB for which the DAPS handover method is not configured, or for DRBs not included in a list when there is a list in which the DAPS handover method is configured,
- 5> the DRBs may be recovered, returned, or restored using the bearer configuration information before the reception of the handover command message, the PDCP status, the RLC status, the window state variables of the PDCP layer entity or the RLC layer entity, the buffer status, or the ROCH context. Alternatively, the DRBs may be resumed. Alternatively, the suspended DRBs may be resumed. In addition, the PDCP status report may be triggered for the AM DRB or the UM DRB, so that the PDCP status report can be transmitted to the source base station, and the source base station may perform the PDCP status report from the terminal so that data transmission or reception can be seamlessly performed based thereon. As another method, through the procedure for the DRBs, when the DRBs for the source base station are resumed, in order to solve the security issue that occurs from reusing the same COUNT value when the DAPS handover fallback procedure is performed, the existing COUNT values of the DRBs for the target base station or the values of transmission or reception window variables may be applied to the DRBs for the source base station or maintained to be used (or by configuring the COUNT values of the DRBs of the target base station or the values of transmission or reception window variables as the COUNT values of DRBs of the source base station or values of transmission or reception window variables). As another method, the original COUNT values for the DRBs for the source base station or the values of transmission or reception window variables may be restored to be used. As another method, through the procedure for the DRBs, when the DRBs for the source base station are resumed, or when the security key for the target base station is not configured, in order to solve the security issue that occurs from reusing the same COUNT value when the DAPS handover fallback procedure is performed, the existing COUNT values of the DRBs for the target base station or the values of transmission or reception window variables may be applied to the DRBs for the source base station or maintained to be used (or by configuring the COUNT values of the DRBs of the target base station or the values of transmission or reception window variables as the COUNT values of DRBs of the source base station or values of transmission or reception window variables). However, when the security key for the target base station is configured, the original COUNT values for the DRBs for the source base station or the values of transmission or reception window variables may be restored to be used.
- 4> The suspended SRBs for the source base station or configured for the MAC layer entity for the source base station (or source PCell) are resumed.
- 4> The MAC layer entity for the source PCell may be reconfigured. Specifically, the MAC layer entity for the source PCell may be reconfigured by the original MAC layer entity configuration information (for example, the configuration information before receiving the handover command message) including again the information for the logical channel or the bearer for which the DAPS handover method is not configured. In addition, the configuration information may include mapping information between the logical channel and the SCell, etc.
- 4> The PDCP layer entity for the target PCell may be re-established or released.
- 4> The RLC layer entity for the target PCell may be re-established or released, or the related DTCH logical channel may be released.
- 4> When there are RRC messages or data stored in the SRBs (for example, SRB1, SRB2, SRB3, or SRB4) for the source PCell in a case of resuming the SRBs for the source PCell, the data or the RRC messages may be discarded. Alternatively, when there are RRC messages or data stored in the PDCP layer entity for the SRBs (for example, SRB1, SRB2, SRB3, or SRB4) for the source PCell, the data or the RRC messages may be discarded. Alternatively, the RLC layer entity for the SRBs may be re-established. This is because transmission of old data or RRC message may generate an error. As another method, through the procedure for the SRBs, when the SRBs for the source base station are resumed, in order to solve the security issue which may occur from reusing of the same COUNT value when the DAPS handover fallback procedure is performed, the existing COUNT values for the SRBs for the target base station or the values of transmission or reception window variables may be applied to the SRBs established for the source base station or maintained to be used (or by configuring the COUNT values for the SRBs for the target base station or the values of transmission or reception window variables as the COUNT values for the SRBs for the source base station or the values of transmission or reception window variables). As another method, the original COUNT values for the SRBs for the source base station or the values of transmission or reception window variables may be restored to be used. As another method, through the procedure for the SRBs, when the SRBs for the source base station are resumed, or when the security key for the target base station is not configured, in order to solve the security issue that occurs from reusing the same COUNT value when the DAPS handover fallback procedure is performed, the existing COUNT values of the SRBs for the target base station or the values of transmission or reception window variables may be applied to the SRBs established for the source base station or maintained to be used (or by configuring the COUNT values of the SRBs of the target base station or the values of transmission or reception window variables as the COUNT values of SRBs of the source base station or values of transmission or reception window variables). However, when the security key for the target base station is configured, the original COUNT values for the SRBs for the source base station or the values of transmission or reception window variables may be restored to be used.
- ● 4> To perform the fallback to the source base station, a procedure of re-obtaining required system information from the source PCell may be performed.
- ● 4> A handover failure message may be configured through the resumed SRBs and may be transmitted to the source base station. Alternatively, the DRBs may be resumed and data transmission or reception may be resumed. Alternatively, the handover procedure has failed, and thus SRB1 having been configured or established for the target PCell may be released.

1> When the terminal has detected a wireless connection problem in the physical layer entity,
- ■ 2> when the second handover method (for example, the second embodiment of the disclosure or the DAPS handover method) is configured, when the DAPS handover method is configured for each bearer identifier or each logical channel identifier, or when the DAPS handover method is configured for at least one bearer, when the DAPS handover method is configured for a bearer, and when an out-of-sync indication indicating that the synchronization of the radio connection signal is out of synchronization is received from the lower layer entity (for example, MAC layer entity or PHY layer entity) a predetermined number (for example, the number may be configured by the base station) of times and the problem in the physical layer entity is detected in a case where predetermined timers (for example, T300 (timer for RRC connection configuration procedure), T301 (timer for RRC connection re-establishment procedure), or T311 (timer for RRC connection re-establishment procedure)) are not running,
  - ◆ 3> the second timer (for example, T310) may be started.
- ■ 2> When an out-of-sync indication indicating that the synchronization of the radio connection signal is out of synchronization is received from the lower layer entity (for example, MAC layer entity or PHY layer entity) a predetermined number (for example, the number may be configured by the base station) of times and the problem in the physical layer entity is detected, and when the first timer, timer T300, timer T304, timer T311, or timer T319 is not running,
  - ◆ 3> the second timer (for example, T310) may be started. However, when the DAPS handover method is not configured and the first timer is running, the second timer does not start even when the physical layer problem is detected.

1> When the second handover method (for example, the second embodiment of the disclosure or the DAPS handover method) is configured (or indicated), when the DAPS handover method is configured (or indicated) for each bearer identifier or each logical channel identifier, when the DAPS handover method is configured for at least one bearer, or when the DAPS handover method is configured for a bearer, and when the first timer is running (or when the handover procedure is being performed),
- ■ 2> when the wireless connection between the source base station and the terminal has failed (or when the radio link failure (RLF) has been detected (for example, when the second timer or the third timer has expired, when there is a random access problem, when the retransmission count has reached the maximum retransmission count, or when the out-of-sync indication is received a predetermined number or more times)), or when the wireless connection between the source PCell and the terminal has failed (or when the second timer or the third timer has expired),
  - ◆ 3> the MAC layer entity for the source PCell may be initialized, or the MAC layer entity configuration information may be released.
  - ◆ 3> For each DRB for which the DAPS handover method is configured, for DRBs included in a list in a case where there is a list in which the DAPS handover method is configured, or all DRBs in a case where there is no list in which the DAPS handover method is configured,
    - ● 4> the RLC layer entity for the source PCell may be re-established or released, or the related DTCH logical channel may be released.
    - ● 4> The PDCP layer entity (for example, the DAPS PDCP layer entity or the second PDCP layer entity structure) may be reconfigured to be the general PDCP layer entity (for example, the normal PDCP layer entity or the first PDCP layer entity structure).
  - ◆ 3> For each DRB for which the DAPS handover method is not configured, or for DRBs not included in a list when there is a list in which the DAPS handover method is configured,
    - ● 4> the RLC layer entity for the source PCell may be re-established or released, or the related DTCH logical channel may be released.
    - ● 4> The PDCP layer entity for the source PCell may be re-established or released.
  - ◆ 3> For each SRB,
    - ● 4> the PDCP layer entity for the source PCell may be re-established or released.
    - ● 4> The RLC layer entity for the source PCell may be re-established or released, or the related DTCH logical channel may be released.
  - ◆ 3> The physical layer entity configuration information for the source PCell may be released.

- 3> Alternatively, when the security configuration information is activated and the SRBS or the DRBs are configured, or as another method, all DRBs configured for the source PCell may be suspended.
1> When the terminal receives the handover command message (for example, RRCReconfiguration message), when ReconfigWithSync information (in case of the NR base station) or MobilityControlInfo information (in case of the LTE base station) is received in the RRCReconfiguration message, or when the random access procedure triggered in the MAC layer entity of a cell group or the target base station is successfully completed,
  - 2> the first timer for the source base station, the target base station, or the cell group is stopped.
  - 2> The second timer is stopped when the second timer for the source base station is running (during the handover). This is because an unnecessary RRC connection re-establishment procedure may be triggered when the second timer expires.
  - 2> As another method, when the second handover method (for example, the second embodiment of the disclosure or the DAPS handover method) is configured, or when the DAPS handover method is configured for each bearer identifier or each logical channel identifier,
    - 3> the second timer is stopped when the second timer for the source base station is running. This is because an unnecessary RRC connection re-establishment procedure may be triggered when the second timer expires.
  - 2> The third timer for the source base station, the target base station, or the cell group is stopped.
1> When the terminal receives the RRCReconfiguration message or the RRCConnectionReconfiguration message and the RRC message does not include ReconfigWithSync information (in case of the NR base station) or MobilityControlInfo information (in case of the LTE base station), when the terminal may follow the RRC message configuration information, or when the second condition proposed in the disclosure is satisfied, the terminal performs the following operations.
  - 2> When the received RRCReconfiguration message or RRCConnectionReconfiguration message includes an indicator indicating releasing of the connection with the source base station (or cell) in the DAPS handover procedure,
    - 3> the MAC layer entity for the source base station (or cell or PCell), the MAC layer entity configuration for the source PCell is released.
    - 3> For the bearer for which the DAPS handover method is configured, or for each DRB having the second PDCP layer entity structure (DAPS PDCP layer entity structure),
      - 4> the RLC layer entity for the source PCell is re-established.
      - 4> The dedicated traffic channel (DTCH) logical channel and the RLC layer entity for the source PCell are released.
      - 4> The second PDCP layer entity structure (or the current PDCP layer entity) is reconfigured or switched to the first PDCP layer entity structure (or general PDCP layer entity structure) or the third PDCP layer entity structure. In addition, when the PDCP layer entity is reconfigured, the PDCP status report may be triggered for the AM DRB or the UM DRB, so that the PDCP status report can be transmitted to the target base station, and the target base station may perform the PDCP status report from the terminal so that data transmission or reception can be seamlessly performed based thereon.
    - 3> For each of the SRBs,
      - 4> the PDCP layer entity configured for the source PCell is released.
      - 4> The dedicated traffic channel (DTCH) logical channel and the RLC layer entity for the source PCell are released.
    - 3> Configuration information for the physical channel (or physical layer entity) configured for the source PCell is released.

When the DAPS handover method is configured for at least one bearer or a bearer in the handover command message (or RRCReconfiguration message) received by the terminal, the terminal may maintain (for example, while transmitting or receiving uplink data or downlink data) the connection with the source base station and perform the procedure of random access to the target base station, as proposed above in the disclosure. In the DAPS handover method in the disclosure, the terminal performs, for the bearer for which the DAPS handover method is configured, uplink data switching to the target base station only when the first condition is satisfied, that is, when the procedure of random access to the target base station is successfully completed. Accordingly, there is no problem caused by the transmission of the data of the bearer for which the DAPS handover method is configured, during the procedure of random access to the target base station.

However, in a case where the DAPS handover method is configured for at least one bearer or a bearer, while performing the DAPS handover procedure, the terminal may perform, for the bearer for which the DAPS handover method is not configured, the PDCP re-establishment procedure when the handover command message (for example, RRCReconfiguration message) is received and the PDCP re-establishment procedure is configured according to the configuration information of the bearer included in the handover command message. When the PDCP re-establishment procedure is not configured, the bearer may be used without change. Accordingly, when the procedure of random access to the target base station is performed, the uplink data of the bearer for which the DAPS handover method is not configured may be transmitted through the uplink transmission resource allocated by the target base station in the process of the random access procedure. In a case where there is no security configuration information for the target base station in the handover command message and the target base station thus uses the same security key as the source base station, or in a case where the security key of the source base station is used without change in the bearer for which the DAPS handover method is not configured, when data of the bearer for which the DAPS handover method is not configured is transmitted in the random access procedure but the random access procedure fails and the terminal performs the procedure of fallback to the source base station, the security issue may occur. For example, in a case where the COUNT value of the bearer for which the DAPS handover method is not configured is 8, for first uplink data received from the upper layer entity during the handover, the ciphering may be performed using the COUNT value and the security key. The terminal may transmit a preamble (message 1) in the procedure of random access to the target base station, receive a random access response (message 2), and transmit the first uplink data of the bearer for which the DAPS handover method, in the uplink transmission resource (message 3) indicated in the random access response. When the random access content is not resolved in message 4, the random access procedure may fail. In addition, when the DAPS handover method fails, the connection with the source base station is valid, and thus fallback to the source base station is performed, the bearer for which the DAPS handover method is not configured may be restored to a bearer at the time point before the reception of the handover command message. In this case, the COUNT value of the bearer for which the DAPS handover method is not configured becomes 8 again, the security key is used without change, the second uplink data received from the upper layer entity is ciphered again using the COUNT value and the security key, and the second uplink data of the bearer for which the DAPS handover method is not configured may be transmitted to the source base station. In the description above, the terminal performs ciphering of the first uplink data and the second uplink data, which are different from each other, by using the same security key and the same COUNT value, and transmits the same, which increases the risk of exposure of the security key to the hackers.

Accordingly, hereinafter, methods for solving the security issue which may occur in the DAPS handover method are proposed. The security issue may be solved through one method or a combination of several methods among the methods proposed below.

- Method 1: In a case where the DAPS handover method is configured, in a case where the DAPS handover method is configured for at least one bearer or a bearer, or in the DAPS handover procedure, when the procedure of random access to the target base station is performed in the MAC layer entity for the target base station, the terminal may cause data or data of the bearer for which the DAPS handover method is not configured not to be transmitted to the target base station during the random access procedure or in message 3 of the random access procedure, so as to prevent the security issue.
- Method 2: In a case where the DAPS handover method is configured, in a case where the DAPS handover method is configured for at least one bearer or a bearer, or in the DAPS handover procedure, when the procedure of random access to the target base station is performed in the MAC layer entity for the target base station, the terminal may cause data or data of the bearer for which the DAPS handover method is not configured not to be transmitted to the target base station until the random access procedure is successfully completed, so as to prevent the security issue.
- Method 3: In a case where the DAPS handover method is configured, in a case where the DAPS handover method is configured for at least one bearer or a bearer, or in the DAPS handover procedure, when the procedure of random access to the target base station is performed in the MAC layer entity for the target base station, the terminal may cause data or data of the bearer for which the DAPS handover method is not configured to be transmitted to the target base station only when the random access procedure is successfully completed, so as to prevent the security issue.
- Method 4: In a case where the DAPS handover method is configured, in a case where the DAPS handover method is configured for at least one bearer or a bearer, or in the DAPS handover procedure, when the terminal performs the procedure of random access to the target base station in the MAC layer entity for the target base station,
  - ■ if random access resource information pre-configured for the procedure of random access to the target base station is configured in the handover command message and the terminal thus performs a contention-free random access (CFRA) procedure, the security issue does not occur even when data of the bearer for which the DAPS handover method is not configured is transmitted through message 3 (the uplink transmission resource indicated in message 2) since the random access procedure is successfully completed when the terminal transmits message 1 (preamble) and receives message 2 (random access response).
  - ■ However, if the random access resource information pre-configured for the procedure of random access to the target base station is not configured in the handover command message and the terminal thus performs a contention-based random access (CBRA) procedure or does not perform the CFRA procedure, the random access procedure can be successfully completed only when the terminal transmits message 1 (preamble), receives message 2 (random access response), transmits message 3, and receives information (for example, MAC control information) indicating random access contention resolution via message 4. Accordingly, when the terminal performs the CBRA procedure or does not perform the CFRA procedure, data or data of the bearer for which the DAPS handover method is not configured may not be allowed to be transmitted to the target base station in message 3, so as to prevent the security issue.
- Method 5: In a case where the DAPS handover method is configured or in a case where the DAPS handover method is configured for at least one bearer or a bearer, when the terminal performs a procedure of random access to the target base station in the MAC layer entity for the target base station,
  - ■ if random access resource information pre-configured for the procedure of random access to the target base station is configured in the handover command message and the terminal thus performs a contention-free random access (CFRA) procedure, the security issue does not occur even when data of the bearer for which the DAPS handover method is not configured is transmitted through message 3 (the uplink transmission resource indicated in message 2) since the random access procedure is successfully completed when the terminal transmits message 1 (preamble) and receives message 2 (random access response).
  - ■ However, if the random access resource information pre-configured for the procedure of random access to the target base station is not configured in the handover command message and the terminal thus performs a contention-based random access (CBRA) procedure or does not perform the CFRA procedure, the random access procedure can be successfully completed only when the terminal transmits message 1 (preamble), receives message 2 (random access response), transmits message 3, and receives information (for example, MAC control information) indicating random access contention resolution via message 4. Accordingly, when the terminal performs the CBRA procedure or does not perform the CFRA procedure, data or data of the bearer for which the DAPS handover method is not configured may not be allowed to be transmitted to the target base station in message 3, so as to prevent the security issue.

♦ 1> More specifically, in a case where the terminal transmits a preamble and receives a random access response, when the terminal receives a downlink transmission resource through a PDCCH for a random access identifier (RA-RNTI) and successfully decodes data (transport block) corresponding thereto, ● 2> if it is considered that the random access response has been successfully received, ■ 3> if the random access response does not include only a random access preamble identifier (RAPID), ♦ 4> if message 1 (preamble) transmitted above is selected from among the preambles for the CBRA procedure, ● 5> if the random access response is successfully received for the first time during the random access procedure, and ■ 6> if the transmission is not to be transmitted through a common control channel (CCCH) logical channel, ♦ 7> the terminal may indicate the multiplication or reassembly device to include C-RNTI MAC control information in the uplink transmission later.

■ 6> The terminal may acquire a MAC PDU from the multiplication or reassembly device and store the same in the message 3 buffer. In a case where the DAPS handover method is configured for at least one bearer or a bearer, or in case where the random access procedure (CBRA procedure) is performed during the DAPS handover procedure, data or data of the bearer for which the DAPS handover method is not configured may be configured not to be included when the MAC PDU is acquired. As another method, a case where the DAPS handover method is configured for at least one bearer or a bearer, or in case where the random access procedure (CBRA procedure) is performed during the DAPS handover procedure, when the MAC PDU is acquired, the MAC PDU may be acquired except for data or data of the bearer for which the DAPS handover method is not configured. In addition, the procedure of excluding, from the MAC PDU, data of the bearer for which the DAPS handover method is not configured may be extended to be applied to the HARQ transmission or retransmission procedure.

In the disclosure, the base station may indicate a cell or a PCell. That is, the source base station is a term indicating a source cell or a source PCell, and the target base station is a term indicating a target cell or a target PCell.

In the disclosure, the bearer for which the DAPS handover method is configured may be called a DAPS bearer, and the bearer for which the DAPS handover method is not configured may be called a non-DAPS bearer.

In the disclosure, the data may refer to upper layer data (user traffic), a PDCP service data unit (PDCP SDU), a PDCP protocol data unit (PDCP PDU), a PDCP data PDU, a PDCP control PDU, an RLC SDU, an RLC SDU segment, an RLC PDU, an RLC data PDU, an RLC control PDU, a MAC PDU, a MAC SDU, a MAC subPDU (MAC subheader), padding, a MAC SDU, a MAC subheader, MAC control information (MAC control element (CE) and MAC subheader), or MAC control information. In the description above, the service data unit (SDU) may indicate data received from the upper layer entity by each protocol layer entity (PDCP, RLC, or MAC), or data to be transferred to the upper layer entity by the lower layer entity, and the protocol data unit (PDU) may refer to data in which each protocol layer processes data and attaches a header of each protocol layer to the front of the SDU. In addition, in the disclosure, the MAC subPDU may indicate only the MAC subheader (for example, when indicating padding), the MAC subheader and the MAC SDU, the MAC subheader and MAC control information, or the MAC subheader and padding. Alternatively, the data transmitted or received by the MAC layer entity may indicate a MAC PDU, and the MAC PDU may include multiple MAC subPDUs.

Figure 1L:
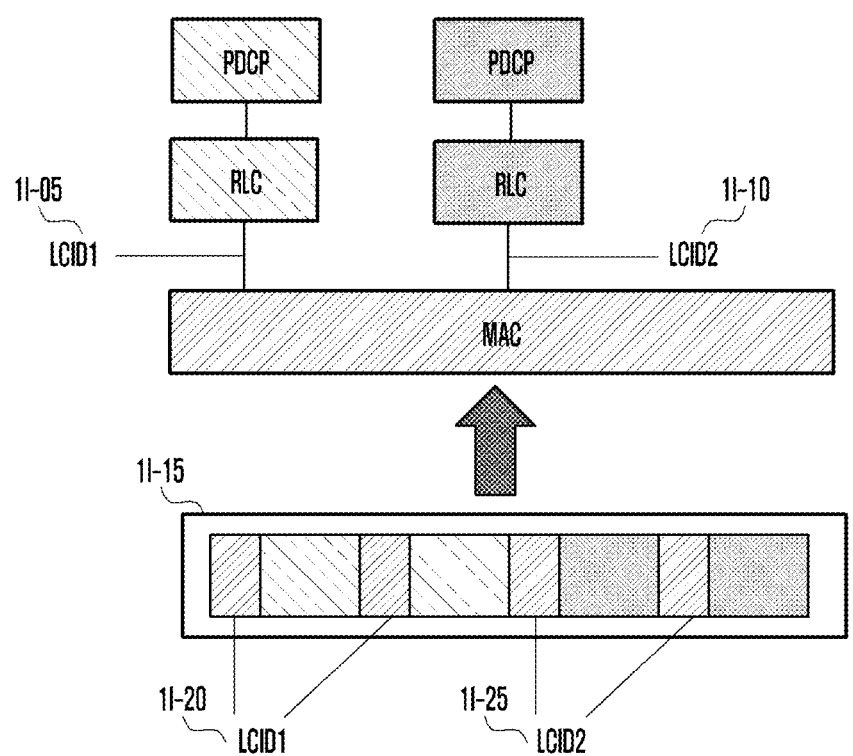
FIG. 1L illustrates a method of processing received data when data (for example, MAC PDU) is received in a MAC layer entity of a base station or a terminal according to an embodiment of the disclosure

FIG. 1L illustrates a method of processing received data when data (for example, MAC PDU) is received in a MAC layer entity of a base station or a terminal according to an embodiment of the disclosure.

Referring to FIG. 1L, when a MAC layer entity of the terminal receives a MAC PDU 1*l*-15 is received from the lower layer entity, the MAC layer entity may process data in units of MAC subPDUs, may read and delete a MAC subheader when the MAC subPDU includes MAC control information, identify the type of the MAC control information, based on a logical channel identifier of the MAC subheader, and interpret an indication of the MAC control information to perform a procedure according thereto. In the description above, when the MAC subPDU includes a MAC SDU, the MAC layer entity may read and delete a MAC subheader, and transfer the MAC SDU as an RLC PDU to the upper layer entity (RLC layer entity 1*l*-05 or 1*l*-10) in accordance with the logical channel identifier 1*l*-20 or 1*l*-25 included in the MAC subheader. For example, when each MAC subPDU included in the received MAC PDU is processed, a logical channel identifier of the MAC subheader of each MAC subPDU may be identified, and when the logical channel identifier is a first logical channel identifier (LCID 1) 1*l*-20, data processing may be performed by transferring the MAC SDU (or RLC PDU) of the MAC subPDU to the first RLC layer entity 1*l*-05 corresponding to the first logical channel identifier through a logical channel corresponding to the first logical channel identifier configured for the MAC layer entity. In addition, when the logical channel identifier is a second logical channel identifier (LCID 2) 1*l*-25, data processing may be performed by transferring the MAC SDU (or RLC PDU) of the MAC subPDU to the second RLC layer entity 1*l*-10 corresponding to the second logical channel identifier through a logical channel corresponding to the second logical channel identifier configured for the MAC layer entity.

In addition, when the MAC subPDU indicates padding or includes padding, the MAC subPDU may be discarded. In addition, the logical channel identifier included in the MAC subheader of the MAC subPDU corresponds to a logical channel identifier not configured for the MAC layer entity, or an unknown logical channel identifier, the MAC layer entity may discard the MAC subPDU.

Each RLC layer entity 1*l*-05 or 1*l*-10 having received the RLC PDU from the MAC layer entity may delete the RLC header and transfer the received RLC SDU to the upper layer entity (for example, PDCP layer entity), as the PDCP PDU. When the received RLC PDU includes an RLC SDU segment, the RLC layer entity may perform reassembly based on RLC PDUs received based on an RLC serial number of the RLC header, segment information (SI field), or segment offset information (SO field), so as to configure a complete RLC SDU and transfer the same to the upper layer entity, as the PDCP PDU.

Hereinafter, a problem which may occur when the DAPS handover method proposed above is performed is analyzed, and a solution thereto is proposed.

Figure 1M:
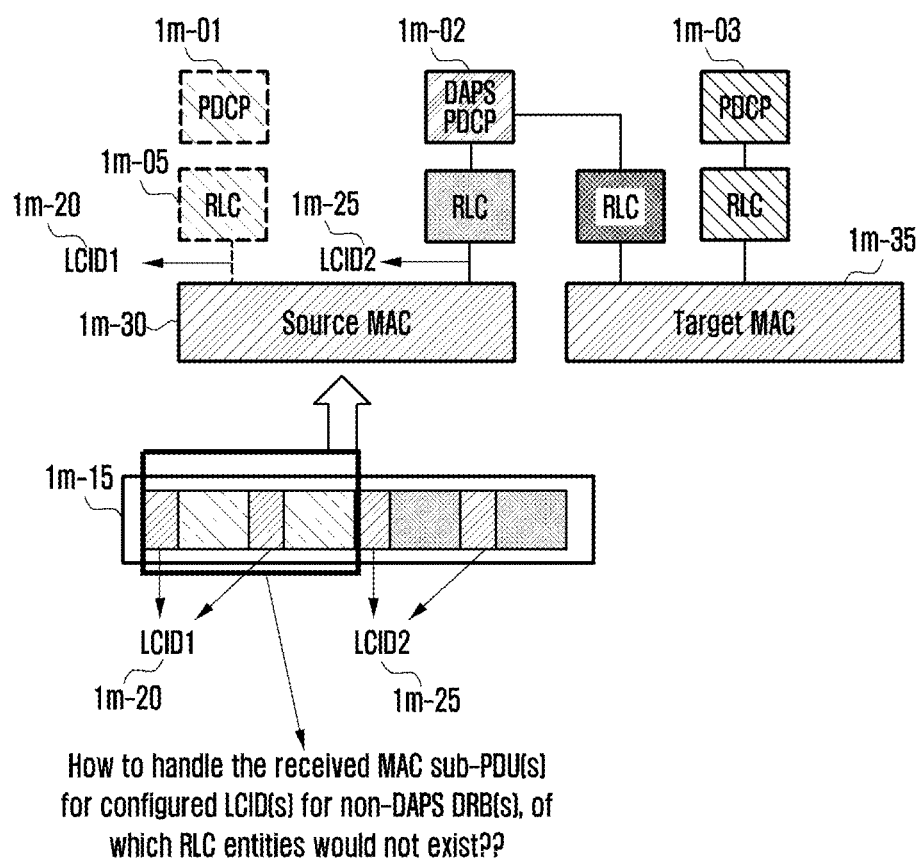
FIG. 1M illustrates a problem which may occur in a terminal when a DAPS handover method is performed according to an embodiment of the disclosure.

FIG. 1M illustrates a problem which may occur in a terminal when a DAPS handover method is performed according to an embodiment of the disclosure.

Referring to FIG. 1M, in the DAPS handover procedure proposed above in the disclosure, when the terminal receives a handover command message (for example, RRCReconfiguration message) and the RRC message configures or indicates a DAPS handover method for a bearer 1m-02 (for example, a bearer having a bearer identifier corresponding to the second logical channel identifier 1m-25) configured for the terminal, the terminal may, for the bearer for which the DAPS handover method is configured, configure the DAPS PDCP layer entity 1m-02, maintain, with respect to the DPAS PDCP layer entity, a connection with the RLC layer entity and the MAC layer entity 1m-30 for the source base station, or establish the RLC layer entity and the MAC layer entity 1m-35 for the target base station, and perform the proposed DAPS handover procedure, as proposed in operation 1h-02 or 1h-03 of FIG. 1H, operation 1j-22 in FIG. 1J, or FIGS. 1JAA and 1JAB. In addition, for the bearer 1m-01 (for example, the bearer having the bearer identifier corresponding to the first logical channel identifier 1m-20) for which the DAPS handover method is not configured, the terminal may perform the RLC re-establishment procedure or the PDCP re-establishment procedure according to the indication or configuration included in the RRC message, or establish or re-establish the RLC layer entity or the PDCP layer entity for the target base station for the bearer 1m-01 for which the DAPS handover method is not configured, according to the indication or configuration included in the RRC message, and make configuration through a connection with the MAC layer entity 1m-35 for the target base station (operation 1m-03). Accordingly, the RLC layer entity 1m-05 or the PDCP layer entity 1m-01 for the bearer 1m-01 for which the DAPS handover method is not configured does not exist in the MAC layer entity 1m-03 for the source base station.

As proposed in operation 1h-02 or 1h-03 in FIG. 1H, operation 1j-22 in FIG. 1J, or FIGS. 1JAA and 1JAB, the source base station may continuously transmit data having been transmitted to the terminal before the DAPS handover is indicated to the terminal via the RRC message (for example, RRCReconfiguration message), and may continuously perform retransmission. For example, when the source base station transmits the MAC PDU 1m-15 including the MAC subPDU for each of the first logical channel identifier 1m-20 and the second logical channel identifier 1m-25 to the terminal before transmitting the RRC message to the terminal, the terminal having failed to receive the MAC PDU transmits HARQ NACK to the source base station as feedback thereto, and the source base station configures or indicates, to the bearer for the bearer identifier corresponding to the second logical channel identifier, the DAPS handover method by transmitting the RRC message to the terminal, the terminal may perform the DAPS handover procedure as described above. However, the source base station having received the HARQ NACK due to the transmission failure may retransmit the MAC PDU 1m-15 to the terminal through HARQ retransmission even after the DAPS handover is indicated to the terminal.

When the MAC layer entity 1m-30 for the source base station of the terminal successfully receives the retransmitted MAC PDU 1m-15, the first logical channel identifier 1m-20 and the second logical channel identifier 1m-25 are configured in the MAC layer entity for the source base station, but the RLC layer entity 1m-05 or the PDCP layer entity 1m-01 corresponding to the first logical channel identifier 1m-20 does not exists according to the DAPS handover procedure, thus when the terminal performs data processing for the MAC PDU in units of MAC subPDU units, the terminal reads the MAC subheader, and may process the data by transferring the data to the RLC layer entity for the bearer 1m-02 for which the DAPS handover method is configured when the logical channel identifier is data corresponding to the second identifier 1m-25, however, when the terminal processes the data in units of MAC subPDU units, the terminal reads the MAC subheader, wherein the RLC layer entity 1m-05 for transferring the data (MAC SUD) does not exist when the logical channel identifier is data corresponding to the first identifier 1m-20, resulting in a problem that the data cannot be processed. Accordingly, the terminal cannot discard the data, or cannot continuously store the data, or an error may occur according to the implementation of the terminal. This is because a problem may occur since the first logical channel identifier is configured in the MAC layer entity, but the RLC layer entity corresponding thereto does not exists while the DAPS handover procedure is performed.

Hereinafter, methods which can solve the problems raised in FIG. 1M above are proposed. The following methods may be combined with each other or applied to each other so as to be extended to a new method, and may be extended to a new method through combination with or application to the other methods proposed above in the disclosure.

The first solution to the problem occurring in FIG. 1M may enable the problem to be solved by performing a procedure of discarding a MAC subPDU for the first logical channel identifier in a case where the terminal receives data for the first logical channel identifier (the logical channel identifier for which the DAPS handover method is not configured) when or while performing the DAPS handover procedure and the first logical channel identifier is configured in the MAC layer entity 1m-30 but there is no RLC layer entity 1m-05 corresponding thereto, as described above in FIG. 1M. That is, if there is no RLC layer entity 1m-05 capable of processing the MAC subPDU, the data cannot be processed anyway, and thus the MAC subPDU can be immediately discarded to prevent the memory from being unnecessarily occupied.

A specific embodiment of the first solution to the problem occurring in FIG. 1M is as follows.

1> Until the DAPS handover method is performed and the connection to the source base station is released (protocol layer entities for the source base station are released), during the DAPS handover, or when the DAPS handover procedure is performed, if the MAC layer entity (for example, the MAC layer entity for the source base station) receives a MAC PDU including a logical channel identifier (LCID or an extended LCID (eLCID)) for the bearer (non-DAPS DRB) for which the DAPS handover method is not configured (or not indicated) through the pre-configured downlink transmission resource (configured downlink assignment), the CS-RNTI, or the C-RNTI for the MAC layer entity,

- ■ 2> the MAC layer entity may discard the MAC subPDU (for example, the logical channel identifier (the subPDU corresponding to the LCID or the extended LCID (eLCID)) for the bearer (non-DAPS DRB) for which the DAPS handover method is not configured (or not indicated)) received from the MAC PDU.
- ■ 2> As another method, the MAC layer entity may discard the MAC subPDU (for example, the logical channel identifier (the subPDU corresponding to the LCID or the extended LCID (eLCID)) for the bearer (non-DAPS DRB) for which the DAPS handover method is not configured (or not indicated)) received from the MAC PDU, and the remaining MAC subPDUs. However, by discarding the same, data may be discarded and data loss may thus occur when data for the bearer for which the DAPS handover method is configured is remaining.

Another specific embodiment of the first solution to the problem occurring in FIG. 1M is as shown in [Table 1] below.

TABLE 1

5.13 Handling of unknown, unforeseen and erroneous protocol data
When a MAC entity (or the source MAC entity) receives a MAC PDU for the MAC entity's C-RNTI or CS-RNTI, or by the configured downlink assignment during DAPS handover, containing an LCID or eLCID value for non-DAPS DRB(s), the MAC entity shall at least:
1>    discard the received subPDU.

The second solution to the problem occurring in FIG. 1M may enable the problem to be solved by causing the first logical channel identifier not to be configured in the MAC layer entity 1m-30 (by releasing the configuration of the first logical channel identifier) so that the MAC layer entity performs a procedure of discarding a MAC subPDU for the first logical channel identifier in a case where the terminal receives data for the first logical channel identifier (the logical channel identifier for which the DAPS handover method is not configured) when or while performing the DAPS handover procedure, as described above in FIG. 1M. That is, if there is no RLC layer entity 1m-05 capable of processing the MAC subPDU, the data cannot be processed anyway, and thus the MAC subPDU can be immediately discarded to prevent the memory from being unnecessarily occupied.

Another specific embodiment of the second solution to the problem occurring in FIG. 1M is as follows.
- 1> When the terminal receives the RRCReconfiguration message,
  - ■ 2> if the DPAS bearer is configured,
    - ◆ 3> the terminal may release logical channels corresponding to the bearers (non-DAPS bearers) for which the DAPS handover method is not configured for the MAC layer entity for the source cell group or the source base station. As another method, the terminal may reconfigure logical channel configuration information so that the logical channel identifiers corresponding to the bearers (non-DAPS bearers) for which the DAPS handover method is not configured are not configured and only the logical channel identifiers for the bearers (DAPS bearers) for which the DAPS handover method is configured are configured. As described above in the in disclosure, when the DAPS handover method fails, the radio link failure does not occur in the connection with the source base station, the wireless connection is thus valid, and the fallback to the source base station is performed, the terminal may reconfigure or restore the released logical channels.
- 1> If the MAC layer entity (for example, the MAC layer entity for the source base station) receives a MAC PDU including a logical channel identifier (LCID or an extended LCID (eLCID)) not configured in the MAC layer entity (or cell group or cell) through the pre-configured downlink transmission resource (configured downlink assignment), the CS-RNTI, or the C-RNTI for the MAC layer entity,
  - ■ 2> the MAC layer entity may discard the MAC subPDU (for example, the logical channel identifier (the subPDU corresponding to the LCID or the extended LCID (eLCID)) not configured in the MAC layer entity (or cell group or cell)) received from the MAC PDU.

The third solution to the problem occurring in FIG. 1M is to prevent data for the first logical channel identifier (the logical channel identifier corresponding to the bearer for which the DAPS handover method is not configured) from being received in the terminal when or while the terminal performs the DAPS handover procedure as described above in FIG. 1M. For example, in a case where the source base station configures or indicates the DAPS handover method through the RRCReconfiguration message, if data for the first logical channel identifier (the logical channel identifier corresponding to the bearer for which the DAPS handover method is not configured) is included in the MAC PDU when the MAC PDU is transmitted as HARQ retransmission, the HARQ retransmission for the MAC PDU may be suspended, or the HARQ identifier or the HARQ process corresponding to the HARQ retransmission may be released, flushed, or initialized. As another method, it may be possible for the terminal not to expect that data for the first logical channel identifier (the logical channel identifier corresponding to the bearer for which the DAPS handover method is not configured) is to be received in the MAC layer entity for the source base station of the terminal. For example, it may be ensured through the implementation that data corresponding to the logical channel identifier for the bearer for which the DAPS handover method is not configured is not be included when the source base station transmits downlink data to the terminal or performs HARQ retransmission during the DAPS handover. That is, the RRC message for configuring the DAPS handover method after the reception of HARQ ACK to the MAC PDUs (MAC PDU including data corresponding to the logical channel identifier for the bearer for which the DAPS handover method is not configured) having been transmitted before the source base station configures the DAPS handover method for the terminal may be transmitted to the terminal.

Figure 1N:
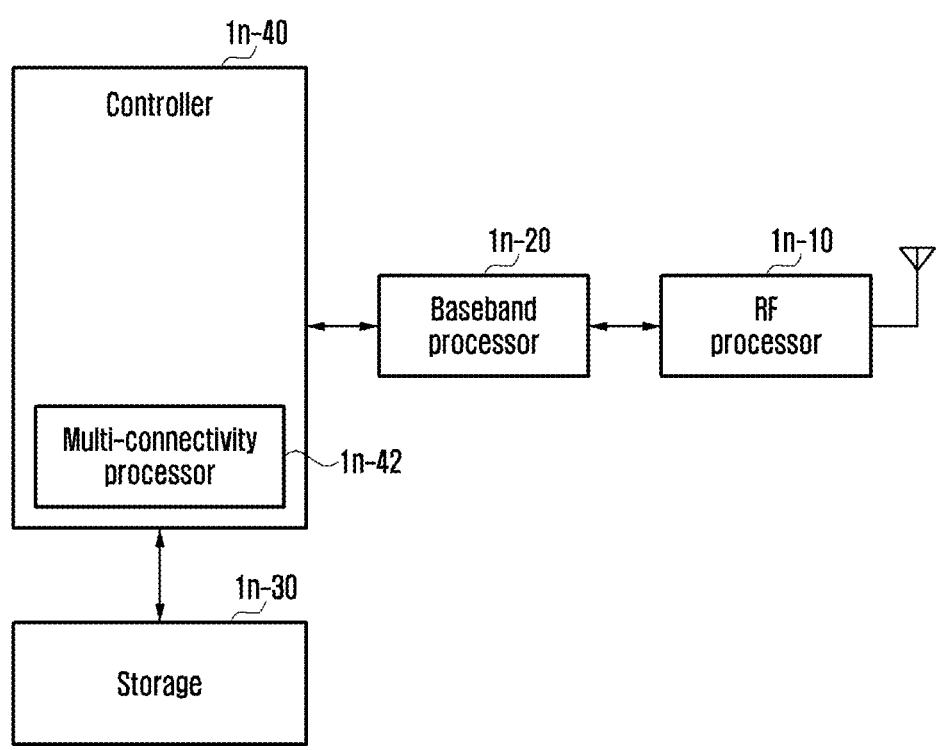
FIG. 1N is a block diagram illustrating a structure of a terminal according to an embodiment of the disclosure.
Figure 10:
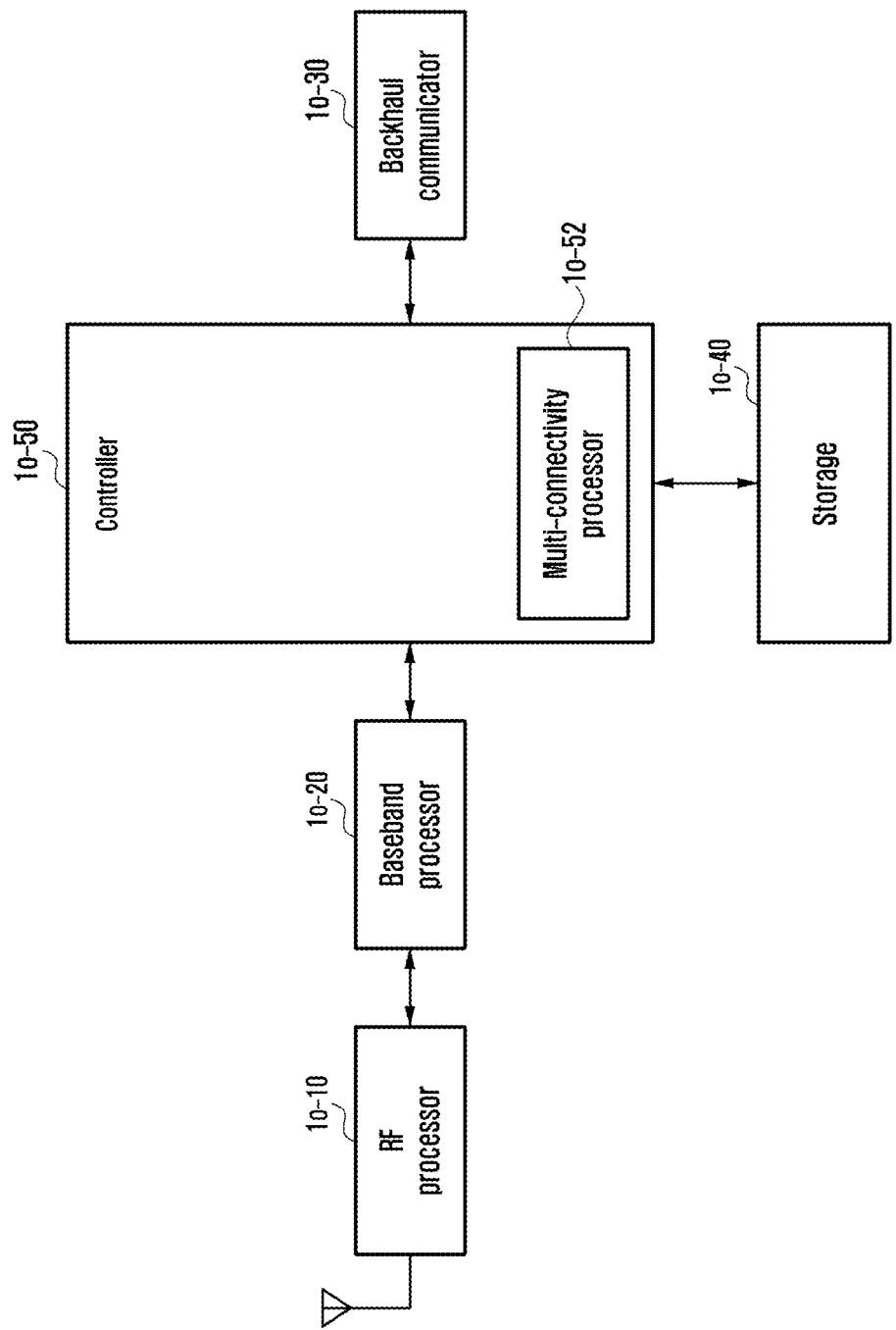

FIG. 1N is a block diagram illustrating a structure of a terminal according to an embodiment of the disclosure.

Referring to FIG. 1N, the terminal includes a radio frequency (RF) processor 1n-10, a baseband processor 1n-20, a storage 1n-30, and a controller 1n-40.

The RF processor 1n-10 performs functions for transmitting and receiving signals through a radio channel, such as signal band conversion and amplification. That is, the RF processor 1n-10 up-converts a baseband signal provided from the baseband processor 1n-20 into an RF band signal to transmit the same through an antenna, and down-converts an RF band signal received through the antenna into a baseband signal. For example, the RF processor 1n-10 may include a transmission filter, a reception filter, an amplifier, a mixer, an oscillator, a digital-to-analog converter (DAC), an analog-to-digital converter (ADC), and the like. Although only one antenna is illustrated in FIG. 1N, the terminal may include multiple antennas. In addition, the RF processor 1n-10 may include multiple RF chains. In addition, the RF processor 1n-10 may perform beamforming. For beamforming, the RF processor 1n-10 may adjust the respective phases and magnitudes of signals transmitted and received through multiple antennas or antenna elements. In addition, the RF processor may perform MIMO, and may receive multiple layers when performing the MIMO operation. The RF processor 1n-10 may perform reception beam sweeping by appropriately configuring multiple antennas or antenna elements under the control of the controller, or may adjust the direction and beam width of the reception beam so that the reception beam is coordinated with the transmission beam.

The baseband processor 1n-20 may perform a conversion function between a baseband signal and a bit string according to a physical layer standard of a system. For example, during transmission of data, the baseband processor 1n-20 may encode and modulate a transmission bit string to generate complex symbols. In addition, during reception of data, the baseband processor 1n-20 may reconstruct the reception bit string by demodulating and decoding the baseband signal provided from the RF processor 1n-10. For example, in the case of conforming to an OFDM scheme, during transmission of data, the baseband processor 1n-20 encodes and modulates the transmission bit string to generate complex symbols, maps the complex symbols to sub-carriers, and then configures OFDM symbols through an inverse fast Fourier transform (IFFT) operation and cyclic prefix (CP) insertion. In addition, during reception of data, the baseband processor 1n-20 segments the baseband signal provided from the RF processor 1n-10 in units of OFDM symbols, reconstructs signals mapped to sub-carriers through a fast Fourier transform (FFT) operation, and then reconstructs a reception bit string through demodulation and decoding.

The baseband processor 1n-20 and the RF processor 1n-10 transmit and receive signals as described above. Accordingly, the baseband processor 1n-20 and the RF processor 1n-10 may be referred to as a transmitter, a receiver, a transceiver, or a communicator. Furthermore, at least one of the baseband processor 1n-20 and the RF processor 1n-10 may include multiple communication modules so as to support multiple different radio access technologies. In addition, at least one of the baseband processor 1n-20 and the RF processor 1n-10 may include different communication modules so as to process signals of different frequency bands. For example, the different radio access technologies may include an LTE network, an NR network, and the like. In addition, the different frequency bands may include a super high frequency (SHF) (e.g., 2.5 GHz, 5 GHz) band and a millimeter wave (e.g., 60 GHz) band.

The storage 1n-30 stores data such as basic programs, application programs, and configuration information for the operations of the terminal. The storage 1n-30 provides stored data upon the request of the controller 1n-40.

The controller 1n-40 controls overall operations of the terminal. For example, the controller 1n-40 controls transmits and receives signals through the baseband processor 1n-20 and the RF processor 1n-10. In addition, the controller 1n-40 records data in the storage 1n-40 and reads data therefrom. To this end, the controller 1n-40 may include at least one processor. For example, the controller 1n-40 may include a communication processor (CP) that performs control for communication, and an application processor (AP) that controls an upper layer, such as an application program.

FIG. 1O illustrates a block configuration of a TRP in a wireless communication system according to an embodiment of the disclosure.

Referring to FIG. 1O, the base station includes an RF processor 1o-10, a baseband processor 1o-20, a backhaul communicator 1o-30, a storage 1o-40, and a controller 1o-50.

The RF processor 1o-10 performs functions for transmitting and receiving signals through a radio channel, such as signal band conversion and amplification. That is, the RF processor 1o-10 up-converts a baseband signal provided from the baseband processor 1o-20 into an RF band signal to transmit the same through an antenna, and down-converts an RF band signal received through the antenna into a baseband signal. For example, the RF processor 1o-10 may include a transmission filter, a reception filter, an amplifier, a mixer, an oscillator, a DAC, an ADC, and the like. Although only one antenna is illustrated in FIG. 1O, the first access node may include multiple antennas. In addition, the RF processor 1o-10 may include multiple RF chains. Furthermore, the RF processor 1o-10 may perform beamforming. For beamforming, the RF processor 1o-10 may adjust the respective phases and magnitudes of signals transmitted and received through multiple antennas or antenna elements. The RF processor may perform a downlink MIMO operation by transmitting one or more layers.

The baseband processor 1o-20 performs a conversion function between a baseband signal and a bit string according to a physical layer standard of a first radio access technology. For example, during transmission of data, the baseband processor 1o-20 encodes and modulates a transmission bit string to generate complex symbols. In addition, during reception of data, the baseband processor 1o-20 reconstructs the reception bit string by demodulating and decoding the baseband signal provided from the RF processor 1o-10. For example, in the case of conforming to an OFDM scheme, during transmission of data, the baseband processor 1o-20 encodes and modulates the transmission bit string to generate complex symbols, maps the complex symbols to sub-carriers, and then configure OFDM symbols through an IFFT operation and CP insertion. In addition, during reception of data, the baseband processor 1o-20 segments the baseband signal provided from the RF processor 1o-10 in units of OFDM symbols, reconstructs signals mapped to sub-carriers through an FFT operation, and then reconstructs a reception bit string through demodulation and decoding. The baseband processor 1o-20 and the RF processor 1o-10 transmit and receive signals as described above. Accordingly, the baseband processor 1o-20 and the RF processor 1o-10 may be referred to as a transmitter, a receiver, a transceiver, a communicator, or a wireless communicator.

The communicator 1o-30 provides an interface for performing communication with other nodes in the network.

The storage 1o-40 stores data such as basic programs, application programs, and configuration information for the operations of the base station. Particularly, the storage 1o-40 may store information about bearers allocated to the connected terminal, measurement results reported from the connected terminal, etc. In addition, the storage 1o-40 may store information that is the criterion for determining whether to provide multiple connections to the terminal or to stop multiple connections. The storage 1o-40 provides stored data upon the request of the controller 1o-50.

The controller 1o-50 controls overall operations of the base station. For example, the controller 1o-50 transmits and receives signals through the baseband processor 1o-20 and the RF processor 1o-10 or through the backhaul communicator 1o-30. In addition, the controller 1o-50 records data in the storage 1o-40 and reads data therefrom. To this end, the controller 1o-50 may include at least one processor.

The invention claimed is:

1. A method performed by a terminal of a wireless communication system, the method comprising:
    receiving, from a source base station, a handover command message indicating a dual active protocol stack (DAPS) handover for at least one bearer;
    receiving, from the source base station, a medium access control (MAC) protocol data unit (PDU) comprising a MAC subPDU (sub protocol data unit) for a bearer for which the DAPS handover is not configured, during the DAPS handover; and
    discarding the MAC subPDU for the bearer for which the DAPS handover is not configured.

2. The method of claim 1, wherein the MAC subPDU for the bearer for which the DAPS handover is not configured comprises a logical channel identifier (LCID) or an eLCID (extended LCID) value for the bearer for which the DAPS handover is not configured.

3. The method of claim 1, wherein during the DAPS handover, the terminal performs data transmission or reception with the source base station by using a protocol layer device for the source base station and performs data transmission or reception with a target base station by using a protocol layer device for the target base station.

4. The method of claim 1, further comprising:
    creating a protocol layer device for a target base station corresponding to the at least one bearer for which the DAPS handover is configured; and
    performing a random access procedure with the target base station by using the protocol layer device for the target base station.

5. The method of claim 1, further comprising:
    transmitting an uplink data to a target base station except for the source base station through a protocol layer device for the target base station, in case that a first condition is satisfied.

6. The method of claim 5, wherein the first condition comprises a random access procedure toward the target base station has been successfully completed.

7. The method of claim 1, further comprising:
    receiving, from the source base station, a downlink data until a second condition is satisfied.

8. The method of claim 7, wherein the second condition comprises a connection with the source base station is released by an explicit release command from the target base station.

9. A terminal of a wireless communication system, the terminal comprising:
    a transceiver; and
    a controller coupled with the transceiver and configured to:
    receive, from a source base station, a handover command message indicating a dual active protocol stack (DAPS) handover for at least one bearer,
    receive, from the source base station, a medium access control (MAC) protocol data unit (PDU) comprising a MAC subPDU (sub protocol data unit) for a bearer for which the DAPS handover is not configured, during the DAPS handover, and
    discard the MAC subPDU for the bearer for which the DAPS handover is not configured.

10. The terminal of claim 9, wherein the MAC subPDU for the bearer for which the DAPS handover is not configured comprises a logical channel identifier (LCID) or an eLCID (extended LCID) value for the bearer for which the DAPS handover is not configured.

11. The terminal of claim 9, wherein during the DAPS handover, the controller performs data transmission or reception with the source base station by using a protocol layer device for the source base station and performs data transmission or reception with a target base station by using a protocol layer device for the target base station.

12. The terminal of claim 9, wherein the controller is configured to:
    create a protocol layer device for a target base station corresponding to the at least one bearer for which the DAPS handover is configured; and
    perform a random access procedure with the target base station by using the protocol layer device for the target base station.

13. The terminal of claim 9, wherein the controller is configured to:
    transmit an uplink data to a target base station except for the source base station through a protocol layer device for the target base station, in case that a first condition is satisfied.

14. The terminal of claim 13, wherein the first condition comprises a random access procedure toward the target base station has been successfully completed.

15. The terminal of claim 9, wherein the controller is configured to:
    receive, from the source base station, a downlink data from the target base station until a second condition is satisfied.

16. The terminal of claim 15, wherein the second condition comprises a connection with the source base station is released by an explicit release command from the target base station.

* * * * *